United States Patent
Teng et al.

(10) Patent No.: US 7,937,655 B2
(45) Date of Patent: May 3, 2011

(54) WORKFLOWS WITH ASSOCIATED PROCESSES

(75) Inventors: Joan C. Teng, Foster City, CA (US); Thomas B. Remahl, Los Altos, CA (US)

(73) Assignee: Oracle International Corporation, Redwood Shores, CA (US)

(*) Notice: Subject to any disclaimer, the term of this patent is extended or adjusted under 35 U.S.C. 154(b) by 1044 days.

(21) Appl. No.: 09/999,074

(22) Filed: Nov. 30, 2001

(65) Prior Publication Data

US 2002/0138543 A1    Sep. 26, 2002

Related U.S. Application Data

(60) Provisional application No. 60/258,087, filed on Dec. 22, 2000, provisional application No. 60/285,524, filed on Apr. 20, 2001.

(51) Int. Cl.
*G06F 17/00* (2006.01)
(52) U.S. Cl. ........ 715/255; 715/229; 707/733; 707/734; 705/8
(58) Field of Classification Search .................. 715/530, 715/255, 229; 718/102; 717/100, 101, 102; 705/7–9; 707/200, 7–10, 609, 733, 734
See application file for complete search history.

(56) References Cited

U.S. PATENT DOCUMENTS

| | | | |
|---|---|---|---|
| 5,077,666 A | 12/1991 | Brimm et al. | |
| 5,301,320 A | 4/1994 | McAtee et al. | |
| 5,455,953 A | 10/1995 | Russell | |
| 5,530,861 A | 6/1996 | Diamant et al. | |
| 5,581,691 A | 12/1996 | Hsu et al. | |
| 5,659,616 A | 8/1997 | Sudia | |
| 5,678,041 A | 10/1997 | Baker et al. | |
| 5,692,125 A | 11/1997 | Schloss et al. | |
| 5,708,780 A | 1/1998 | Levergood et al. | |
| 5,734,837 A * | 3/1998 | Flores et al. | 705/7 |
| 5,745,574 A | 4/1998 | Muftic | |
| 5,764,890 A | 6/1998 | Glasser et al. | |
| 5,796,841 A | 8/1998 | Cordery et al. | |
| 5,815,152 A | 9/1998 | Collier et al. | |
| 5,822,454 A | 10/1998 | Rangarajan | |

(Continued)

FOREIGN PATENT DOCUMENTS

WO    WO 00/70507 A    11/2000

(Continued)

OTHER PUBLICATIONS

Leon, McAfee's NetTools Promises to Ease Network Desktop Diagnosis, InfoWorld, San Mateo, Jul. 24, 1995, vol. 17, Iss. 30. p. 53.

(Continued)

*Primary Examiner* — Thu Huynh
(74) *Attorney, Agent, or Firm* — Kilpatrick Townsend & Stockton LLP

(57) ABSTRACT

Workflows are used to automate processes. When a first workflow is performed, it may invoke a set of one or more nested workflows, workflows in other applications or services in other applications. The first workflow can be configured to pause and wait for the invoked set of one or more nested workflows, workflows in other applications, or services in other applications. Alternatively, the first workflow can be configured to proceed without waiting. Various means are disclosed for re-staring the first workflow and providing data back for the first workflow.

55 Claims, 52 Drawing Sheets

U.S. PATENT DOCUMENTS

| | | |
|---|---|---|
| 5,831,975 A | 11/1998 | Chen et al. |
| 5,867,665 A | 2/1999 | Butman et al. |
| 5,867,824 A * | 2/1999 | Saito et al. ............... 705/9 |
| 5,884,284 A | 3/1999 | Peters et al. |
| 5,901,287 A | 5/1999 | Bull et al. |
| 5,903,882 A | 5/1999 | Asay et al. |
| 5,907,837 A | 5/1999 | Ferrel et al. |
| 5,940,834 A | 8/1999 | Pinard et al. |
| 5,940,843 A * | 8/1999 | Zucknovich et al. ......... 715/210 |
| 5,944,824 A | 8/1999 | He |
| 5,960,422 A | 9/1999 | Prasad |
| 5,961,593 A | 10/1999 | Gabber et al. |
| 5,966,702 A | 10/1999 | Fresko et al. |
| 5,987,457 A | 11/1999 | Ballard |
| 5,987,471 A | 11/1999 | Bodine et al. |
| 5,987,611 A | 11/1999 | Freund |
| 5,991,768 A | 11/1999 | Sun et al. |
| 5,991,807 A | 11/1999 | Schmidt et al. |
| 5,991,810 A | 11/1999 | Shapiro et al. |
| 5,999,911 A | 12/1999 | Berg et al. |
| 6,012,098 A | 1/2000 | Bayeh et al. |
| 6,041,306 A | 3/2000 | Du et al. |
| 6,044,462 A | 3/2000 | Zubeldia et al. |
| 6,061,726 A | 5/2000 | Cook et al. |
| 6,061,740 A | 5/2000 | Ferguson et al. |
| 6,067,548 A | 5/2000 | Cheng |
| 6,073,109 A | 6/2000 | Flores et al. |
| 6,073,242 A | 6/2000 | Hardy et al. |
| 6,098,056 A | 8/2000 | Rusnak et al. |
| 6,104,705 A | 8/2000 | Ismail et al. |
| 6,105,006 A | 8/2000 | Davis et al. |
| 6,105,063 A | 8/2000 | Hayes, Jr. |
| 6,105,066 A * | 8/2000 | Hayes, Jr. ............... 709/226 |
| 6,112,181 A | 8/2000 | Shear et al. |
| 6,112,225 A | 8/2000 | Kraft et al. |
| 6,112,243 A | 8/2000 | Downs et al. |
| 6,131,120 A | 10/2000 | Reid |
| 6,138,104 A | 10/2000 | Marchk et al. |
| 6,141,778 A | 10/2000 | Kane et al. |
| 6,151,531 A | 11/2000 | Frankel et al. |
| 6,154,776 A | 11/2000 | Martin |
| 6,158,010 A | 12/2000 | Moriconi et al. |
| 6,161,139 A * | 12/2000 | Win et al. ............... 709/225 |
| 6,173,311 B1 | 1/2001 | Hassett et al. |
| 6,182,142 B1 | 1/2001 | Win et al. |
| 6,195,689 B1 | 2/2001 | Bahlmann |
| 6,195,696 B1 | 2/2001 | Baber et al. |
| 6,208,986 B1 | 3/2001 | Schneck et al. |
| 6,212,558 B1 | 4/2001 | Antur et al. |
| 6,216,231 B1 | 4/2001 | Stubblebine |
| 6,219,667 B1 | 4/2001 | Lu et al. |
| 6,223,205 B1 | 4/2001 | Harchol-Balter et al. |
| 6,223,291 B1 | 4/2001 | Puhl et al. |
| 6,256,739 B1 | 7/2001 | Skopp et al. |
| 6,263,332 B1 | 7/2001 | Nasr et al. |
| 6,263,363 B1 | 7/2001 | Rosenblatt et al. |
| 6,266,420 B1 | 7/2001 | Langford et al. |
| 6,275,916 B1 | 8/2001 | Weldon, Jr. et al. |
| 6,292,833 B1 | 9/2001 | Liao et al. |
| 6,295,061 B1 | 9/2001 | Park et al. |
| 6,304,949 B1 | 10/2001 | Houlsdworth |
| 6,317,783 B1 | 11/2001 | Freishtat et al. |
| 6,330,569 B1 | 12/2001 | Baisley et al. |
| 6,336,124 B1 | 1/2002 | Alam et al. |
| 6,336,214 B1 | 1/2002 | Sundaresan |
| 6,338,097 B1 | 1/2002 | Krenzke et al. |
| 6,347,312 B1 | 2/2002 | Byrne et al. |
| 6,356,996 B1 | 3/2002 | Adams |
| 6,366,913 B1 | 4/2002 | Fitler, Jr. et al. |
| 6,367,013 B1 | 4/2002 | Bisbee et al. |
| 6,389,589 B1 | 5/2002 | Mishra et al. |
| 6,397,232 B1 | 5/2002 | Cheng-Hung et al. |
| 6,408,336 B1 | 6/2002 | Schneider et al. |
| 6,418,446 B1 | 7/2002 | Lection et al. |
| 6,434,531 B1 | 8/2002 | Lancelot et al. |
| 6,438,690 B1 | 8/2002 | Patel et al. |
| 6,442,567 B1 | 8/2002 | Retallick et al. |
| 6,457,066 B1 | 9/2002 | Mein et al. |
| 6,487,600 B1 | 11/2002 | Lynch |
| 6,493,702 B1 | 12/2002 | Adar et al. |
| 6,493,731 B1 * | 12/2002 | Jones et al. ............... 715/501.1 |
| 6,507,857 B1 | 1/2003 | Yalcinalp |
| 6,519,571 B1 * | 2/2003 | Guheen et al. ............... 705/14 |
| 6,519,767 B1 | 2/2003 | Carter et al. |
| 6,523,027 B1 | 2/2003 | Underwood |
| 6,539,021 B1 | 3/2003 | Kennelly et al. |
| 6,539,379 B1 | 3/2003 | Vora et al. |
| 6,542,515 B1 | 4/2003 | Kumar et al. |
| 6,563,830 B1 | 5/2003 | Gershon et al. |
| 6,564,370 B1 | 5/2003 | Hunt |
| 6,571,216 B1 | 5/2003 | Garg et al. |
| 6,571,279 B1 | 5/2003 | Herz et al. |
| 6,574,675 B1 | 6/2003 | Swenson |
| 6,587,856 B1 | 7/2003 | Srinivasan et al. |
| 6,591,260 B1 | 7/2003 | Schwarzhoff et al. |
| 6,606,644 B1 | 8/2003 | Ford et al. |
| 6,609,198 B1 | 8/2003 | Wood et al. |
| 6,632,251 B1 * | 10/2003 | Rutten et al. ............... 715/530 |
| 6,643,661 B2 | 11/2003 | Polizzi et al. |
| 6,662,365 B1 | 12/2003 | Sullivan et al. |
| 6,671,695 B2 | 12/2003 | McFadden |
| 6,671,853 B1 | 12/2003 | Burkett et al. |
| 6,675,261 B2 | 1/2004 | Shandony |
| 6,678,733 B1 | 1/2004 | Brown et al. |
| 6,711,607 B1 | 3/2004 | Goyal |
| 6,711,616 B1 | 3/2004 | Stamm et al. |
| 6,721,318 B1 | 4/2004 | Cai et al. |
| 6,721,716 B1 * | 4/2004 | Gross ............... 705/40 |
| 6,728,685 B1 * | 4/2004 | Ahluwalia ............... 705/26 |
| 6,745,327 B1 | 6/2004 | Messing |
| 6,748,374 B1 | 6/2004 | Madan et al. |
| 6,748,569 B1 | 6/2004 | Brooke et al. |
| 6,751,797 B1 | 6/2004 | Desgranges et al. |
| 6,754,702 B1 | 6/2004 | Kennelly et al. |
| 6,775,782 B1 | 8/2004 | Buros et al. |
| 6,782,379 B2 | 8/2004 | Lee |
| 6,785,726 B1 | 8/2004 | Freeman et al. |
| 6,791,949 B1 | 9/2004 | Ryu et al. |
| 6,801,940 B1 | 10/2004 | Moran et al. |
| 6,816,871 B2 | 11/2004 | Lee |
| 6,823,513 B1 | 11/2004 | McNally et al. |
| 6,839,680 B1 * | 1/2005 | Liu et al. ............... 705/10 |
| 6,839,752 B1 | 1/2005 | Miller et al. |
| 6,842,863 B1 | 1/2005 | Fox et al. |
| 6,851,054 B2 | 2/2005 | Wheeler et al. |
| 6,854,016 B1 | 2/2005 | Kraenzel et al. |
| 6,859,783 B2 | 2/2005 | Cogger et al. |
| 6,859,823 B1 | 2/2005 | Nishihara et al. |
| 6,886,170 B1 | 4/2005 | Bahrs et al. |
| 6,901,588 B1 | 5/2005 | Krapf et al. |
| 6,959,415 B1 | 10/2005 | Soderberg et al. |
| 6,963,573 B1 | 11/2005 | Cain et al. |
| 6,963,917 B1 | 11/2005 | Callis et al. |
| 6,968,503 B1 | 11/2005 | Chang et al. |
| 6,970,862 B2 | 11/2005 | Kwan |
| 6,981,212 B1 | 12/2005 | Claussen et al. |
| 6,986,138 B1 | 1/2006 | Sakaguchi et al. |
| 7,031,944 B2 | 4/2006 | Tanioka |
| 7,031,999 B1 * | 4/2006 | Ludwig et al. ............... 709/202 |
| 7,058,798 B1 | 6/2006 | Elley et al. |
| 7,080,078 B1 | 7/2006 | Slaughter et al. |
| 7,085,834 B2 | 8/2006 | Delany et al. |
| 7,107,526 B1 | 9/2006 | Weller |
| 7,120,914 B1 | 10/2006 | Manthos et al. |
| 7,124,354 B1 | 10/2006 | Ramani et al. |
| 7,143,048 B1 * | 11/2006 | Ruben et al. ............... 705/1 |
| 7,213,249 B2 | 5/2007 | Tung Loo et al. |
| 7,216,163 B2 | 5/2007 | Sinn |
| 7,308,702 B1 | 12/2007 | Thomsen et al. |
| 7,349,912 B2 | 3/2008 | Delany et al. |
| 7,363,339 B2 | 4/2008 | Delany et al. |
| 7,380,008 B2 | 5/2008 | Teng et al. |
| 7,415,607 B2 | 8/2008 | Sinn |
| 7,464,162 B2 | 12/2008 | Chan |
| 7,475,136 B2 | 1/2009 | Sinn |
| 7,475,151 B2 | 1/2009 | Delany et al. |
| 7,516,360 B2 | 4/2009 | Bacher et al. |

| 7,581,011 | B2 | 8/2009 | Teng |
| 7,584,250 | B1* | 9/2009 | Chapman et al. ............ 709/206 |
| 7,673,047 | B2 | 3/2010 | Delany et al. |
| 7,711,818 | B2 | 5/2010 | Lee et al. |
| 2001/0002485 | A1 | 5/2001 | Bisbee et al. |
| 2001/0007133 | A1 | 7/2001 | Moriconi et al. |
| 2001/0023440 | A1 | 9/2001 | Franklin et al. |
| 2001/0027439 | A1 | 10/2001 | Holtzman et al. |
| 2001/0049770 | A1 | 12/2001 | Cai et al. |
| 2002/0013777 | A1* | 1/2002 | Diener ............................ 707/1 |
| 2002/0023132 | A1 | 2/2002 | Tornabene et al. |
| 2002/0032684 | A1 | 3/2002 | Kobayashi et al. |
| 2002/0053023 | A1 | 5/2002 | Patterson et al. |
| 2002/0062435 | A1 | 5/2002 | Nemirovsky et al. |
| 2002/0065701 | A1* | 5/2002 | Kim et al. ........................ 705/9 |
| 2002/0066033 | A1 | 5/2002 | Dobbins et al. |
| 2002/0078307 | A1 | 6/2002 | Zahir |
| 2002/0091836 | A1* | 7/2002 | Moetteli ...................... 709/227 |
| 2002/0099822 | A1 | 7/2002 | Rubin et al. |
| 2002/0103819 | A1 | 8/2002 | Duvillier et al. |
| 2002/0108003 | A1 | 8/2002 | Ellis et al. |
| 2002/0129024 | A1 | 9/2002 | Lee |
| 2002/0129135 | A1 | 9/2002 | Delany et al. |
| 2002/0129177 | A1 | 9/2002 | McGuire et al. |
| 2002/0133516 | A1 | 9/2002 | Davis et al. |
| 2002/0138572 | A1 | 9/2002 | Delany et al. |
| 2002/0138577 | A1 | 9/2002 | Teng et al. |
| 2002/0138763 | A1 | 9/2002 | Delany et al. |
| 2002/0143865 | A1 | 10/2002 | Tung Loo et al. |
| 2002/0143943 | A1 | 10/2002 | Lee et al. |
| 2002/0143949 | A1* | 10/2002 | Rajarajan et al. ............ 709/226 |
| 2002/0147746 | A1 | 10/2002 | Lee |
| 2002/0147801 | A1 | 10/2002 | Gullotta et al. |
| 2002/0147813 | A1 | 10/2002 | Teng et al. |
| 2002/0152244 | A1 | 10/2002 | Dean et al. |
| 2002/0152254 | A1 | 10/2002 | Teng |
| 2002/0156879 | A1 | 10/2002 | Delany et al. |
| 2002/0166049 | A1 | 11/2002 | Sinn |
| 2002/0174238 | A1 | 11/2002 | Sinn et al. |
| 2002/0184444 | A1 | 12/2002 | Shandony |
| 2003/0065921 | A1 | 4/2003 | Chang |
| 2003/0105654 | A1 | 6/2003 | Macleod et al. |
| 2003/0110376 | A1 | 6/2003 | Wiener et al. |
| 2003/0145074 | A1 | 7/2003 | Penick |
| 2004/0002903 | A1 | 1/2004 | Stolfo et al. |
| 2004/0003351 | A1 | 1/2004 | Sommerer et al. |
| 2004/0049675 | A1 | 3/2004 | Micali et al. |
| 2004/0064356 | A1* | 4/2004 | Saito et al. ........................ 705/9 |
| 2004/0103413 | A1 | 5/2004 | Mandava et al. |
| 2004/0153509 | A1* | 8/2004 | Alcorn et al. ................. 709/205 |
| 2005/0015340 | A1 | 1/2005 | Maes |
| 2005/0138363 | A1 | 6/2005 | Fox et al. |
| 2006/0159109 | A1 | 7/2006 | Lamkin et al. |
| 2006/0195575 | A1 | 8/2006 | Delany |
| 2006/0212574 | A1 | 9/2006 | Maes |

FOREIGN PATENT DOCUMENTS

WO     WO 02/07396 A1     1/2002

OTHER PUBLICATIONS

Cooney. IBM rolls out host- and server-based mgmt. apps, Network World, Framingham, Feb. 6, 1995, vol. 12, Iss. 6, pp. 6-7.
Walsh, Remedy releases three applications for help-desk suite, InfoWorld, San Mateo. Apr. 21, 1997, vol. 19, Iss. 16, p. 34.
Schmersal, Testing to maintain service standards, Communications News, Nokomis, Mar. 1998, vol. 35, Iss. 3, pp. 22-23.
Musthaler, The trouble with help desk selection, Network World, Framingham, Feb. 20, 1995, vol. 12, Iss. 8. pp. 35-39.
Clear Trust, Unified Access Management, Securant Technologies, Inc., pp. 1-23, 1997.
SiteMinder Agent Operations, Verson 4.0, Netegrity Inc., 1997.
SiteMinder Deployment Guide, Version 4.0, Netegrity Inc., 1997.
SiteMinder Policy Server Operations Guide, Version 4.0, Netegrity Inc., 1997.
SiteMinder Developer's API Guide, Version 4.0, Netegrity Inc., 1997.
SiteMinder Installation Guide, Version 4.0, Netegrity Inc., 1997.
Camenisch, Jan et al., "Privacy and Identity Management for Everyone", ACM, 2005, 8 pages.
Howes, Timothy A. et al., "Understanding And Deploying LDAP Directory Services," Netscape Communications Corporation, pp. cover pp. 102-105, 277-292 and 699-723, 1999.
Microsoft, "Microsoft's Vision for an Identity Metasystem", Microsoft Corporation, http://www.identityblog.com/stories/2005/07/05/IdentityMetasystem.htm, printed date Oct. 6, 2002, 9 pages.
PC PRO, "Identity Systems", http://research.pcpro.co.uk/detail/ORG/1139341311_744.html, printed date Oct. 6, 2006, 2 pages.
Prasad, CK, "Distributing Sun Java System Identity Server Applications Using Java Web Start", Article Index, Apr. 2004, 8 pages.
Wahl, M., "Informed Control Enabling Identity Interoperability", http://www.Idap.com/1/commentary/wahl/20050203_.shtml, Feb 3, 2005, 3 pages.
U.S. Appl. No. 09/997,408, Office Action dated Sep. 7, 2005, 11 pages.
U.S. Appl. No. 09/997,408, Final Office Action dated Feb. 15, 2006, 7 pages.
U.S. Appl. No. 09/997,408, Advisory Action dated Apr. 27, 2006, 3 pages.
U.S. Appl. No. 09/997,408, Office Action dated Aug. 7, 2006, 17 pages.
U.S. Appl. No. 09/997,408, Notice of Allowance dated Jan. 25, 2007, 5 pages.
U.S. Appl. No. 09/997,409, Office Action dated Jun. 3, 2005, 17 pages.
U.S. Appl. No. 09/997,409, Office Action dated Nov. 7, 2005, 12 pages.
U.S. Appl. No. 09/997,409, Office Action dated May 3, 2006, 9 pages.
U.S. Appl. No. 09/997,409, Advisory Action dated Jul. 12, 2006, 3 pages.
U.S. Appl. No. 09/997,409, Office Action dated Oct. 20, 2006, 21 pages.
U.S. Appl. No. 09/997,409, Notice of Allowance dated Sep. 7, 2007, 20 pages.
U.S. Appl. No. 09/998,893, Office Action dated Jun. 13, 2005, 21 pages.
U.S. Appl. No. 09/998,893, Final Office Action dated Dec. 28, 2005, 12 pages.
U.S. Appl. No. 09/998,893, Advisory Action dated Mar. 28, 2006, 3 pages.
U.S. Appl. No. 09/998,893, Office Action dated Jul. 17, 2006, 17 pages.
U.S. Appl. No. 09/998,893, Final Office Action dated Jan. 4, 2007, 12 pages.
U.S. Appl. No. 09/998,893, Advisory Action dated Mar. 22, 2007, 6 pages.
U.S. Appl. No. 09/998,893, Office Action dated Jul. 16, 2007, 11 pages.
U.S. Appl. No. 09/998,895, Office Action dated Mar. 25, 2005, 18 pages.
U.S. Appl. No. 09/998,895, Final Office Action dated Aug. 1, 2005, 19 pages.
U.S. Appl. No. 09/998,895, Advisory Action dated Oct. 20, 2005, 3 pages.
U.S. Appl. No. 09/998,895, Office Action dated Feb. 7, 2006, 13 pages.
U.S. Appl. No. 09/998,895, Final Office Action dated Jul. 20, 2006, 22 pages.
U.S. Appl. No. 09/998,895, Advisory Action dated Sep. 26, 2006, 3 pages.
U.S. Appl. No. 09/998,895, Final Office Action dated Jan. 18, 2007, 17 pages.
U.S. Appl. No. 09/998,895, Advisory Action dated Apr. 10, 2007, 6 pages.
U.S. Appl. No. 09/998,895, Office Action dated Jul. 26, 2007, 17 pages.
U.S. Appl. No. 09/998,898, Office Action dated Sep. 21, 2005, 13 pages.
U.S. Appl. No. 09/998,898, Office Action dated Mar. 28, 2006, 7 pages.

U.S. Appl. No. 09/998,898, Final Office Action dated Oct. 4, 2006, 7 pages.
U.S. Appl. No. 09/998,898, Advisory Office Action dated Dec. 29, 2006, 3 pages.
U.S. Appl. No. 09/998,898, Office Action dated Mar. 7, 2007, 10 pages.
U.S. Appl. No. 09/998,898, Final Office Action dated Aug. 24, 2007, 8 pages.
U.S. Appl. No. 09/998,898, Office Action dated Nov. 14, 2007, 8 pages.
U.S. Appl. No. 09/998,908, Office Action dated Jan. 25, 2005, 23 pages.
U.S. Appl. No. 09/998,908, Final Office Action dated Aug. 22, 2005, 15 pages.
U.S. Appl. No. 09/998,908, Advisory Action dated Nov. 1, 2005, 3 pages.
U.S. Appl. No. 09/998,908, Office Action dated Feb. 16, 2006, 15 pages.
U.S. Appl. No. 09/998,908, Final Office Action dated Aug. 22, 2006, 25 pages.
U.S. Appl. No. 09/998,908, Advisory Action dated Nov. 20, 2006, 3 pages.
U.S. Appl. No. 09/998,908, Examiner's Answer dated Jun. 19, 2007, 16 pages.
U.S. Appl. No. 09/998,908, Supplemental Examiner's Answer dated Jul. 30, 2007, 17 pages.
U.S. Appl. No. 09/998,910, Office Action dated Jan. 28, 2005, 12 pages.
U.S. Appl. No. 09/998,910, Final Office Action dated Aug. 19, 2005, 6 pages.
U.S. Appl. No. 09/998,910, Office Action dated Dec. 13, 2005, 10 pages.
U.S. Appl. No. 09/998,910, Office Action dated Apr. 25, 2006, 19 pages.
U.S. Appl. No. 09/998,910, Advisory Action dated Aug. 1, 2006, 3 pages.
U.S. Appl. No. 09/998,910, Office Action dated Sep. 27, 2006, 12 pages.
U.S. Appl. No. 09/998,910, Final Office Action dated Feb. 14, 2007, 15 pages.
U.S. Appl. No. 09/998,910, Office Action dated Oct. 31, 2007, 13 pages.
U.S. Appl. No. 09/998,914, Office Action dated Jul. 14, 2005, 19 pages.
U.S. Appl. No. 09/998,914, Final Office Action dated Jan. 30, 2006, 15 pages.
U.S. Appl. No. 09/998,914, Advisory Action dated Apr. 19, 2006, 3 pages.
U.S. Appl. No. 09/998,914, Office Action dated Sep. 6, 2006, 18 pages.
U.S. Appl. No. 09/998,914, Final Office Action dated Feb. 16, 2007, 13 pages.
U.S. Appl. No. 09/998,914, Advisory Action dated Apr. 25, 2007, 3 pages.
U.S. Appl. No. 09/998,914, Office Action dated Jun. 22, 2007, 14 pages.
U.S. Appl. No. 09/998,914, Notice of Allowance dated Nov. 28, 2007, 8 pages.
U.S. Appl. No. 09/998,916, Office Action dated Mar. 21, 2005, 16 pages.
U.S. Appl. No. 09/998,916, Final Office Action dated Sep. 8, 2005, 12 pages.
U.S. Appl. No. 09/998,916, Advisory Action dated Dec. 9, 2005, 3 pages.
U.S. Appl. No. 09/998,916, Office Action dated Apr. 5, 2006, 11 pages.
U.S. Appl. No. 09/998,916, Office Action dated Sep. 15, 2006, 20 pages.
U.S. Appl. No. 09/998,916, Office Action dated Feb. 23, 2007, 12 pages.
U.S. Appl. No. 09/998,916, Notice of Allowance dated Sep. 27, 2007, 10 pages.
U.S. Appl. No. 09/998,926, Office Action dated Aug. 25, 2005, 25 pages.
U.S. Appl. No. 09/998,926, Final Office Action dated Feb. 27, 2006, 15 pages.
U.S. Appl. No. 09/998,926, Advisory Action dated June 16, 2006, 3 pages.
U.S. Appl. No. 09/998,926, Office Action dated Sep. 11, 2006, 19 pages.
U.S. Appl. No. 09/998,926, Office Action dated Feb. 26, 2007, 16 pages.
U.S. Appl. No. 09/998,926, Office Action dated Aug. 10, 2007, 35 pages.
U.S. Appl. No. 09/999,177, Office Action dated Mar. 25, 2005, 23 pages.
U.S. Appl. No. 09/999,177, Final Office Action dated Sep. 14, 2005, 26 pages.
U.S. Appl. No. 09/999,177, Advisory Action dated Dec. 14, 2005, 6 pages.
U.S. Appl. No. 09/999,177, Notice of Allowance dated Mar. 29, 2006, 6 pages.
U.S. Appl. No. 10/145,684, Office Action dated Jun. 16, 2005, 17 pages.
U.S. Appl. No. 10/145,684, Final Office Action dated Dec. 1, 2005, 10 pages.
U.S. Appl. No. 10/145,684, Advisory Action dated Mar. 9, 2006, 3 pages.
U.S. Appl. No. 10/145,684, Office Action dated Jun. 30, 2006, 25 pages.
U.S. Appl. No. 10/145,684, Office Action (restriction requirement) dated Jan. 9, 2007, 7 pages.
U.S. Appl. No. 10/146,150, Office Action dated Jul. 27, 2005, 17 pages.
U.S. Appl. No. 10/146,150, Final Office Action dated Dec. 20, 2005, 12 pages.
U.S. Appl. No. 10/146,150, Advisory Action dated Mar. 13, 2006, 3 Pages.
U.S. Appl. No. 10/146,150, Office Action dated May 30, 2006, 18 pages.
U.S. Appl. No. 10/146,150, Office Action dated Sep. 7, 2006, 12 pages.
U.S. Appl. No. 10/146,150, Advisory Action dated Dec. 5, 2006, 12 pages.
U.S. Appl. No. 10/146,150, Notice of Allowance dated Feb. 20, 2007, 19 pages.
Farjami, P. et al., "Advanced service provisioning based on mobile agents", Computer Communications, vol. 23, No. 8, Apr. 2000, Elsevier Science B.V., pp. 754-760.
U.S. Appl. No. 09/998,910, Advisory Action dated Jul. 17, 2008, 4 pgs.
Bartoli, Alberto, "Group-based multicast and dynamic membership in wireless networks with incomplete spatial coverage," Baltzer Science Publishers BV, Mobile Networks and Applications 3, 1998, pp. 175-188.
Carter, Gerald, "Putting Directories to Work, LDAP System Administration," Chapter 7: Email and LDAP, O'Reilly®, Jan. 2000, pp. 126-156.
Chiasson, et al., "Electronic commerce universal access device—the knowledge—acquiring layered infrastructure (KALI) project", Crossroads, vol. 7, Issue 1, Fall 2000, pp. 28-32.
Consumer Action News, "2000 Identity Theft Issue," May 11, 2007, http://www.consumer-action.org/news/articles/2000 identity theft issue, 15 pgs.
Oracle Security and Identity Management, "Oracle Identity Management, Password Reset Validation" May 11, 2007, pp. 1-20, http://www.oracle.com/technology/products/oid/oidhtml/sec.
U.S. Appl. No. 09/997,410, filed Nov. 30, 2001, NOA dated Apr. 6, 2004, 5 pages.
U.S. Appl. No. 09/997,410, filed Nov. 30, 2001, Office Action dated Dec. 18, 2003, 9 pages.
U.S. Appl. No. 09/998,893, filed Nov. 30, 2001, Non-Final Office Action dated Sep. 18, 2009, 14 pgs.
U.S. Appl. No. 09/998,893, filed Nov. 30, 2001, Advisory Action dated May 26, 2009, 3 pgs.

U.S. Appl. No. 09/998,893, filed Nov. 30, 2001, Final Office Action dated Mar. 4, 2009, 17 pgs.
U.S. Appl. No. 09/998,893, filed Nov. 30, 2001, Non-Final Office Action dated Aug. 20, 2008, 12 pgs.
U.S. Appl. No. 09/998,893, filed Nov. 30, 2001, Advisory Action dated May 5, 2008, 3 pgs.
U.S. Appl. No. 09/998,894, filed Nov. 30, 2001, Notice of Allowance dated Mar. 19, 2004, 5 pages.
U.S. Appl. No. 09/998,894, filed Nov. 30, 2001, Non-Final Office Action dated Dec. 22, 2003, 7 pages.
U.S. Appl. No. 09/998,895, filed Nov. 30, 2001, Notice of Allowance dated Dec. 7, 2009, 16 pgs.
U.S. Appl. No. 09/998,895, filed Nov. 30, 2001, Final Rejection dated Apr. 2, 2009, 18 pgs.
U.S. Appl. No. 09/998,895, filed Nov. 30, 2001, Advisory Action dated Mar. 27, 2008, 3 pgs.
U.S. Appl. No. 09/998,895, filed Nov. 30, 2001, Final Office Action dated Jan. 9, 2008, 13 pgs.
U.S. Appl. No. 09/998,896, filed Nov. 30, 2001, Notice of Allowance dated Sep. 23, 2003, 6 pages.
U.S. Appl. No. 09/998,896, filed Nov. 30, 2001, Office Action dated May 19, 2003, 11 pages.
U.S. Appl. No. 09/998,898, filed Nov. 30, 2001, Notice of Allowance dated Sep. 3, 2008, 13 pgs.
U.S. Appl. No. 09/998,898, filed Nov. 30, 2001, Advisory Action dated Aug. 1, 2008, 3 pgs.
U.S. Appl. No. 09/998,908, filed Nov. 30, 2001, Notice of Allowance dated Dec. 17, 2009, 16 pgs.
U.S. Appl. No. 09/998,908, filed Nov. 30, 2001, BPAI Decision—Examiner Reversed dated Aug. 20, 2009, 9 pgs.
U.S. Appl. No. 09/998,910, filed Nov. 30, 2001, Notice of Allowance dated Apr. 16, 2009, 8 pgs.
U.S. Appl. No. 09/998,926, filed Nov. 30, 2001, Notice of Allowance dated Jan. 15, 2008, 8 pgs.
U.S. Appl. No. 10/145,684, Final Office Action dated Jan. 21, 2010, 18 pages.
U.S. Appl. No. 10/145,684, Non-Final Office Action dated May 12, 2009, 10 pages.
U.S. Appl. No. 10/145,684, filed May 15, 2002, Restriction Requirement dated Jan. 5, 2009, 7 pgs.
U.S. Appl. No. 10/145,684, filed May 15, 2002, Final Office Action dated Jun. 26, 2008, 19 pgs.
U.S. Appl. No. 11/382,981, filed May 12, 2006, Notice of Allowance dated Oct. 8, 2009, 7 pgs.
U.S. Appl. No. 11/382,981, filed May 12, 2006, Advisory Action dated Sep. 21, 2009, 4 pgs.
U.S. Appl. No. 11/382,981, filed May 12, 2006, Final Office Action dated Jul. 2, 2009, 6 pgs.
U.S. Appl. No. 11/382,981, filed May 12, 2006, Non-Final Office Action dated Dec. 23, 2008, 7 pgs.
U.S. Appl. No. 11/691,072, filed May 12, 2006, Notice of Allowance dated Sep. 8, 2008, 7 pgs.
U.S. Appl. No. 11/691,072, filed May 12, 2006, Non-Final Office Action dated Apr. 9, 2008, 7 pgs.
U.S. Appl. No. 09/998,893, filed Nov. 30, 2001, Final Office Action dated Jun. 11, 2010, 17 pgs.
U.S. Appl. No. 09/998,895, filed Nov. 30, 2001, Notice of Allowance dated May 13, 2010, 9 pgs.
Myers, M. et al., "X.509 Internet Public Key Infrastructure Online Certificate Status Protocol—OCSP," The Internet Society, 22 pages, Jun. 1999.
U.S. Appl. No. 09/998,893, Final Office Action dated Feb. 6, 2008, 14 pages.
Mohri, Takao et al. "Virtual Integration of Distributed Databased by Multiple Agence", 1998. XP-002473963, S. Arakwa and H.Motoda (Eds.): D'98, LNAI 1532, pp. 413-414.
Moridera, Akio et al., "The Network Paradigm of the 21st Century and its Key Technologies", vol. 38, No. 11, Nov. 11, 2000, IEEE Comunications Magazine, pp. 94-98, ISSN: 0163-6804.
Soltysiak, Stuart et al., "An Agent-Based Intelligent Distributed Information Management System for Internet Resources", XP-002473965, URL:http://isoc.org/inet2000.cdproceedings, retrieved Mar. 26, 2008.
U.S. Appl. No. 09/998,898, Final Office Action dated May 13, 2008, 13 pgs.
U.S. Appl. No. 09/998,910, Final Office Action dated Apr. 29, 2008, 15 pages.
Blakeley, Jose A., "Universal data access with OLE DB", Microsoft Corporation, Feb. 23, 1997, pp. 2-7, ISBN: 0-8186-7804-6, 1063-6390/97—Compcon 1997 Proceedings, 1997 IEEE Computer Society, US.

Oblix™ Identity-Based Security Solutions, "Using Oblix NetPoint and Active Directory Across Your E-Business," Whitepaper, 2002 Oblix, Inc., 12 pgs.
U.S. Appl. No. 09/997,410, filed Nov. 30, 2001, NOA dated Apr. 6, 2004, 5 pages.
U.S. Appl. No. 09/997,410, filed Nov. 30, 2001, Office Action dated Dec. 18, 2003, 9 pages.
U.S. Appl. No. 09/998,893, filed Nov. 30, 2001, Non-Final Office Action dated Sep. 18, 2009, 14 pgs.
U.S. Appl. No. 09/998,893, filed Nov. 30, 2001, Advisory Action dated May 26, 2009, 3 pgs.
U.S. Appl. No. 09/998,893, filed Nov. 30, 2001, Final Office Action dated Mar. 4, 2009, 17 pgs.
U.S. Appl. No. 09/998,893, filed Nov. 30, 2001, Non-Final Office Action dated Aug. 20, 2008, 12 pgs.
U.S. Appl. No. 09/998,893, filed Nov. 30, 2001, Advisory Action dated May 5, 2008, 3 pgs.
U.S. Appl. No. 09/998,894, filed Nov. 30, 2001, Notice of Allowance dated Mar. 19, 2004, 5 pages.

Farjami, P. et al., "Advanced service provisioning based on mobile agents", Computer Communications, vol. 23, No. 8, Apr. 2000, Elsevier Science B.V., pp. 754-760.

Foster, Ian et al., "A Security Architecture for Computational Grids", XP-002473964, 5th ACM Conference on Computer and Communication Security, ACM 1998, pp. 83-92.

Mohri, Takao et al., "Virtual Integration of Distributed Databased by Multiple Agence", 1998. XP-002473963, S. Arakawa and H.Motoda (Eds.): D'98, LNAI 1532, pp. 413-414.

Moridera, Akio et al., "The Network Paradigm of the 21st Century and its Key Technologies", vol. 38, No. 11, Nov. 11, 2000, IEEE Comunications Magazine, pp. 94-98, ISSN: 0163-6804.

Soltysiak, Stuart et al., "An Agent-Based Intelligent Distributed Information Management System for Internet Resources", XP-002473965, URL:http://isoc.org/inet2000.cdproceedings, retrieved Mar. 26, 2008.

U.S. Appl. No. 09/998,898, Final Office Action dated May 13, 2008, 13 pgs.

U.S. Appl. No. 09/998,910, Final Office Action dated Apr. 29, 2008, 15 pages.

U.S. Appl. No. 09/998,895, Office Action dated Jun. 18, 2008, 22 pgs.

\* cited by examiner

FIG. 5
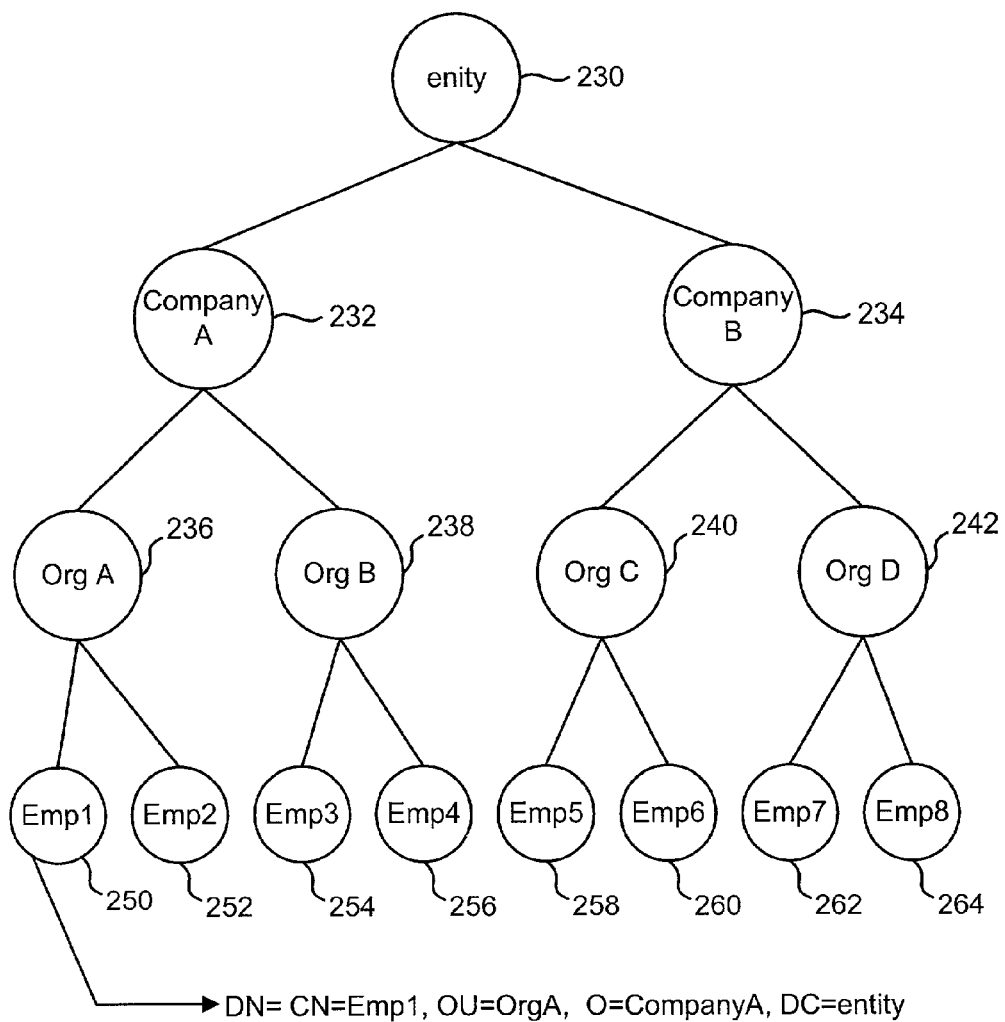
→ DN= CN=Emp1, OU=OrgA, O=CompanyA, DC=entity
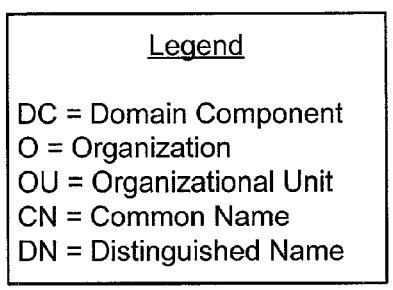

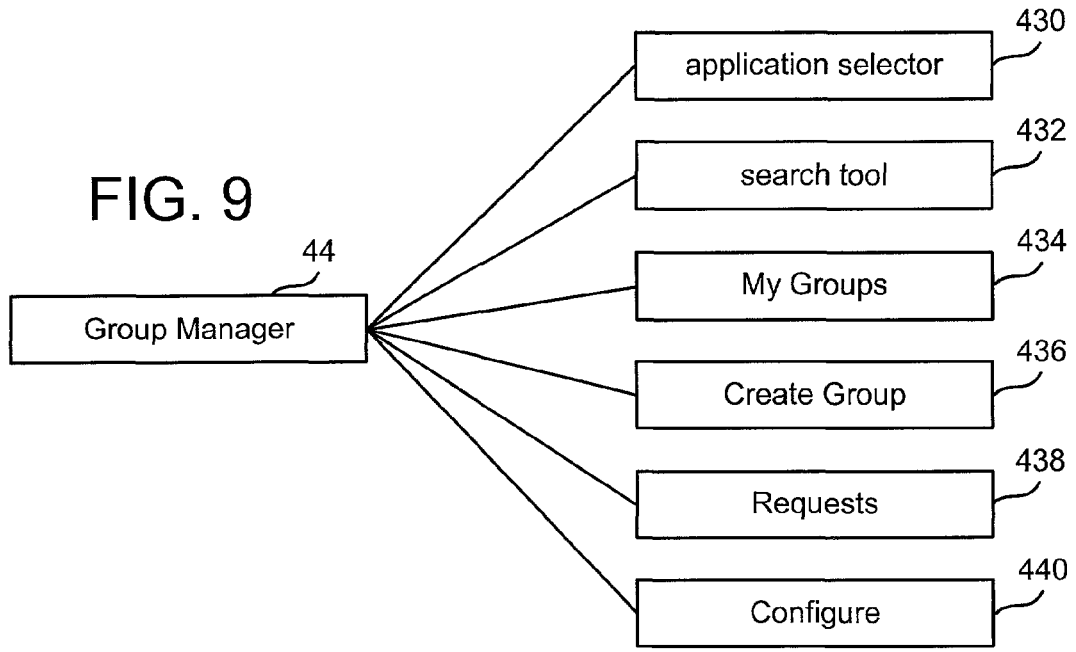
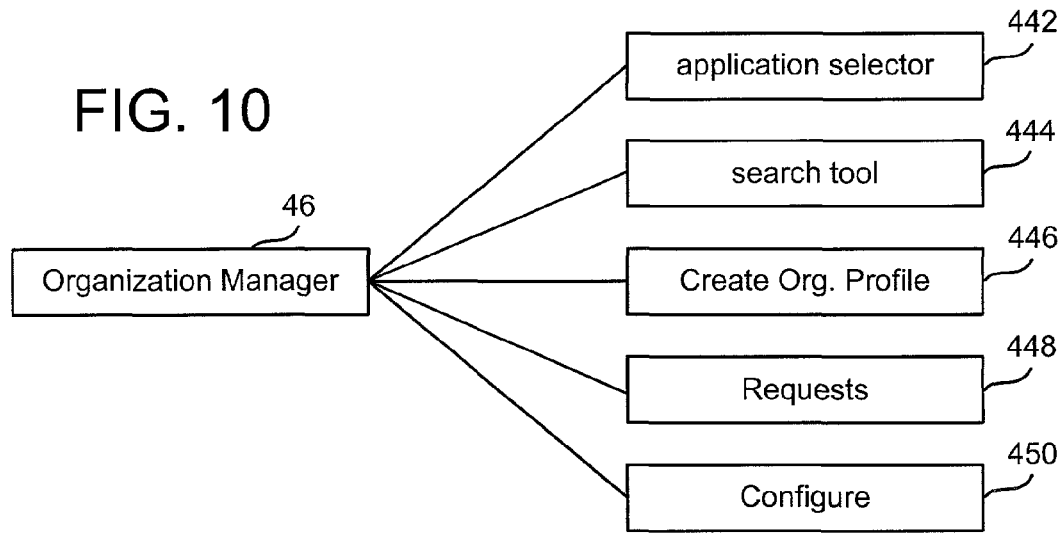

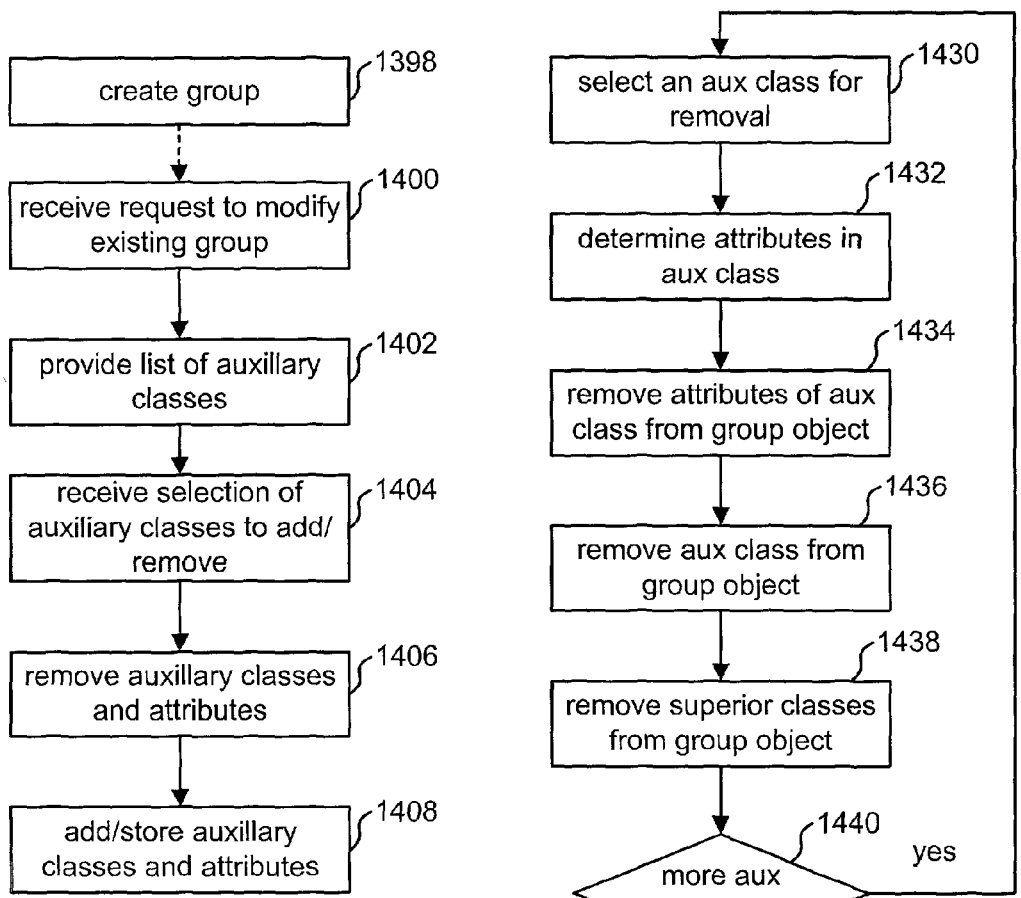
FIG. 32
FIG. 33
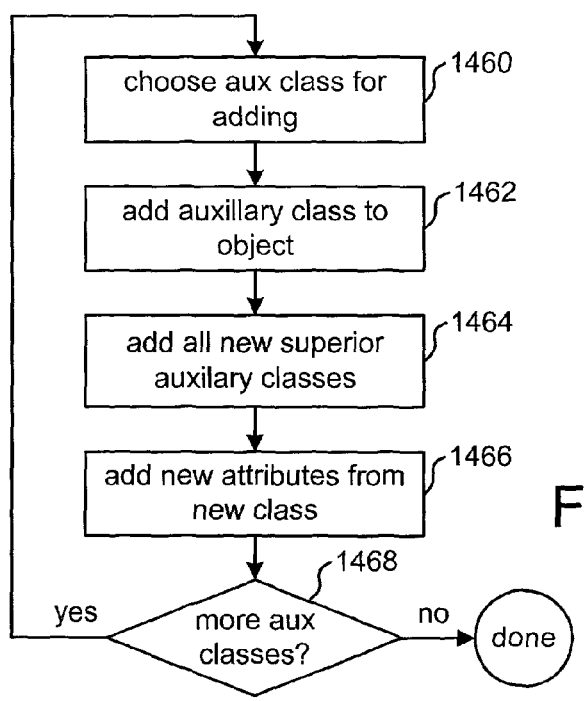
FIG. 34

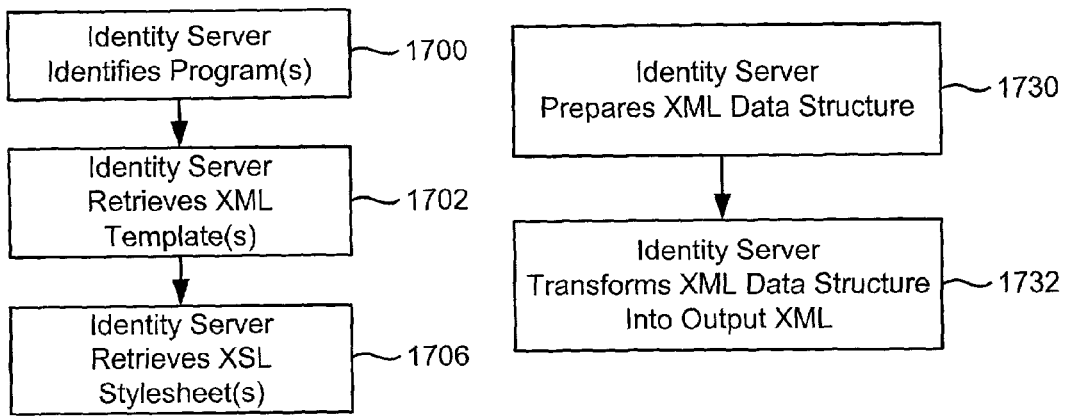
FIG. 38
FIG. 39
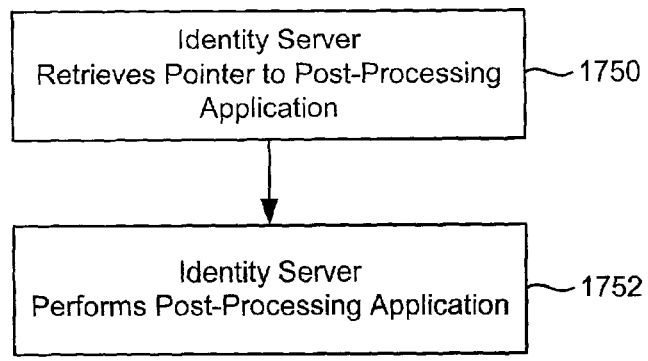
FIG. 40

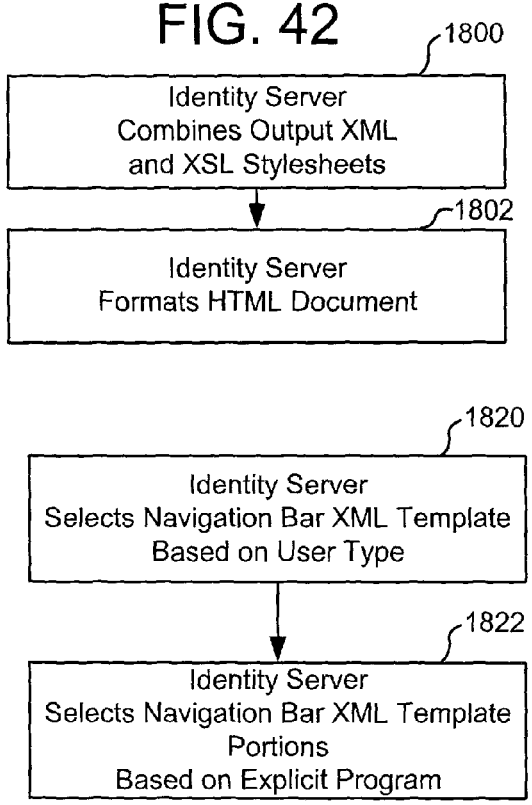
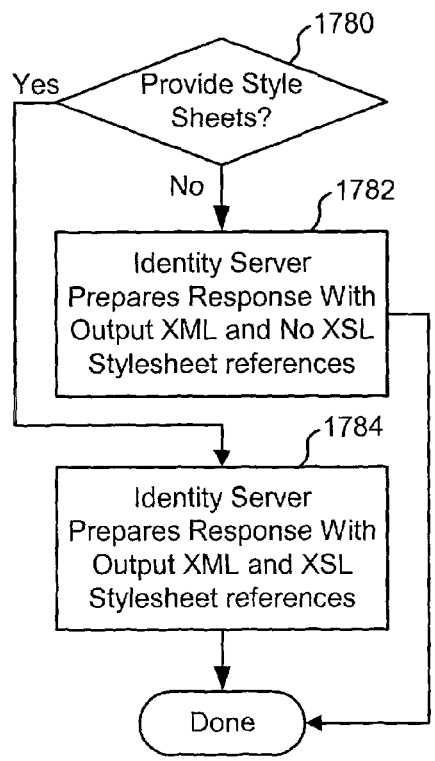
FIG. 41
FIG. 43
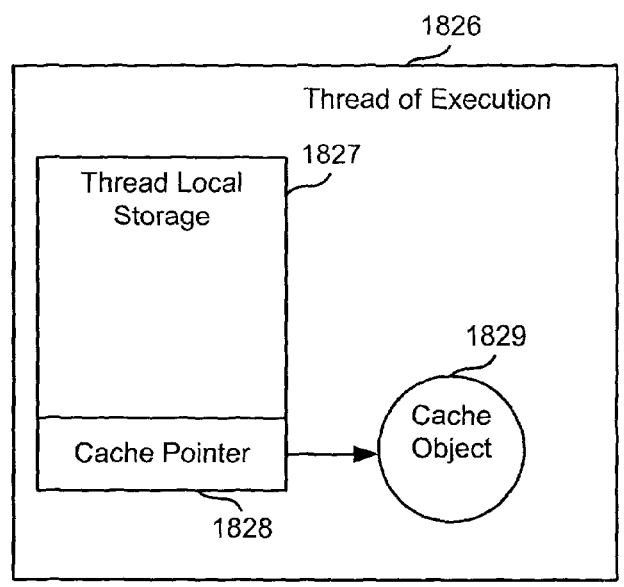
FIG. 44

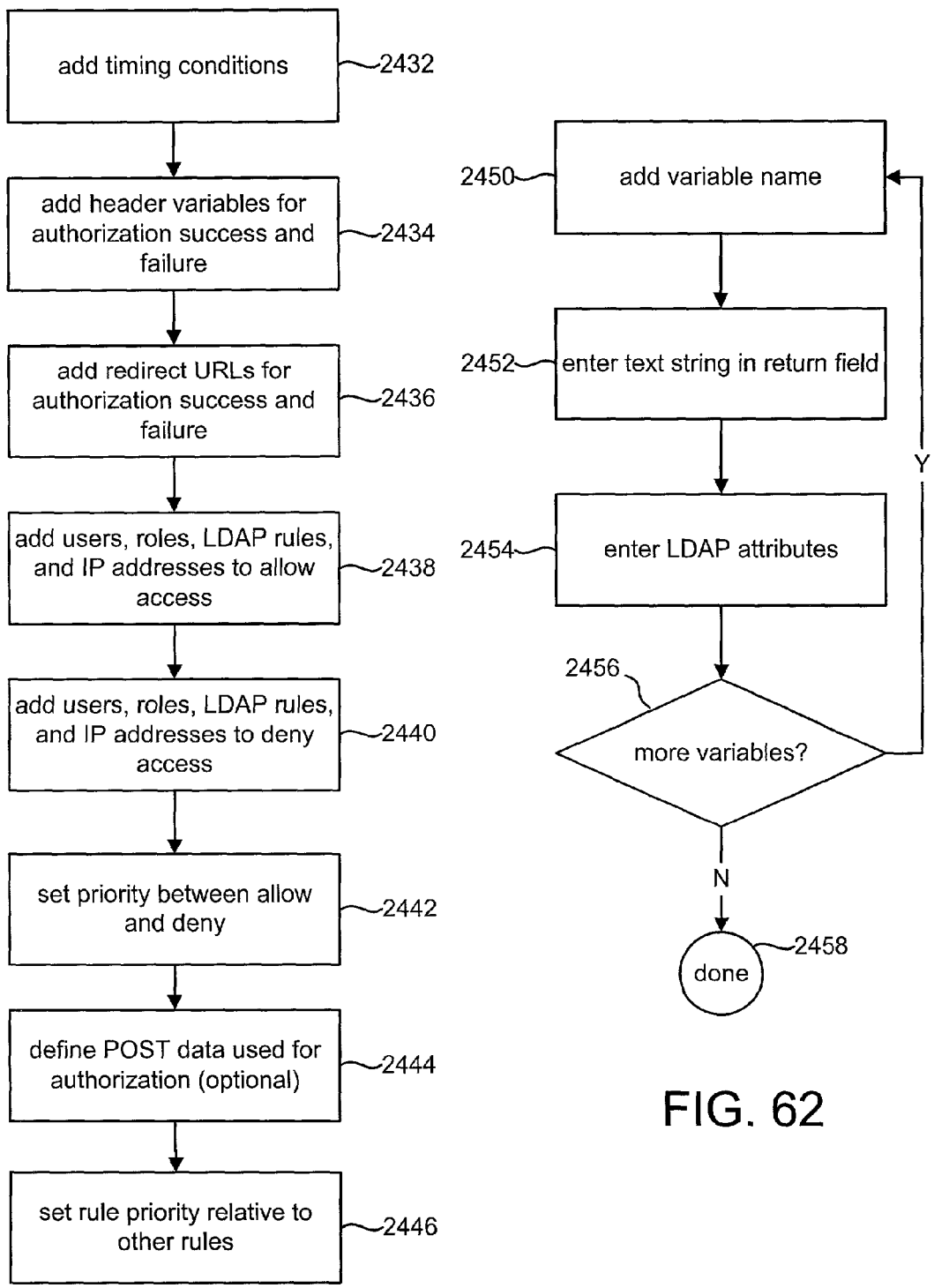

WORKFLOWS WITH ASSOCIATED PROCESSES

This application claims the benefit of U.S. Provisional Application No. 60/258,087, "Integrated Identity and Access Management Systems With Group and Organization Managers," filed on Dec. 22, 2000; and U.S. Provisional Application No. 60/285,524, "Integrated Identity and Access Management System," filed on Apr. 20, 2001; both of which are incorporated herein by reference.

COPYRIGHT NOTICE

A portion of the disclosure of this patent document contains material, which is subject to copyright protection. The copyright owner has no objection to the reproduction by anyone of the patent document or the patent disclosure as it appears in the United States Patent and Trademark Office patent file or records, but otherwise reserves all copyright rights whatsoever.

CROSS-REFERENCE TO RELATED APPLICATIONS

This Application is related to the following Applications: "Template Based Workflow Definition", by Joan C. Teng, 09/998,910, filed the same day as the present application; and "Domain Based Workflows", by Joan C. Teng and Thomas B. Remahl, 09/998,895, filed the same day as the present application.

Each of these related Applications are incorporated herein by reference.

BACKGROUND OF THE INVENTION

1. Field of the Invention

The present invention is directed to technology for using workflows with associated processes.

2. Description of the Related Art

With the growth of the Internet, the use of networks and other information technologies, Identity Systems have become more popular. In general, an Identity System provides for the creation, removal, editing and other managing of identity information stored in various types of data stores. The identity information pertains to users, groups, organizations and/or things. For each entry in the data store, a set of attributes is stored. For example, the attributes stored for a user may include a name, address, employee number, telephone number, email address, user ID and password. The Identity System can also manage access privileges that govern what an entity can view, create, modify or use in the Identity System. Often, this management of access privileges is based on one or more specific attributes, membership in a group and/or association with an organization.

Many organizations require pre-defined business methods in order to carry out various tasks. For example, to add a new user to the Identity System, a business method may require the telecommunications group to provide a telephone number, the Information Technology Group to provide an email address, the Human Resources Group to provide personal data, and, finally, approval from a manager. To implement such business methods with an Identity System, workflows have been implemented. In general, a workflow is a process that is implemented by the Identity System (or other system) and automates the business methods.

No single process, however, can fit the needs of every organization and task. Therefore, a given system is likely to have many workflows. The administration costs of creating and maintaining these many workflows can be burdensome on the organization. Thus, there is a need to reduce administration costs associated with creating and maintaining workflows.

Furthermore, there are situations when an entity's business process requires tasks to be performed by different applications. Since workflows are performed by one application, previous workflows have been unable to implement processes that require the use of two applications.

SUMMARY OF THE INVENTION

The present invention, roughly described, pertains to technology for using workflows with associated processes. For example, a first workflow can invoke one or more nested sub-workflows ("sublows"). Re-using existing workflows as subflows reduces administrative costs of creating and maintaining workflows. Additionally, having a first workflow invoke one or more workflows in other applications or services in other applications allows workflows to implement processes that require the use of two applications. The first workflow can be configured to pause and wait for the invoked set of one or more nested workflows, workflows in other applications or services in other applications. Alternatively, the first workflow can be configured to proceed without waiting. Various means are disclosed for re-starting the first workflow and providing data back to the first workflow or its target.

One embodiment of the present invention includes performing a first workflow for a first task and starting a second workflow as a subflow of the first workflow in order to perform a second task. Performance of the first workflow includes accessing an indication of whether the first workflow should wait for the second workflow to complete the second task and waiting, if so indicated. In another embodiment, the second workflow invokes additional one or more nested workflows.

Another embodiment of the present invention includes performing a first workflow in a first application and causing a second process in a second application to be performed in response to the first workflow. One example of a second process is a workflow. In one implementation, a status message is received indicating that the first workflow should be paused. The first workflow is then paused until a callback command is invoked.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

BRIEF DESCRIPTION OF THE DRAWINGS

FIG. 5 is an example of a directory tree structure.

FIG. 9 is a block diagram depicting the Group Manager.

FIG. 10 is a block diagram depicting the Organization Manager.

FIG. 32 is a flow chart describing an overview of an exemplar process for adding and removing auxiliary classes.

FIG. 33 is a flow chart describing one embodiment of a process for removing auxiliary classes.

FIG. 34 is a flow chart describing one embodiment of a process for adding auxiliary classes.

FIG. 38 is a flowchart describing a process for translating a request.

FIG. 39 is a flowchart describing a process for preparing Output XML.

FIG. 40 is a flowchart describing a process for responding to a request for a post-processing application.

FIG. 41 is a flowchart describing a process for preparing a client-side response.

FIG. 42 is a flowchart describing a process for preparing a server-side response.

FIG. 43 is a flowchart describing a process for identifying an XML template for a navigation bar.

FIG. 44 is a block diagram representing a thread of execution.

FIG. 61 is a flow chart describing a process for adding an authorization rule.

FIG. 62 is a flow chart describing a process for adding header variables to an HTTP request.

DETAILED DESCRIPTION

Figure 1:
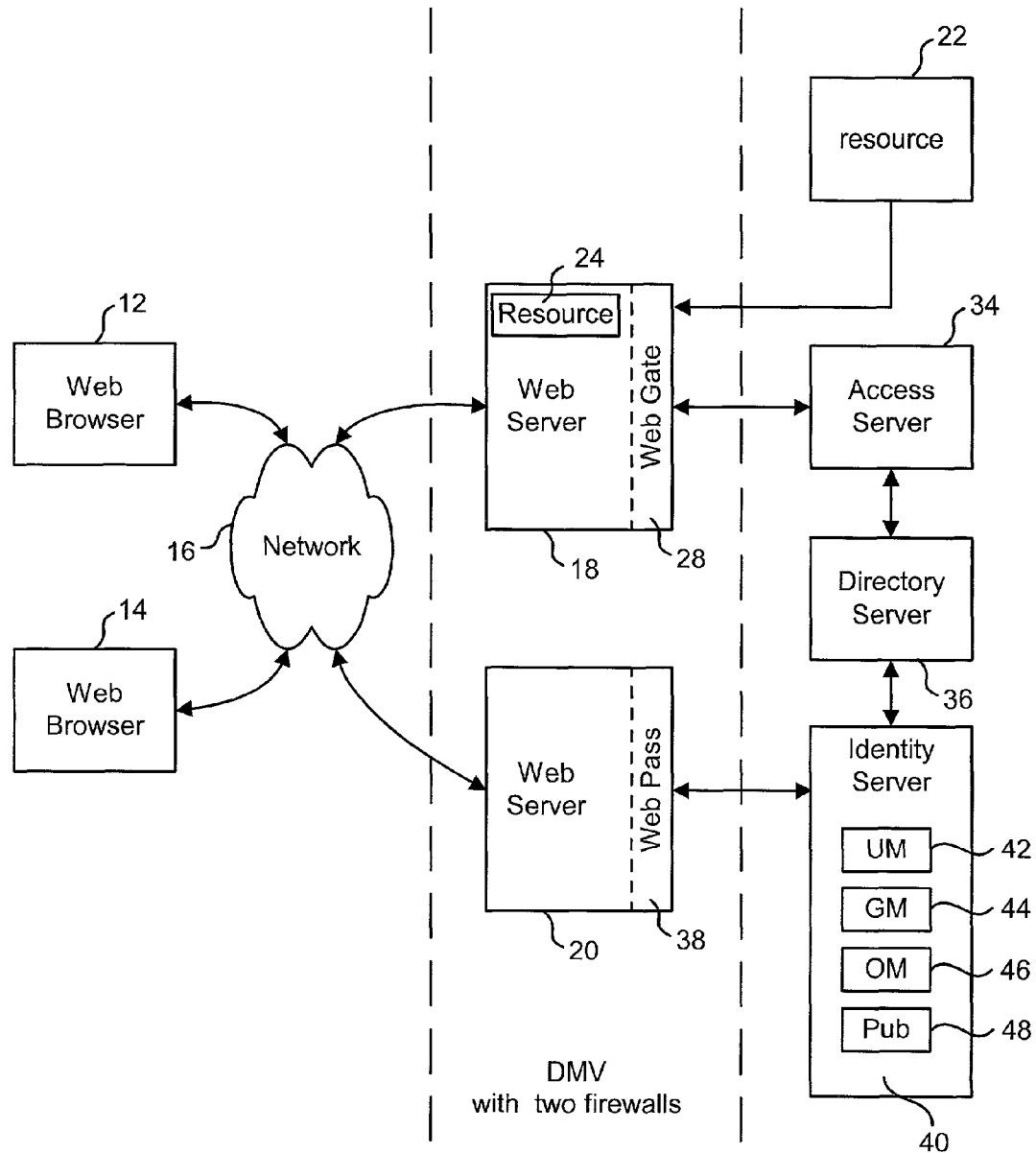
FIG. 1 is a block diagram depicting the components of one embodiment of the present invention.

FIG. 1 depicts an access management system, which provides identity management services and/or access management services for a network. The identity management portion of the system (hereinafter "the Identity System") manages identity profiles, while the access management portion of the system (hereinafter "the Access System") provides security for resources across one or more Web Servers. A key feature of one embodiment of this system is the centralization of the repositories for policies and user identity profiles, while decentralizing their administration. That is, one embodiment of the system centralizes the policy and identity repositories by building them on a directory service technology. The system decentralizes their administration by hierarchy delegating administrative roles. Although the system of FIG. 1 includes an Identity System and an Access System, other embodiments may only include an Identity System or only include an Access System.

FIG. 1 is a block diagram depicting one embodiment for deploying an integrated Identity System and Access System. FIG. 1 shows web browsers 12 and 14 accessing Web Server 18 and/or Web Server 20 via network 16. One example of a network is the Internet. In one embodiment, web browsers 12 and 14 are standard web browsers known in the art running on any suitable type of computer. FIG. 1 depicts web browsers 12 and 14 communicating with Web Server 18 and Web Server using HTTP over the Internet; however, other protocols and networks can also be used.

Web Server 18 is a standard Web Server known in the art and provides an end user with access to various resources via network 16. One embodiment includes two firewalls. A first firewall (see dotted lines) is connected between network 16 and Web Server 18. A second firewall (see dotted lines) is connected between Web Servers 16 and 18 and Access Server 34/Identity Server 40.

FIG. 1 shows two types of resources: resource 22 and resource 24. Resource 22 is external to Web Server 18 but can be accessed through Web Server 18. Resource 24 is located on Web Server 18. A resource can be anything that is possible to address with a uniform resource locator (URL, see RFC 1738). A resource can include a web page, software application, file, database, directory, a data unit, etc. In one embodiment, a resource is anything accessible to a user on a network. The network could be the Internet, a LAN, a WAN, or any other type of network. Table 1, below, provides examples of resources and at least a portion of their respective URL syntax:

| Resource | URL Encoding |
|---|---|
| Directory | /Sales/ |
| HTML Page | /Sales/Collateral/index .html |
| CGI Script with no query | /cgi-bin/testscript.cgi |
| CGI Script with query | /cgi_bin/testscript.cgi?button=on |
| Application | /apps/myapp.exe |

A URL includes two main components: a protocol identifier and a resource name separated from the protocol identifier by a colon and two forward slashes. The protocol identifier indicates the protocol used to fetch the named resource. Examples of protocols include HTTP, FTP, Gopher, File and News. The resource name is the complete address to the resource. The format of the resource name depends on the protocol. For HTTP, the resource name includes a host name, a file name, a port number (optional) and a reference (optional). The host name is the name of the machine on which the resource resides. The file name is the path name to the file on the machine. The port number is the number of the port to which to connect. A reference is a named anchor within a resource that usually identifies a specific location within a file. Consider the following URL:

"http://www.oblix.com/oblix/sales/index.html."

The string "http" is the protocol identifier. The string "www.oblix.com" is the host name. The string "/oblix/sales/index.html" is the file name.

A complete path, or a cropped portion thereof, is called a URL prefix. In the URL above, the string "/oblix/sales/index.html" is a URL prefix and the string "/oblix" is also a URL prefix. The portion of the URL to the right of the host name and to the left of a query string (e.g. to the left of a question mark, if there is a query string) is called the absolute path. In the URL above, "/oblix/sales/index.html" is the absolute path. A URL can also include query data, which is typically information following a question mark. For example, in the URL:

http://www.oblix.com/oblix/sales/index.html?user=smith&dept=sales the query data is "user=smith&dept=sales." Although the discussion herein refers to URLs to identify a resource, other identifiers can also be used within the spirit of the present invention.

FIG. 1 shows Web Server 18 including Web Gate 28, which is a software module. In one embodiment, Web Gate 28 is a plug-in to Web Server 18. Web Gate 28 communicates with Access Server 34. Access Server 34 communicates with Directory Server 36.

The Access System includes Access Server 34, Web Gate 28, and Directory Server 36. Access Server 34 provides authentication, authorization, auditing logging services. It further provides for identity profiles to be used across multiple domains and Web Servers from a single web-based authentication (sign-on). Web Gate 28 acts as an interface between Web Server 18 and Access Server 34. Web Gate 28 intercepts requests from users for resources 22 and 24, and authorizes them via Access Server 34. Access Server 34 is able to provide centralized authentication, authorization, and auditing services for resources hosted on or available to Web Server 18 and other Web Servers.

The Identity System includes Web Pass 38, Identity Server 40 and Directory Server 36. Identity Server 40 manages identity profiles. An identity profile is a set of information associated with a particular entity (e.g. user, group, organization, etc.). The data elements of the identity profile are called attributes, which are discussed in more detail below. An attribute may include a name, value and access criteria. The Identity Server includes three main applications, which effectively handle the identity profiles and privileges of the user population: User Manager 42, Group Manager 44, and Organization Manager 46. User Manager 42 manages the identity profiles for individual users. Group Manager 44 manages identity profiles for groups. Organization Manager 46 manages identity profiles for organizations. Identity Server 40 also includes Publisher 48, an application that enables entities to quickly locate and graphically view information stored by Directory Server 36. In one embodiment, Web Pass 38 is a Web Server plug-in that sends information back and forth between Identity Server 40 and the Web Server 20, creating a three-tier architecture. The Identity System also provides a Certificate Processing Server (not shown in FIG. 1) for managing digital certificates.

User Manager 42 handles the functions related to user identities and access privileges, including creation and deletion of user identity profiles, modification of user identity profile data, determination of access privileges, and credentials management of both passwords and digital certificates. With User Manager 42, the create, delete, and modify functions of user identity management can be set as flexible, multi-step workflows. Each business can customize its own approval, setup, and management processes and have multiple processes for different kinds of users.

Multi-level delegation features also simplify individual user management. Companies can assign the responsibility for maintaining user identity data to the people closest to it. For example, individual users can be allowed to: (1) add themselves to the user directory by filling out customized forms, (2) modify personal or professional information about themselves (such as addresses, personal preferences, or name changes), (3) change a piece of information in their identity profiles that can determine their access rights, or (4) allow someone else to log in as their temporary substitute while they are out of the office or on vacation. Likewise, any number of delegated administrators (both inside and outside the company) can be given the authority to: (1) create and delete users in the user directory, (2) approve a change that a user has requested, and (3) change the information about users to grant or revoke services. An administrator can be delegated any allowed degree of responsibility. For example, a company might decide that only IT staff can assign application access, whereas department managers can add new users.

External legacy systems—such as human resource management systems—can be allowed to trigger automated workflows. With this feature, a new user could be created, a departing employee could be deleted, or certain services could be granted or revoked following an event change in an external system.

The Identity System also provides for self-registration. User Manager 42 enables an individual to self-register in situations when it's appropriate. User Manager 42 then authorizes delegated administrators to verify the individual's information and approve or deny the registration requests. In one embodiment, self-registration is defined by a customizable, multi-step workflow. This concept is discussed below.

Group Manager 44 allows entities to create, delete and manage groups of users who need identical access privileges to a specific resource or set of resources. Managing and controlling privileges for a group of related people—rather than handling their needs individually—yield valuable economies of scale. Group Manager 44 meets a wide range of e-business needs: easy creation, maintenance, and deletion of permanent and ad hoc groups of users who may be allowed or denied access to particular resources; modification and adaptation of groups and their access privileges with minimal disruption to the directory server's underlying schema; efficient addition and deletion of users from established groups; and delegation of administrative responsibility for group membership and subscription requests and approvals.

With Group Manager 44, companies (or other entities) can allow individual users to do the following: (1) self-subscribe to and unsubscribe from groups, (2) view the groups that they are eligible to join or have joined, and (3) request subscription to groups that have access to the applications they need. Multi-step workflows can then define which users must obtain approval before being added to a group and which can be added instantly. Group Manager 44 also lets companies form dynamic groups specified by an LDAP filter. The ability to create and use dynamic groups is extremely valuable because it eliminates the administrative headache of continually keeping individual, static membership up-to-date. With dynamic group management features, users can be automatically added or removed if they meet the criteria specified by the LDAP filter. Dynamic groups also greatly enhance security since changes in user identities that disqualify someone from membership in a group are automatically reflected in the dynamic group membership.

The third application in the Identity System, Organization Manager 46, streamlines the management of large numbers of organizations within an e-business network, including partners, suppliers, or even major internal organizations such as sales offices and business units. Certain infrastructure security and management operations are best handled—or can only be handled—at the highest organizational unit level rather than at the individual or group level. Like User Manager and Group Manager, this application relies on multi-step workflow and delegation capabilities. Organization Manager handles the following administrative tasks: (1) organization lifecycle management, whereby companies can create, register, and delete organizations in their systems using customizable workflows; (2) maintenance of organization profiles on an attribute-by-attribute basis through self-service, delegated administration and system-initiated activities; (3) organization self-registration, whereby organizations such as business partners, customers and suppliers can self-generate a request to be added to the e-business network; and (4) creation of reusable rules and processes through multi-step workflows.

The system of FIG. 1 can be used to protect a web site, network, Intranet, Extranet, etc. To understand how the system of FIG. 1 protects a web site (or other structure), it is important to understand the operation of unprotected web sites. In a typical unprotected web site, end users cause their browsers to send a request to a Web Server. The request is usually an HTTP request, which includes a URL. The Web Server then translates, or maps, the URL into a file system's name space and locates the matching resource. The resource is then returned to the browser.

With the system of FIG. 1 deployed, Web Server 18 (enabled by Web Gate 28, Access Server 34, and Directory Server 36) can make informed decisions based on default and/or specific rules about whether to return requested resources to an end user. The rules are evaluated based on the end user's identity profile, which is managed by the Identity System. In one embodiment of the present invention, the general method proceeds as follows. An end user enters a URL or an identification of a requested resource residing in a protected policy domain. The user's browser sends the URL as part of an HTTP request to Web Server 18. Web Gate 28 intercepts the request. If the end user has not already been authenticated, Web Gate 28 causes Web Server 18 to issue a challenge to the browser for log-on information. The received log-on information is then passed back to Web Server 18 and on to Web Gate 28.

Web Gate 28 in turn makes an authentication request to Access Server 34, which determines whether the user's supplied log-on information is authentic or not. Access Server 34 performs the authentication by accessing attributes of the user's identity profile and the resource's authentication criteria stored on Directory Server 36. If the user's supplied log-on information satisfies the authentication criteria, the process flows as described below; otherwise, the end user is notified that access to the requested resource is denied and the process halts. After authenticating the user, Web Gate 28 queries Access Server 34 about whether the user is authorized to access the resource requested. Access Server 34 in turn queries Directory Server 36 for the appropriate authorization criteria for the requested resource. Access Server 34 retrieves the authorization criteria for the resource and answers Web Gate 28's authorization query, based on the resource's authorization criteria and the user's identity profile. If the user is authorized, the user is granted access to the resource; otherwise, the user's request is denied. Various alternatives to the above described flow are also within the spirit and scope of the present invention.

Authentication and Authorization decisions are based on policy domains and policies. A policy domain is a logical grouping of Web Server host ID's, host names, URL prefixes, and rules. Host names and URL prefixes specify the course-grain portion of the web name space a given policy domain protects. Rules specify the conditions in which access to requested resources is allowed or denied, and to which end users these conditions apply. Policy domains contain two levels of rules: first level default rules and second level rules contained in policies. First level default rules apply to any resource in a policy domain not associated with a policy.

A policy is a grouping of a URL pattern, resource type, operation type (such as a request method), and policy rules. These policy rules are the second level rules described above. There are two levels of rules available (first and second levels) for authentication, authorization, and auditing. Policies are always attached to a policy domain and specify the fine-grain portion of a web name space that a policy protects. In practice, the host names and URL prefixes from the policy's policy domain are logically concatenated with the policy's URL pattern. The resulting overall pattern is compared to the incoming URL. If there is a match, then the policy's various rules are evaluated to determine whether the request should be allowed or denied; if there is not a match, then default policy domain rules are used.

The system of FIG. 1 is scalable. There can be many Web Servers, many Access Servers, and many Identity Servers. In one embodiment, Directory Server 36 is an LDAP Directory Server and communicates with other servers/modules using LDAP over SSL. In other embodiments, Directory Server 36 can implement other protocols or can be other types of data repositories (e.g. SQL, etc.). Many variations of the system of FIG. 1 can be used with the present invention. For example, instead of accessing the system with a web browser, an API can be used. Alternatively, portions of functionality of the present invention cab be separated into independent programs that can be accessed with a URL.

Figure 2:
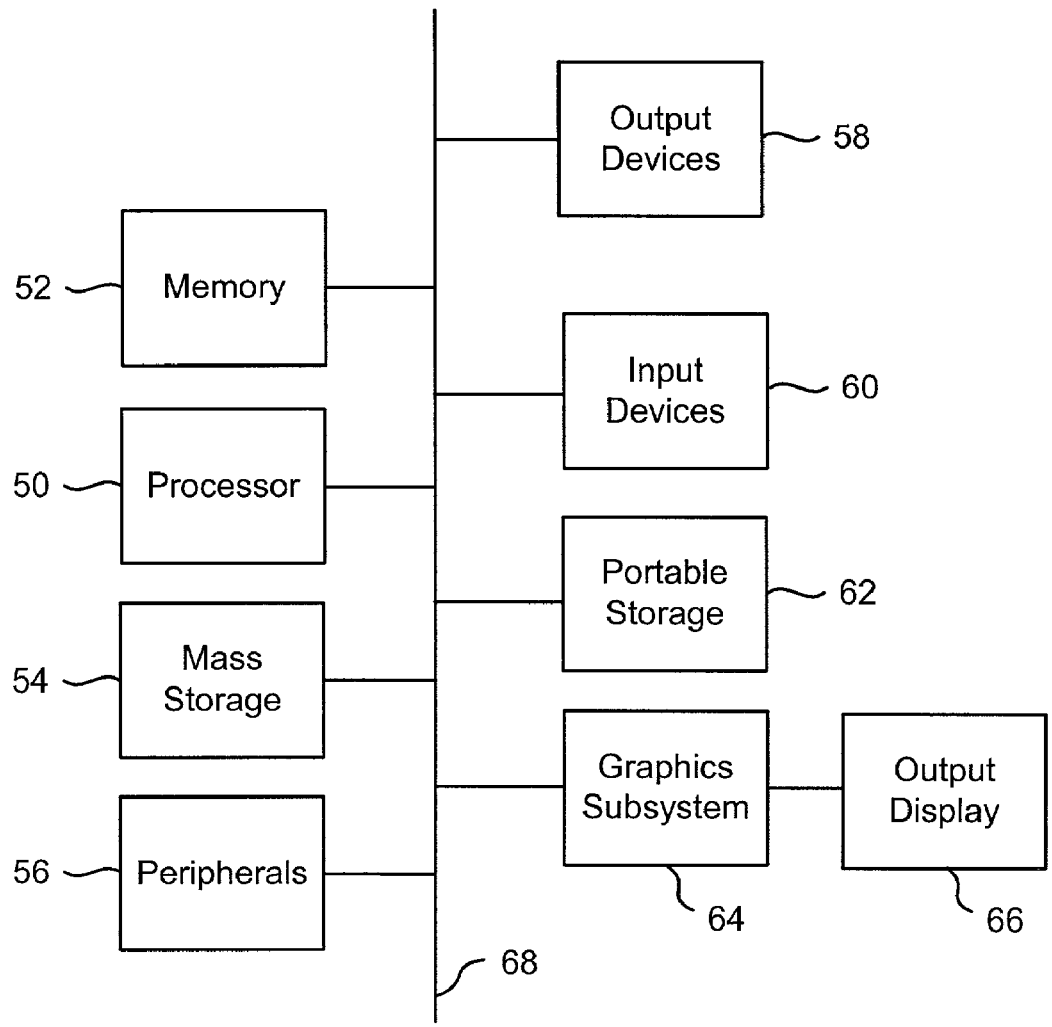
FIG. 2 is a block diagram depicting exemplar components of a computing system that can be used to implement the present invention.

FIG. 2 illustrates a high level block diagram of a computer system that can be used for the components of the present invention. The computer system in FIG. 2 includes processor unit 50 and main memory 52. Processor unit 50 may contain a single microprocessor, or may contain a plurality of microprocessors for configuring the computer system as a multi-processor system. Main memory 52 stores, in part, instructions and data for execution by processor unit 50. If the system of the present invention is wholly or partially implemented in software, main memory 52 can store the executable code when in operation. Main memory 52 may include banks of dynamic random access memory (DRAM) as well as high speed cache memory.

The system of FIG. 2 further includes mass storage device 54, peripheral device(s) 56, user input device(s) 60, portable storage medium drive(s) 62, graphics subsystem 64, and output display 66. For purposes of simplicity, the components shown in FIG. 2 are depicted as being connected via a single bus 68. However, the components may be connected through one or more data transport means. For example, processor unit 50 and main memory 52 may be connected via a local microprocessor bus, and the mass storage device 54, peripheral device(s) 56, portable storage medium drive(s) 62, and graphics subsystem 64 may be connected via one or more input/output (I/O) buses. Mass storage device 54, which may be implemented with a magnetic disk drive or an optical disk drive, is a non-volatile storage device for storing data and instructions for use by processor unit 50. In one embodiment, mass storage device 54 stores the system software for implementing the present invention for purposes of loading to main memory 52.

Portable storage medium drive 62 operates in conjunction with a portable non-volatile storage medium, such as a floppy disk, to input and output data and code to and from the computer system of FIG. 2. In one embodiment, the system software for implementing the present invention is stored on such a portable medium, and is input to the computer system via the portable storage medium drive 62. Peripheral device(s) 56 may include any type of computer support device, such as an input/output (I/O) interface, to add additional functionality to the computer system. For example, peripheral device(s) 56 may include a network interface for connecting the computer system to a network, a modem, a router, etc.

User input device(s) 60 provide a portion of a user interface. User input device(s) 60 may include an alpha-numeric keypad for inputting alpha-numeric and other information, or a pointing device, such as a mouse, a trackball, stylus, or cursor direction keys. In order to display textual and graphical information, the computer system of FIG. 2 includes graphics subsystem 64 and output display 66. Output display 66 may include a cathode ray tube (CRT) display, liquid crystal display (LCD) or other suitable display device. Graphics subsystem 64 receives textual and graphical information, and processes the information for output to display 66. Additionally, the system of FIG. 2 includes output devices 58. Examples of suitable output devices include speakers, printers, network interfaces, monitors, etc.

The components contained in the computer system of FIG. 2 are those typically found in computer systems suitable for use with the present invention, and are intended to represent a broad category of such computer components that are well known in the art. Thus, the computer system of FIG. 2 can be a personal computer, handheld computing device, Internet-enabled telephone, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

FIG. 1 shows Web Server 20 being in communication with Identity Server 40, via Web Pass 38. In one embodiment of the present invention, data is transferred between a web server and Identity Server 40 using blob data transfers. One version of a blob data transfer contains the following fields: (1) Overall Message Length—containing the number of bytes in the overall blob data transfer; (2) Protocol Version—identifying the protocol version of the blob data transfer; (3) Sequence Number—identifying the position of the blob data transfer in a set of blob data transfers; (4) Opcode—identifying the operation to be performed with the blob data; and (5) Actual Message—containing the data intended to be transferred for an associated application.

Possible opcodes that can be employed in the blob data transfer opcode field include: (1) indicating that the blob data transfer is to be employed by Identity Server 40; and (2) indicating that this data is to be employed by a Web Server 20 in a configuration process. In one embodiment of the present invention, the Actual Message is presented in a key-val-map format having the following syntax: {length}key=val {length}key=val {length}key val . . . .

Figure 3:
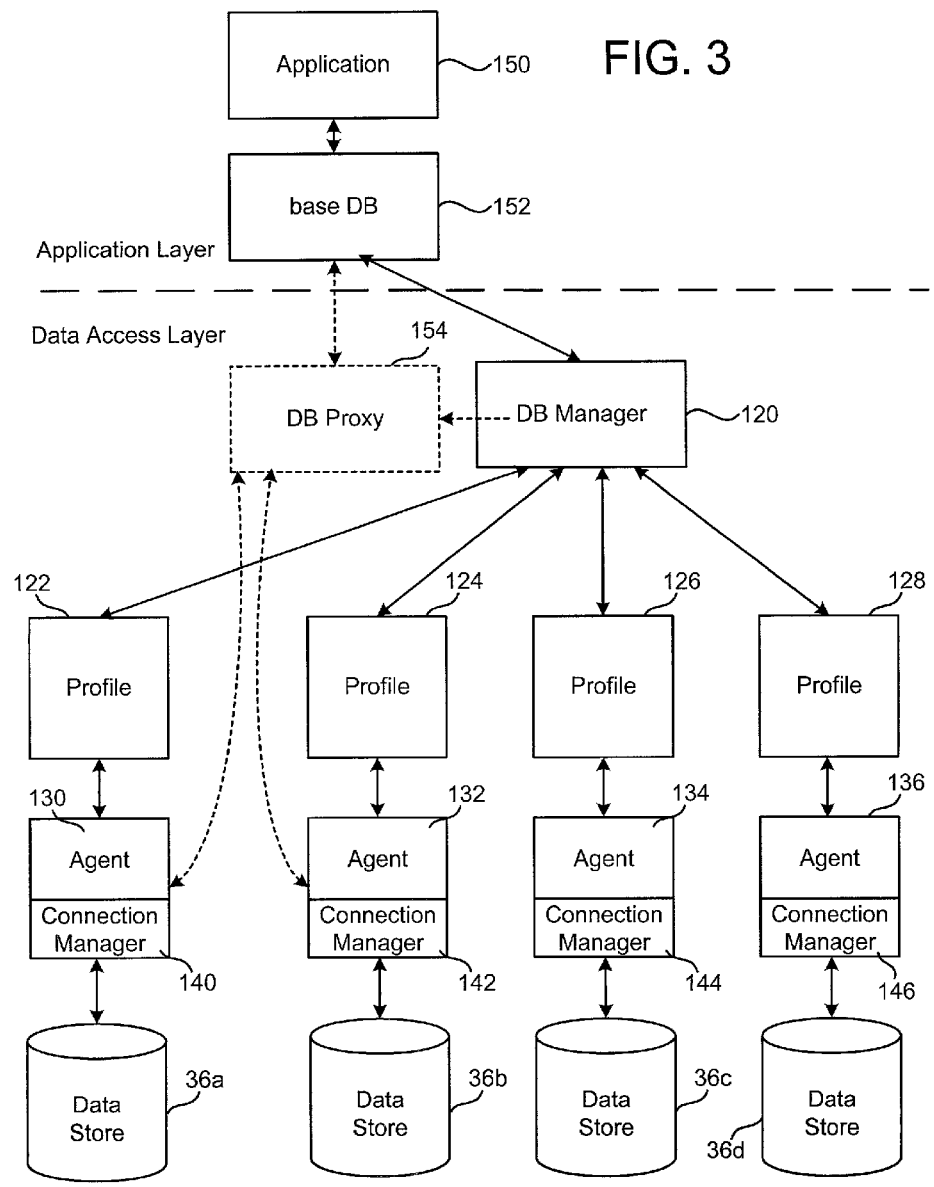
FIG. 3 is a block diagram depicting an embodiment of the present invention that supports multiple data stores.

FIG. 1 shows Identity Server 40 communicating with Directory Server 36. The system can also support multiple directory servers (or other types of data stores). FIG. 3 depicts an exemplar architecture for supporting multiple directory servers based on the notion of abstracting database objects and separating database clients from the actual database access functionalities. By doing so, clients can be implemented in a database independent fashion. Database manager 120 is the central place where all database clients interface to access the data stores. In one embodiment, there is one database manager 120 for all clients.

When database manager 120 starts, it will read the directory server configuration file(s) and insert corresponding profile and agent objects to its internal tables for later reference. FIG. 3 shows database manager 120 in communication with profiles 122, 124, 126 and 128. Each profile corresponds to an agent. For example, profile 122 corresponds to agent 130, profile 124 corresponds to agent 132, profile 126 corresponds to agent 134, and profile 128 corresponds to agent 136. Each agent is associated with a connection manager and a data store. For example, agent 130 is associated with connection manager 140 and data store 36a. Agent 132 is associated with connection manager 142 and data store 36b. Agent 134 is associated with connection manager 144 and data store 36c. Agent 136 is associated with connection manager 146 and data store 36d. In one embodiment, each of the data stores are LDAP directory servers with LDAP directories. In other embodiments, one or more of the data stores are LDAP directories and one or more of the data stores are other types of data stores (e.g. SQL servers) or others. In further embodiments, none of the data stores are LDAP directories.

Each of the profiles represents configuration information for the associated data store. This includes, among other things, host name, port number, name space, login name (also called an ID), password, and support operations. There is a one-to-one mapping between a profile and agent. One of the most important methods exposed by a profile is the method "IsSupported." Database manager 120 calls this method to determine whether a proposed data store access request can be performed by the data store associated with the profile. The method will return a false if any of the following are met: (1) the configured profile is not enabled, (2) the database type (e.g. LDAP) of the access request is not the same as the data store for that profile, (3) the type of operation is not supported by the data store, (4) the target user identification has no overlap with the profile's (and data store's) name space, or (5) the target's user identification is above the profile's (and data store's) name space and the target operation is not SEARCH.

The Agent is the object responsible for all the interaction with the data stores. Each agent includes a Connection Manager, which maintains the connection with the associated data store. The agents are responsible for converting the native data store entries to the format expected by the application.

Database clients interact with database manager 120 to accomplish any database operation. Database manager 120, in turn, interacts with the profiles to determine which data stores can service the database operation. A database proxy 154 is created to service a particular database request. Database proxy 154 communicates directly to the Agents for the data stores that can service the request. The database client then interacts directly with proxy 154 to access the appropriate data stores. Thus, database proxy 154 is a dynamic object which database manager 120 creates every time a database request is made.

Database proxy 154 encapsulates the supporting agent objects for the particular operation. It also acts as a storage area where input parameters and output results are stored. Each database proxy object exposes its methods and input parameters. These parameters include search base, object class, auxiliary class, filter, search scope, attributes and entry. After a database client sets all the parameters, the client calls the execute method of the proxy to invoke the database operation. The client then calls the database proxy GetResults method to retrieve the operations results.

FIG. 3 shows database proxy 154 in dotted lines to indicate that it is created for a particular request. When the request is completed, the proxy is terminated. The proxy communicates directly with the appropriate agents for accessing the appropriate data stores. FIG. 3 shows one example of a database proxy being created to access data in data stores 36a and 36b.

Figure 4:
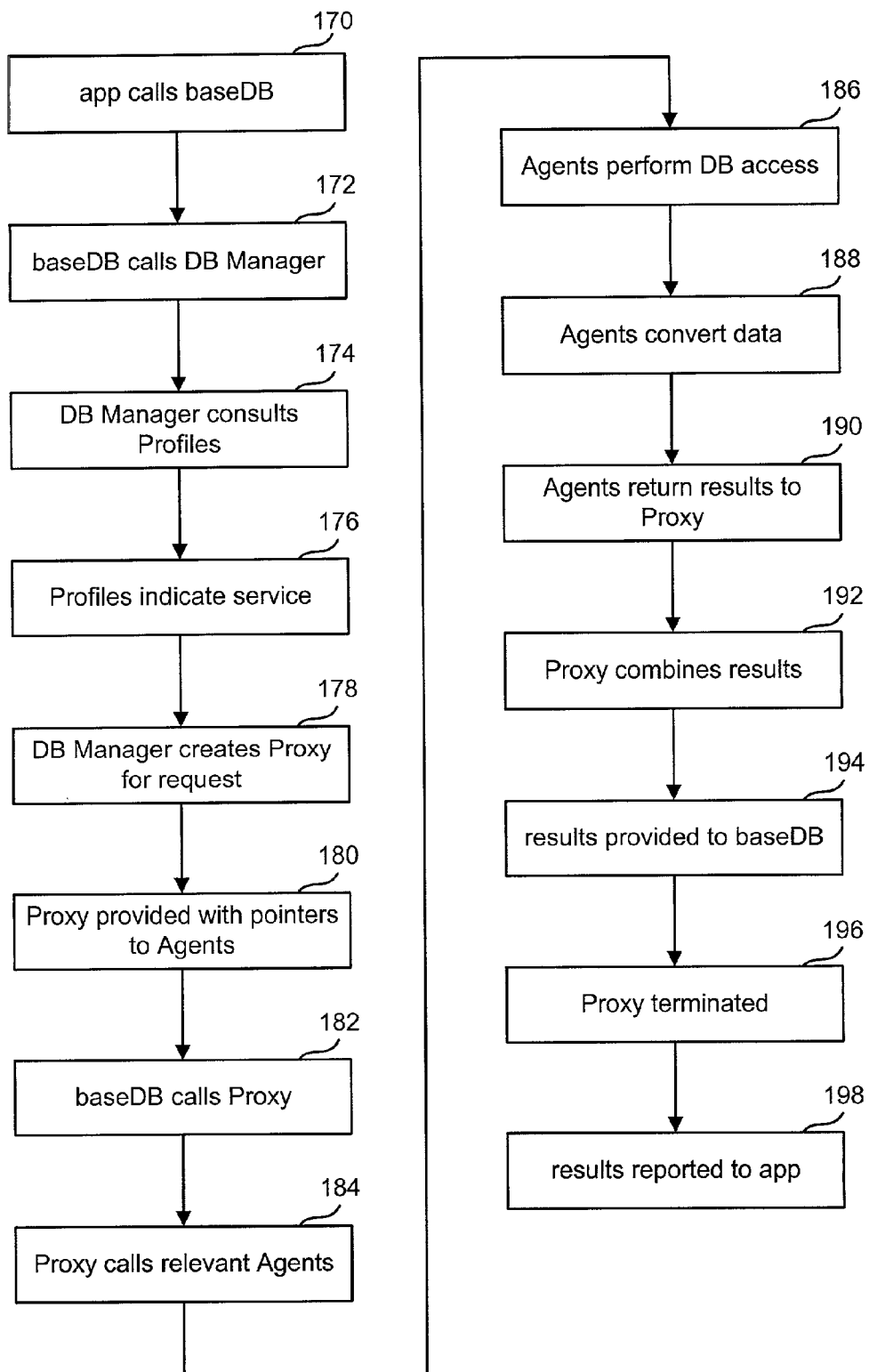
FIG. 4 is a flow chart describing one embodiment of a process for supporting multiple data stores.

FIG. 4 is a flowchart describing the process for performing a data operation when one or more data stores are supported. In step 170, application 150 calls baseDB 152. Application 150 can be User Manager 42, Group Manager 44, Organization Manager 46, etc. BaseDB 152 is an object used by the application to access a data store. In one embodiment, baseDB 152 includes sub-objects. There is one sub-object for each application.

BaseDB 152 calls database manager 120 in step 172, indicating the operation and search base for the data operation. In step 174, database manager 120 consults each of the profiles to determine which data store can support the operation. That is, each data store is a particular type of data store, has its own set of operations that it supports, and has its own search base that it supports. In step 176, each of the profiles indicates whether they can service the request based on whether the above mentioned criteria match the request. In step 178, database manager 120 creates proxy 154. Note that proxy 154 is for this one particular request and will be terminated at the end of the request.

In one example, it is assumed that profiles 122 and 124 indicate that their associated data stores can service the operation, but profiles 126 and 128 report that their associated data stores cannot service the operation. Therefore, proxy 154 will be set up to communicate with agents 130 and 132, as depicted in FIG. 3.

In step 180, proxy 154 is provided with pointers to the appropriate agents, as depicted in FIG. 3. In step 182, baseDB 152 calls proxy 154 to indicate the one or more database access operations requested. In step 184, proxy 154 communicates the appropriate request information to the appropriate agents. In step 186, the appropriate agents perform appropriate database accesses using their respective connection managers. In step 188, the agents convert the data from the native format of the data store to the format expected by application 150. In some embodiments, conversion is not necessary. In step 190, each of the agents returns the results to proxy 154. In step 192, proxy 154 combines the results from the various data stores into one set of results. In one embodiment, step 192 is skipped and the results are not combined. In step 194, the results are then provided to userDB 152. In step 196, database proxy 154 is terminated. In step 198, the results are reported back to application 150. In this manner, application 150 is insulated from the data access layer (which includes database proxy, database manager and any other components below the database manager 120, as depicted in FIG. 3). Note that when the access to the data stores includes a read operation, the reporting of results will likely include the data that was read. If the access was for a write operation, the reporting of results can include a confirmation of the write operation or a reporting of the data that was written. In some embodiments, the failure to notify of an error during a write operation can be considered as reporting a successful result of the write operation.

The basic unit of information store in a directory is called an entry, which is a collection of information about an object. The information in an entry often describes a real-world object such as a person, but this is not required. A typical directory includes many entries that correspond to people, departments, servers, printers, and other real-world objects in the organization served by the directory.

An entry is composed of a set of attributes, each of which describes one particular trait of the object. Each attribute has a type, one or more values, and associated access criteria. The type describes the kind of information contained in the attribute, and the value contains the actual data.

An entry in the directory has a set of attribute that are required and a set of attribute that are allowed. For example, an entry describing a person is required to have a cn (common name) attribute and an sn (surname) attribute. One example of an allowed attribute may be a nickname. Any attribute not explicitly required or allowed is prohibited. The collections of all information about required and allowed attributes are called the directory schemas.

Examples of attributes stored in a user identity profile include: first name, middle name, last name, title, email address, telephone number, fax number, mobile telephone number, pager number, pager email address, identification of work facility, building number, floor number, mailing address, room number, mail stop, manager, direct reports, administrator, organization that the user works for, department number, department URL, skills, projects currently working on, past projects, home telephone, home address, birthday, previous employers and anything else desired to be stored by an administrator. Examples of attributes stored in a group identity profile include: owner, name, description, static members, dynamic member rule, subscription policies, etc. Examples of attributes stored in a user organization identity profile include: owner, name, description, business category, address, country, etc. In other embodiments, less or more than the above-listed information is stored.

FIG. 5 depicts an exemplar directory tree that can be stored on Directory Server 36. Each node on the tree is an entry in the directory structure that includes an identity profile. In one embodiment, the entity can be a user, group or organization. Node 230 is the highest node on the tree and represents an entity responsible for the directory structure. In one example, an entity may set up an Extranet and grant Extranet access to many different companies. The entity setting up the Extranet is node 230. Each of the companies with Extranet access would have a node at a level below node 230. For example, company A (node 232) and company B (node 234) are directly below node 230. Each company may be broken up into organizations. The organizations could be departments in the company or logical groups to help manage the users. For example, FIG. 5 shows company A broken up into two organizations: organization A with node 236 and organization B with node 238. Company B is shown to be broken up into two organizations: organization C with node 240 and organization D with node 242. FIG. 5 shows organization A having two end users: employee 1 with node 250 and employee 2 with node 252. Organization B is shown with two end users: employee 3 with node 254 and employee 4 with node 256. Organization C is shown with two end users: employee 5 with node 258 and employee 6 with node 260. Organization D is shown with two end users: employee 7 with node 262 and employee 8 with node 264.

Each entity has a distinguished name (DN), which uniquely identifies the node. In one embodiment, each entry also has a relative name, which is different from all other relevant names on the same level of the hierarchy. In one implementation, the distinguished name (DN) comprises a union of the relative names up the tree through to the entity. For example, the distinguished name of employee 1 (node 250) is DN=CN Empl, OU=OrgA, O=CompanyA, DC=entity, where:

| | | |
|---|---|---|
| DC | = | Domain Component |
| O | = | Organization |
| OU | = | Organizational Unit |
| CN | = | common name. |

FIG. 5 shows a hierarchical tree. Some organizations employ fat or flat trees for ease of maintenance. A flat directory tree is a directory information tree that does not have any hierarchy. All of the nodes are leaf nodes (nodes without any child nodes). A fat directory tree is a tree that has a large number of nodes at any given level in a directory information tree. One advantage of a fat or flat tree is user maintenance. For example, if an employee moves to a new group, the node must be moved to a new container if the tree is not flat or fat. By moving the node to a new container, the distinguished name for the node changes and all certificates become void. One drawback of flat or fat trees is that the organization loses the benefits of having a logical directory, such as using the logical directory to determine who has access to which nodes. To remedy this, the Identity System includes partition support for fat and flat tree directories using filters. From a configuration page, an attribute can be configured to be accessible (read, modify, etc.,) based on a two part filter. The first component in the filter identifies a top node in the directory. The filter will only apply to those entities at or below that top node. The second component of the filter is an LDAP filter which defines who can access the attribute. This two component filter can be applied on an attribute by attribute basis.

There are many ways for an entity to access and use the Identity System. In one embodiment, the entity can access the Identity Systems services using a browser. In other embodiments, XML documents and API's can be used to access the services of the Identity System. For example, an entity can use a browser by pointing the browser to Identity Server 40. The user will then be provided with a login page to enter the user's ID, password, type of user and application requested (optional). Upon filling out that information, the user will be authenticated and authorized (by the Access System) to use the Identity System, as described below. Alternatively, the Access System can be bypassed (or there may be no Access System) and the Identity System authenticates the user.

Figure 6:
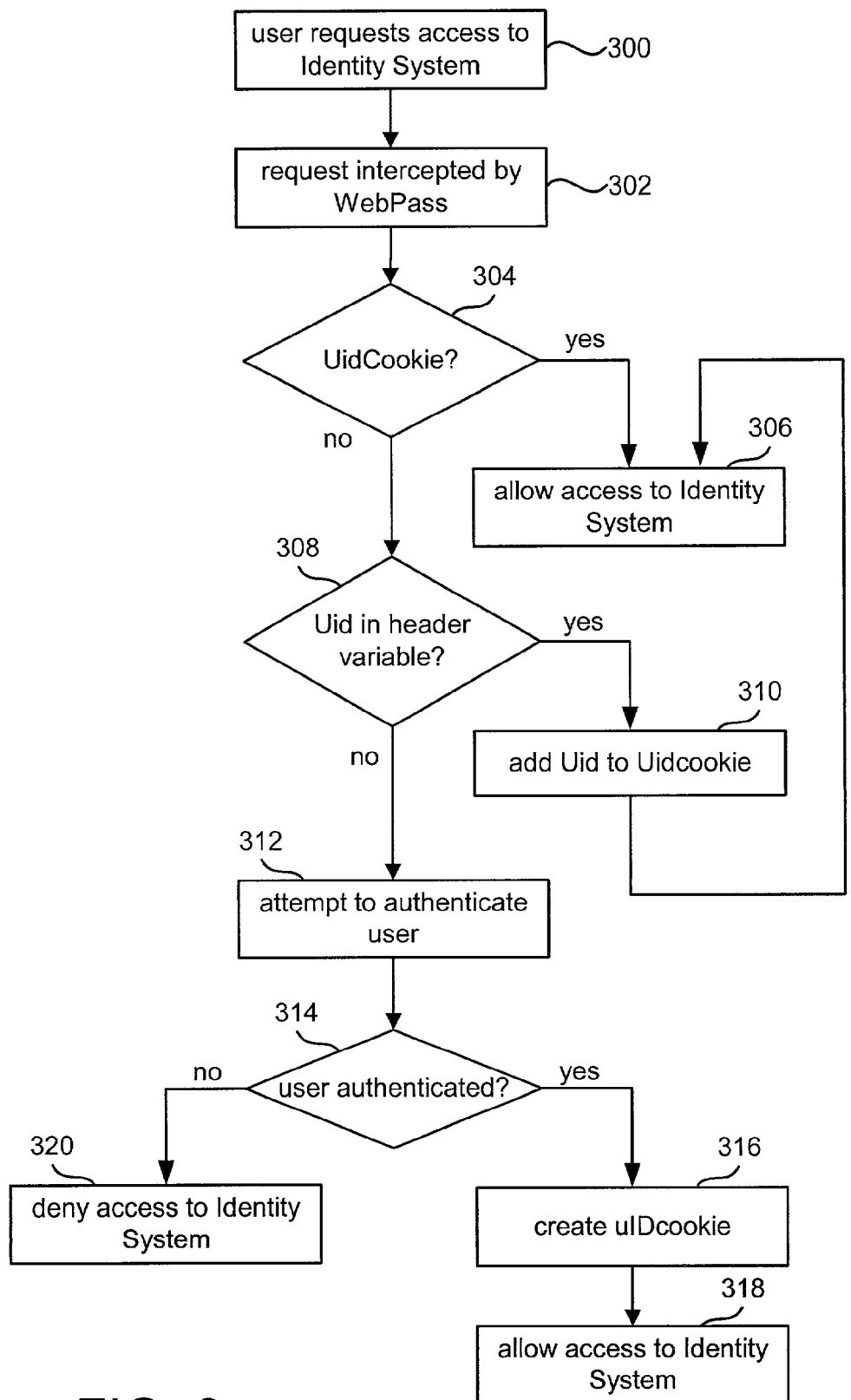
FIG. 6 is a flow chart describing one embodiment of a process for accessing the Identity System.

FIG. 6 is a flowchart, which describes a process of entering the Identity System. In step 300 the user requests access to the Identity System. For example, the user can point a browser to Identity Server 40. After being provided with a login page, the user fills in the login information, and that information is sent back to the system. If there is an Access System, as described below, then the user will be authenticated and authorized by the Access System. After authorization, the request will be redirected from the Access System to Web Server 20 (see FIG. 1). If there is no Access System, or if the Access System is not providing authentication and/or authorization services, the browser can initially be pointed directly to Web Server 20. Other alternatives can also be supported. Upon the request being sent to Web Server 20, the request will be intercepted by Web Pass 38 in step 302. In step 304, it is determined whether there is an Identity System UidCookie. The UidCookie is stored on the user's system and can be provided with the request.

Figure 7:
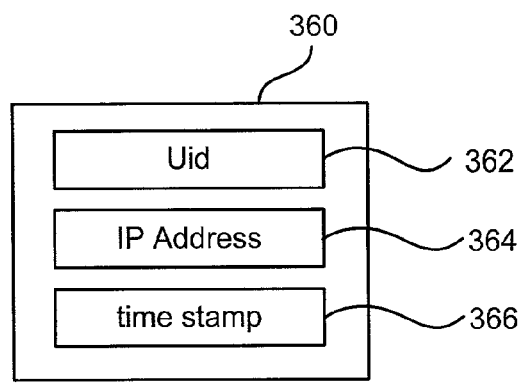
FIG. 7 is a block diagram of a cookie.

FIG. 7 depicts an example of UidCookie 360. A cookie is information that a web page, system or resource stores on a client device. In some embodiments it can represent information about the user, regardless of where it is stored and in what format. This cookie includes at least three components: Uid 362, IP address 364 and timestamp 366. Uid 362 stores the user identification for the entity trying to access the Identity System. IP address 364 is the IP address of the machine that the user is currently using. Timestamp 366 indicates the time that the cookie was initially created. Some embodiments use timestamp 366 to limit the life of the cookie. Some embodiments do not use timestamp 366. In one embodiment, the cookie is encrypted.

If, in step 304, it is determined that a valid UidCookie exists, then, in step 306, the user is given access to the Identity System application requested. The Uid from the cookie is used as the user identification upon entering the Identity System. If the valid UidCookie does not exist (step 304), then it is determined whether a user identification was received in a header variable. In one embodiment using an integrated Access and Identity System, a user's request to access the Identity System will be authenticated and authorized by the Access System. After authentication and/or authorization, the HTTP request will be redirected to the Identity System. This redirected HTTP request will include a header variable labeled as "userAuth." The data associated with this header variable will indicate the user identification for the user. If the user identification was in a header variable then a UidCookie is created in step 310 and that user identification is added to the UidCookie. Subsequent to step 310, the user is provided access to the Identity System in step 306.

If the user identification was not in a header variable, then the system attempts to authenticate the user in step 312. That is, the user's user name and password provided by the login page are used to access Directory Server 36 in order to authenticate the user. More information about authentication is described below. If the user is properly authenticated, then a UidCookie is created in step 316. During an authentication process, the user's ID and password were used to access the user's identity profile in Directory Server 36. That identity profile will include a user identification, which is added to the UidCookie in step 316. In one embodiment, the user identification is the user's distinguished name. In step 318, the user is provided access to the Identity System. If the user was not properly authenticated, then the user is denied access to the Identity System in step 320.

As discussed above, when requesting access to the Identity System, the user selects which of the Identity System applications (User Manager 42, Group Manager 44, Organization Manager 46 or Publisher 48) the user wishes to access. In one embodiment, the login page for the Identity System will request an ID, a password, an indication of the application requested and an indication of a role (discussed below). After appropriate authentication and authorization, the user is provided with a home page for User Manager 42, a home page for Group Manager 44, a home page for Organization Manager 46 or a home page for Publisher 48, depending upon which application was selected by the user. From the home page, the user can access the various services of the application.

Figure 8:
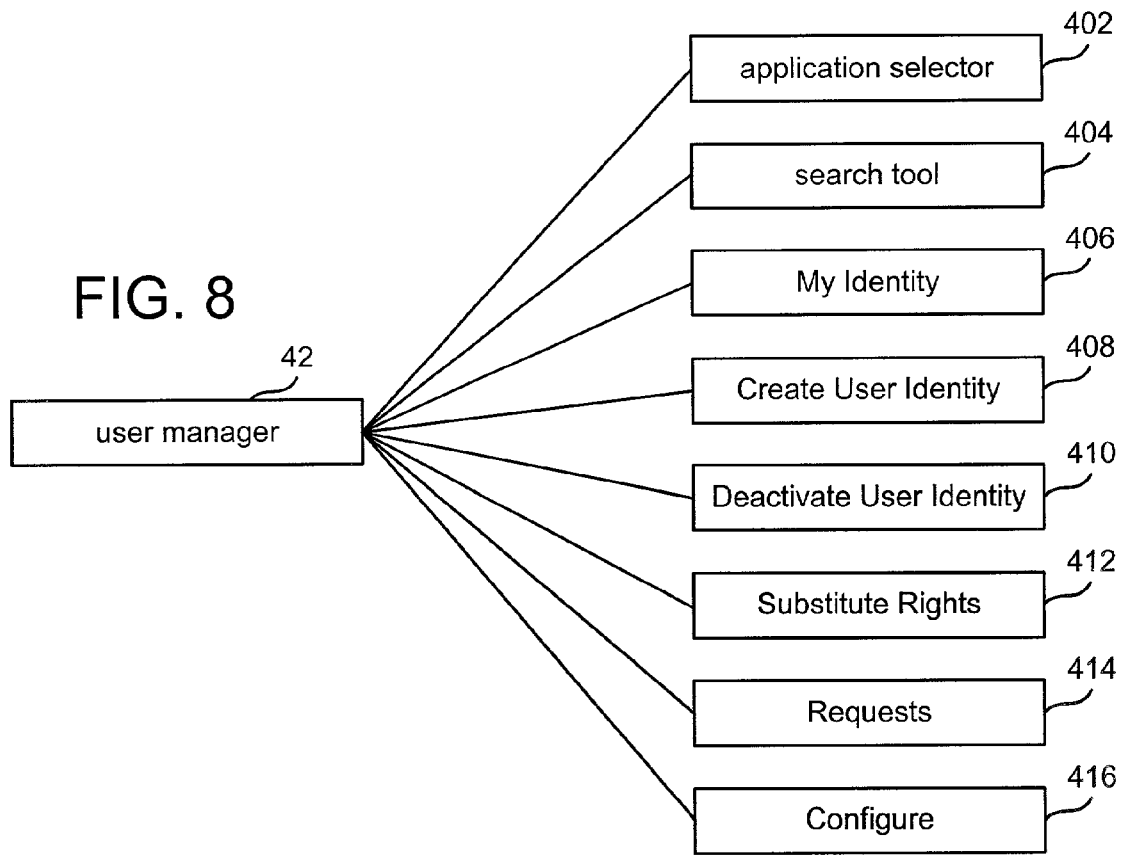
FIG. 8 is a block diagram depicting the User Manager.

FIG. 8 graphically depicts the various services provided by User Manager 42. Each of these services can be accessed from the User Manager home page. For example, in one embodiment, the home page will include an application selector 402, search tool 404, My Identity tab 406, Create User Identity tab 408, Deactivate User Identity tab 410, Substitute Rights tab 412, Requests tab 414 and Configure tab 416. Application selector 402 lets the user change applications from the User Manager to either the Group Manager, Object Manager or Publisher. In one embodiment, application selector 402 is a drop down menu. Search tool 404 enables a user to provide search information in order to search the directory for a set of one or more user identity profiles.

By selecting My Identity tab 406, a user is provided with the information stored in that user's identity profile. Create User Identity tab 408 allows a user with the appropriate privileges to create a new user identity profile (e.g. with a workflow). Deactivate User Identity tab 410 allows a user with proper privileges to remove an identity profile from the directory. Substitute Rights tab 412 allows the user to indicate who can proxy that user and allows the user to be a proxy for someone else. Request tab 414 allows a user to monitor workflows that are in progress or recently completed. Depending on the user's privileges, by selecting request tab 414, the user can see all workflows that involve that user, that are started by that user, that affect that user or that the user has privileges to view. Request tab 414 will indicate workflows for which there is an outstanding action to be done by the current user. The user can select that workflow and perform the task.

Configure tab 416 allows a user to configure various options for User Manger 42. The user must have sufficient privileges to access Configure tab 416. The user can perform attribute access control, delegate administration, define workflows and set the search base. Attribute access control includes controlling who has view and modify permissions for each attribute. Attributes can be set at any and all levels in an organization. The configuration also allows the specification of an e-mail notification list when a change to an attribute is requested. Delegation administration includes delegating administrative tasks to local administrators. An entity can choose what rights to delegate, whom to delegate to, and the scope to delegate. Workflow definition includes defining workflows for a particular organization, defining who will be responsible for the workflow actions and/or defining who will be receiving notifications for the workflow actions. Setting the search base includes setting the search base for a particular organization, person or set of persons. This will localize access to ensure security.

FIG. 9 depicts the various services provided by Group Manager 44. Once an entity is at the Group Manager home page, the entity can access the application selector 430, search tool 432, My Groups tab 434, Create Groups tab 436, Request tab 438 and Configure tab 440. My Groups tab 434 indicates the groups of which the entity is a member. By selecting any of the groups identified by My Groups tab 434 or Search Tool 432, the user will be provided with the identity profile page for that particular group. From the profile page, the group can be modified or deleted. Create groups tab 436 allows the user to create a new group. Request tab 438 provides the user with access to currently pending and recently finished workflows that involve groups. Configure tab 440 allows the user to configure various information about groups in the Group Manager. While viewing the identity profile for a group, the entity can modify that profile if the entity has appropriate privileges.

Configure tab 440 allows an entity to provide attribute access control, delegate rights, define workflows and expand dynamic groups. Attribute access control includes controlling who has view and modify permissions for each attribute in group identity profiles. Additionally, e-mail notification lists can be created which are used to notify entities when a change to an attribute is requested. Administration tasks can be delegated to local administrators. An entity can choose what rights to delegate, who to delegate to, and what the scope of the delegation is. Workflow definition includes defining the workflows for a particular group. This includes defining who is responsible for the workflow actions and who will be receiving notifications for workflow actions. Expanding dynamic groups will be discussed below. Note that some of the tabs and services may not be available to all entities, depending upon the privileges of those entities.

FIG. 10 depicts the services provided by Organization Manager 46. Organization manager 46 provides functionality to create, modify, delete and manage organizational objects. From the home page for Organization Manager 46, a user is provided with an application selector 442, search tool 444, Create Organizational Profile tab 446, Request tab 448 and Configure tab 450. Application selector 442 allows the user to select a different application to access. Search tool 444 provides a user with the ability to enter search terms in order to search for one or more organizational objects. After performing a search, the user will be provided with a list of organizational objects meeting the search requirements. User can select any of these objects to view, modify or delete, if the user has sufficient privileges.

Create Organizational Profile tab 446 allows a user to create new organizational objects, if the user has sufficient privileges. Request tab 448 allows a user to access pending workflows and workflows that have recently been finished that relate to organizational objects. Access to Request tab 448 can be restricted and/or limited depending upon users privileges. If a user has a step to perform for a workflow, it will be indicated by Request tab 448.

Configure tab 450 allows the entity to perform attribute access control, delegate administration, define workflows and define container limits. Attribute access control includes controlling who has view and modify permissions for each attribute of an organizational identity profile. In addition, an entity can specify an e-mail notification list when a change to an attribute is requested. Delegating administration includes delegating administrative tasks to local administrators. An entity can choose what rights to delegate, whom to delegate to, and the scope of the delegation. Workflow definition includes defining the workflows for a particular organization, including who will be responsible for the workflow actions and who will be receiving notifications for the workflow. Container limits includes controlling how many objects can be created in an organization. This would also include defining who will be receiving notifications that a container limit has been met, has been violated or is close to being met.

Figure 11:
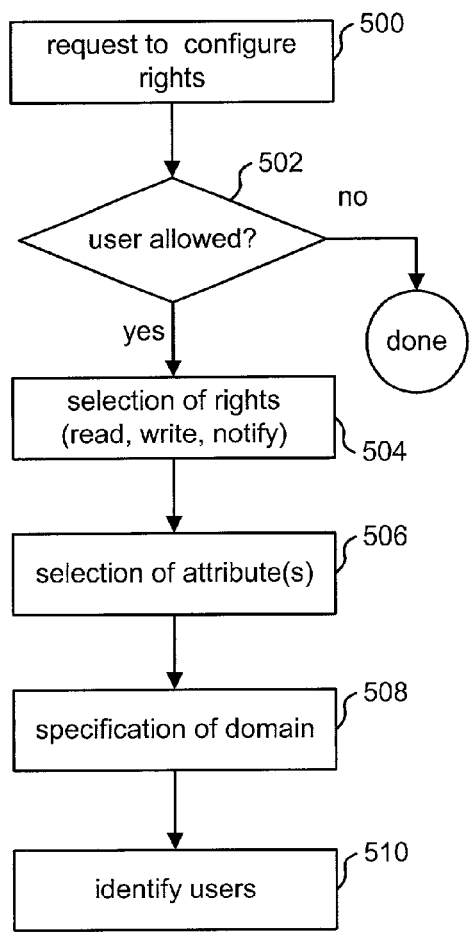
FIG. 11 is a flow chart describing one embodiment of a process for configuring rights to access attributes.

As discussed above, user identity profiles, group identity profiles and organization identity profiles all contain attributes. In the various services provided by User Manager, Group Manager and Organization Manager, users with the appropriate privileges can configure the rights to access each of the attributes. FIG. 11 is a flowchart describing an exemplar process for configuring rights to access attributes. In step 500, a user requests to configure rights. For example, the user may select any of the configuration tabs described above. In step 502, it is determined whether that user is allowed to configure rights to access attributes. If no, the user is not given access to configure any access rights. If the user is allowed to configure access rights, then in step 504 the user selects which rights to configure. In one embodiment, there are choices of three rights: read, write and notify. The notify right is associated with persons who are notified when an attribute changes.

In step 506, the particular attributes are selected. For example, in the User Manager, an entity can select the user's name, the user's telephone number, etc. In step 508, the domain is selected. The domain applies to the portion of the directory tree that is affected by the configuration. That is, only identity profiles in the specified domain are being affected by the current process being performed. In step 510, the users are identified whose rights to access the selected attributes are being affected. The users can be identified by identifying specific names of users, a group, a class of users, and an owner of the identify profile, or an LDAP filter.

Figure 12:
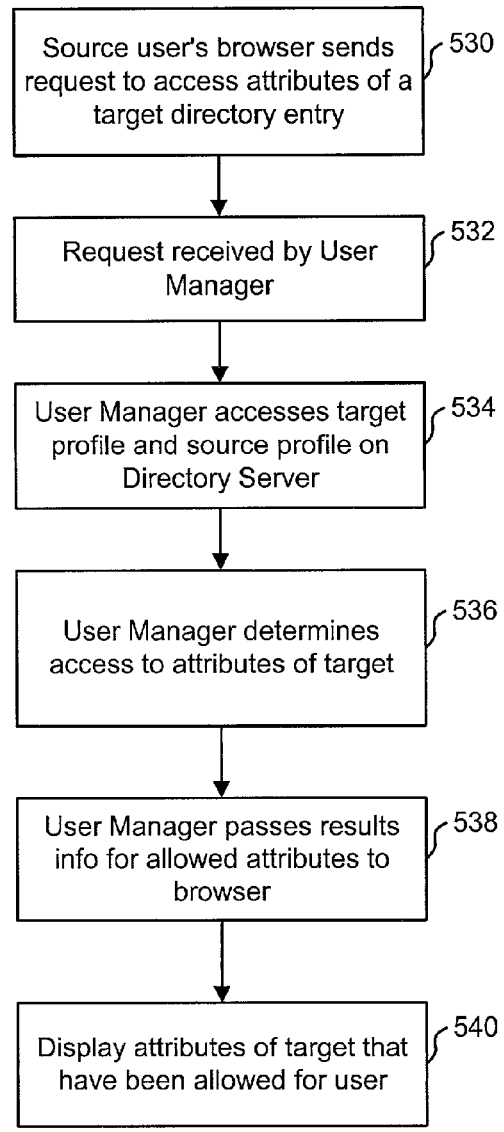
FIG. 12 is a flow chart describing one embodiment of a process for allowing an entity to view attributes.

Based on the configuration from the process of FIG. 11, when a user accesses an identity profile, the user's ability to view or modify that profile will be restricted. FIG. 12 is a flowchart describing the process for accessing an identity profile and viewing attributes. In step 530, the user's browser sends a request to access attributes of a target directory entry. Alternatively, the user can attempt to access attributes via means different than a browser (e.g. XML document). In step 532, the request is received by User Manager 42, Group Manager 44 or Organization Manager 46. In step 530, the appropriate manager accesses the target profile and a source profile on directory server 36. The target profile is the identity profile sought to be viewed. The source profile is the identity profile of the user attempting to access the target profile. In step 536, the manager determines the access rights for each of the attributes for the target profile. In step 538, the manager passes the result information for the allowed attributes to the browser. That is, the manager will determine which attributes the user may view based on the access information (e.g. from FIG. 11) and the user's identity profile. All of those attributes that can be viewed are displayed in step 540. Those attributes that can be modified will include a "modify" button next to the attribute. Selecting a modify button will allow the user to modify the attribute (e.g. change the user's telephone number, etc.).

In many implementations of the system of FIG. 1, there is a single instance of the system that will be running against the directory server that holds all the partners/suppliers/customer information in a hierarchical tree. A given user that belongs to one of these partners (or other entities) should be restricted to accessing the information that only pertains to that user's company (or other organization). So different users will have access to a different logical directory.

To support segmentation of the directory tree, the system employs a policy based search base. As part of the configuration, an administrator can set up search bases. A particular search base includes two components. The first component includes identifying to whom the search base pertains. The first component can name a single person, multiple persons, a domain in the directory or an LDAP filter. The second component of the search base is to indicate the search base itself. In one embodiment, indicating the search base includes identifying a node in the directory tree. That node and all nodes below that node in the directory tree will be part of the search base. In some embodiments, the search base can be associated with an object class.

Once the search base is set up, anyone who the search base pertains to can only access nodes within the search base. Thus, if a company employs an Extranet and two suppliers have accessed the Extranet, one supplier can be prevented from seeing the profiles about the other supplier using this search base feature. That is, persons in company A can be configured to only have a search base that includes company A, and persons in company B can be configured to only have a search base that includes company B.

As discussed above, when an entity logs into the Identity System, the entity indicates the entity's role. There are at least six roles: System Administrator, Master Identity Administrator, Master Access Administrator, Delegated Access Administrator, Delegated Identity Administrator and End User. The System Administrator can perform all Access System configuration tasks and all Identity System configuration tasks. The Master Identity Administrator can configure access controls, attribute access controls, new user services, workflow definitions, setting the search base, delegating rights, expanding dynamic groups, and setting container limits. The Master Access Administrator can configure a web gate, configure an access server, create host identifiers, configure users, set-up policies and policy domains, and delegate rights. The Delegated Identity Administrator is an administrator who has been delegated rights from the Master Identity Administrator. The Delegated Access Administrator can be delegated rights from a Master Access Administrator. An End User cannot perform configuration functions. There can also be a delegated admin who can create/delete users, add/remove users to/from groups, process workflow steps, etc.

Figure 13:
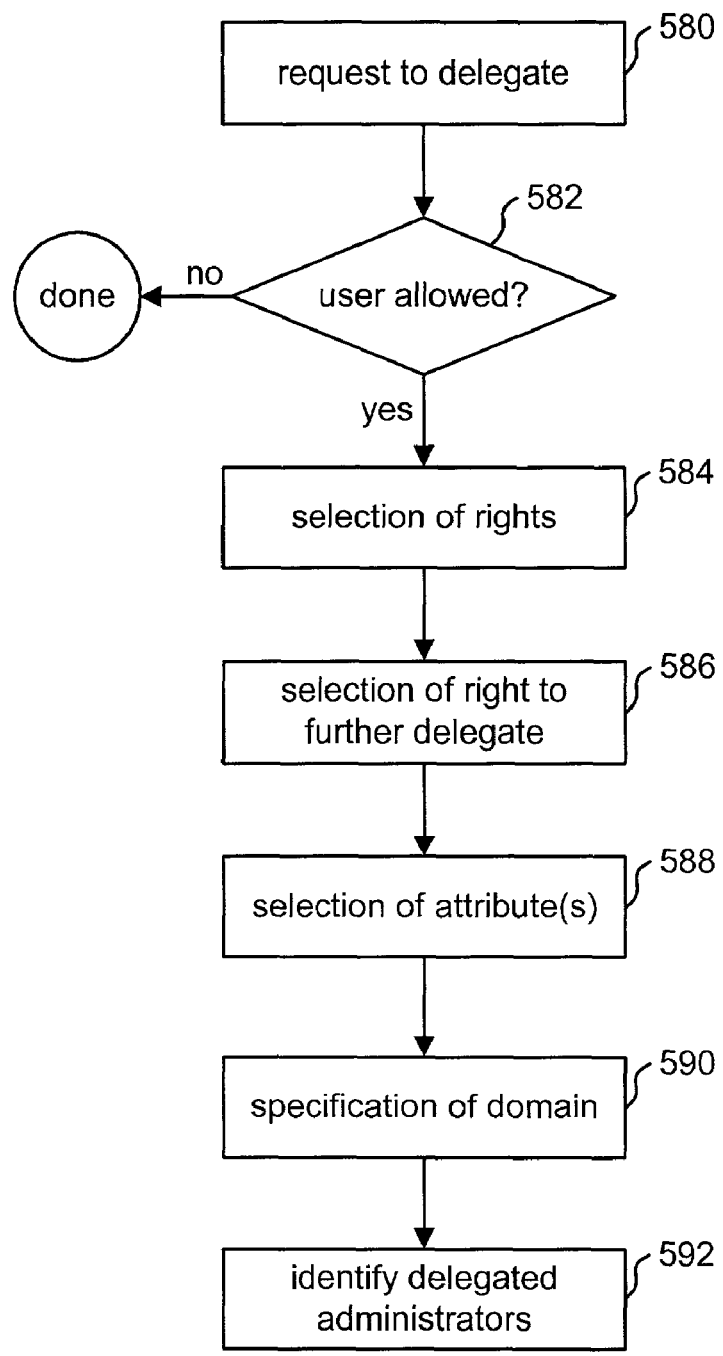
FIG. 13 is a flow chart describing one embodiment of a process for delegating rights.

A delegated administrator receives rights that were delegated by a master administrator or another delegated administrator. FIG. 13 depicts the process of delegating rights to a delegated administrator. In step 580, a request is made to delegate rights. In one embodiment, this request is made by accessing the configure tabs described above. In step 582, it is determined whether the user requesting to delegate is allowed to delegate. A Master Identity Administrator is allowed to delegate and a Delegated Administrator can delegate if that Delegated Administrator has been provided with delegation rights. If the user is not able to delegate rights, then the process is not completed. If the user can delegate rights, then in step 584, the rights to be delegated are selected. In step 586, it is determined whether the person receiving the delegated right can further delegate that right. That is, can a Delegated Administrator receiving the right then delegate that right to another Delegated Administrator. In step 588, the attributes associated with a delegated right are selected. In step 590, a domain is specified. The domain indicates the area of the directory tree that will be affected by the delegation of rights. Only profiles within the domain are subject to the delegation of rights. In step 592, the Delegated Administrators who will receive the rights being configured are identified. The administrators can be identified by indicating a particular name (or other identification), a group or an LDAP rule indicating who should receive the rights.

One right that an administrator has and which can be delegated to a Delegated Administrator is the proxy right. The proxy right for person A allows person A to choose another person (e.g. person B) to be a proxy for person A during a period of time. For example, if a Delegated Administrator (or other administrator) is going on vacation, or will otherwise be unavailable to perform its administrative duties, that Delegated Administrator can identify another person (or persons) who can be a proxy for that Delegated Administrator. While person B is being a proxy for person A, person B has all the rights and privileges of person A within the Identity System. Person B does not have the rights of person A in the Access System. Thus, the Identity System will see person B as person A, but the Access System will see person B as person B.

Figure 14:
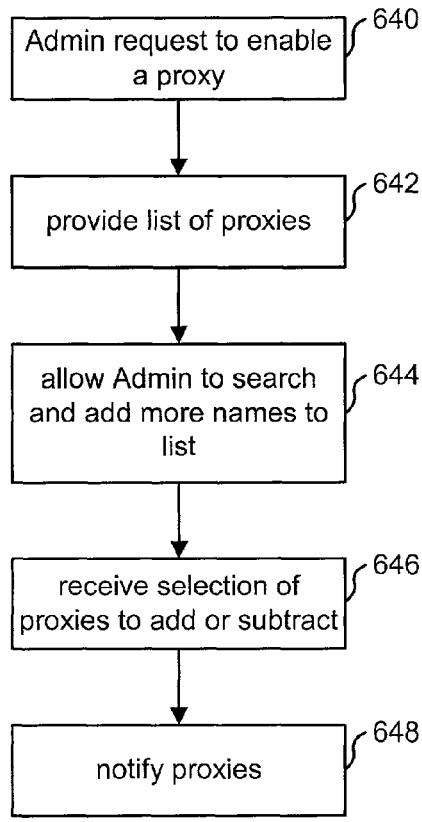
FIG. 14 is a flow chart describing one embodiment of a process for enabling another to be a proxy.

FIG. 14 is a flowchart describing the process for enabling others to be a proxy. The process of FIG. 14 is performed in Substitute Rights tab 412 in the User Manager. In one embodiment, only those entities who are Delegated Administrators or Master Administrators can perform the process of FIG. 14. In another embodiment, any user can choose to be proxied and be a proxy. In step 640, the administrator will request to enable a proxy. In one embodiment, this includes accessing the Substitute Rights tab 412. Substitute rights tab 412 will provide a list of persons who have been selected for potential proxies.

In step 644, the administrator can search for more persons to be on the list of potential proxies. In one embodiment, step 644 includes providing a search tool for a user to search for users. A list of identified users is then depicted on the substitute rights tab. Next to each user's name is a check box. In step 646, the user can select any of the users for proxy by selecting the check box. Once a user has been selected for proxy, then that user can be a proxy for the administrator performing the process of FIG. 14. However, the user will not become a proxy until the user enacts the proxy right. Thus, selecting the user in step 644 (e.g. checking the box next to the users name) only provides for the potential for that user to be a proxy. In step 648, all of the persons who have been selected for potential proxy are notified by e-mail, by a page/tab displaying proxy information or by other means.

Figure 15:
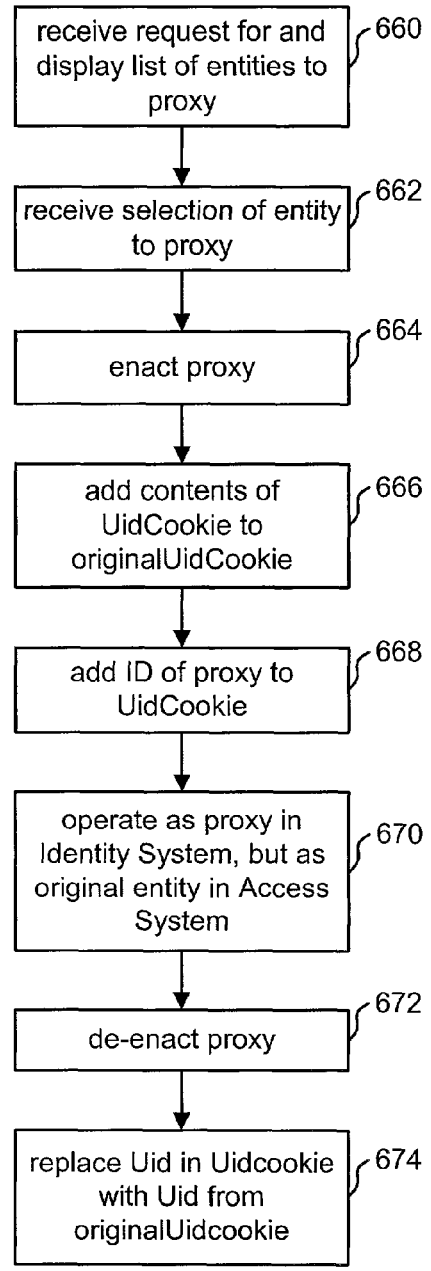
FIG. 15 is a flow chart describing one embodiment of a process for becoming a proxy for another.

FIG. 15 is a flowchart describing a process that is performed when a user becomes a proxy for another. In step 660, the system receives a request from a user to become a proxy. In one embodiment, that includes a user selecting Substitute Rights tab 412. In that tab, the system displays a list of all those persons for whom the user can be a proxy. Next to each name will be a check box. In step 662, the user selects the one person for which the user wants to be a proxy (hereinafter referred to as "the person being proxied"). For example, person A accesses Substitute Rights tab 412 to be a proxy for person B, while person B is on vacation. Person B is the person being proxied. In step 664, the user enacts the proxy right. In one embodiment, step 664 includes selecting an "enact" button. When the user selects the "enact" button, the system creates a new cookie on the users' machine called originalUidCookie. The originalUidCookie is in the same format as the UidCookie depicted in FIG. 7. In one embodiment, the originalUidCookie is an exact copy of the UidCookie currently on the user's machine.

In step 668, the UidCookie on the user's machine is edited by changing Uid 362 to equal the user identification for the person being proxied. In step 670, the user now operates as the person being proxied in the Identity System. Because the Uid in the Cookie identifies the person being proxied, the Identity System treats the user as the person being proxied. However, the UidCookie is only used by the Identity System, so only the Identity System treats the person as the person being proxied. The Access System uses a different cookie (described below), and the Access System's cookie is not edited. Therefore, the Access System treats the user as himself or herself and not as the person being proxied. While being a proxy, the user has all the rights and privileges as the person being proxied. In one embodiment, the process of FIG. 15 is performed without the user providing or knowing the password for the person being proxied and, therefore, without authenticating the password and ID for the person being proxied.

In one embodiment, step 670 includes receiving a request from the user (e.g. the entity who is the proxy) to access a service of the Identity System. In response, the system will access the Uid in the cookie, and use that Uid to access attributes, group memberships and organizations memberships for the identity profile of the person being proxied. Based on those attributes, the user will or will not be provided access to the requested service.

In step 672 of FIG. 15, the user de-enacts the proxy right. In one embodiment, this is performed by accessing the substitute rights tab and clicking on a "de-enact" button. After de-enacting, the Uid from the originalUidCookie is inserted into the UidCookie in step 674. Editing the UidCookie in step 674 thus reverts the user back to the rights and privileges that the user originally had before the process of FIG. 15. In one embodiment, the originalUidCookie is deleted in step 674.

A lot of the tasks that are performed in the Identity System are accomplished using workflows. A workflow is a predefined set of steps that perform a specific task, where information or tasks are passed between participants and programs according to a defined set of rules. One embodiment of the present invention supports the following types of workflows: create object; delete object; change the value of attributes; and certificate issuance, revocation and renewal. In one embodiment of the present invention, a user is required to create a workflow to create or delete an object, change the value of an attribute or implement certificates. Workflows ensure that an organization's guidelines for performing a task are met. Workflows can be defined in the User Manager, Group Manager or Organization Manager. A workflow can be used only in the application (e.g. User Manager) in which it was created. Each workflow has two or more steps, including one to start the action and one to implement or commit it. Each step can contain an action, send e-mail notifications to selected persons and start the next step if its entry conditions are satisfied. A workflow is associated with a portion of the directory tree. This allows an entity to have its organizations and partners enforce different workflows. Workflows can be stored in Directory Server 36.

Table 1 provides examples of different tasks that can be performed with workflows in the appropriate applications:

TABLE 1

| Application | Workflow Tasks |
| --- | --- |
| User Manager | Create User |
|  | Delete User |
|  | Change Attribute |
|  | Certificate Enrollment |
|  | Certificate Renewal |
|  | Certificate Revocation |
| Group Manager | Create Group |
|  | Delete Group |
|  | Change Attribute |
| Org. Manager | Create Object |
|  | Delete Object |
|  | Change Attribute |

Each workflow includes two or more steps. Each step can include one or more actions. Table 2, below, provides examples of different actions that can be performed with various types of workflows:

TABLE 2

| Workflow Type | Actions |
| --- | --- |
| Creating object | Initiate |
|  | Self Registration |
|  | Provide Information |
|  | Approval |
|  | Provide Information and Approval |
|  | Activate |
|  | Commit |
|  | Error Report |
|  | External Action |
| Deleting object | Initiate |
|  | Change Information |
|  | Approval |
|  | Change Approval |
|  | Deactivate |
|  | Commit |
|  | Error Report |
|  | External Action |
| Changing Attribute | Request |
|  | Approval |
|  | Provide Information |
|  | Provide Information and Approval |
|  | Commit |
|  | Error Report |
|  | External Action |

Table 3 provides a description of the various actions:

TABLE 3

| Action | Description |
| --- | --- |
| initiate | This action initiates workflows. Required, option, and supplied attributes may be configured for this action. Based on the relevant data configured in the step, the action will compose a page for the user to fill in the required information and to add additional attributes for provisioning (supplied variables) if so desired. Once the page is submitted, the workflow engine will trigger the Change Attribute workflows for the supplied attributes. People who are configured as a participant for this action and its corresponding workflow will see the "Create Profile" or "Initiate Deactivate User" button. |
| self_registration | This action allows an e-user to fill in a registration form and submit it for acceptance. The required information will be displayed on the page. It is envisioned that self-registration will be used before the user has access to an application. Therefore, the UI of this page will be designed without the context of an application and with credentials for authentication. |
| request | This action makes a request for change/add/delete attribute. People who are configured as a participant for this action and its corresponding workflow will see the "Request to Modify" or "Request to Remove" button on the profile page (during "modify" mode). |
| provide_info | This action is similar to initiate, in that it collects information from the user and triggers other workflows, if necessary. It is treated as a different action from initiate for the following reasons:<br>○ Initiate is always the first action in the workflow.<br>○ Provide_info can occur at multiple places in a workflow |

TABLE 3-continued

| Action | Description |
|---|---|
| | while initiate can not.<br>○ The people who can initiate the workflow may be different from those who can provide intermediate information. Only the people configured as the participants for the initiate action will see the "Create Profile" button.<br>○ Provide_info will try to retrieve the required attributes to display the values to the user. This allows the information setup in the previous steps or in the directory to be changed. |
| change_info | This action is identical in behavior to provide_info. A different name is used because the name change_info makes more sense in the case of deactivating. |
| approval | This action can be configured with only the required attributes. At run time, the values of the required attributes will be presented to the user to get approval. No information is supposed to be changed. The only user action allowed is to click on the button to indicate approve or reject. In other embodiments, a digital signature could be used to provide a nonrepudiation approval. |
| Provide_info and approval | This action combines the provide_info and the approval into one action. In some situation, customers may want the people who can approve also to be able to provide or change the information if necessary. |
| change_approval | This action is identical in behavior to provide_approval. A different name is given to reflect the nature of the action in the deactivating context. |
| activate | This action enables the user to explicitly mark an entry ready. Until this action is performed, the user's entry has been marked as "PendingActivation." Upon completing this action, the status will be changed to "Activated." Once "Activated," this user entry may be used for authentication to the system. |
| deactivate | This action is the counterpart of the activate action to mark an entry suspended. Until this action is performed, the user's entry has been marked as "Pending for Deactivation." Upon completing this action, the status will be changed to "Deactivated." In both of these cases, this entry will not be recognized as an authorized user in the system. |
| commit | This action writes the information collected this far in the previous workflow steps to the directory. Commit can be done multiple times. The location of the write is the user's permanent location as selected in the "initiate" step. |
| error_report | This action is to report for a background process. When a background process encounters a processing error, it has no proper way to report the error since there is no responsible person for the action. The workflow definer can configure the failed path to this error_report step, so that the error can be designated to the responsible individuals. |
| external_action | External action can be plugged into the workflow as a distinct step. |

Workflows are created based on templates (forms) by users with sufficient privileges. In one embodiment, each template has at least four sections including a section for creating objects, deleting objects, changing attributes and working with certificates. The template provides parameters that define how workflows can be created. Templates can be edited in order to tailor the workflow definition processes. The User Manager, Group Manager and Organization Managers each have their own template files and use those template files to control and define the workflow definition process. In one embodiment, the template file is an XML document that defines a set of parameters for each of the actions available to that particular workflow type. Table 4 describes the various parameters that are used in the template files:

TABLE 4

| Parameter | Description | Sample Setting |
|---|---|---|
| occurrence | Indicates how many times this action may be used within a workflow. | [1][n]<br>1–action can be used once.<br>n–action can be used multiple times. |
| useraction | Indicates whether or not the step is interactive. | [true][false]<br>True–action requires user interaction.<br>False–this is a background step and requires no user interaction. |
| forceCommit | Indicates whether an implicit commit takes place for this step, even though this action is not a commit. An implicit commit writes all collected data to the specific target entry. | [true][false]<br>True_implicit commit takes place.<br>False_implicit commit does not take place. |
| pre_action | Indicates that the current action can be specified if the previous step's action is in this list. | [list of actions] |
| exit_condition | Indicates the possible results for the given action. | [list of exit conditions]<br>For example:<br>true: 1<br>false: 0 |
| relevant_data | Indicates which types of relevant data can be configured for this step. Background steps do not contain any relevant data. | [list of relevant data}<br>Can be any combination of Required, Optional, or Supplied. |

Below is a generic form of a template. In the left hand margin is a letter to identify each line of the template for explanation purposes:

| Generic Template |
|---|

```
© Oblix, Inc., 2001
a  <CompoundList ListName = "[workflow type]">
b      <CompoundList ListName = "[action]">
c          <SimpleList>
d              <NameValPair ParamName="occurrence" Value= [value] />
e              <NameValPair ParamName="useraction" Value= [value] />
f              <NameValPair ParamName="forceCommit" Value= [value] />
g          </SimpleList>
h          <ValList ListName= "pre_action">
i              <ValListMember Value = "[action]"
j              ...
k          </ValList>
l          <ValNameList ListName= "exit_condition">
m              <NameValPair ParamName = "true" Value="0"/>
n              <NameValPair ParamName = "false" Value="1"/>
o          </ValList>
p          <ValList ListName= "relevant_data">
q              <ValListMember Value = "required">
r              <ValListMember Value = "optional">
s              <ValListMember Value = "supplied">
t          </ValList>
u      </CompoundList>
       [more definitions of actions]
v  </CompoundList>
```

The first line labeled (a) indicates the workflow type, which includes creating an object, deleting an object, changing attribute or certificates. Lines (b-u) define the parameters for one particular action. One or more of the parameters described above are defined in lines (b-u) for one action. For example, line (d) puts a value into the occurrence parameter, line (e) provides a value for a useraction and line (f) provides a value for forceCommit. Lines (h-k) provide the various pre-actions that have to occur before the particular action is performed. Lines (l-o) provide exit conditions. While the generic template above shows line (b-u) for one particular action, a typical template would have parameters for many actions. One template is likely to be used to create many workflows.

Figure 16:
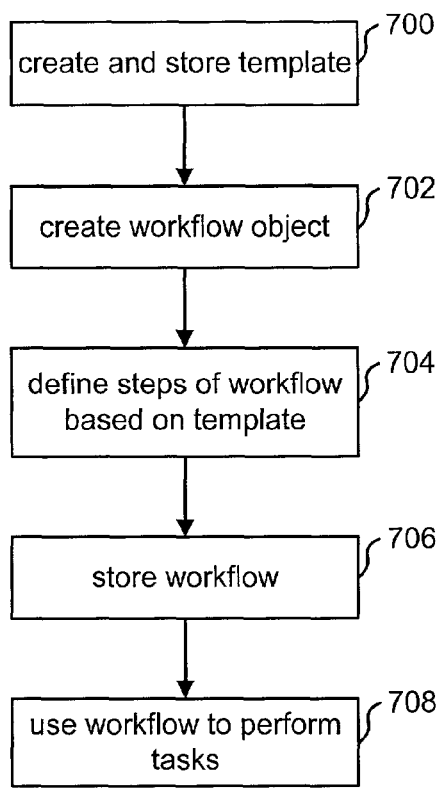
FIG. 16 is a flow chart describing an overview of a process for creating and using workflows.

FIG. 16 is a flowchart providing an overview of the process for creating a workflow. In step 700 a template is created and stored. In one embodiment, the template can be created using a word processor. In step 702, a workflow object is created. The workflow can be created using the User Manager 42, Group Manager 44 or Organization Manager 46. In step 704, the steps of the workflow are defined based on the template created in step 700. In step 706, the workflow is stored. In step 708, the workflow is performed. Additional workflows can be created by performing steps 702-708 because once a template is created, it can be used to create many workflows.

Figure 17:
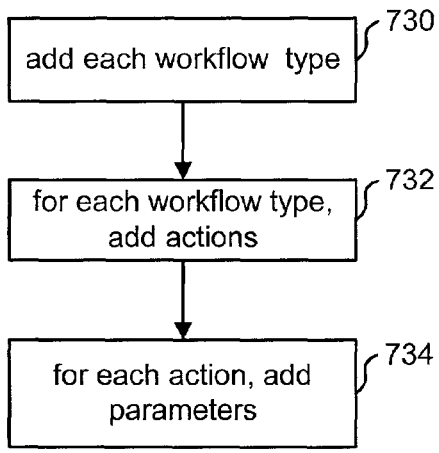
FIG. 17 is a flow chart describing one embodiment of a process for creating a template.

FIG. 17 is a flowchart describing the steps of creating a template. In step 730, each workflow type is added to the template file. In reference to the generic template above, line (a) of the generic template identified the first workflow type. It is likely that the workflow types would include create object, delete object, change attributes and certificates. In step 732, for each workflow type, actions are added. Code for one action is depicted above in the generic template. In step 734, for each action the parameters are added. In one embodiment, one or more domains can be specified for a template or for workflow types in the template. If domains are specified, then the associated template or workflow types only apply to workflows created for the specified domain(s).

Figure 18:
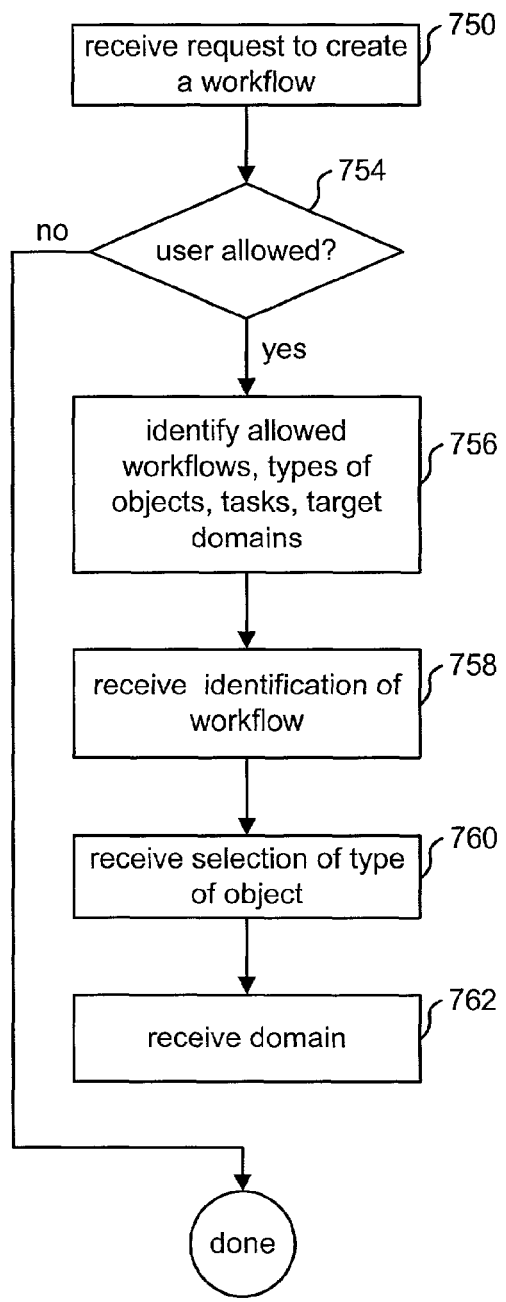
FIG. 18 is a flow chart describing one embodiment of a process for creating a workflow.

FIG. 18 provides a flowchart for creating a workflow object (step 702 of FIG. 16). In step 750, the appropriate manager (User, Group, Organization) receives a selection or indication to create a workflow. In step 754, it is determined whether the user is allowed to create the workflow. If no, the process is completed. If yes, the system identifies the different types of workflows, objects, tasks and target domains for which the user can create a workflow (step 756). In step 758, the user selects the identification of the workflow to be created. The identification is just a unique name to identify the workflow. In step 760, the user inputs a selection of the type of workflow based on the options from step 756. Step 760 includes choosing the task that the workflow will perform. For example, in the User Manager, the possible tasks include create a user, delete a user, change attribute, etc., as discussed above.

In step 762, the user specifies the domain in the directory to associate with the workflow. In one embodiment, specifying a domain limits the workflow to only operate on target identity profiles that are in the domain. In one implementation, the domain is specified by identifying a node in the directory. The domain includes the identified node and all nodes in the tree that are below the identified node. For example, if a user selects node 242 of FIG. 5, then the domain includes nodes 242, 262 and 264. In one embodiment, a filter can be used so that the workflow can be associated with a portion of a flat tree or hierarchical tree. The filter can be an LDAP filter or other type of filter for identifying a set of entities.

Figure 19:
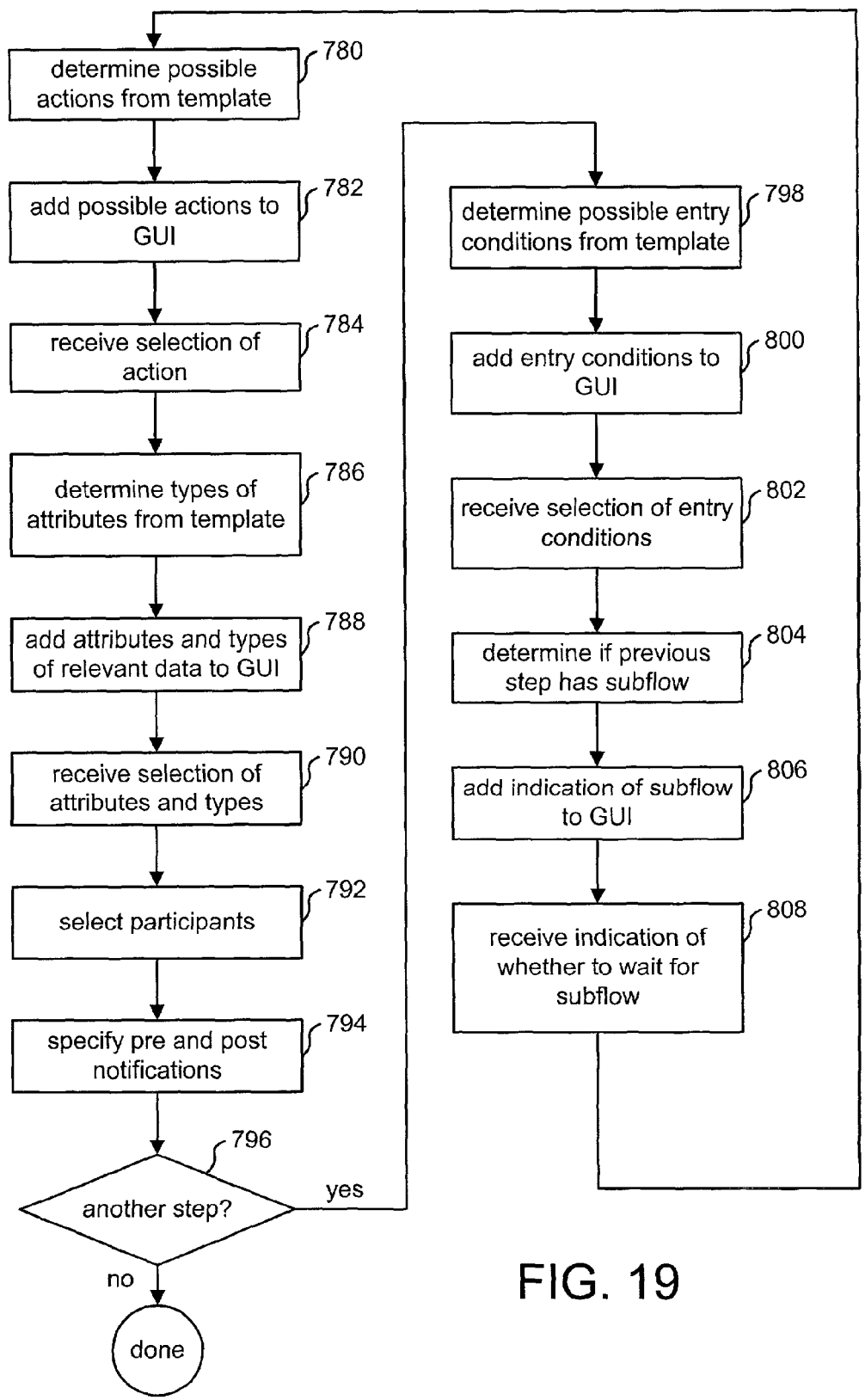
FIG. 19 is a flow chart describing one embodiment of a process for defining steps for a workflow.

FIG. 19 is a flowchart describing the process of defining steps for a workflow being created. The process of FIG. 19 is performed based on the template. In step 780, the system determines the possible actions that can be performed for this particular workflow based on the template. That is, the system reads the template and determines which actions can be added. The actions that can be selected are added to a GUI in step 782 and, in step 784, a selection from the GUI is made by the user. In step 786, the system determines which types (required, optional, supplied) of attributes are available, based on the template. The appropriate attributes and types of attributes are added to the GUI in step 788. For example, the various attributes can be selected as required, optional or supplied. If the template does not allow for the supplied attribute, then that option will not be available on the GUI.

In step 790, the system receives a selection of the attributes and the types from the user. That is, the user will select which attributes are optional, which attributes are required and which attributes are supplied. An attribute is supplied if it is provided from another workflow. In other embodiments, other types can be used. In step 792, the participants who can perform the current step being defined are identified. They can be identified by naming them individually, naming a group, or using an LDAP filter. In step 794, pre and post notifications are specified. A pre-notification means that prior to the step being performed the following set of users are sent an e-mail (or other form of communication). Post notification means that after the step has being completed the following individuals are sent an e-mail (or other form of communication).

If there is another step in the workflow (step 796), then the method loops to step 798; otherwise, the process of FIG. 19 is completed. In step 798 the possible entry conditions are determined from the template. In step 800, these entry conditions are added to the GUI. In step 802, a selection of the entry conditions is made from the GUI. In step 804, the system determines if the previous step has a subflow. If so, the user has an opportunity to indicate whether to prevent the initiation of the current step until the subflow is completed. Determination of whether there is a subflow can be based on the template or based on the types of data in the previous step (e.g. is there supplied data). If there is a subflow (or multiple subflows), then indication of the subflow(s) is added to the GUI in step 806. In step 808, the system receives an indication from the GUI whether the current step should wait for the previous step's subflow(s) to complete. This indication to wait for subflows is stored as a flag with the data for the workflow. After step 808, the method continues at step 780.

In one alternative, each subflow (for a step that had multiple subflows) can be associated with a separate entry condition. In such an embodiment, the user can individually select whether to wait for each subflow.

A subflow is a workflow that is initiated by another workflow. The concept of subflow was introduced and implemented to reduce administrative work. If a workflow already exists to perform a task, any other workflow that needs to perform that task should be able to leverage off the first workflow. When creating a workflow, an indication that there is a sub-workflow is provided by the creator of the workflow when the creator indicates that one or more of the variables are supplied.

The workflow that initiates the subflow is referred to as the parent workflow. A workflow can be both a parent workflow to a first workflow and a subflow to a second workflow. The parent workflow may or may not wait for the subflow, as defined in the workflow creation. Consider the following example, a company uses a first workflow to create new users for the Identity System and add the new user's identity profile to the directory. As part of its process, the new user workflow obtains the new user's telephone number. The obtaining of the new user's telephone number is accomplished by performing a new telephone number workflow. In this example, the new telephone number workflow is initiated by a step in the new user workflow. Therefore, the new telephone number workflow is a subflow of the new user workflow. In one alternative, the new telephone number workflow can also call a subflow, for example, to get a new telephone line connected and operational. This, second subflow can also call a subflow, and so on. There can be many levels of nesting of subflows. Additionally, a parent workflow can have many subflows.

In one embodiment, a parent workflow and its subflows must all be performed by the same application. For example, the all must be performed by the User Manager. Or, they must be performed by the Group Manager, etc.

Figure 20:
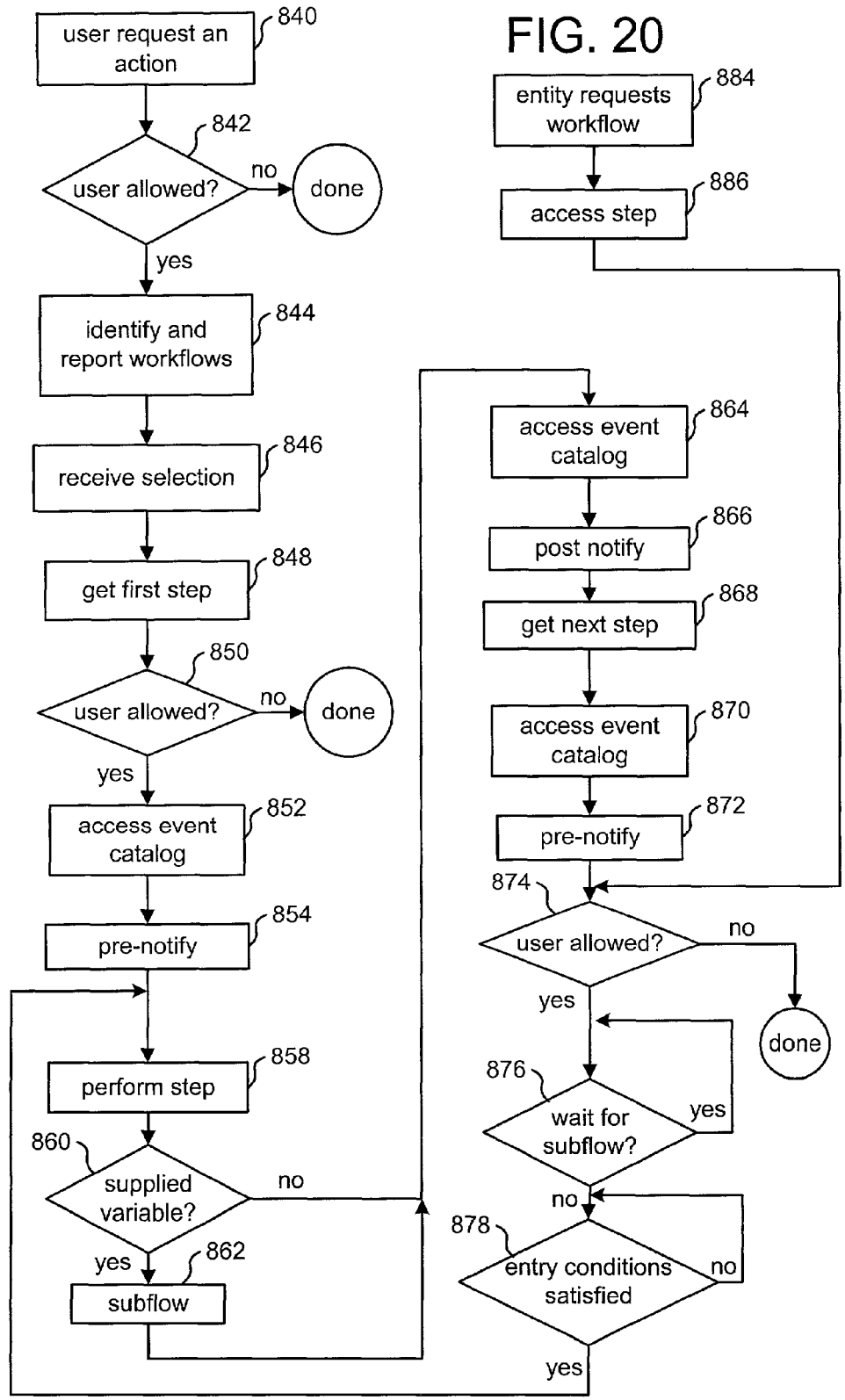
FIG. 20 is a flow chart describing one embodiment of a process for using a workflow.

FIG. 20 is a flowchart describing the process of using a workflow. The process of FIG. 20 is performed, for example, when creating a new user, a new group, etc. In step 840, the relevant manager (e.g. user, group or organization) receives a request to perform an action that requires a workflow. Most actions are likely to have an effect on at least one identity profile in the directory. In step 842, it is determined whether this user is allowed to initiate the workflow. If not, the process of FIG. 20 is completed. If so, the GUI determines and reports a set of one or more workflows. This set of one or more workflows meets three criteria: (1) the user is allowed to use the workflows, (2) the workflows perform the requested task and (3) the workflows are associated with a domain that includes the target of the task. For example, if user A has requested to modify the attributes of Employee 8 (identity profile 264 of FIG. 5), then the system will identify and report workflows that (1) user A has permission to access, (2) perform attribute modification and (3) are associated with a domain that includes identity profile 264 of FIG. 5. In one embodiment, the identified workflows are displayed in a menu.

In some situations, a workflow is requested without knowing the location of the target identity profile. For example, a user can request to create an object without indicating where to store the object in the directory. In such a scenario, the system will find and report workflows that perform the requested task and can be accessed by the user. When the system reports the list of workflows (e.g. via a GUI), the system will also report the domain associated with each workflow. In this situation, step 846 includes the system receiving a selection from the user of the workflow desired, and the domain to operate on.

In step 846, the system receives a selection from the user of the work flow desired. Note that is step 844 only identified one workflow, then step 846 can be skipped or performed automatically. In step 850, it is determined whether the user is allowed to perform this workflow step. If not, the process of FIG. 20 is completed, at least temporarily. One embodiment of the process of FIG. 20 does not include step 850. If the user is allowed to perform the step, then the event catalog is accessed in step 852. The event catalog, which will be discussed in more detail below, is a list of events that trigger actions (e.g. cross application workflows) external to the workflow. In one embodiment, the event catalog is only checked if the template allowed for the use of external actions. For example, one of the actions allowed in a workflow step and defined in a template is "external_action."

In step 854, pre-notifications, if any, defined in the workflow are sent out. In step 856, cross application workflows, if any, are invoked, as per the event catalog. In step 858, the current step of the workflow is performed. In step 860, it is determined whether there are supplied variables. When creating a workflow, the creator had the option of defining the types of variables. Supplied variables are those variables whose value will be supplied by a subflow. If the current step has a supplied variables, then the system searches for any workflows that can supply the variable and apply to the appropriate domain. If only one workflow is found for each supplied variable, then those workflows are initiated as a subflow in step 862. If multiple workflows are found for a particular supplied variable, then the user is given a choice and the chosen workflow is initiated as a subflow in step 862. Note that the subflow could itself have a subflow, which could itself have a subflow, and so on. There is no limitation on the number of subflow nestings.

If there are no supplied variables, or after the subflow(s) are started, the event catalog is accessed in step 864. Note that cross application workflows can be started pre-step or post-step. Step 864 is for post-step cross application workflows. In step 866, post step notifications are sent out, if any. In step 868, the next step is accessed from the workflow definition. If there are no more steps, then the process of FIG. 20 is completed. In step 870, the event catalog is checked. In step 872, pre-notifications are sent out.

In step 874, the system determines whether the user is allowed to perform the next step. If not, the process of FIG. 20 is stopped. If so, the system determines in step 876 whether it has to wait for the subflow(s) started in the previous workflow step. In one embodiment, a flag is set at workflow creation time to indicate that the workflow should wait or not wait. If there is a subflow and the current workflow has to wait, the system continues to wait until the subflow is completed. If there is no subflow or it does not have to wait, then the system determines whether all entry conditions have been satisfied in step 878. If not, the system waits for the entry conditions to be satisfied. If yes, the process continues to step 856.

Note that different steps may be set up for performance by different users. Thus, a first user may start the workflow but a different user or a different set of users may be needed for intermediate steps. Therefore, the process of FIG. 20 performed by the initial user may temporarily halt. As described above, if another user is needed to perform a step, that user will be notified either by e-mail or through one of the request tabs discussed above. When that user desires to perform the step, the user will request access to the workflow in step 884 of FIG. 20. For example, the user can respond to a link in an e-mail or select a workflow listed in one of the request tabs. In step 886, the step for that particular user is accessed, and then the method continues with step 874 of FIG. 20.

Figure 21:
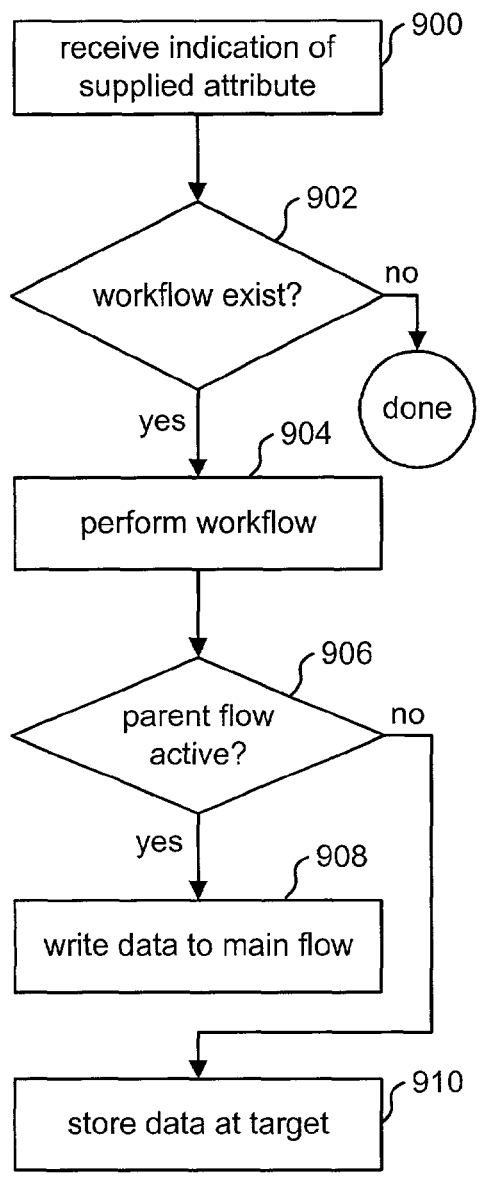
FIG. 21 is a flow chart describing one embodiment of a process for using a subflow.

FIG. 21 is a flowchart describing the process for using a subflow. In step 900, the workflow engine (part of Identity Server 40) receives an indication that a variable/attribute is to be supplied. In step 902, the engine determines whether a workflow exists for that particular variable that applies to the user and domain. If not, the process is done and the supplied variable is not supplied. If there is a workflow available, then that workflow is performed in step 904. When the workflow is completed, it is determined whether the main workflow (parent workflow) is still active. The parent workflow may still be active because it is waiting for the subflow to complete. Alternatively, if the parent workflow is not waiting for the subflow to complete, then the parent workflow may not necessarily be active. The parent workflow may be completed.

If the parent workflow is still active, then the result of the subflow is written to the parent workflow in step 908. If the parent workflow is not active, then the result is written to the target identity profile in step 910. In an alternative embodiment, the end result of the subflow can be written to the target identity profile regardless of whether the parent workflow is still active or not. Note that a subflow may have a subflow of its own, which would cause the process of FIG. 21 to operate in a recursive manner. There is no limit on the number of subflow nestings.

A workflow is performed by one of the three managers described above (User Manager, Group Manager, Organization Manager). There may be cases when one workflow in one of the applications (e.g. user manger) needs to trigger a workflow in another application (e.g. Group Manager). For example, when creating a new user with a workflow in the User Manager, it may be beneficial for that workflow to trigger another workflow in the Group Manager which subscribes the new user to groups. A cross application workflow is performed using the event catalog described above, a client program and (optionally) a configuration file for the client program, all of which will be described below.

The cross application workflow uses a pre and post processing feature of the integrated Identity System and Access System. The pre and post processing allows third parties to extend the base of functionality of the system by providing custom actions based on specific defined events. The base elements of pre and post processing are called events. Events occur any time the user interacts with the system. Events can be as simple as adding, modifying or deleting an object or could be as complex as a specific step within a workflow process.

Actions are functions or applications that perform a task in response to an event. These actions are defined to enhance the base functionality of the system of FIG. 1. Multiple actions can be defined for each event. Actions are executed in the order that they appear in an event catalog. Actions are defined using a plug-in model similar to Web Server CGI model. Functions are applications defined for each custom action. Each function/application will take a standard XML structure as its parameters that allow the system to specify information about the event that triggered the function. Action functions are defined within libraries (.dll or .so) or stand alone executable files. To create a new action based on an event, one must insert a hook into the event catalog. All entries in the event catalog are defined in the following format:

actionName; exectype; param1, param2, . . . ; path; execparam; func;

The "actionName" is the name of the event. The convention for most events is APPNAME_EVENTNAME_PPPTYPE, where APPNAME is the name of the application, EVENTNAME is the name of the event and PPPTYPE is the type of processing (pre event or post event). For a workflow, the APPNAME is the workflow ID for the workflow, the EVENTNAME is the step number in the workflow. The "exectype" is a type of hook, which can be exec or lib. An exec is an executable. A type that is lib is in a library such as a dll. The "param" is the parameter, which the system takes to output the value. The parameters are deliminated by commas. The "path" is the path for the external exc or dll to be launched. The "execparam" identifies the input parameters, deliminated by a comma. The "func" is the function in the shared library. Thus, when the event defined in actionName occurs, the appropriate executable or library function is called.

The function in the shared library or the executable that is to be executed upon the event (hereinafter referred to as the "client program") needs to include logic to decide which workflow (or other process) to be invoked. It can make use of a configuration file to have a mapping between workflows and any distinguished names, values of attributes, system parameters and any other variables of interest. This client program, after deciding which workflow to call, must connect to the system. In some embodiments, the client program does not call any workflows—rather the client program does all of the work or the client program calls another program/function.

In one embodiment, the integrated Access and Identity System accepts XML document inputs that are encapsulated in a SOAP envelope using HTTP protocol requests. The XML document contains the necessary parameters and authentication information for carrying out the request. The request is sent to an appropriate URL for the desired application. The Identity System provides the desired application's response to the client program as an output XML document.

The XML input language is a language based on SOAP that allows customers to perform functions outside of the current GUI. The structure of SOAP requests is explained in greater detail below.

One example of a use for a cross application workflow is for a new user workflow to spawn a subscribe to group workflow. The following is the XML input to spawn the subscribe to group workflow:

```
© Oblix, Inc., 2001
<?xml version="1.0"?>
    <oblix:requests>
        <authentication type="basic" login="newuser"
password="passwd">
        <oblix.request application="groupservcenter"
function="SetGroupSubscription" includeRequest="none"
displayOutput="No">
            <oblix:params>
                <oblix.param name="useruid">
                    <oblix:value>cn=new user,
ou=engineering, o=company, c=us</oblix:value>
                </oblix:param>
                <oblix.param name="groupuid">
                    <oblix:value>cn=engineering group,
ou=engineering, o=company,c=us</oblix:value>
                </oblix:param>
            </oblix:params>
        </oblix.request>
    </oblix:requests>
```

Figure 22:
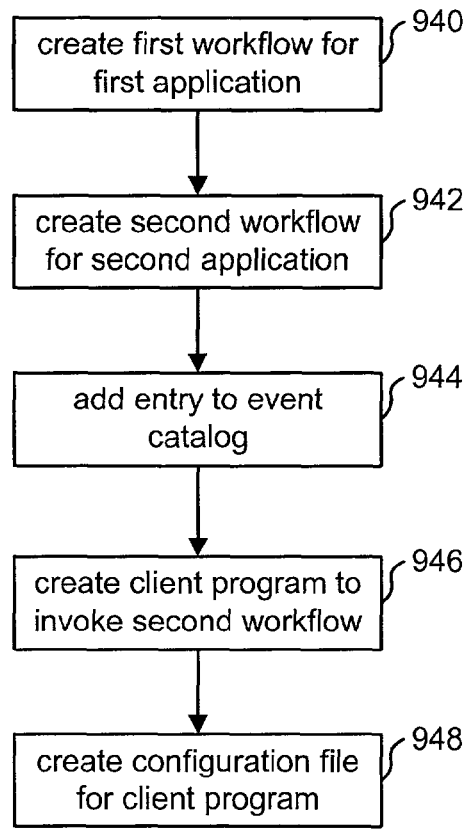
FIG. 22 is a flow chart describing one embodiment of a process for creating a cross application workflow.

FIG. 22 is a flowchart describing the process for creating a cross application workflow situation. In step 940, the first workflow for the first application is created. For example, the create user workflow for the User Manager application is created. In step 942, the second workflow for the second application is created. For example, the subscribe user to group workflow can be created in the Group Manager application. In step 944, an entry is added to the event catalog. For example, an entry is added to the event catalog that indicates the workflow ID for the workflow created in step 940—the step that should spawn the second workflow and that it is a post event. The entry also identifies the client program that will be created (see below). In step 946, the client program is created which invokes the second workflow. This client program receives the distinguished name of the newly created user as a parameter. In another embodiment, the client program receives other attributes from the identity profile being operated in by original workflow. The client also receives the workflow instance, the work step identification, and attributes of the work step. In step 948, a configuration file may be created for the client program. For example, if the second workflow is to subscribe a user to a group, then the configuration file may include rules for which users should be added to which groups.

Figure 23:
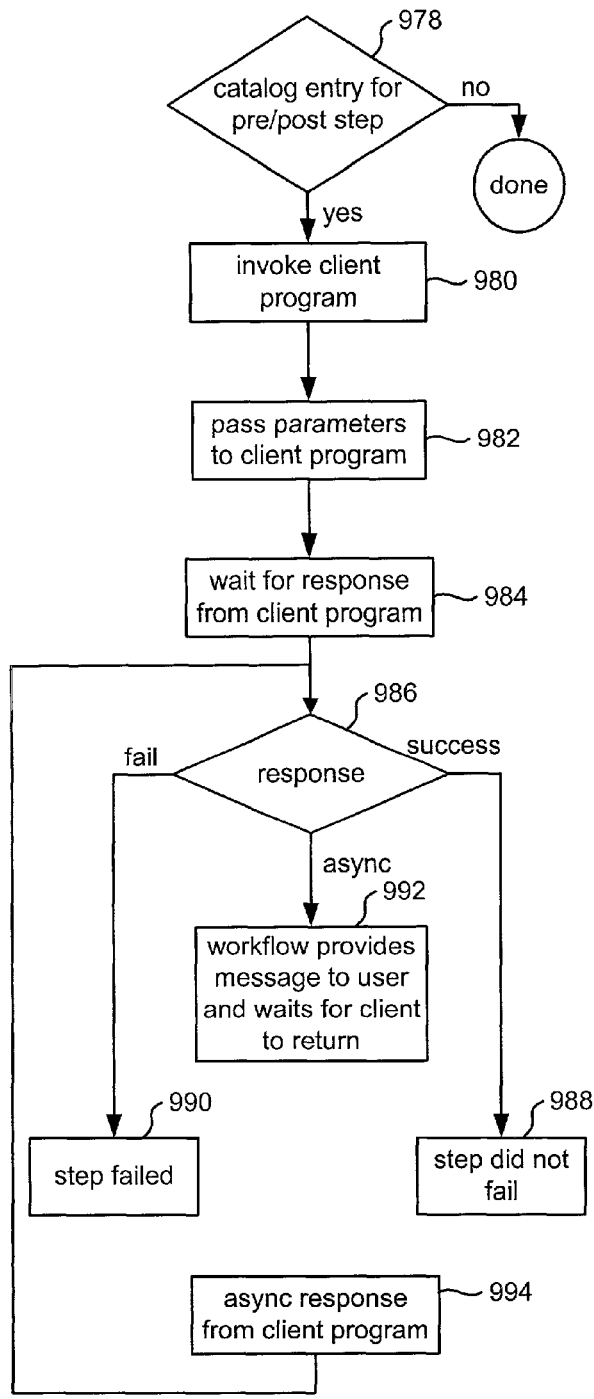
FIG. 23 is a flow chart describing one embodiment of a process performed to implement a cross application workflow.

FIG. 23 is a flowchart describing the process of accessing the event catalog in order to invoke cross application workflows. The process of FIG. 23 is performed by a workflow engine in one of the applications during steps 852, 864 and 870 of FIG. 20. In step 978 of FIG. 23, the workflow engine determines whether there is an entry in the event catalog for the current step of the workflow. If step 856 is being performed, the workflow engine is looking for a catalog entry that is a pre-event. If step 860 is being performed, the workflow engine is looking for a catalog entry that is a post-event. If no catalog entries exist, then the process of FIG. 23 is done. If a catalog entry exists, then the client program identified in the catalog entry is invoked in step 980. In step 982, the parameters are passed to the client program. In step 984, the workflow engine waits for a response from the client program. The client program will respond with one of three status codes: success, fail, or async. If the return code is "success" then the cross application workflow did not cause the step to fail (step 998). If the response from the client program was "fail" then the workflow engine considers the step to have failed (step 990).

When the client program is called, it is passed the following information: distinguished name of the user, attributes that have been preconfigured in the event catalog, a callback handle URL and the workflow ID. The callback handle URL is a URL for the client program to call back the workflow if the workflow returns a "async" status code. The client program is written to return either failure, success or async depending on the conditions specific to that particular program. When the client program returns with "fail" or "success" the workflow continues. If the client program returns "async," then the first workflow pauses until the client program invokes the callback handle URL to start the first workflow again. When the client program sends an "async" status, the user at the browser receives a status message that the workflow is pending for another event.

Therefore, in step 986, if the response is "async" then the workflow engine pauses and waits for the client to return in step 992. The user is provided with a message that the workflow is paused. When the client program invokes the callback URL (step 994), the workflow engine will receive an asynchronous response of either a "success" or "fail" with the callback URL. If the result is "fail" (step 986), then the process continues at step 990. If the result is "success" (step 986), then the process continues at step 988.

Figure 24:
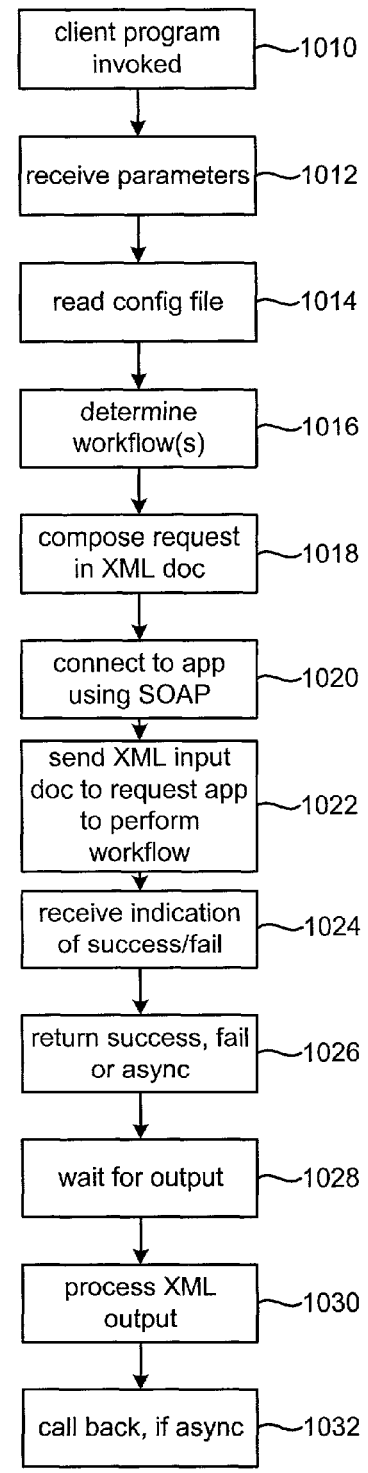
FIG. 24 is a flow chart describing one embodiment of a process performed by a workflow client program to implement a cross application workflow.

FIG. 24 is a flowchart describing a process performed by the client program during the cross application workflow process. In step 1010, the client program is invoked. In one instance, the client program is invoked in response to an event being recognized in the event catalog. For example, step 1010 can be performed in response to step 980 of FIG. 23. In step 1012, the client program receives the data discussed above (see step 982 of FIG. 23). In step 1014, the client program reads the configuration file. Note that some client programs may not need a configuration file. In step 1016, the logic in the client program determines which workflow in which application to invoke. In step 1018, the client program composes a request in an XML document, as described above. In step 1020, the client program connects to the appropriate application using SOAP. In step 1022, the XML input document is sent to the relevant application. In response to the XML input document, the application will perform the requested workflow or other service. In step 1024, the application responds, and the client receives an indication of whether the second workflow was started successfully.

In step 1026, the client program returns a status message back to the workflow engine indicating success, failure or async, based on whether the second workflow started successfully and other custom logic (optional). In step 1028, the client program waits for the output message from the application running the second workflow. The output message is likely to be sent to the client program after the second workflow is completed. The output message is an XML document. In step 1030, the output message is processed (including being read and acted on). In step 1032, the client program invokes the callback URL if the previous status was "async." Note that the above discussion was tailored to cross application workflows. However, the pre and post processing features, including the event catalog, client program and XML inputs, can be used to associate with events other than workflow events and other than workflow actions.

Looking back at FIG. 9, one of the services provided by Group Manager 44 is to the ability to view a list of all groups of which a user is a member. A user can be a static member of a group, a dynamic member of a group or a nested member of a group. A user is a static member if the user is explicitly listed as a member. For example, the user can be identified in a membership attribute of the group identity profile. A user is a dynamic member if the user's identity profile matches the LDAP rule that specifies the group's dynamic membership. The LDAP rule is stored in an attribute of the group identity profile. A user is a nested member of Group A if the user is a member for Group B and Group B is a member of Group A. The number of levels of nesting is not limited. A nested member of a group receives the privileges of being a member, including receiving access to resource available to the group.

When a user selects the My Groups tab 434, the user is provided with a list of the groups for which the user is a static member, dynamic member or nested member. In one embodiment, My Groups tab 434 visualizes the containment relationship of all groups in which the user is a member. This relationship is displayed as a tree on its side, with the roots on the left and the leaves on the right. The display allows the user to tunnel down from a particular group to display the groups contained in (e.g. that are a member of) that group, and so on.

Figure 25:
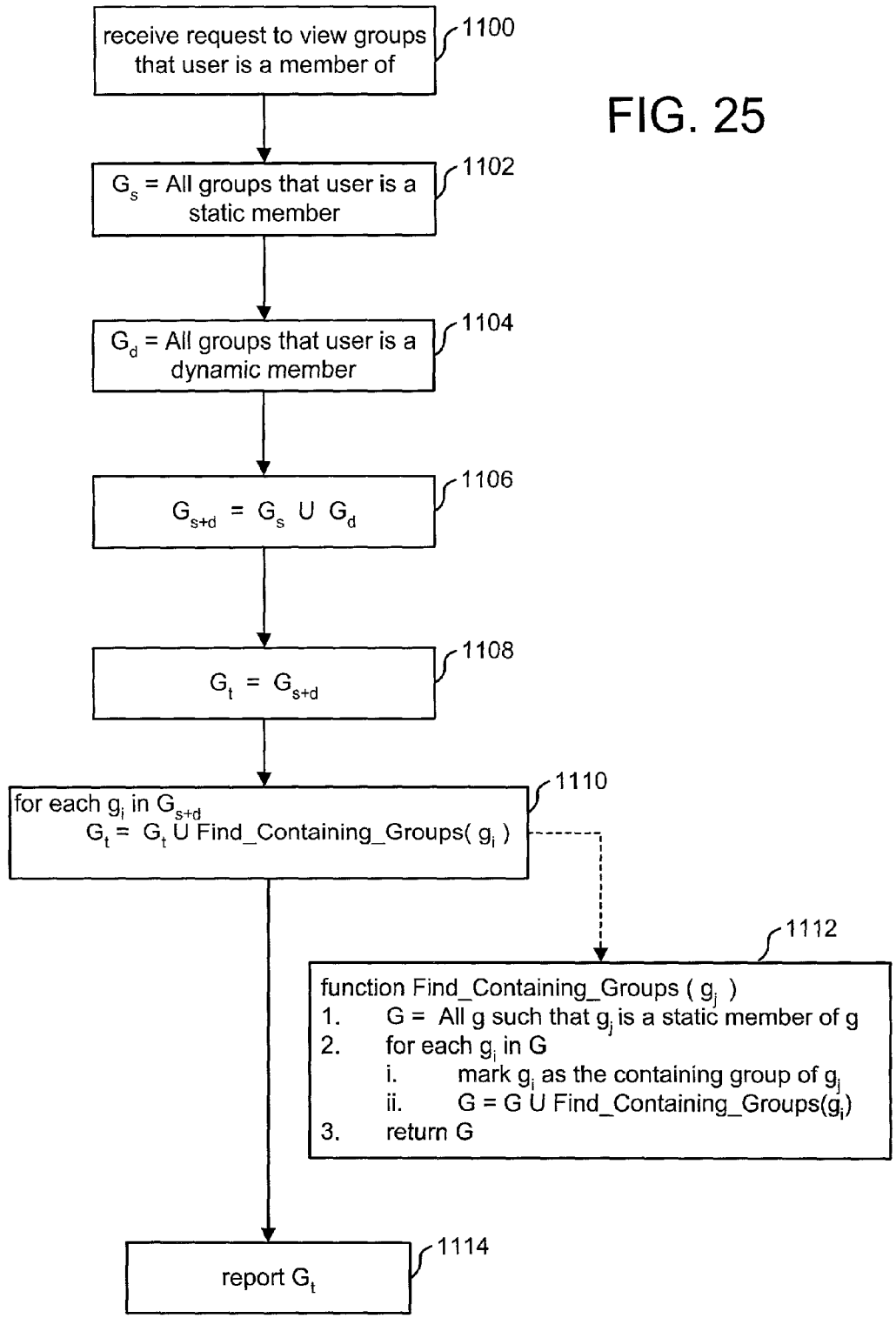
FIG. 25 is a flow chart describing one embodiment of a process for viewing all groups of an entity.

FIG. 25 is a flowchart describing one embodiment of a process for determining all the groups of which a user is a member, including static membership, dynamic membership and nested membership. The process can be used to build a tree structure in which the nodes are groups that contain the user as a member. The leaf nodes of the tree are those groups in which the user is a static or dynamic member. All other nodes are groups in which the user is a nested member. The process of FIG. 25 assumes the following:

Let u denote the target user;
Let g denote a single group;
Let G denote a set of groups, where the $g_i$ denotes the $i^{th}$ group in the set;
Let $G_s$ denote the set of groups in which u is a static member;
Let $G_d$ denote the set of groups in which u is a dynamic member; and
Let $G_t$ denote the set of groups in which each $g_i$ has a reference to each of its containing groups.

The process of FIG. 25 starts at step 1100 when a user requests to view groups of which the user is a member. One example of performing step 1110 is the selection of My Groups tab 434 (see FIG. 9). In step 1102, the system determines all groups of which the user is a static member. Each group identity profile has an attribute defining static membership. The system determines all groups for which the user is specifically listed in the static membership attribute. In step 1104, the system determines all groups of which the user is a dynamic member. A group can have an attribute that defines a dynamic membership in terms of an LDAP filter/rule. In one embodiment, the system compares the user's identity profile with the LDAP filter for each group to determine which filters are satisfied by the user's identity profile. Those LDAP filters that are satisfied are groups in which the user is a dynamic member.

In step 1106, the set of groups that the user is a static member of and the set of groups that the user is a dynamic member of are combined to determine the set of groups in which the user is either a dynamic or static member. In step 1108, the final set of groups $G_t$ is initialized to the set of groups in which the user is either a static member or dynamic member. For each group in which the user is a static or dynamic member, the system calls the function Find_Containing_Groups (step 1110). The results of the function are added to the set $G_t$. In step 1114, the resulting set $G_t$ is reported as an identification of all the groups in which the user is either a static, dynamic or nested member. The resulting set can be reported in various ways including reporting the groups in a GUI for the user (e.g. a tree on its side), reporting the groups to the user in a non-graphical format, storing a list of the groups in a file, providing identifications of the groups to another process, etc. In one example, the access system requests that the Identity System determine a user's groups so that the access system can authorize a user to access a resource based on membership in a particular group.

The function Find_Containing_Groups (shown as step 1112) includes three sub-steps. In the first sub-step (substep 1 in step 1112), the system finds all groups that contain $g_j$ as a member. These are the containing groups of $g_j$. In the second sub-step, the system iterates over the set of containing groups. In sub-step 2.i. (step 1112), the system marks g, as a containing group $g_j$. The markings are provided in order to graphically show the nesting relationship in My Groups tab 434. In sub-step 2.ii. (step 1112), the system recursively finds the containing groups of $g_i$. In sub-step 3 (step 1112), the system returns the closure of the set of containing groups.

Figure 26:
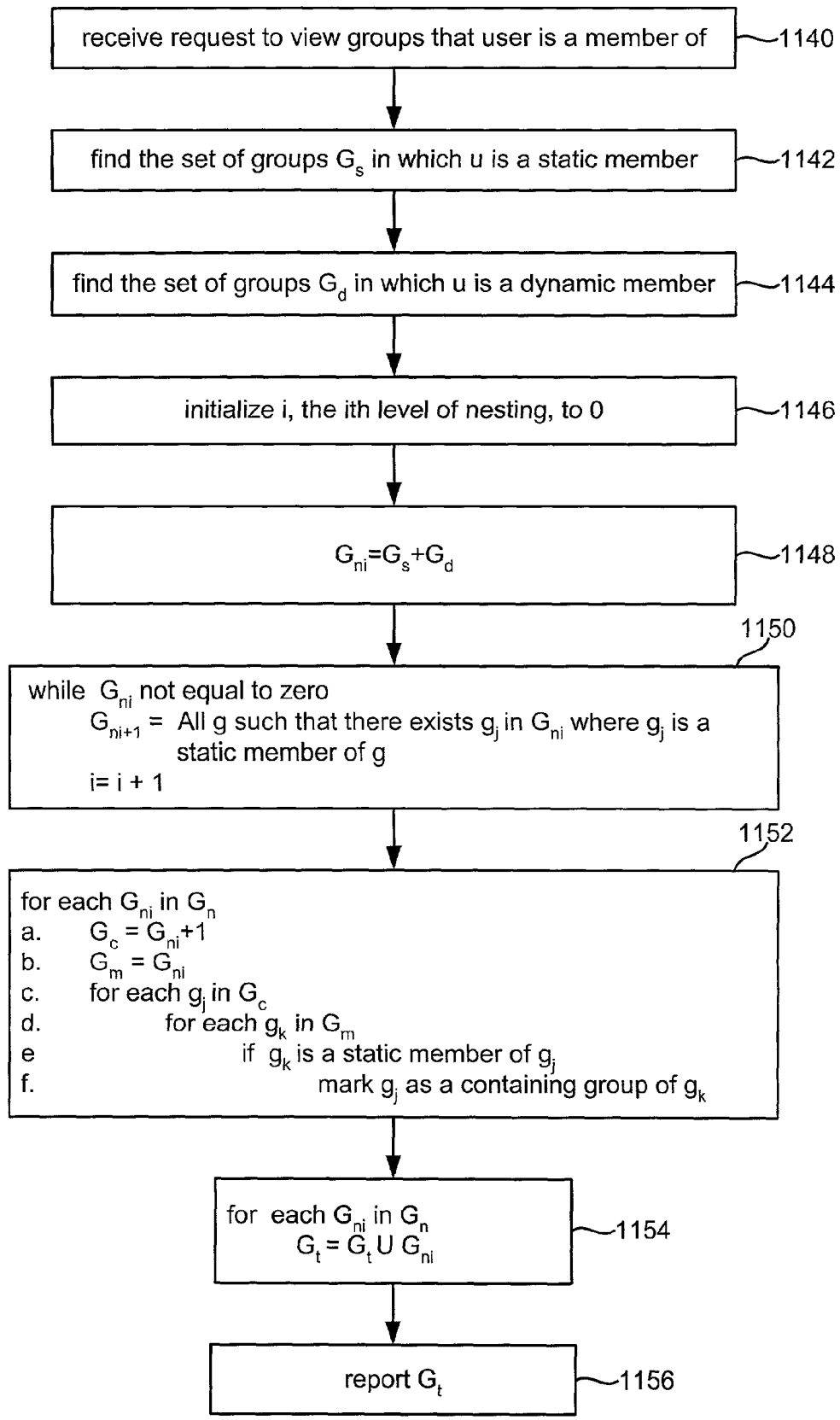
FIG. 26 is a flow chart describing a second embodiment of a process for viewing all groups of an entity.

FIG. 26 is a second embodiment of a process for determining the groups in which the user is a member. The process of FIG. 26 is a more optimized method than FIG. 25. The process of FIG. 26 utilizes the following assumptions:

Let u denote the target user;
Let g denote a single group;
Let G denote a set of groups where $g_i$ denotes the $i^{th}$ group in the set;
Let $G_s$ denote the set of groups in which u is a static member;
Let $G_d$ denote the set of groups in which u is a dynamic member;
Let $G_{n1}$ denote the set of groups in which u is a nested member, where i denotes the $i^{th}$ level of nesting;
Let $G_n$ denote the set of $G_{n1}$ where i is the $i^{th}$ set of groups;
Let $G_c$ be a set of groups, where $g_j$ denotes the $j^{th}$ group in the set; and
Let $G_m$ be a set of groups, where $g_k$ denotes the $k^{th}$ group in the set, such that for all $g_k$, there exists $g_j$ such that $g_k$ is a static member of $g_j$.

In step 1140 of FIG. 26, the system receives a request to view groups of which a user is a member. One example of performing step 1140 is the user selecting My Groups tab 434. In step 1142, the system determines the set of groups $G_s$ in which the user is a static member. In step 1144, the system determines the set of groups $G_d$ in which the user is a dynamic member. In step 1146, the variable i is initialized to nesting level 0. In step 1148, $G_{ni}$ is initialized to be the union of $G_s$ and $G_d$. In step 1150, the system iterates until the set of groups for the $i^{th}$ level of nesting is empty, finding the $(i+1^{th})$ set of groups which contain groups that have a static member that is in the $i^{th}$ set of groups.

In step 1152, the system iterates over the set of groups in $G_n$. In step a, $G_c$ is set to $G_{n1+1}$. In step b, $G_m$ is assigned to equal $G_{ni}$. In step c, the system iterates over the containing set of groups $G_c$. In step d, the system iterates over the contained set of groups $G_m$. In step e, the system determines if group $g_k$ (the contained group under consideration) is a static member of the group $g_j$ (the containing group under consideration). In step f, the containing group $g_j$ is marked as a containing group of $g_k$, if $g_k$ is a static member of $g_j$. In step 1154, the system iterates over the set of $G_{ni}$, adding each set of groups to the final set $G_t$. In step 1156, the resulting set of groups $G_t$ is reported back to the requester.

Another feature of the Group Manager is to allow a user to view all the members of a group. For example, when a list of groups is presented in response to a search or a request to "view all my groups," a user can select a group and request to see all the members. A response to this request from Group Manager 44 will list all static members, dynamic members and nested members of the group. In one embodiment, each type of membership (static, dynamic, nested) is displayed as separate lists. In other embodiments, one combined list is displayed. To display static and dynamic membership of the group is somewhat straightforward. Static membership is stored directly in the group's identity profile. A dynamic membership is obtained by evaluating the LDAP rule/filter that specifies the group's dynamic membership. However, the nested membership is more difficult to determine, since the membership of nested members must be recursively calculated.

Figure 27:
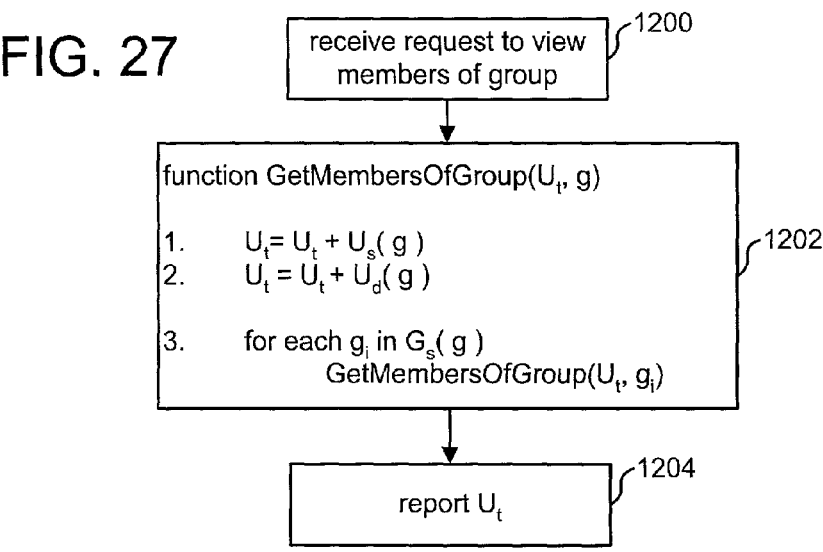
FIG. 27 is a flow chart describing one embodiment of a process for determining the members of a group.

FIG. 27 is a flowchart describing one embodiment of a process for determining all members of a group, including static members, dynamic members and nested members. The process of FIG. 27 assumes the following:

Let $U_t$ be the total set of group members including static, dynamic and nested;
Let g denote a single group;
Let G denote a set of groups;
Let $g_i$ denote the $i^{th}$ group in G;
Let $U_s$ (g) denote the set of static user members of group g;
Let $G_s$ (g) denote the set of static members of group g;
Let $U_d$ (g) denote the set of dynamic user members of group g; and
Let $g_t$ be the target group.

In step 1200, the system receives a request to view the members of a group. In response to the request, the system calls the function GetMembersOfGroup in step 1202. The result of the function GetMembersOfGroup is a set of users $U_t$, which is reported in step 1204. The function GetMembersOfGroup includes three steps. In the first step (1), the static members of group g are added to the total set $U_t$. In the second step (2), the dynamic members of group g are added to the total set $U_t$. In the third step (3), the system iterates over the set of static group members of group g—adding the members for $g_t$ to the total set $U_t$ by recursively calling the function GetMembersOfGroup.

Figure 28:
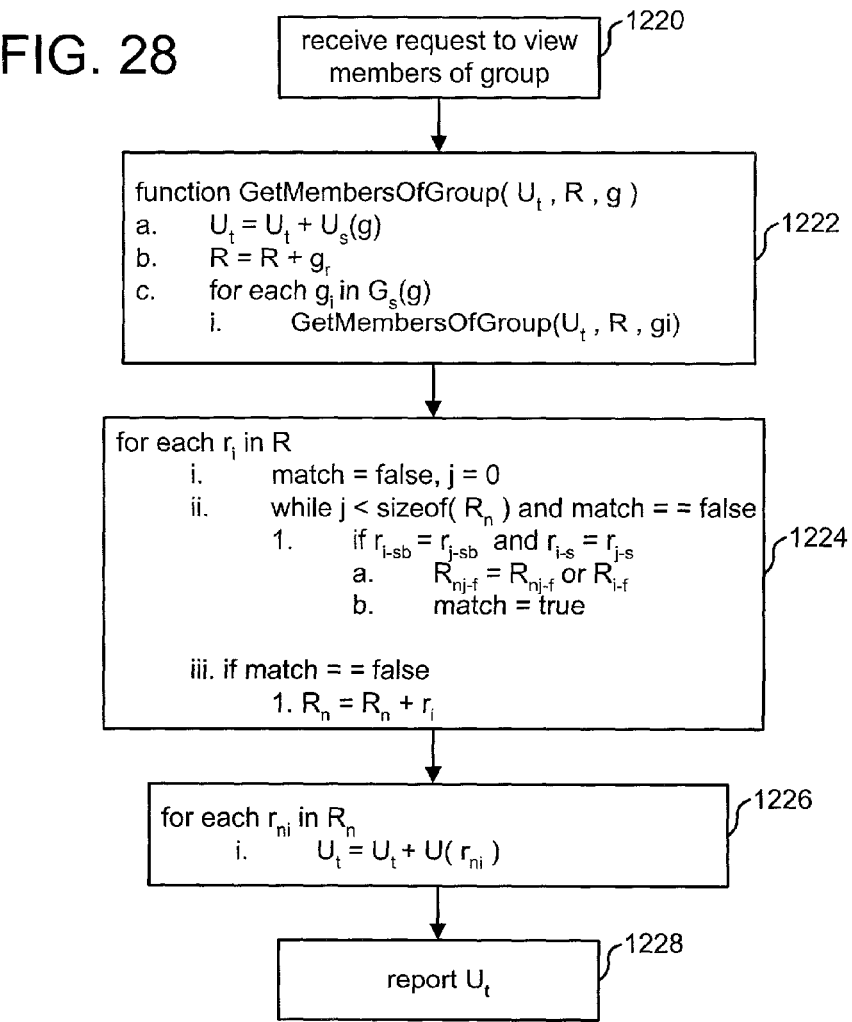
FIG. 28 is a flow chart describing a second embodiment of a process for determining the members of a group.

FIG. 28 is a flowchart describing a second embodiment for the process of determining the members of a group. The process of FIG. 28 assumes the following:

Let R denote a set of LDAP rules;
Let r denote an LDAP rule comprised of three components: $r_{sb}$, scope $r_c$ and filter $r_f$;
Let $r_i$ denote the $i^{th}$ rule in the set R;
Let $g_r$ denote the LDAP rule that specifies the dynamic membership of the group; and
Let $R_n$ denote the normalized set of LDAP rules, there does not exist $r_i$ and $r_j$ such that $r_{i-sb}=r_{j-sb}$ and $r_{l-c}=r_{j-c}$.

In step 1220 of FIG. 28, the system receives a request to view members of a particular group. In step 1222, the function GetMembersOfGroup is called. This function includes three steps. In the first step (a), the static members of group g are added to the total member set $U_t$. In the second step (b), the dynamic membership rule $g_r$ is added to R. In the third step (c), the system iterates over the set of static group members of g, $G_s$ (g), calling GetMembersOfGroup for each $g_i$ and $G_s$ (g). The function GetMembersOfGroup adds all static members of g to the total member set $U_t$, and adds the LDAP rule specifying dynamic membership of g to set R.

In step 1224, the system iterates over the set of rules R, constructing the normalized set of rules, $R_n$. In substep (i) of step 1224, the system initializes the match to false, and j to 0 for each iteration. In substep (ii), the system iterates over the set of rules in the normalized set $R_n$, continuing until a match is found or until the end of the set. The system checks if the rule $r_i$ in R has identical search base ($r_{sb}$) and scope ($r_s$) as the rule $r_{nj}$ in the normalized set $R_n$. If so, the system constructs the disjunction of the filter in the normalized rule $r_{nj}$ with that of $r_i$. The system also sets match to true to indicate that $r_i$ has been normalized. In substep (iii) of step 1224, if a rule $r_{nj}$ has not been found in the normalized set $R_n$ that has an identical search base ($r_{sb}$) and scope ($r_s$) as $r_i$, then add $r_j$ to the normalized set. In step 1226, the system iterates over the set of normalized rules in $R_n$, getting the user set for each rule U ($r_{ni}$) and adding that set to the total member set $U_t$. In step 1228, the total member set $U_t$ is reported back as a list of members. Once you have identified a list of members, a requesting entity can request to view certain attributes of those users.

Group manager 44 also allows an administrator to associate a policy with a group that controls user subscription to and unsubscription from that group. Subscription is defined as adding the user to the static membership of the group. Unsubscription means removing the user from the static membership of the group. A static member is a member who is explicitly identified as a member, as opposed to a dynamic member that is indirectly identified by a rule or other means. In one embodiment, an identity profile for a group includes an attribute that stores a list of all static members and an attribute that stores an identification of the policy for subscribing/unsubscribing.

While viewing the attributes of a group, a user can request to subscribe or unsubscribe. In one embodiment, a "subscribe" button or "unsubscribe" will be displayed in the GUI while the user views the attributes of a group. By selecting the button, the subscribe or unsubscribe process will start based on the policy for that group. The process of subscribing or unsubscribing according to a policy is typically initiated by the user who is being added to or removed from the group. However, in other embodiments, a first user can request that a different user be added to or removed from the group.

There are at least four policies for subscribing/unsubscribing: open, open with filter, control through workflow and closed. An open policy does not restrict subscription or unsubscription, any user can subscribe or unsubscribe. The open with filter policy requires that a user satisfy an LDAP rule (or other type of rule) to subscribe but does not require that the rule be satisfied to unsubscribe. The control through workflow policy requires a user to subscribe or unsubscribe through a workflow process. In one embodiment, in order to start the process, the user must be a participant in the first step of a workflow that changes the static member attribute of the group. A closed policy prohibits the subscription to or unsubscription from the group. The open and open with filter policies are less restrictive than the control through workflow and close policies. In one embodiment, the system enforces the rule that no group with a less restrictive policy can be added as a nested member to a group with a more restrictive policy. This rule avoids subversion of the latter policy.

Figure 29:
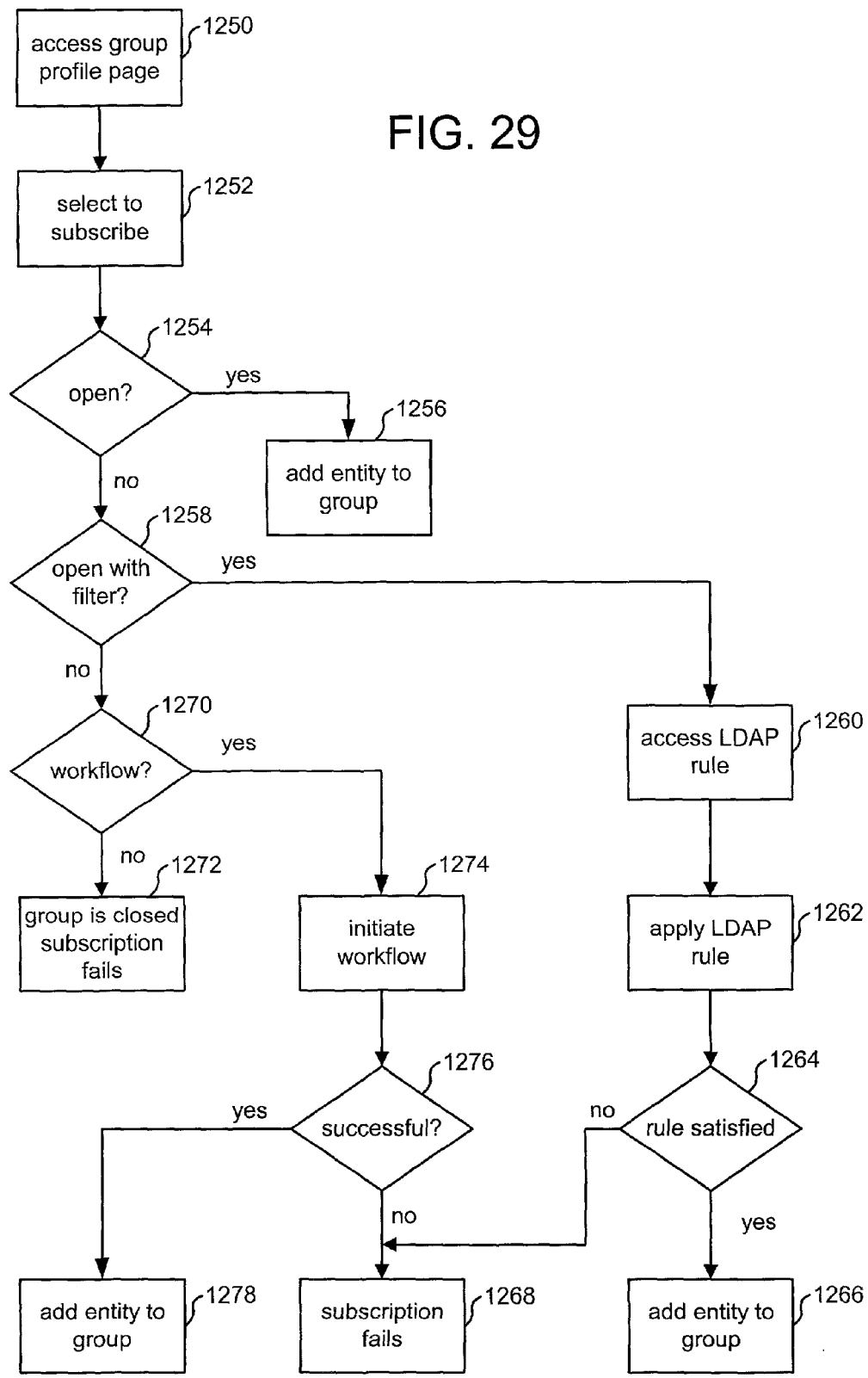
FIG. 29 is a flow chart describing one embodiment of a process for subscribing to a group.

FIG. 29 is a flowchart describing the process for subscribing to a group. While interacting with Group Manager 44, a user can use search tool 432 or other means to identify a list of groups. By selecting one of those groups, the user can access the profile page for that group (step 1250). A profile page may have a "subscribe" button. A user chooses the "subscribe" button in step 1252, indicating that the user wishes to subscribe to that group. In response to the user (or other entity) selecting the "subscribe" button, Group Manager 44 accesses the group's attribute that stores the identification of the policy for subscribing/unsubscribing and determines whether the subscription policy of the group is "open" (in step 1254). If the policy is "open," then that entity is added to the group in step 1256. If the policy is not open, then the system determines whether the policy is "open with filter" (in step 1258). If so, the system accesses the LDAP rule associated with the policy in step 1260 and applies the LDAP rule to the user's identity profile in step 1262. If the LDAP rule is satisfied (step 1264) then the entity is added to the group in step 1266. If the rule is not satisfied, then the user is not added to the group and the subscription fails in step 1268.

If the subscription policy was not open or open with filter, the system determines whether the subscription from policy is "controlled through workflow" (step 1270). If so, then the workflow is initiated in step 1274. If the workflow completes successfully (step 1276), then the entity is added to the group in step 1278; otherwise, the subscription fails and the entity is not added to the group in step 1268. In one embodiment, the workflow is used to approve a user for a group. If the user is approved, the user is added to the group after the workflow completes. In another embodiment, the user is approved and added to the group by the workflow. If the subscription policy is not "open," "open with filter," or "controlled through workflow," then the group is closed and the user cannot be added to the group (step 1272).

Figures 30, 31:
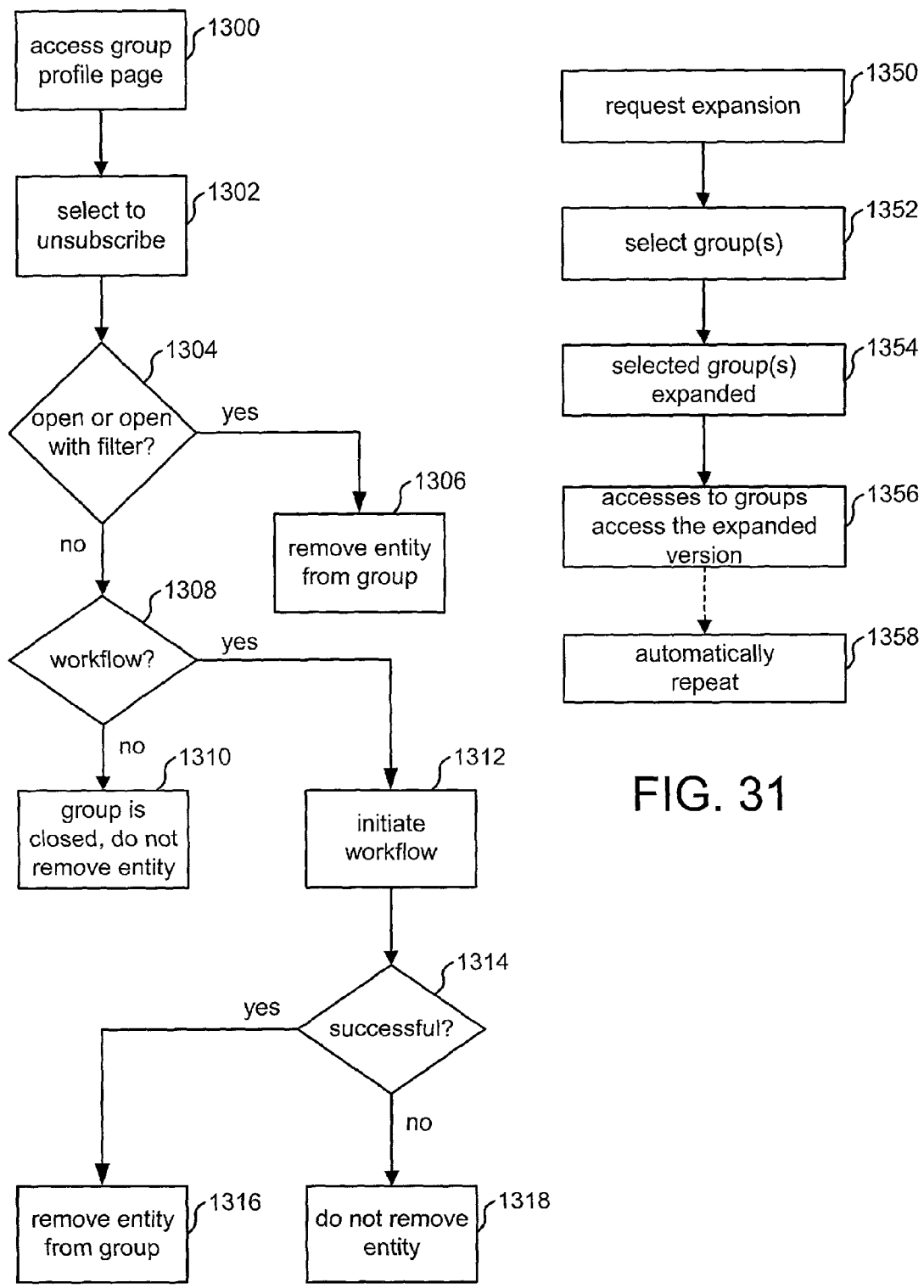
FIG. 30 is a flow chart describing one embodiment of a process for unsubscribing from a group.
FIG. 31 is a flow chart describing one embodiment of a process for expanding a group.

FIG. 30 is a flowchart describing the process for unsubscribing from a group. In step 1300, the entity accesses a group profile page. This group profile page may include a "unsubscribe" button. The user selects that button to unsubscribe from the group in step 1302. The user profile page may be accessed in many ways including using a search tool or from a list of groups when the user selects My Groups tab 434. After the user selects to be unsubscribed from the group, the system determines whether the subscription policy is "open" or "open with filter" (step 1304). If so, the entity is removed from the group in step 1306. If not, the system determines whether the policy is "controlled through workflow" (step 1308). If not then the group is closed and the entity cannot be removed (step 1310). If it is "controlled through workflow," then the workflow is initiated to step 1312. If the workflow completes successfully (step 1314), then the entity is removed from the group in step 1316. If the workflow does not complete successfully, then the entity is not removed from the group (step 1318). In one embodiment, the user is approved for removal by the workflows, and actually removed from the group after the workflow completes. In another embodiment, the user is both approved and removed from the group by the workflows.

Another feature of Group Manager 44 is the ability to perform group expansion. Expanding a group means evaluating the LDAP rule that specifies its dynamic membership and then updating the static membership list with results of the evaluation of the LDAP rules. Expansion, in effect, populates the static membership with a snapshot of the dynamic membership at the time of expansion. Expansion has performance implications. On one hand, it is much faster to evaluate group membership by looking up a value in the static membership list than to evaluate the rule that specifies dynamic membership. On the other hand, frequently updating groups is, in itself, computationally expensive. If the expansion occurs as a separate process, the performance hit can be hidden from the user. Thus, if a group is already expanded when a user requests to see all the members of a group, the processes of FIG. 27 or 28 do not need to be performed again because the group only has static members at this point. An administrator should expand the groups regularly to maintain accuracy. It may be possible to create a background process that automatically expands a group at certain intervals.

In one embodiment, the group expansion feature can be accessed from Configure tab 440 in Group Manager 44. Within the configure tab there is a button labeled "Expand Dynamic Groups." FIG. 31 is a flowchart for describing the process for expanding dynamic groups. When the user selects the button in Configure tab 440, a request to expand is sent to Group Manager 44 in step 1350. The administrator can select a particular group or set of groups to be expanded in step 1352. In step 1354, these groups are expanded by determining all of the members of the groups according to the processes of FIG. 27 or 28. In one embodiment, the process of expanding the groups only determines dynamic members. In another embodiment, the process of expanding determines dynamic members and nested members (including multiple levels of nesting). Step 1354 also includes storing all of the determined members. In one embodiment, the system will store and keep track of which group members were added during expansion and which members were original static members. That is because future expansions may remove some members that no longer satisfy the LDAP rule; however, members who are named static members will not be removed as part of the expansion process.

When an entity accesses the groups that were expanded in step 1354 and/or requests to see the members of the group (step 1356), the entity sees the expanded list of members. Additionally, any process that needs to access members of a group will access the membership generated in the expansion process. In one embodiment, the process of FIG. 31 can be automatically repeated (step 1358) using a background process or any other means.

In one embodiment, the process of expanding groups can only be performed on groups that have an expansion attribute that is set to true. Additionally, the person or entity expanding the group must have read access for the group expansion attribute and the dynamic filter attribute. That user must also have write access for the static member attribute. In one embodiment, all the expanded members are stored in the static member attribute with the original static members. In another embodiment, all of the original static members can be stored in one attribute and the members added during expansion stored in another attribute.

Another feature of Group Manager 44 is the ability to dynamically modify groups during run time. This feature is based on attaching auxiliary object classes to structural object classes. A structural object class can be instantiated to create a group such that for each entry in the directory there is only one structural object class. The structural object class cannot change after the object has been instantiated and is being used. One or more auxiliary object classes can be attached to any structural object class in a directory. The structural object class defines a set of attributes. The auxiliary object class also has a set of attributes. When an auxiliary object class is attached to an object class, the attributes of the auxiliary class are added to the object. Once instantiated, a structural object class cannot be modified or removed; auxiliary object classes, however, can be added or removed. Group manager 44 provides the user with the ability to add or remove auxiliary object classes on the fly using a GUI.

Prior identity systems allow for the addition of auxiliary classes to structural classes upon creation of the object. The present invention allows for auxiliary classes to be added and removed subsequent to object creation. That is, dynamically, an existing object class can have additional attributes added to the group object or removed from the group object by adding or removing auxiliary classes.

When creating a group, an administrator (or other user with sufficient privileges) is provided with a graphical user interface that lists all possible attributes that can be included in the group profile. Some of these attributes are part of structural object class, while others are part of auxiliary object classes (or auxiliary object class schema). If the user selects attributes from an auxiliary class, then those auxiliary classes are added to the object upon creation of the object. After the group is created, various attributes can be populated with data values. Subsequent to this time, attributes that are associated with auxiliary classes can be removed or added to the group. In addition to adding flexibility to defining which attributes are associated with a group, the present invention allows for bulk deletion of attributes. Simply removing the auxiliary object class from the group entry will automatically delete all attributes of the removed auxiliary object class.

FIG. 32 is a flowchart describing an overview of the process for adding and removing attributes to a group during run time. In step 1398, a group is created. This step includes determining which attributes to include in the group definition. Based on the attributes chosen, a structural class and the appropriate auxiliary classes are added to the group. In one implementation, the group is created by instantiating the appropriate classes to create a group object representing the group identity profile. In one embodiment, a group can be created that has an auxiliary class, but no attributes of that auxiliary class. The system can use a workflow to create the group and the workflow knows which auxiliary classes to use. The arrow from step 1398 to step 1400 is depicted as a doted line to indicate that time and other steps pass before step 1400 is performed. That is, step 1400 is performed after a group has been created and, possibly, after the various attributes have been populated with data. In step 1400, Group Manager 44 receives a request to modify the existing group. This can happen from Configure tab 440. Alternatively, while viewing a group, Group Manager 44 will display a "modify group" button. Selecting that button allows the user to request a modification to the group being viewed, if the user has sufficient privileges. In step 1402, Group Manager 44 provides a list of auxiliary classes that can be added or removed from the existing group. In an alternative embodiment, Group Manager 44 provides a list of attributes to add or remove, with each of the attributes being associated with auxiliary classes. The auxiliary classes and/or attributes to be added or removed are reported to the user via a graphical user interface. Next to each class (or each attribute) is a check box. The user can check the check box to indicate that the class (or attribute) should be added. The user can uncheck check box to indicate that the class (or attribute) should be removed. In step 1404, the selection of classes (or attributes) to be added and removed are received by Group Manager 44 from the graphical user interface and stored. In step 1406, those auxiliary classes selected to be removed are then removed from the group object including removing those attributes from the group object. In step 1408, the auxiliary class selected to be added and their associated attributes are added to the group object. After, step 1408, the group can be used as any other group; for example, a user can be authorized to access a resource based on attributes of or membership in a group.

FIG. 33 is a flowchart describing the process for removing auxiliary classes and their associated attributes from an object. In step 1430, Group Manager 44 selects one of the classes that have been marked for removal. In step 1432, Group Manager 44 determines which attributes are associated with that selected auxiliary class. The attributes identified in step 1432 do not include attributes that are part of a class that is not being removed. In step 1434, those attributes that are determined in step 1432 are removed from the group object. When the attributes are removed, all data stored in those attributes is deleted. In step 1436, the actual auxiliary class is removed from the group object. In step 1438, all auxiliary classes that are superior classes to the currently selected auxiliary class (see step 1430) are removed from the group object. In many instances, the auxiliary classes are part of an object oriented hierarchy where auxiliary classes can be subclasses of other classes (called superior classes). A subclass inherits from the superior class. In many cases, a particular auxiliary class may have a superior class, which has a superior class, which has a superior class, and so on. Thus, the chain of superior classes from the auxiliary class will go all the way up the tree to the root class. Therefore, some auxiliary classes will have many superior classes. All of the superior classes for a particular auxiliary class are removed when that auxiliary class is removed. Step 1436, however, does not remove a superior class, if that superior class is also superior to another auxiliary class that is part of the object and is not being removed. There is no need to remove the attributes of the superior classes because all those attributes have been inherited by the auxiliary class and already removed in step 1434. In step 1440, it is determined whether there are any more auxiliary classes to be removed. If there are more auxiliary classes to be removed, then the method loops to step 1430. If there are no more auxiliary classes to remove, then the process is complete. Note that some directories do not allow for the modification of the object class attribute; therefore, in those cases, only the attributes are removed.

FIG. 34 is a flowchart describing a process for adding to the group object those auxiliary classes that have been marked for addition. In step 1460, Group Manager 44 chooses an auxiliary class for adding to the group object from those auxiliary classes marked for addition. In step 1462, the chosen auxiliary class is added to the group object. In step 1464, all superior classes of the auxiliary class chosen in step 1460 that are not already part of the group object are added to the group object. In step 1466, all of the attributes from the auxiliary class selected in step 1460 are added to the group object. In step 1468, it is determined whether there are any more auxiliary classes to add. If there are more auxiliary classes to add, then the method loops back to step 1460. If there are no more auxiliary classes to add, then the method of FIG. 34 is completed.

The ability to add or remove from an existing group at runtime provides greater flexibility in defining the content for groups. Furthermore, the removal of an auxiliary class provides a means to bulk delete a set of attributes because removing an auxiliary class will, in one embodiment, delete all attributes for the removed class. Finally, the ability to add or remove from an existing group provides for less coupling between a group schema and group entries. For example, if the schema changes such that a group auxiliary class is removed, only those group entries that have that auxiliary class need to be updated.

The Identity System also includes an "Advanced Group" auxiliary object class that contains the attributes necessary to implement some of the unique functionalities described above. Administrators can attach the "Advanced Group" to a group in order to provide values for attributes that control features such as Subscription/Unsubscription and Dynamic Membership. In one embodiment, the "Advanced Group" consists of one auxiliary class that includes the attributes listed below. In another embodiment, the "Advanced Group" consists of a plurality of classes.

The attributes in the "Advanced Group" related to Subscription/Unsubscription are:
    obgroupsubscriptiontype—stores the subscription policy
    obgroupsubscriptionfilter—stores an LDAP rule used with the Open with Filter policy
    obgroupsubscribenotification—stores values of either "subscribe" or "unsubscribe" indicating whether or not the user should receive an email upon subscribing or unsubscribing from the group.

obgroupsubscribemessage—stores a customized message the user receives upon subscribing to the group obgroupunsubscribemessage—stores a customized message the user receives upon unsubscribing from the group The attributes related to Dynamic Membership are:

obgroupdynamicfilter—stores the LDAP rule that defines the group's dynamic membership obgrouppuredynamic—stores either "true" or "false" indicating whether or not static members can be added to the group The following two attributes belong to neither of the two categories above but are included here for completion:

obgroupsimplifiedaccesscontrol—stores the initial attribute access control policy applied to newly created group obgroupadministrator—stores the user selected as the group administrator.

The system of FIG. 1 provides users with a variety of interface options. For example, the system supports users with traditional browsers by providing for communication using HTTP and Hypertext Mark-up Language ("HTML"). The system also supports interfaces to third party applications, proprietary browsers and others by providing for communication using Extensible Mark-up Language ("XML"). Embodiments of the present invention provide further flexibility by facilitating the use of custom XML templates to generate HTML and XML responses.

Figure 35:
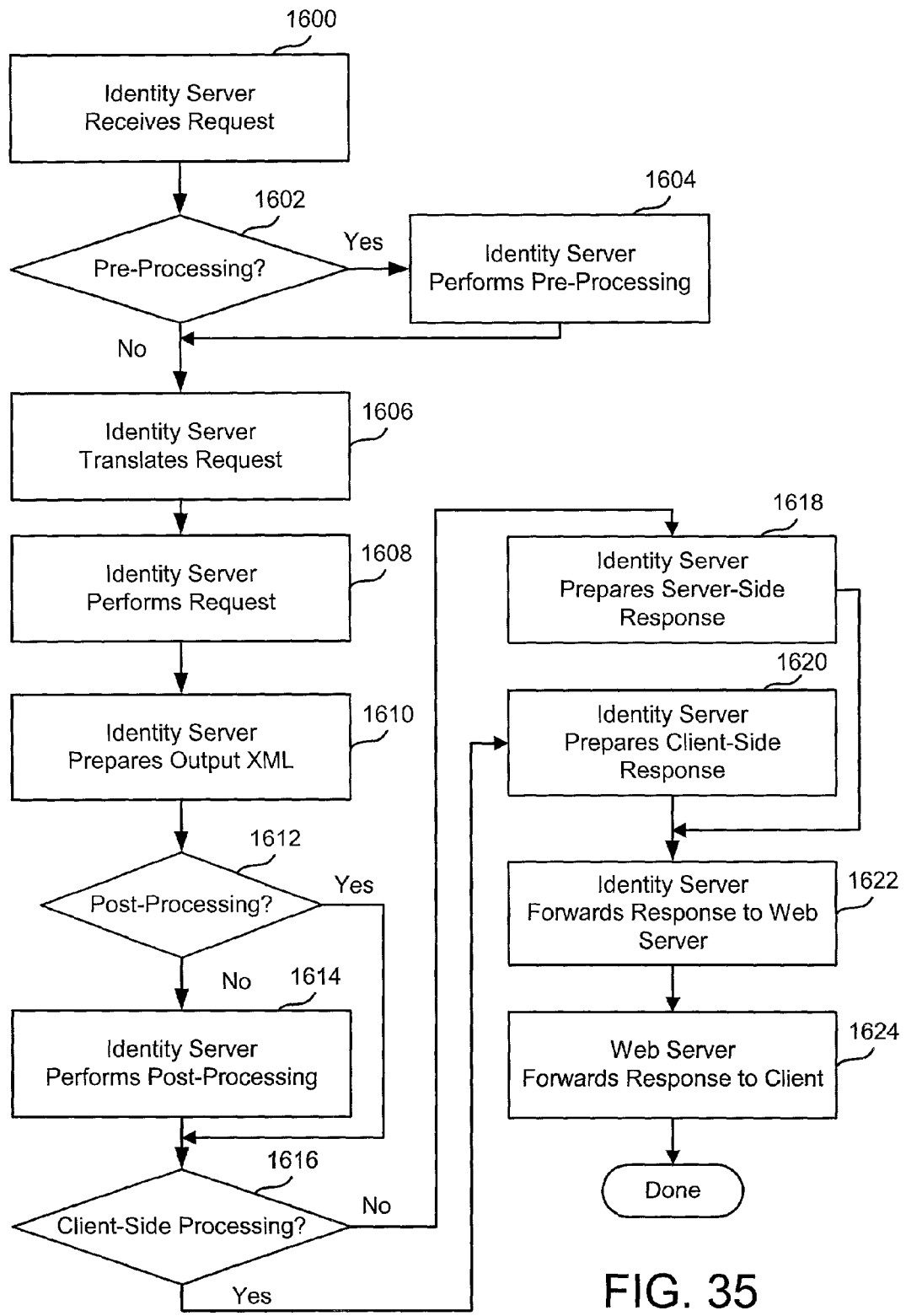
FIG. 35 is a flowchart describing a process for responding to a client's request.

FIG. 35 shows a process employed by Identity Server 40 to provide responses to users' requests. Identity Server 40 receives the request from Web Server 20 (step 1600). In one embodiment of the present invention, Identity Server 40 is capable of receiving HTML requests via the HTTP protocol, as well as XML requests via the SOAP protocol (or other protocols). One example of an HTML request over HTTP (or other protocols), appears as follows:

http://host:port/
appname.cgi?param1=value1&param2=val2 . . . .

The "http" indicates the request is controlled by the HTTP protocol. The host:port field identifies the host that is the target of the request and port on that host. The appname field identifies the application for Identity Server 40 to perform, such as User Manager, Group Manager, or Organization Manager. The parameter fields (param1, param2, . . . ) identify parameters employed by the identified application. For example, param1 may be a function the identified application performs, and param2 may be a variable or other information required for carrying out the function. One example of a function is a search program that searches Directory Server 36 for entries with attributes corresponding to values in the request's parameters. In this example, the parameters may require Identity Server 40 to search Directory Server 36 for the employee entry for John Smith.

When the SOAP protocol is employed, Identity Server 40 receives a request similar to the example described above, with a host:port value that informs Identity Server 40 that the SOAP protocol is in use. The request includes an XML document encapsulated in the SOAP protocol format. The following provides an example of such a request:

```
© Oblix, Inc., 2001
<?xml version="1.0"?>
<SOAP-ENV:Envelope
xmlns:oblix="http://www.oblix.com"
xmlns:SOAP-ENV="http://schemas-xmlsoap.org/soap/envelope/">
<SOAP-ENV:Body>
    <oblix:authenication xmlns:oblix="http://www.oblix.com" type="<fill in authentication type>">
        <oblix:login>login name</oblix:login>
        <oblix:password>password</oblix:password>
    </oblix:authentication>
    <oblix:request application="<fill in application name>" function="<fill in function name>">
        <oblix:params>
            <oblix:param name="<fill in parameter name>"><fill in parameter value></oblix:param>
        </oblix:params>
    </oblix:request>
</SOAP-ENV:Body>
</SOAP-ENV:Envelope>
```

The above listed text is the backbone of a standard SOAP request with the italicized text representing variables that change between requests. The "oblix:authentication" directive identifies the type of user authentication to be employed. The authentication directive includes a type parameter that corresponds to an authentication operation. One authentication type calls for a user's login ID and password. These parameters are provided in the "oblix:login" field and "oblix: password" field. Alternate implementations of authentication operations include evaluating a user's cookie and/or requiring the user to submit a challenge phrase.

The "oblix:request" directive provides the necessary information for identifying the user's request. Attributes provided within the "oblix:request" section are application name, function name, and parameters employed by the function.

Once a request is received (step 1600, FIG. 35), Identity Server 40 determines whether any pre-processing is required for the request (step 1602). Decryption is an example of one pre-processing operation. If pre-processing is required, Identity Server 40 performs the pre-processing operation (step 1604). Once pre-processing is complete or if no pre-processing is required, Identity Server 40 translates the request (step 1606). In one implementation, Identity Server 40 translates the request by identifying all programs to be performed in response to the request and the format for outputting the results from each program. Process steps for carrying out the translation are described in greater detail below.

Identity Server 40 performs the request (step 1608) after the request is translated. In performing the request, Identity Server 40 retrieves and manipulates data in accordance with the functions identified in the request. After the request is performed, Identity Server 40 prepares an Output XML (step 1610). The Output XML is a data file organized in accordance with formatting directions retrieved during the translation operation (step 1606). In one embodiment of the present invention, the Output XML is formed using a XML template obtained during the translation process (step 1606) and display characteristics. The XML template provides a data structure for the Output XML. The use of XML templates and display characteristics is described in greater detail below.

After preparing the Output XML, Identity Server 40 determines whether any post-processing is to be performed (step 1612). Post-processing may include operations such as encryption. Embodiments of the present invention also provide for post-processing operations that further customize the Output XML. If post-processing is to be performed, Identity Server 40 carries out the post-processing operation (step 1614).

After completing post-processing or if no post-processing is necessary, Identity Server 40 determines whether client-side processing will be used (step 1616). In client-side processing, Identity Server 40 provides the Output XML data file to the requesting client through Web Server 20. In contrast, the client may elect to have Identity Server 40 perform server-side processing. In server-side processing, Identity Server 40 processes the Output XML to prepare a response to the request.

If client-side processing is chosen, Identity Server 40 prepares a client-side response (step 1620). In one implementation of the present invention, two different client-side responses are possible. The client may receive only the Output XML or both the Output XML and references to a set of XSL stylesheets that contain directives for converting the Output XML into an HTML display. In various embodiments of the present invention, the set of XSL stylesheets may contain one or multiple XSL stylesheets. The user (or client) then formats the Output XML for presentation or any other purpose the user desires. If client-side processing is not selected, Identity Server 40 prepares a server-side response (step 1618). In one embodiment, Identity Server 40 combines the Output XML with a XSL stylesheet to obtain a HTML response for the client.

In one embodiment of the present invention, Identity Server 40 determines whether to perform client-side or server-side processing by examining a processing parameter in the request. In a further implementation, the processing parameter also indicates the desired client-side response from Identity Server 40, namely Output XML and XSL stylesheet references or Output XML and no XSL stylesheet references. If the processing parameter is set to equal "xmlnoxsl," Identity Server 40 prepares a client-side processing response including Output XML and no stylesheet references. If the processing parameter is set to equal "xml," Identity Server 40 prepares a client-side processing response including both output XML and references to a set of XSL stylesheets the client can access. If no processing parameter appears in the request, Identity Server 40 defaults to preparing a server-side processing response. In further embodiments, the request can also include a parameter expressly identifying a XSL stylesheet for Identity Server 40 to employ in preparing either a server-side or client-side response.

In another version of the present invention, Identity Server 40 employs a predefined list to determine whether to provide client-side processing or server-side processing. The list identifies browsers that desire client-side processing. If Identity Server 40 receives a request for a browser on the list, Identity Server 40 performs client-side processing. Otherwise, Identity Server 40 performs server-side processing. In a further embodiment, the list distinguishes between client-side processing providing Output XML and XSL stylesheet references and client-side processing providing Output XML and no XSL stylesheet references. The list may be updated by clients.

Once a response has been prepared, Identity Server 40 forwards the response to Web Server 20 (step 1622), which forwards the response to the client (step 1624).

Figure 36:
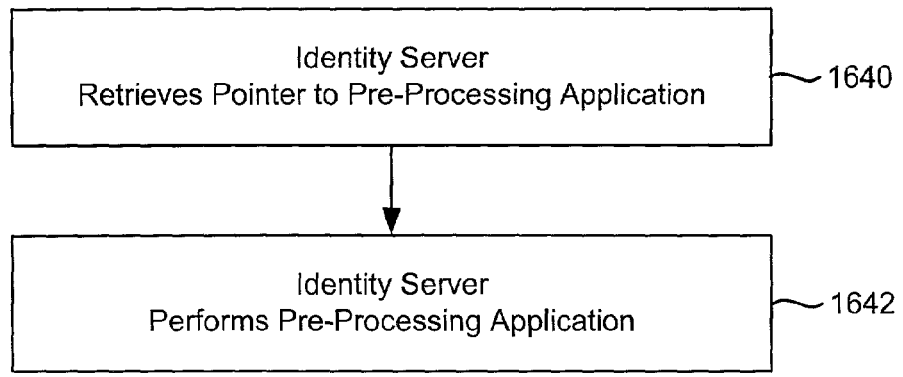
FIG. 36 is a flowchart describing a process for responding to a request for a pre-processing application.

FIG. 36 shows the steps taken by Identity Server 40 in performing a pre-processing operation (step 1604, FIG. 35). Identity Server 40 retrieves a pointer to the pre-processing application from the event catalog (step 1640). Identity Server 40 then performs the pre-processing application (step 1642).

Figure 37:
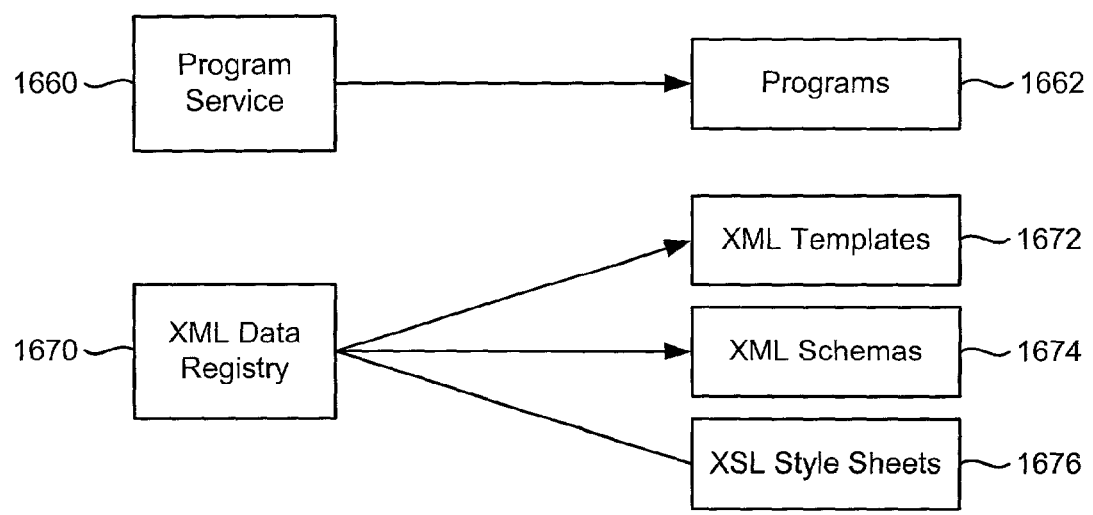
FIG. 37 is a block diagram illustrating an identity server's program service and XML data registry.

In order to perform request translation (step 1606, FIG. 35), Identity Server 40 maintains program service 1660 and XML data registry 1670, which are both depicted in FIG. 37. Program service 1660 contains a list of the programs supported by applications running on Identity Server 40. Each function in the request corresponds to at least one program listed in program service 1660. Each program listing in program service 1660 contains a pointer to a program, as well as any peripheral programs to be performed in conjunction with the listed program. In alternate embodiments of the present invention, the peripheral programs can be identified in the request or a register file in XML data registry 1670. An example of a peripheral program is the display of a navigation bar that accompanies the display of a request's results.

XML data registry 1670 contains registration files. Each registration file corresponds to at least one program or peripheral programs listed in program service 1660. Each registration file contains information necessary for structuring the output of a program's result. Identity Server 40 maintains a set of XML templates 1672, XML schemas 1674, and XSL stylesheets 1676. Each registration file in data registry 1670 contains a pointer to an XML template, an XML schema and XSL stylesheet. The application of templates and stylesheets will be explained below in greater detail. Schemas provide information to Identity System users for establishing display characteristics.

FIG. 38 illustrates steps performed by Identity Server 40 to translate a request (step 1606, FIG. 35). In step 1700, Identity Server 40 identifies programs corresponding to functions called for in the request, including peripheral programs. For each program explicitly identified in the request, Identity Server 40 finds a corresponding entry in program service 1660. The corresponding entry contains a pointer to the explicitly identified program, as well as pointers to all peripheral programs to be performed in conjunction with the explicit program. In one embodiment, all explicitly identified programs for workflow related requests include peripheral programs for providing a workflow function navigation bar, a search bar/window, and a standard navigation bar. Other programs include peripheral programs for providing a standard navigation bar and a search window in a window with any displayed program results.

Identity Server 40 completes the request translation by retrieving XML templates and XSL stylesheets. Identity Server 40 retrieves a XML template for each identified program and peripheral program (step 1702). Identity Server 40 retrieves each template from a register file in data registry 1670. Each register file corresponds to at least one combination of an application and a program. Identity Server 40 retrieves a XSL stylesheet for each identified program and peripheral program (step 1706). In one embodiment, Identity Server 40 retrieves each stylesheet from the same register files containing the retrieved XML templates.

The following provides an example of a registration file in one embodiment of the present invention:

```
© Oblix, Inc., 2001
<?xml version="1.0"?>
<ObProgramRegistry>
    <ObApplication name="the_application_name">
        <ObProgram name="a_program_name">
            <ObButton name="a_button_name"/>
            <ObButton name="yet_another_button_name"/>
            <ObButton name="and_maybe_more_button_names"/>
            ...
            ...
            <ObTemplate name="templatename.xml"/>
            <ObStyleSheet name="stylesheetname.xsl"/>
            <ObSchema name="XML_schema_name.xsd"/>
        </ObProgram>
        <ObProgram name="another_program_name">
            <ObStyleSheet name="Its_stylesheetname.xsl"/>
            <ObButton name="a_button_associated_with_it"/>
            <ObSchema name="Its_XML_schema_name.xsd"/>
        </ObProgram>
        <ObProgram name="and_so_on">
            ...
            ...
        </ObProgram>
        ...
        ...
    </ObApplication>
</ObProgramRegistry>
```

The ObProgramRegistry directive identifies the file as a registration file. The ObApplication instruction identifies an application. The ObProgram instruction identifies a program. Identity Server 40 uses the ObApplication and ObProgram values to identify the appropriate register file for retrieving a program's XML template, XML schema, and XSL stylesheet. For each program, Identity Server 40 locates the register file with the ObApplication and ObProgram values matching the request's application and program (steps 1702 and 1706).

Information within an ObProgram directive provides the template, schema and stylesheet for formatting a program's results as Output XML and an HTML document. The ObTemplate field specifies an XML template to be used with the program specified in the ObProgram field. The ObStyleSheet field identifies the XSL stylesheet for the program. The ObSchema field identifies the schema for the program. Identity Server 40 retrieves the identified template and stylesheet in steps 1702 and 1706 for each program identified in step 1700.

In further embodiments, the register file contains additional information related to preparing an output display for a program's result. For example, one or multiple "ObButton" directives can be associated with a program combination when a button is to be displayed along with program results. The button field is used in preparing the button display for Identity Server 40. For example, it may be appropriate to display an acceptance button along with program results—calling for a user to accept displayed data. A typical button identifies the following characteristics: (1) graphical display; (2) mouse over text; and (3) link that will be invoked when the button is selected by the user. In one implementation, button information is dynamically determined, as opposed to being defined in a template.

The following is an example of an XML template employed with a program for retrieving personal information for people with the last name Smith:

```
© Oblix, Inc., 2001
<?xml version="1.0"?>
<Company>
    <PersonalInformation>
        <Email>
            <oblix:data attrname="mail"/>
        </Email>
        <Name>
            <oblix:attribute name="Smith">
                <oblix:data attrname="sn"/>
            </oblix:attribute>
            <oblix:data attrname="cn"/>
        </Name>
    </PersonalInformation>
    <oblix:link href="location.xml"/>
</Company>
```

This template indicates that a program retrieves personal information from entries in a company's directory server that have a last name "Smith." The personal information retrieved includes the person's e-mail and name. The XML template provides directives to obtain this information. The <oblix: data attrname="mail"/> directive specifies mail as an attribute name for the desired e-mail address value. The program responds by replacing the <oblix:data attrname="mail"> element with the e-mail value retrieved by the program. This element is also referred to as a direct proxy value.

The <oblix:attribute name="Smith"> <oblix:data attrname="sn"/></oblix:attribute> directive calls for the program to select an entry from the directory server with a value in the surname (sn) attribute corresponding to "Smith." The <oblix:data attrname="cn"/> instruction is another direct proxy calling for the complete name (cn) attribute in the selected entry. The <oblix:link href="location.xml"/directive links the present template to another XML template specified by the location.xml name.

The following shows the resulting XML template after the program has been executed and the program fills in direct proxies in the XML template.

```
© Oblix, Inc., 2001
<?xml version="1.0"?>
<Company>
    <PersonalInformation>
        <Email>
            j.smith@company.com
        </Email>
        <Name lastName="Smith">
            John Smith
        </Name>
    </PersonalInformation>
    <Location>
        <FloorNumber value="6"/>
    </Location>
</Company>
```

The program located one person with a last name of Smith, namely John Smith. The program returned John Smith's e-mail as j.smith@company.com and John Smith's name as "John Smith." The referenced "location.xml" template was also integrated into the existing template to indicate that John Smith resides on the 6$^{th}$ floor.

The use of templates and stylesheets provides users with a great deal of flexibility and control. Templates and stylesheets can be modified to address the unique needs of system users. Different system users employing the same programs can create different displays of the program's results. Users and/ or system administrators implement customized templates and stylesheets in desired register files.

FIG. 39 provides a more detailed view of the steps taken by Identity Server 40 to prepare an Output XML for a request using XML templates and attribute display characteristics (step 1610, FIG. 35). Identity Server 40 first prepares an XML data structure (step 1730). The XML data structure is an organization of data based on the XML templates corresponding to the request's programs. The XML data structure combines the XML templates from each program to form a single data structure. This enables Identity Server 40 to provide a single response to a request instead of a response for each program in the request.

Identity Server 40 maps data retrieved in performing the request's programs into the XML data structure. An example of an XML data structure for the XML template shown above appears below in Table 5:

TABLE 5

| Proxies | Retrieved Attribute Values |
|---|---|
| Email | j.smith@company.com |
| Complete Name | John Smith |

In the XML data structure, the left-hand column lists the names of data server entry attributes retrieved by the program. These are also referred to as direct proxies. The right-hand column corresponds to the retrieved attribute values for the direct proxies. Identity Server 40 fills each right-hand column cell with the corresponding data for the direct proxy. As shown in Table 5 above, the direct proxy field for the e-mail address attribute is filled with the j.smith@company.com value, and the direct proxy field for the complete name attribute is filled with John Smith.

In some instances, an XML template indirectly defines data to be retrieved—calling for data from an attribute based on the status of another attribute. For example, a search program may call for the name and e-mail address for each direct report of John Smith. In this example, an entry's name and e-mail address attributes for a person are returned, if another attribute in the entry identifies John Smith as the person's direct manager. The XML template shown below supports this search:

```
<Person>
    <Direct Report>
        <Name>
            <oblix:data attrname="cn"/>
        </Name>
        <Email>
            <oblix:data attrname="mail"/>
        </Email>
    </Direct Report>
</Person>
```

The above XML template indicates that a name and e-mail address is to be retrieved for each direct report of John Smith. In Directory Server 36, no entry identifies the direct reports of John Smith. Instead, the entry for each person identifies the person's direct manager. Identity Server 40 queries Directory Server entries and retrieves name and e-mail address information from those entries with John Smith in the direct manager attribute. The <oblix:data attrname="cn"/> and <oblix: data attmame="mail"/> directives in the template are indirect proxy values for the data to be retrieved by Identity Server 40.

Template elements calling for indirect proxies are also mapped into the XML data structure. Prior to mapping these elements into the XML data structure, Identity Server 40 prepares a data structure identifying each of the entries used to obtain the indirect proxy values. An example data structure for the above XML template appears below in Table 6:

TABLE 6

| Direct Report | Entry |
|---|---|
| Direct Report 1 | Bob Smith |
| Direct Report 2 | Gordon Smith |

The indirection structure in Table 6 identifies the entries for Bob Smith and Gordon Smith as direct reports of Bob Smith. This indicates that Identity Server 40 will retrieve indirect proxy values from the data store entries for Bob Smith and Gordon Smith. Identity Server 40 adds data for the indirect proxy values for the Bob Smith and Gordon Smith entries to the XML data structure, which can contain both direct and indirect proxies. The resulting XML data structure appears below in Table 7:

TABLE 7

| Proxies | Retrieved Attribute Values |
|---|---|
| Email | b.smith@company.com |
| Name | Bob Smith |
| Email | g.smith@company.com |
| Name | Gordon Smith |

The XML data structures shown above are just examples of XML data structures that can be prepared in accordance with the present invention. As those skilled in the art will recognize, the contents of XML data structures can vary widely as different XML templates and programs are employed.

After preparing the XML data structure (step 1730, FIG. 39), Identity Server 40 transforms the XML data structure into Output XML (step 1732). Identity Server 40 obtains attribute display characteristics for the retrieved attributes in the XML data structure. The display characteristics establish the display format of attribute data in the XML data structure. Attribute display characteristics identify a display type and relevant information for the display. For example, a text box display type and the length of the text box.

In one embodiment, Identity Server 40 obtains attribute display characteristics from directory entries in Directory Server 36. Each Directory Server entry corresponds to a different attribute type. For each attribute, Identity Server 40 locates a corresponding directory entry, which provides the attribute's display characteristics. In one such embodiment, a system administrator creates all the display attribute directory entries when Identity System 40 is configured. In alternate embodiments of the present invention, the directory entries are replaced by tables, data structures, or other means that relate display characteristics to attributes so the display characteristics can be obtained by Identity Server 40.

As explained above, the Output XML is combined with XSL stylesheets to obtain HTML displays. XSL stylesheets interpret directives integrated into the Output XML by the attribute display characteristics—providing instructions to Identity Server 40 or any other processing engine to implement the formatting called for by the attribute display characteristics. For example, the attribute display characteristics may have integrated directives into the Output XML indicating that a name, such as John Smith, is to be displayed according to a particular type. The identified type corresponds to a set of instructions in an XSL stylesheet that direct a processor to display the value John Smith with a particular font and size. In one example, the display type instructions in the XSL stylesheet indicate that the name John Smith is to be displayed in an Arial font with 12 point typeface.

FIG. 40 illustrates steps for performing post-processing (step 1614, FIG. 35). These steps are very similar to the above-described pre-processing operation (step 1604, FIG. 35). Identity Server 40 retrieves a pointer to the post-processing application in the event catalog (step 1750). Identity Server 40 then performs the post-processing application (step 1752).

By employing post-processing, a client can create a plug-in program running on Identity Server 40 that captures and modifies the Output XML prior to Identity Server 40 returning a request response. This provides users of Identity Server 40 with great flexibility and control over the content and format of request responses. For example, a user can modify the Output XML to insert a customized display type directive or remove unwanted data.

FIG. 41 describes the operations performed by Identity Server 40 to prepare a client-side response (step 1620, FIG. 35). Identity Server 40 determines whether the client wishes to receive references to a set of XSL stylesheets (step 1780). If the client wishes to receive XSL stylesheet references, Identity Server 40 prepares a response including Output XML and the associated XSL stylesheet references (step 1784). Otherwise, Identity Server 40 prepares a response with Output XML and no XSL stylesheet references (1782). Client-side processing is useful in several applications. In one instance, a client may wish to receive only Output XML for a third party application that does not require any display. This makes the display rules and information in the stylesheets useless. In another instance, a client's browser may do a superior job of combining Output XML and XSL stylesheets to form an output display. In this instance, client-side processing allows the client to use their own browser to combine Output XML and XSL stylesheets. In one embodiment, XSL stylesheet references are provided in the form of Uniform Resource Identifiers (also known as Uniform Resource Locators) in the Output XML.

FIG. 42 shows the operation of Identity Server 40 in preparing a server-side response (step 1628, FIG. 35). Identity Server 40 combines the Output XML with its associated XSL stylesheets (step 1800). Identity Server 40 then formats the resulting combination as an HTML output document (step 1802).

One of the peripheral programs frequently performed in conjunction with a user's expressly requested program is the generation of a navigation bar. The navigation bar is displayed along with the result of a user's expressly identified program—enabling the user to navigate within the request response and other related areas. For example, the navigation bar lets a user scroll through the text of the response and jump to related data in Directory Server 36. Some implementations of Identity Server 40, however, provide users with different levels of access to Directory Server 36 and functions performed by Identity Server 40. Identity Server 40 provides for displaying different navigation bars based on user access privileges.

FIG. 43 shows steps performed by Identity Server 40 that provide different navigation bars based on a user's access privileges. As explained above, Identity Server 40 retrieves a navigation bar peripheral program from program service 1660 as part of the translation process (step 1606, FIG. 35 and step 1700, FIG. 38). Identity Server 40 also retrieves an XML template and XSL stylesheet for the navigation bar program (steps 1702 and 1706, FIG. 38). In one embodiment of the present invention, Identity Server 40 maintains a set of navigation bar templates for a program, as opposed to a single navigation bar template. Each navigation bar template corresponds to a different user type where each user type has different access privileges. In retrieving an XML template for the navigation bar, Identity Server 40 carries out the steps shown in FIG. 43. Identity Server 40 selects the navigation bar XML template corresponding to the user issuing the request (step 1820). Identity Server 40 then selects portions of the navigation bar template that are relevant to the user's explicitly requested program (step 1821). In some instances, portions of the selected navigation bar template may not be relevant to the request response. The selected portions of the navigation bar template form the XML template for the navigation bar program. Identity Server 40 employs the resulting XML template to prepare a response in the manner described above with respect to FIGS. 35-42.

Requests for data received by the Identity System frequently require repeated access to the same entries in Directory Server 36. Continually retrieving this information through Directory Server 36 slows operation and wastes server bandwidth. Therefore, Identity Server 40 provides each active request with a cache to reduce the number of data store accesses.

Each request is assigned to a thread of operation. Each thread has access to a small amount of memory in Identity Server 40 that is referred to as thread local storage. FIG. 44 provides an illustration of thread 1826, which resides in Identity Server 40 and contains thread local storage 1827. In accordance with the invention, thread local storage 1827 contains cache pointer 1828, which points to cache object 1829. Cache object 1829 is reserved for caching data from entries in Directory Server 36 that are accessed by the request assigned to thread 1826.

In one embodiment, cache object 1829 is a write through cache that is deleted once a request completes operation in thread 1826. In one implementation, Identity Server 40 does not update cache object 1829 to maintain coherency with either cache objects in other threads of execution or changes made to the data store by other threads of execution. Requests typically expect data retrieved during one segment of the request's performance to remain the same, unless changed by the request itself. In alternate embodiments of the present invention, Identity Server 40 updates cache object 1829 to maintain coherency between cache object 1829, the data store, and other cache objects.

Figure 45:
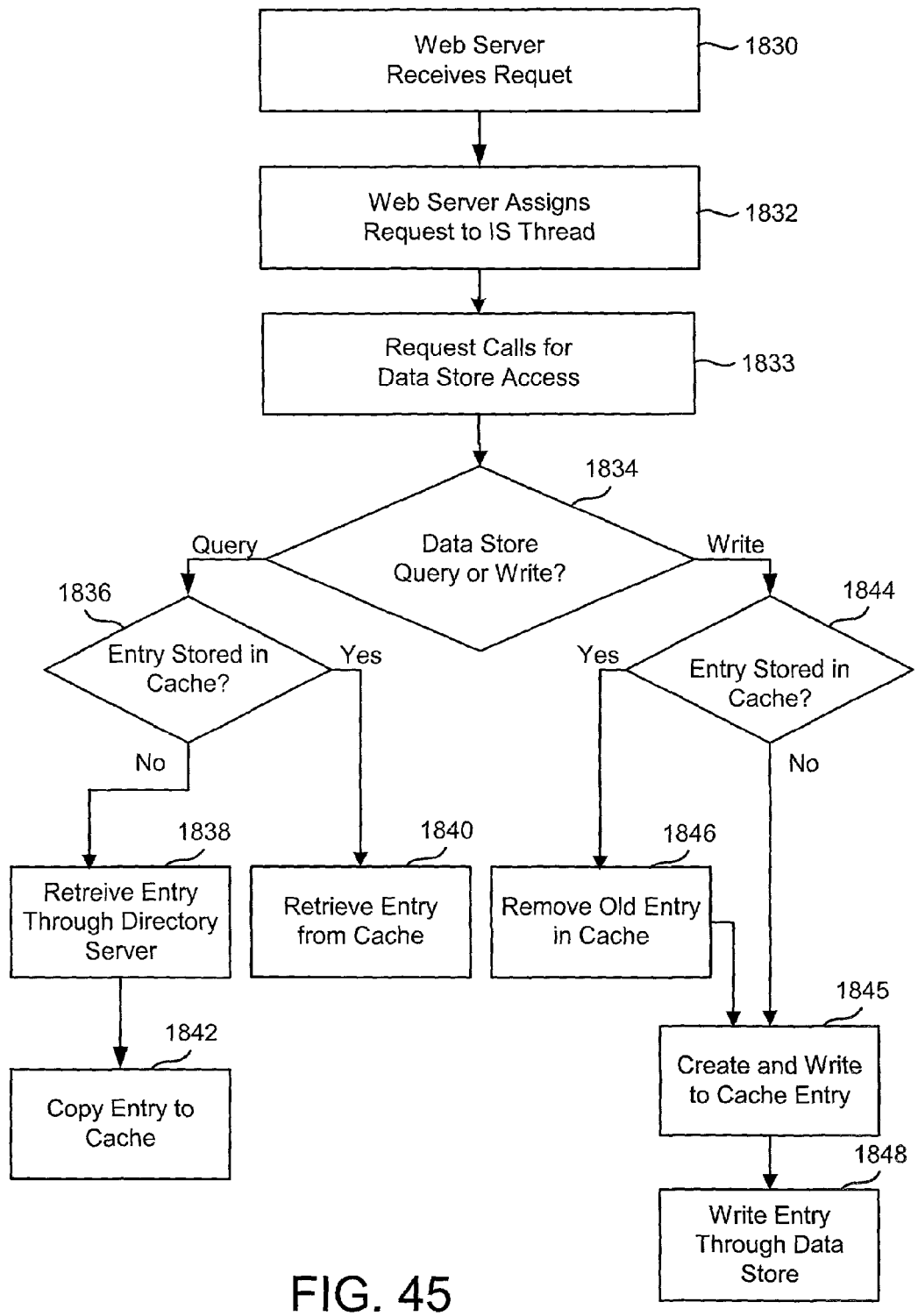
FIG. 45 is a flowchart describing a process for performing request-based caching.

FIG. 45 illustrates steps performed in one version of the invention to provide request based caching. Web Server 20 receives a request (step 1830) and assigns the request to thread of execution 1826 in Identity Server 40 (step 1832). No request other than the one assigned to thread 1826 has access to cache object 1829. At some point during the Identity Server's execution of the request, the request calls for Identity Server 40 to perform a data store access command (step 1833). At this point, Identity Server 40 begins implementing caching operations.

Identity Server 40 determines whether the request's data store command is a query or a write to data store 36 (step 1834). Directory Server 36 is referred to here as a data store, since there is nothing directory server specific in the request-based caching. The embodiment shown in FIG. 45 operates in many types of environments including flat files and RDBMS. If the attempted access is a query, Identity Server 40 determines whether the queried entry is already stored in cache object 1829 (step 1836). If the queried entry resides in cache object 1829, Identity Server 40 retrieves the requested entry from cache 1829 (step 1840). Otherwise, Identity Server 40 retrieves the entry from the data store through data store 36 (step 1838). Identity Server 40 then copies the entry into cache object 1829 so the data will be available for later accesses (step 1842).

If the attempted data store access is a write (step 1834), Identity Server 40 determines whether the requested memory location is stored in cache object 1829 (step 1844). If the entry is stored in cache object 1829, Identity Server 40 removes the old entry in cache object 1829 (step 1846) and writes the data supplied by the request into cache object 1829 (step 1845). Identity Server 40 also writes the same data into the data store (step 1848). If no cache entry exists for the requested entry, Identity Server 40 creates a space for the entry in cache 1829 and writes the data to cache 1829 (step 1845). Identity Server 40 also writes the data to the data store through data store 36 (step 1848).

The process shown in FIG. 45, beginning with step 1833 described above, is repeated for each data store access command in a request. Once the request is completed, cache object 1829 is destroyed.

As described above, clients submit requests to the Identity System asking for information on requesting tasks to be performed. These requests can be submitted via HTTP, XML documents, or other means. In some embodiments of the present invention, multiple Identity Servers are employed to increase the throughput of the Identity System. In such embodiments, requests are assigned to Identity Servers so as to balance the load of each Identity Server. In some instances a request may execute a function that requires a primary Identity Server handling the request to communicate with another Identity Server.

One example of need for inter-server communications arises in caching applications. In some implementations, Identity Servers each maintain caches for data that is frequently used by requests. For example, each Identity Server maintains a workflow definition cache containing workflow data. When a request alters a workflow, the workflow definition cache in every Identity Server must be flushed, since the cache data is no longer accurate. The primary Identity Server handling the request must communicate with all other Identity Servers to instruct them to flush their workflow definition caches. Identity Servers in one embodiment of the present invention are equipped to perform such inter-server communications.

Figure 46:
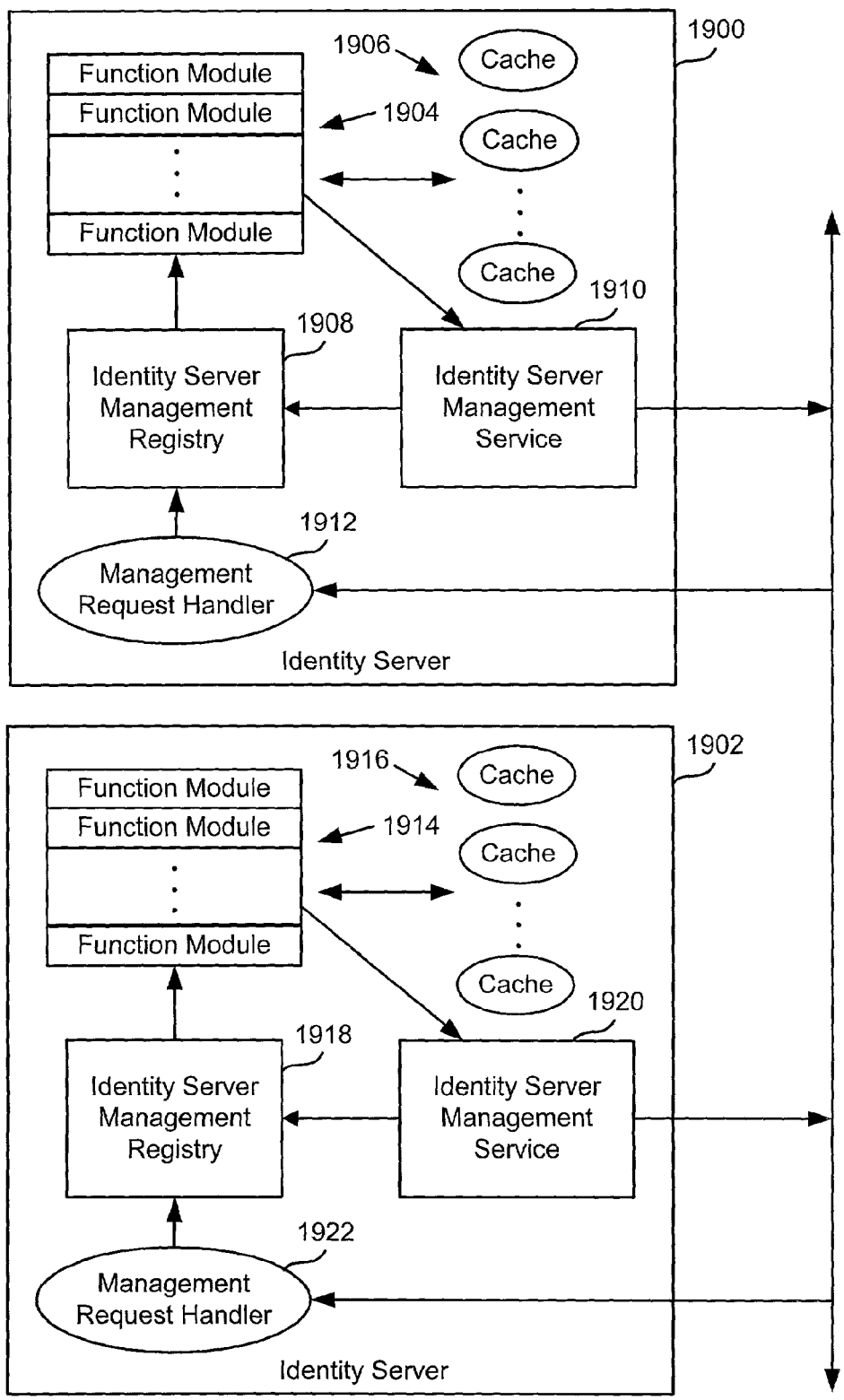
FIG. 46 is a block diagram showing an interconnection between two identity servers.

FIG. 46 shows a block diagram of two identity servers that are equipped to communicate with each other in accordance with the present invention. Identity Server 1900 contains a set of function modules 1904. Each function module contains instructions for carrying out a program that may be called for by a request. Function module set 1904 communicates with a set of caches 1906. Caches in set 1906 contain data frequently used by function modules in set 1904. The following caches are representative of those in set 1906: (1) Access Control Policy Cache; (2) System Specific Data Cache; (3) Workflow Definition Cache; (4) X Structure Cache; (5) Server Information Cache; (6) Application Information Cache; and (7) Master Audit Policy Cache.

Identity Server 1900 also includes management service 1910, management registry 1908, and request handler 1912. Management service 1910 provides an application programming interface for functional modules to call when remote access of another Identity Server is required. Management registry 1908 stores pointers to functions in set 1904. In one embodiment of the present invention, management registry 1908 is a hash table. Request handler 1912 receives communication requests from other identity servers.

Identity Server 1902 includes function module set 1914, cache set 1916, management service 1920, management registry 1918, and request handler 1922. The components identified in Identity Server 1902 operate the same as the similarly named components in Identity Server 1900.

Request handler 1912 is coupled to management service 1920 to receive inter-server communications. Request handler 1922 is coupled to management service 1910 to receive inter-server communications.

In one embodiment of the present invention, inter-server communications include a remote request to implement functions. In one such embodiment, function parameters accompanying a remote request are transferred among identity servers in a key-value format, which appears below:

{length}key=val {length}key=val . . . .

The "{" symbol indicates the beginning of a parameter. The "val" field is the parameter being passed. The "length" field identifies the number of bytes in the val field. The "}" symbol indicates the end of the length field. The "key" field identifies the name for the parameter. In this embodiment, each remote function is able to encode and decode key-val parameters.

Figure 47:
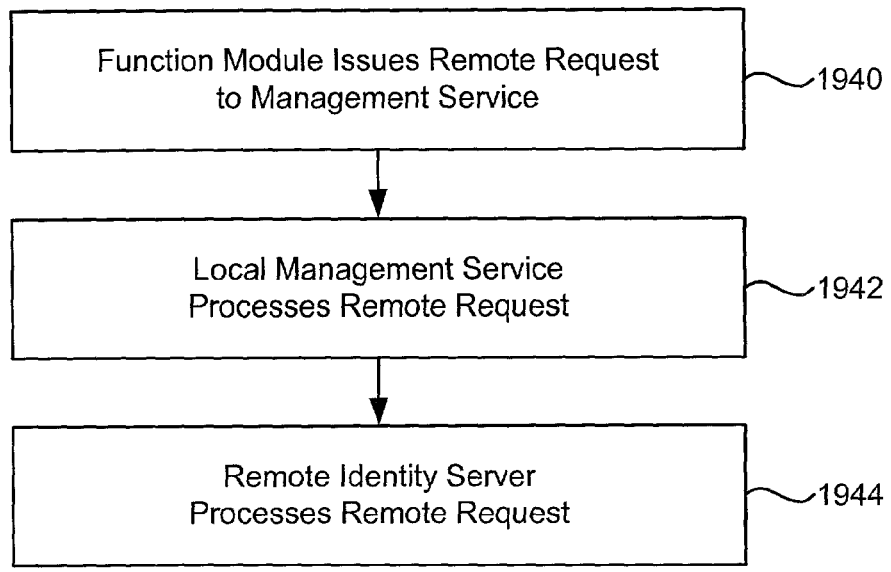
FIG. 47 is a flowchart describing a process for servicing a request that requires operations to be performed by multiple identity servers.

FIG. 47 illustrates steps for performing inter-server communications for one embodiment of the present invention. During the performance of a user request, a function module in set 1904 issues a request for a remote operation to management service 1910 (step 1940). Management service 1910 is referred to as the local management service, since it resides in the Identity Server where the remote request originated. Management service 1910 first processes any portion of the remote request that needs to be carried out locally in Identity Server 1900 (step 1942). Next, remote Identity Server 1902 processes the remote request (step 1944). Steps 1942 and 1944 can be exchanged in alternate embodiments of the present invention so that remote Identity Server 1902 services the remote request before local Identity Server 1900.

Figure 48:
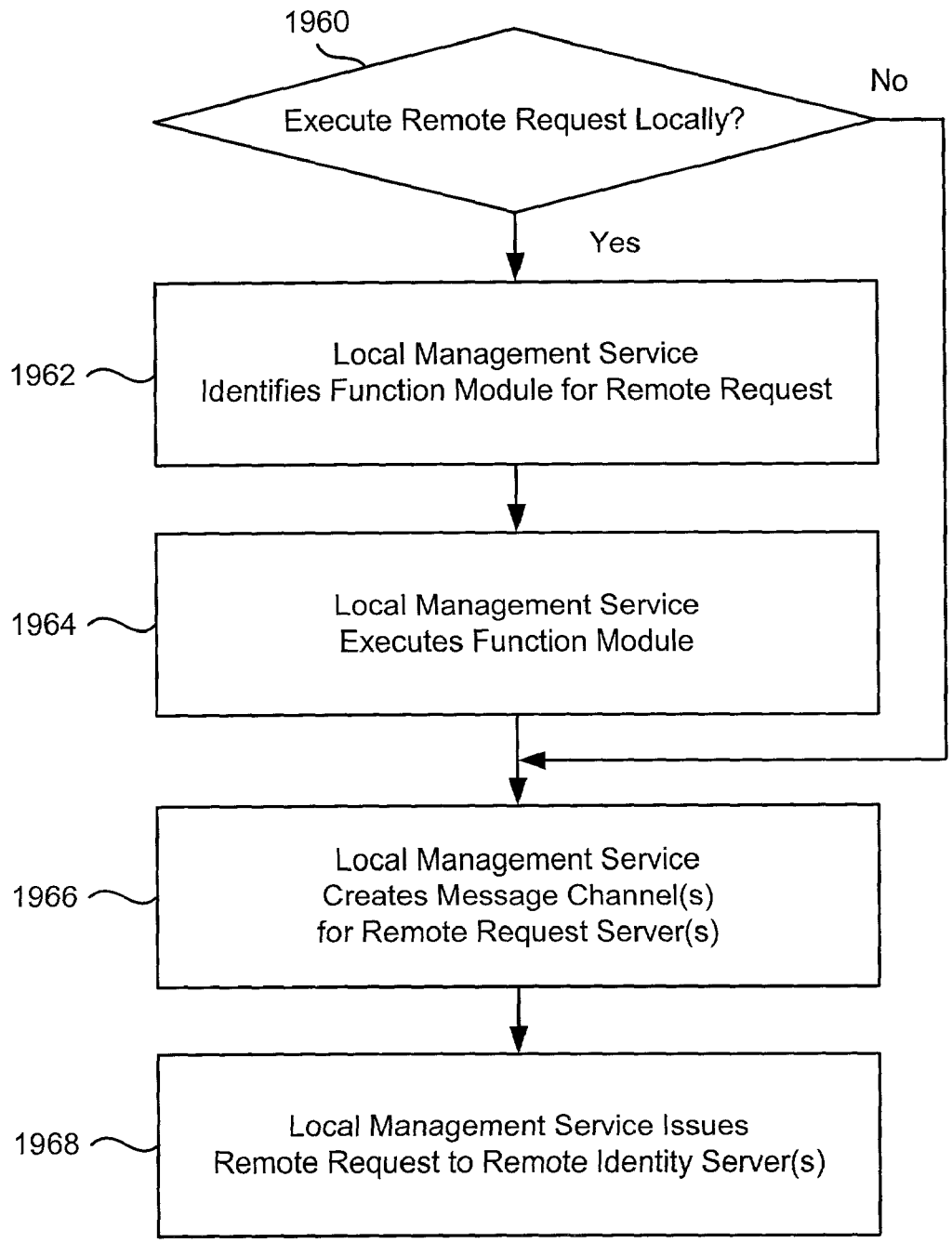
FIG. 48 is a flowchart describing a process for servicing a local component of a remote request.

FIG. 48 illustrates steps taken by Identity Server 1900 to carry out local processing of the remote request (step 1942, FIG. 47). Management service 1910 determines whether the remote request requires any local operations (step 1960). If a local operation is required, management service 1910 identifies a function module in set 1904 for carrying out the local operation. Management service 1910 makes this identification by supplying the requested local operation to management registry 1908. Management registry 1908 identifies the function module in set 1904 for carrying out the requested local operation. Management service 1910 executes the selected function module (step 1964).

After executing the local operation or if no local operation is required, management service 1910 opens a message channel for providing the remote request to remote Identity Server 1902 (step 1966). Management service 1910 then issues the remote request to remote Identity Server 1902 (step 1968). In the embodiment shown in FIG. 46, management service 1910 opens up a communication channel with Identity Server 1902 and provides the remote request to server 1902. In alternate embodiments, however, more than two Identity Servers are employed in the Identity System. In such embodiments, local Identity Server 1900 opens message channels with all the other remote Identity Servers and issues the remote request to them.

Figure 49:
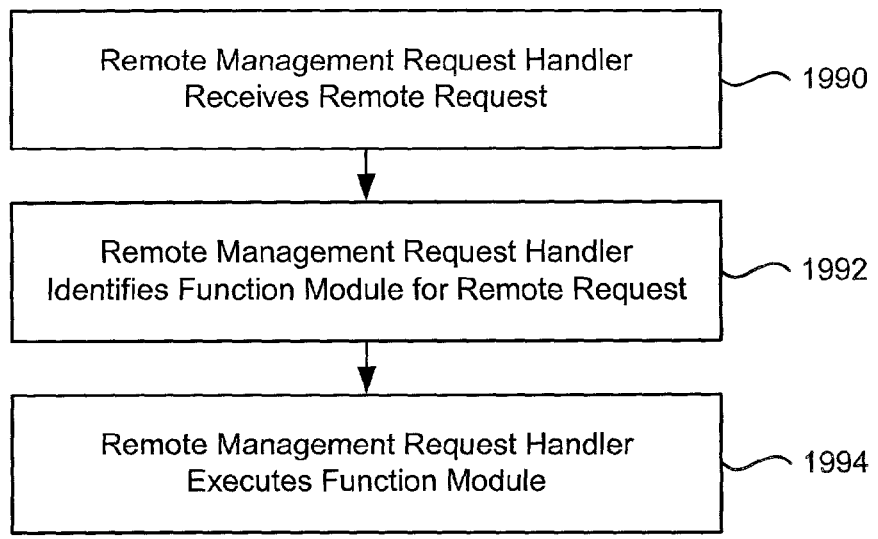
FIG. 49 is a flowchart describing a process for servicing a remote component of a remote request.

FIG. 49 illustrates steps taken by a remote identity server, such as Identity Server 1902, to respond to a remote request from another Identity Server. Request handler 1922 receives the remote request from local management service 1910 (step 1990). Request handler 1922 identifies a function module in set 1914 for carrying out the remote request (step 1992). Request handler 1922 makes this identification by supplying the remote request to management registry 1918, which identifies the corresponding function module in set 1914. Next, Identity Server 1902 executes the identified function module (step 1994).

Figure 50:
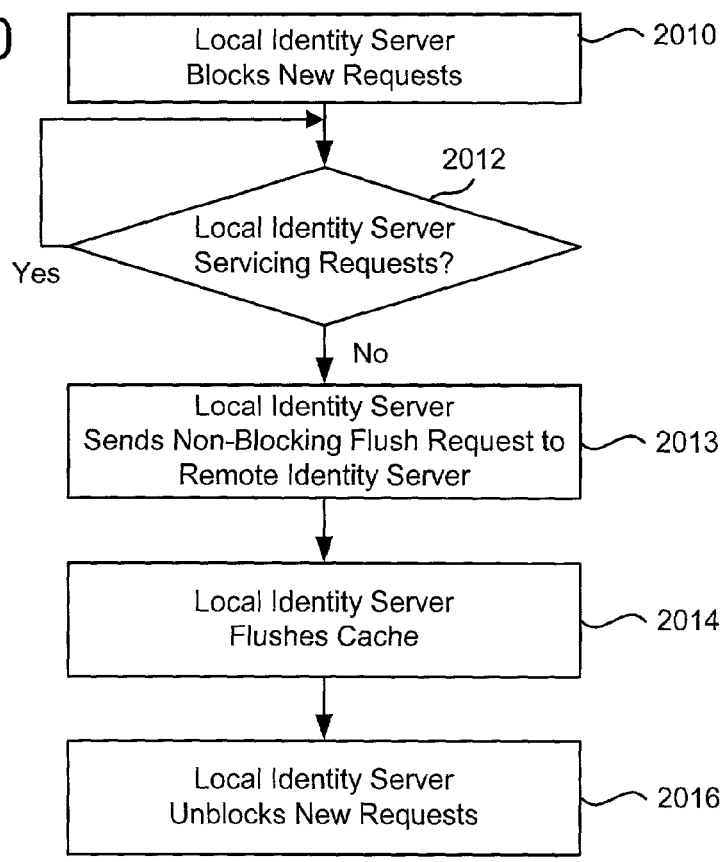
FIG. 50 is a flowchart describing a process for flushing local caches.
Figure 51:
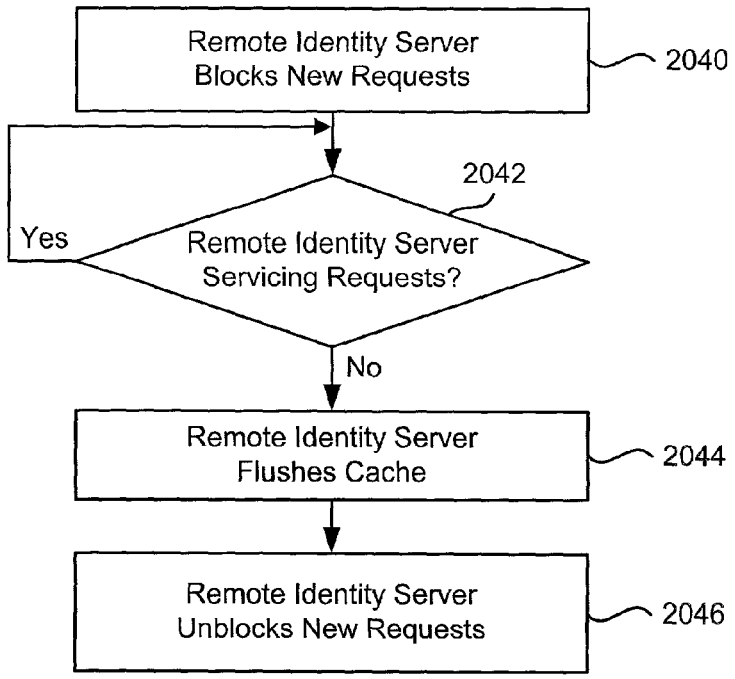
FIG. 51 is a flowchart describing a process for flushing remote caches.

FIGS. 50 and 51 combine to show the steps taken by local and remote Identity Servers in response to function modules calling for cache flushing. FIG. 50 illustrates steps taken by local Identity Server 1900 to execute a function module for cache flushing (step 1964, FIG. 48). Identity Server 1900 blocks all new requests from being serviced (step 2010). Identity Server 1900 then determines whether any requests are currently being serviced within Identity Server 1900 (step 2012). If requests are currently being serviced, Identity Server 1900 waits until the servicing of all these requests has been completed (step 2012). Once Identity Server 1900 is no longer servicing any requests, Identity Server 1900 sends a non-blocking cache flush request to remote Identity Server 1902 (step 2013). A non-blocking request does not require local Identity Server 1900 to wait for remote Identity Server 1902 to service the request before resuming local actions. Identity Server 1900 flushes the identified cache in set 1906 (step 2014). After the flush, Identity Server 1900 resumes servicing new requests (step 2016). In the embodiment shown in FIG. 50, step 2013 carries out steps 1966 and 1968 shown in FIG. 48 by issuing a flush request to remote Identity Server 1902. In alternate embodiments, step 2013 is removed and steps 1966 and 1968 are carried out after local Identity Server 1900 flushes the local cache (step 2014) and unblocks new requests (step 2016).

FIG. 51 shows the operations executed by remote Identity Server 1902 to execute a function module for flushing a cache in set 1916 (step 1994, FIG. 49). Remote Identity Server 1902 blocks all new requests from being serviced (step 2040). Identity Server 1902 then determines whether any requests are currently being serviced (step 2042). If any requests are currently being serviced, Identity Server 1902 waits until the servicing of all these requests is complete (step 2042). Once all request servicing is terminated, Identity Server 1902 flushes the identified cache in cache set 1916 (step 2044). Identity Server 1902 then resumes the servicing of new requests (step 2046).

In one embodiment, the present invention provides for customized certificate management processes. Certificates are electronic documents used to verify the identity of an entity such as a user, group or organization. A well known standard defining certificate formats is the X.509 standard for certificates. In general, a certificate contains information about an entity, including a public key for performing encryption. A certificates holder maintains a secret copy of a corresponding private key that is used for decryption. Certificates employed in one embodiment of the present invention include the following fields: (1) VEND—certificate's expiration date; (2) VSTART—certificate validity start date; (3) ISSUER—certificate holder's distinguished name (dn); (4) EMAIL—certificate holder's e-mail address; (5) SERIAL—certificate serial number; (6) VERSION—certificate version number; (7) ALGOID—certificate algorithm identifier; (8) PUBLICKEY_ALGOID—public key algorithm identifier; (9) PUBLICKEY—public key value of the certificate; (10) ISSUER_SIGNATURE_ID—certificate holder's signature algorithm identifier; and (11) SUBJECT—subject of the certificate.

When a first person wants to establish a secure connection with a second person, the first person sends the second person their certificate. The second person obtains the first person's public key from the certificate. When sending messages to the first person, the second person uses the public key to encrypt the message. The first person uses their private key to decrypt the message. The first person can provide a secure response to the second person by using the second person's public key, which is attached to the second person's certificate.

Embodiments of the present invention provide for establishing different sets of criteria for obtaining a certificate. For example, a high level person in an organization may have great need for access to confidential corporate information. The corporation may wish to issue this person a certificate without any more than a mere request being filed. On the other hand, entry level employees at a corporation may have very little need for access to confidential information. The corporation may wish to have the entry level person's manager approve the issuance of a certificate. One embodiment of the integrated Access and Identity System of the present invention incorporates certificate management into the workflow process so different standards for certificate management can be applied among various entities. In one implementation, different certificate enrollment, renewal, and revocation workflows can be defined for different types of system users.

Figure 52:
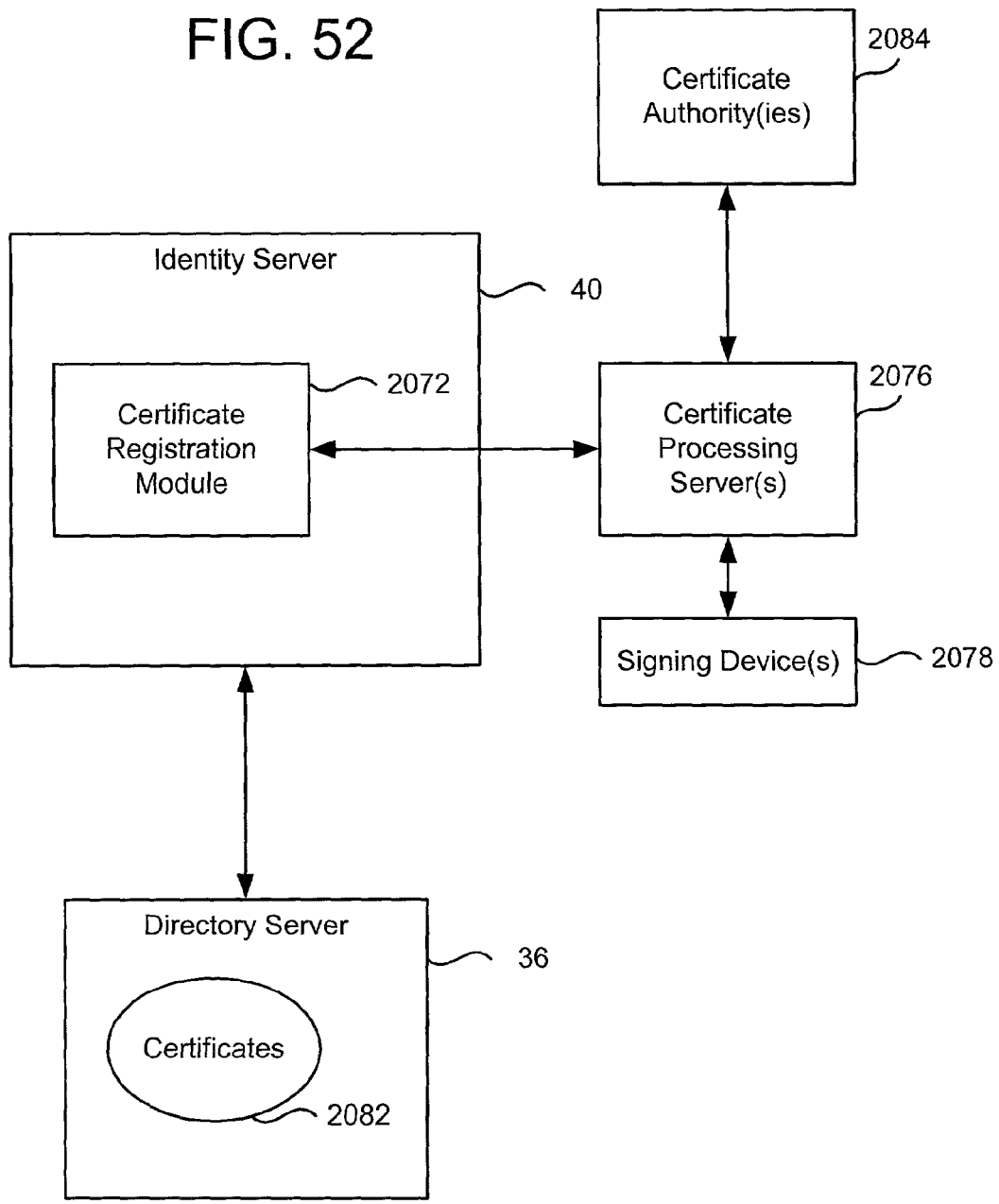
FIG. 52 is a block diagram of an identity server coupled to an authority that issues certificates.

FIG. 52 illustrates additional system modules used for supporting certificate management through the workflow process. Identity Server 40 includes certificate registration module 2072, which services certificate related requests from system users and administrators. Certificate registration module 2072 carries out workflow processes defined by administrators to respond to users' requests for certificate enrollment, renewal and revocation. Directory Server 36 maintains a pool of certificates 2082 that are available for issuance to system users. When the system is initialized the administrator applies for a fixed number of certificates that can be distributed to system users. Issued certificates are stored in Directory Server 36 and accessible to certificate registration module 2072 through Directory Server 36.

The integrated Access and Identity System of the present invention also includes Certificate Processing Server 2076, which is in communication with Identity Server 40 to communicate with certificate registration module 2072. Certificate Processing Server 2076 issues certificate signing requests to Certificate Authority 2084, which is external to the integrated Access and Identity System and in communication with Certificate Processing Server 2076. Certificate Authority 2084 is typically a third party vendor that provides certificates, including pairs of public and private keys for attachment to the certificates. One example of a third party certificate provider is Verisign. Certificate Processing Server 2076 is also in communication with signing device 2078. Signing device 2078 digitally signs certificate signing requests before they are issued to Certificate Authority 2084. Digitally signing certificate signing requests heightens the level of security in the connection between Certificate Processing Server 2076 and Certificate Authority 2084. In one embodiment of the present invention, certificate registration module 2072 communicates with Certificate Processing Server 2076 via a secure SSL socket connection and Certificate Processing Server 2076 communicates with Certificate Authority 2084 via a secure SSL connection to enhance system security.

Figure 53:
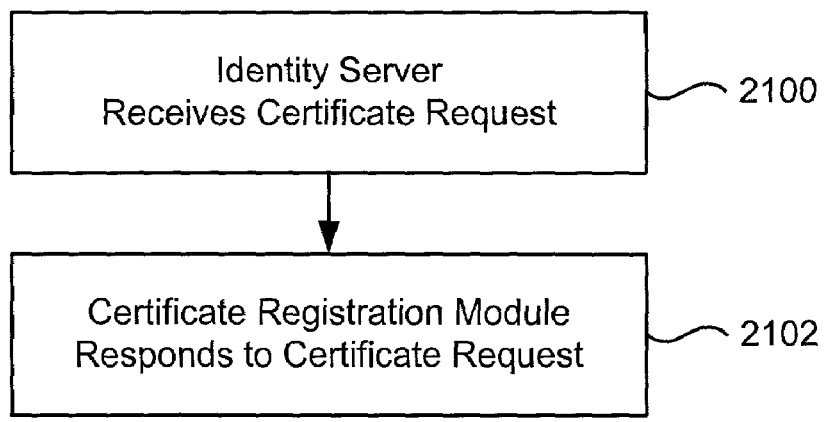
FIG. 53 is a flowchart describing a process for processing a certificate related request.

FIG. 53 illustrates the steps performed to respond to a user's certificate related request in one implementation of the current invention. Examples of certificate related requests include enrollment, renewal or revocation request. Identity Server 40 receives the certificate request (step 2100). Typically the request comes from the user via Web Server 20. After receiving the request, Identity Server 40 responds (step

2102). Certificate registration module 2072 responds differently based upon the type of request operation being requested. The following FIGS. 54-59 illustrate responses of certificate registration module 2072 to different types of certificate requests, namely requests for enrollment, renewal and revocation.

Figure 54:
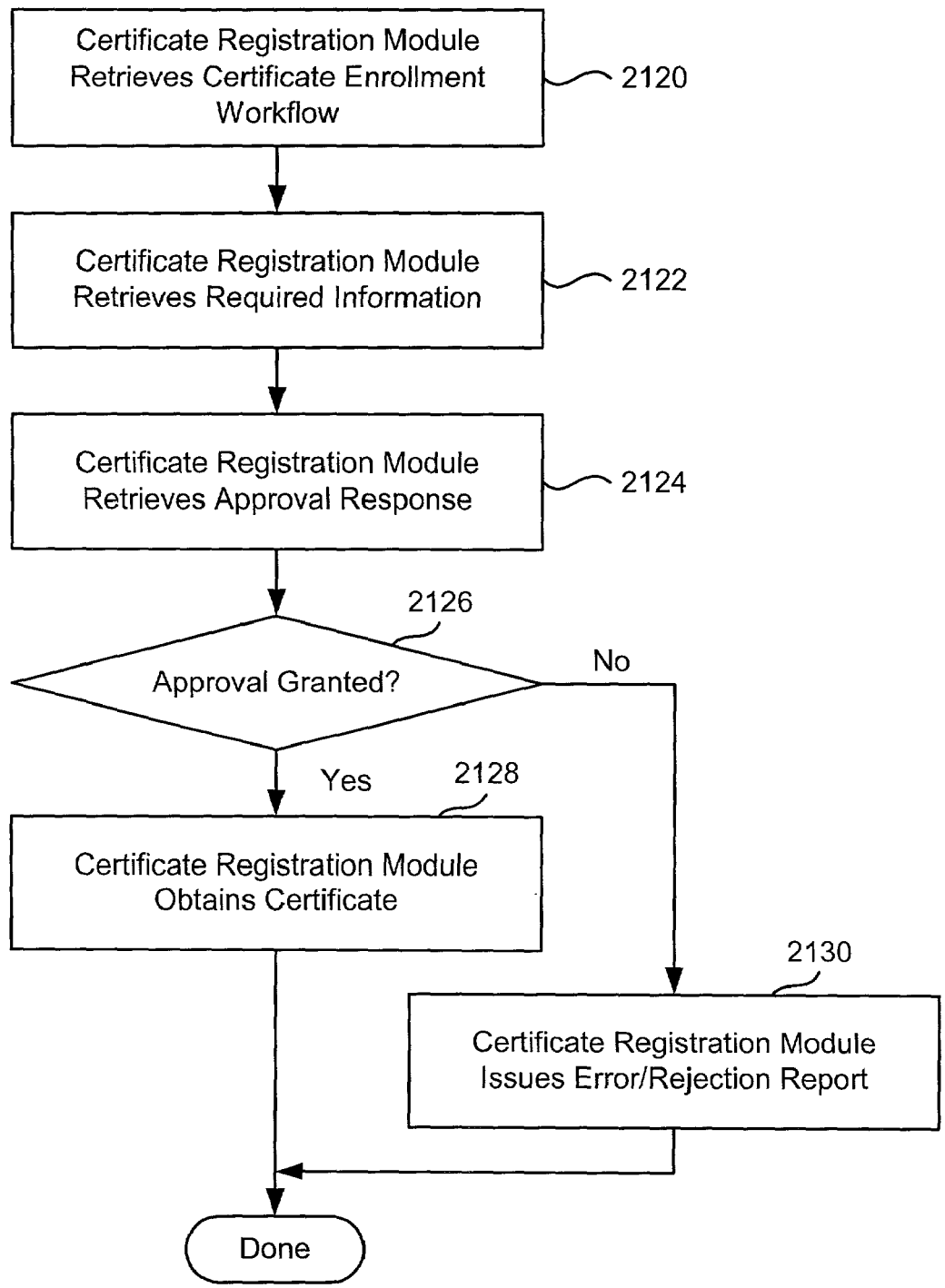
FIG. 54 is a flowchart describing a process for responding to a certificate enrollment request.

FIG. 54 illustrates how certificate registration module 2072 responds to a certificate enrollment request in one version of the invention (step 2102, FIG. 53). Certificate registration module 2072 retrieves a certificate enrollment workflow that corresponds to the characteristics of the requesting user (step 2120). The workflow contains a set of directives that must be carried out for responding to the user's request. In one embodiment, there are multiple certificate enrollment workflows. Each workflow corresponds to a different set of user characteristics, such as job title and access privileges. Certificate registration module 2072 selects the enrollment workflow matching the characteristics of the requesting user.

Certificate registration module 2072 proceeds with certificate enrollment in accordance with the workflow by retrieving information (step 2122). Examples of the information retrieved include information from the user's identity profile and information from entities associated with the user. Examples of entities associated with the requesting user include the requesting user's manager who also has an identity profile in the Identity System and can be contacted by Identity Server 40.

Certificate registration module 2072 also retrieves approval responses, indicating whether issuing a certificate to the requesting user is allowed (step 2124). For example, certificate registration module 2072, in one implementation, queries a user's manager to determine whether the user is eligible to receive a certificate. If approval is not granted (step 2126), certificate registration module 2072 issues the requesting user a rejection report (step 2130). If enrollment is approved (step 2126), certificate registration module 2072 obtains a certificate for the user (step 2128). In another embodiment, approval can be based on comparing an LDAP filter to the attributes of the user's identity profile.

In accordance with the present invention, system administrators are able to define different workflows for different users—making many variations of the above-described certificate enrollment process possible. In alternate implementations, the workflow does not call for retrieving information or obtaining approval responses. Certificate registration module 2072 immediately moves to obtain a certificate for the user (step 2128).

Figure 55:
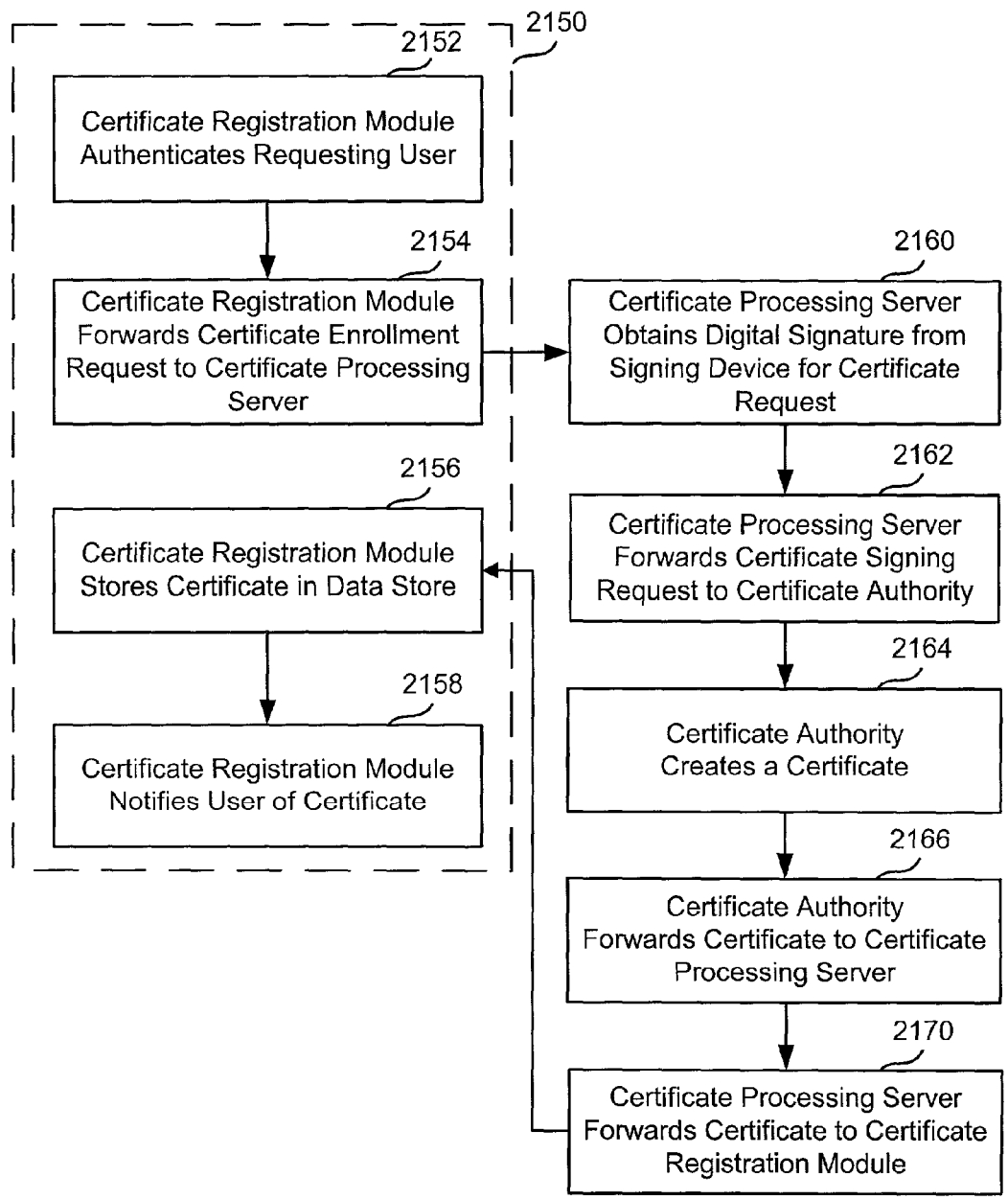
FIG. 55 is a flowchart describing a process for obtaining a certificate.

FIG. 55 illustrates operations performed to obtain a certificate for a requesting user (step 2128, FIG. 54). Certificate registration module 2070 authenticates the requesting user (step 2152). In one embodiment, authentication is performed by the Access System. In alternate embodiments, certificate registration module 2072 authenticates the user based on challenge information collected during information retrieval (step 2122, FIG. 54). In an alternate implementation, certification registration module 2072 authenticates the user from information in the user's cookie. Certificate registration module 2072 forwards a certificate request to Certificate Processing Server 2076 (step 2154).

Certificate Processing Server 2076 obtains a digital signature for the request from signing device 2078 (step 2160). Certificate Processing Server 2076 then forwards the digitally signed request as a certificate signing request to Certificate Authority 2084 (step 2162). Certificate Authority 2084 responds by creating a certificate (step 2164) and forwarding the certificate to Certificate Processing Server 2076 (step 2166). Certificate Processing Server 2076 forwards the certificate to certificate registration module 2072 (step 2170). Certificate registration module 2072 stores the new certificate in certificate data store location 2082 (step 2156). Certificate registration module 2072 then notifies the user that the certificate is in place (step 2158).

Once a certificate has been issued it is typically valid for a predetermined period of time, such as one year. After the time period expires, the certificate holder must renew the certificate. In one embodiment of the present invention, the certificate holder renews the certificate by submitting a certificate renewal request to Identity Server 40. This request is handled by certificate registration module 2072 in essentially the same manner as described above for certificate enrollment. The same process is applicable, because the renewal of a certificate is essentially the same as enrollment. When a certificate is renewed, Certificate Authority 2084 generates a new private key-public key pair, in essence creating a new certificate without increasing the total number of certificates issued to the Identity System. The only difference is that Certificate Processing Server 2076 informs Certificate Authority 2084 that a certificate is to be renewed, as opposed to a new certificate being issued.

When a new certificate is issued through enrollment or a certificate is renewed, the system administrator informs the user that the certificate is ready for pick-up. The administrator can send the user an e-mail indicating the certificate is available on a floppy disk in the administrator's office. The user then goes to the administrator's office and picks up the floppy disk with the certificate. The user's copy of the certificate includes the private key, which is not available in the certificate maintained in certificate data store 2082. After picking up the certificate, the user installs the certificate in his/her client device's browser. The copy of the certificate in certificate data store location 2082 is available for system users to view and obtain the certificate holder's public key information.

Figure 56:
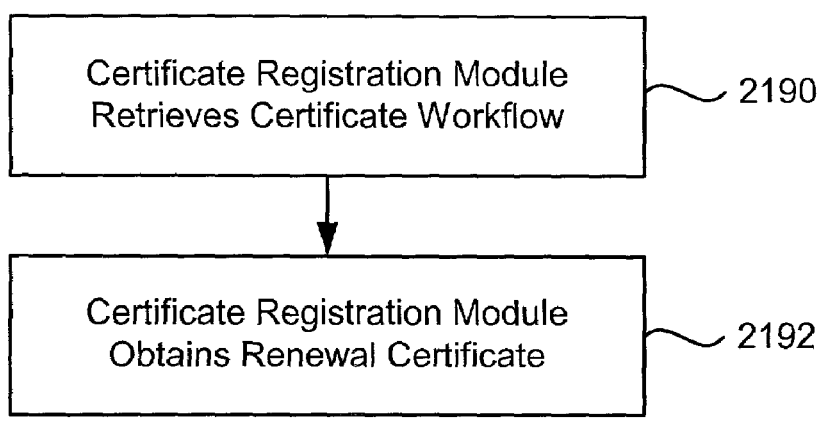
FIG. 56 is a flowchart describing a process for responding to a certificate renewal request.

In an alternate embodiment of the present invention, an automatic renewal option is provided. In response to an automatic renewal request, renewal is based solely on authenticating the requesting user. No data collection or additional approval is required. FIG. 56 illustrates one set of steps taken by certificate registration module 2072 to respond to an automatic renewal request (step 2102, FIG. 53). Certificate registration module 2072 retrieves the automatic renewal certificate workflow for the user (step 2190). In one embodiment, there are multiple automatic renewal workflows with each workflow corresponding to a different set of user characteristics. Certificate registration module 2072 selects the workflow that matches the characteristics of the user. Certificate registration module 2072 then obtains the renewal certificate (step 2192).

Figure 57:
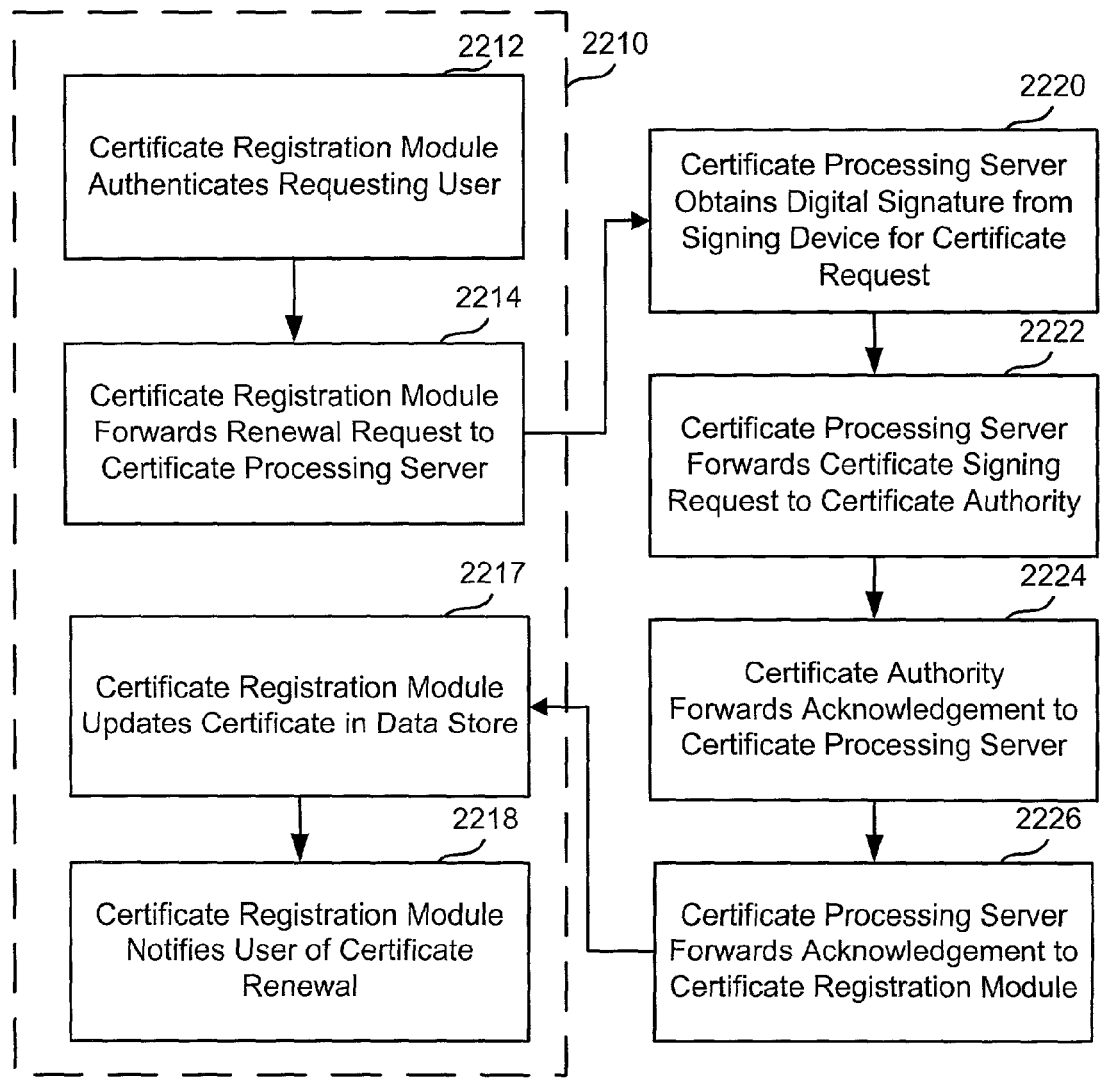
FIG. 57 is a flowchart describing a process for obtaining an automatic certificate renewal.

FIG. 57 illustrates steps taken to obtain the automatic renewal certificate (step 2192, FIG. 56). Certificate registration module 2072 authenticates the requesting user (step 2212). This authentication can be performed as explained above for the enrollment process. In another implementation, the user encrypts the request using a private key and certificate registration module 2072 is able to decrypt the message using a corresponding public key. In an alternate embodiment, the user enters a challenge phrase along with the request to provide authentication.

Certificate registration module 2072 forwards the automatic renewal request to Certificate Processing Server 2076 (step 2214). Certificate Processing Server 2076 obtains a digital signature for the request (step 2220). Certificate Processing Server 2076 forwards the request to Certificate Authority 2084 as a certificate signing request (step 2222).

Certificate Authority 2084 provides a renewal acknowledgement to Certificate Processing Server 2076 (step 2224). Certificate Processing Server 2076 forwards the renewal acknowledgement to certificate registration module 2072 (step 2226). Certificate registration module 2072 updates the certificate in the data store (step 2217) and notifies the user of the certificate renewal (step 2218). In the automatic renewal process described above, a new public key-private key pair is not issued for the certificate. In alternate embodiments, a new key pair is issued as described with reference to FIG. 55.

Figure 58:
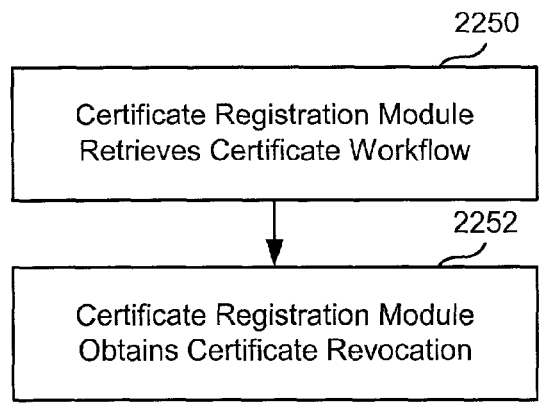
FIG. 58 is a flowchart describing a process for responding to a certificate revocation request.

FIG. 58 illustrates steps taken by certificate registration module 2076 to respond to a certificate revocation request (step 2102, FIG. 53). Certificate registration module 2072 retrieves a certificate workflow that corresponds to the requesting user for revoking the user's certificate (step 2250). In one embodiment, there are multiple revocation workflows with each workflow corresponding to a different set of user characteristics. Certificate registration module 2072 selects the revocation workflow matching the requesting user's characteristics. Using the workflow process, certificate registration module 2072 obtains certificate revocation (step 2252).

Figure 59:
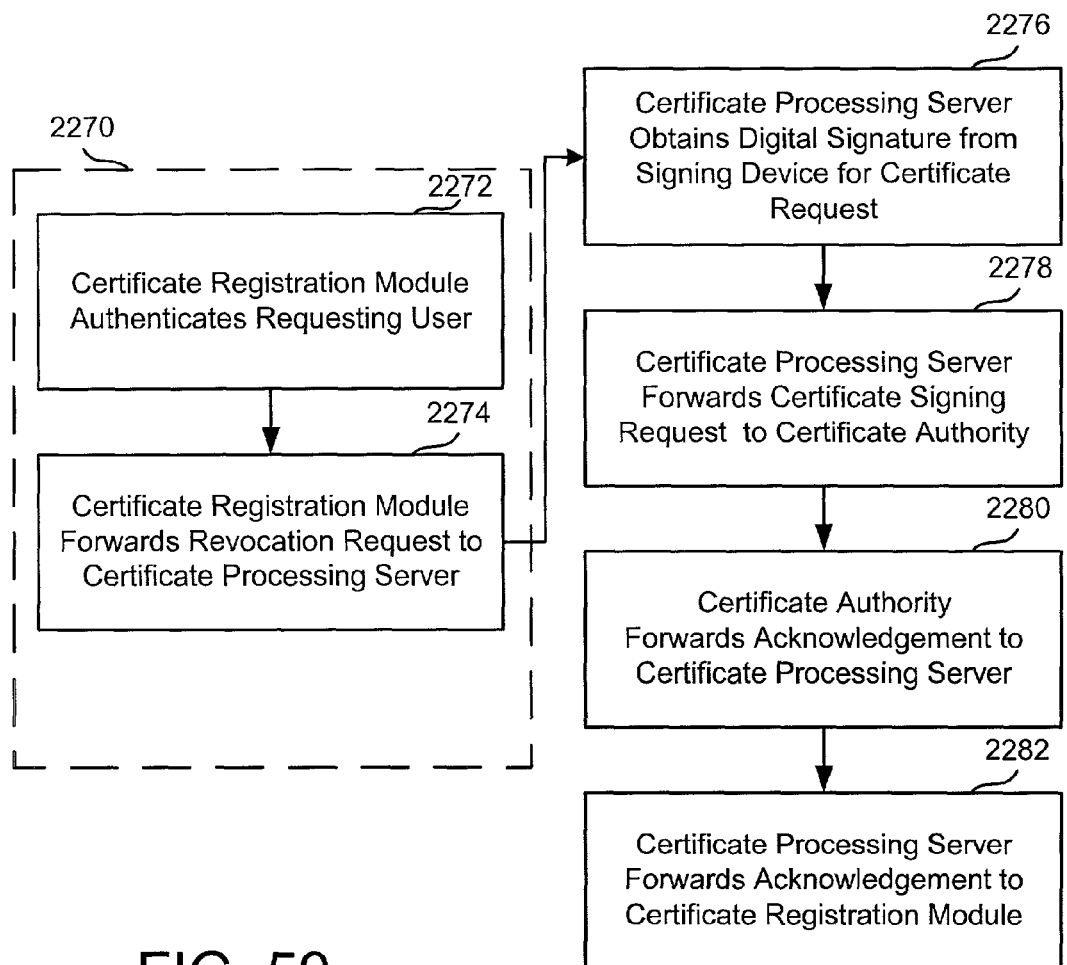
FIG. 59 is a flowchart describing a process for obtaining certificate revocation.

FIG. 59 illustrates steps taken by certificate registration module 2072 to obtain certificate revocation (step 2252, FIG. 58). Certificate registration module 2072 authenticates the requesting user, as described above (step 2272). Certificate registration module 2072 forwards the certificate revocation request to Certificate Processing Server 2076 (step 2274). Certificate Processing Server 2076 obtains a digital signature for the request from signing device 2078 to form a certificate signing request (step 2276). Certificate Processing Server 2076 then forwards the certificate signing request to Certificate Authority 2084 (step 2278). Certificate Authority 2284 forwards the revocation acknowledgement to Certificate Processing Server 2076 (step 2080). Certificate Processing Server 2076 then forwards the revocation acknowledgement to certificate registration module 2072 (step 2282).

The system administrator is responsible for verifying that a certification has been successfully revoked. In one embodiment, the system administrator reviews a certificate revocation list provided by Certificate Authority 2084. Certificate Authority 2084 makes arrangements with the system administrator to determine the frequency at which the certificate revocation list will be updated. Alternatively, the system administrator employs an Online Certificate Status Protocol ("OCSP") to check the status of a certificate revocation in real time through an online connection with Certificate Authority 2084. OCSP is a real time protocol provided by Certificate Authority 1084 that enables applications to check the status of certificates with the Certificate Authority. One Certificate Authority that provides such a protocol is Verisign.

It is important to note that revoking a certificate does not result in the certificate being deleted from certificate data store location 2082. Revoked certificates remain in the data store until Identity Server 40 deletes the certificate, which can be done through a change attribute workflow.

The following table provides example workflows for certificate enrollment, revocation and renewal.

TABLE 8

| Workflow | Actions |
| --- | --- |
| Certificate Enrollment | cert_initiate_enroll |
| | provide_info (optional) |
| | approval/provide_approval (optional) |
| | cert_generate_certificate |
| Certificate Renewal | cert_initiate_renew |

TABLE 8-continued

| Workflow | Actions |
| --- | --- |
| | provide_info (optional) |
| | approval/provide_approval (optional) |
| | cert_generate_certificate |
| Certificate Revocation | cert_initiate_revoke |
| | cert_revoke_certificate |

The first action in the certificate enrollment workflow is cert_initiate_enroll, which includes certificate registration module 2072 presenting the requesting user with a certificate enrollment page—indicating that certificate enrollment process is under way. In one embodiment, the user's browser responds by submitting the certificate enrollment page back to certificate registration module 2072.

The provide_info action calls for certificate registration module 2072 to retrieve information from either the user or an entity affiliated with the user, as described above. The enrollment workflow can also contain either an approval action or a provide_approval action. The approval action requires certificate registration module 2072 to obtain approval for certificate issuance from an entity, such as someone affiliated with the user. For the provide_approval action, certificate registration module 2072 obtains information along with the approval. The provide_info, approval, and provide_approval actions are optional.

The cert_generate_certificate action in the enrollment workflow causes certificate registration module 2072 to obtain a certificate. As shown above, certificate registration module 2072 obtains certificates with the assistance of Certificate Processing Server 2076 and Certificate Authority 2084.

The actions in the certificate renewal workflow are essentially the same as those in the enrollment workflow with the exception of cert_initiate_enroll being replaced by cert_initiate_renew. The cert_initiate_renew action causes certificate registration module 2072 to present the user with a request to renew button. Certificate registration module 2072 provides this button when there is a predetermined period of time remaining before an existing certificate expires. The user requests the renewal of a certificate by selecting the button, and certificate registration module 2072 provides the user with a renewal page to be submitted as a renewal request.

The cert_initiate_revoke action enables certificate registration module 2072 to accept a revocation request. The cert_revoke_certificate action causes certificate registration module 2072 to carryout the revocation process through Certificate Processing Server 2076 and Certificate Authority 2084.

As shown above, several of the workflow actions are optional. The flexibility to add different steps to workflows makes certificate management very flexible. System administrators can create different certificate related workflows for different types of users. For example, a particular type of user may be automatically granted a certificate upon requesting enrollment—requiring the workflow to include only the cert_initiate_enroll and cert_generate_certificate actions. Alternatively, another type of user may require approval before a certificate is issued—requiring the workflow to include an approval or provide approval action. In further embodiments, system administrators can also initiate certificate related requests on behalf of system users.

As described above, Identity Server 40 maintains public copies of certificates in certificate data store location 2082. Identity System users issue requests to Identity Server 40 to export or display the certificates. In one embodiment of the present invention, the Identity System maintains real time status information about the certificates, so users are not unknowingly importing or viewing expired certificates. Maintaining this status information is beneficial, because certificate status is a dynamic value that cannot typically be provided in a certificate field.

Figure 59A:
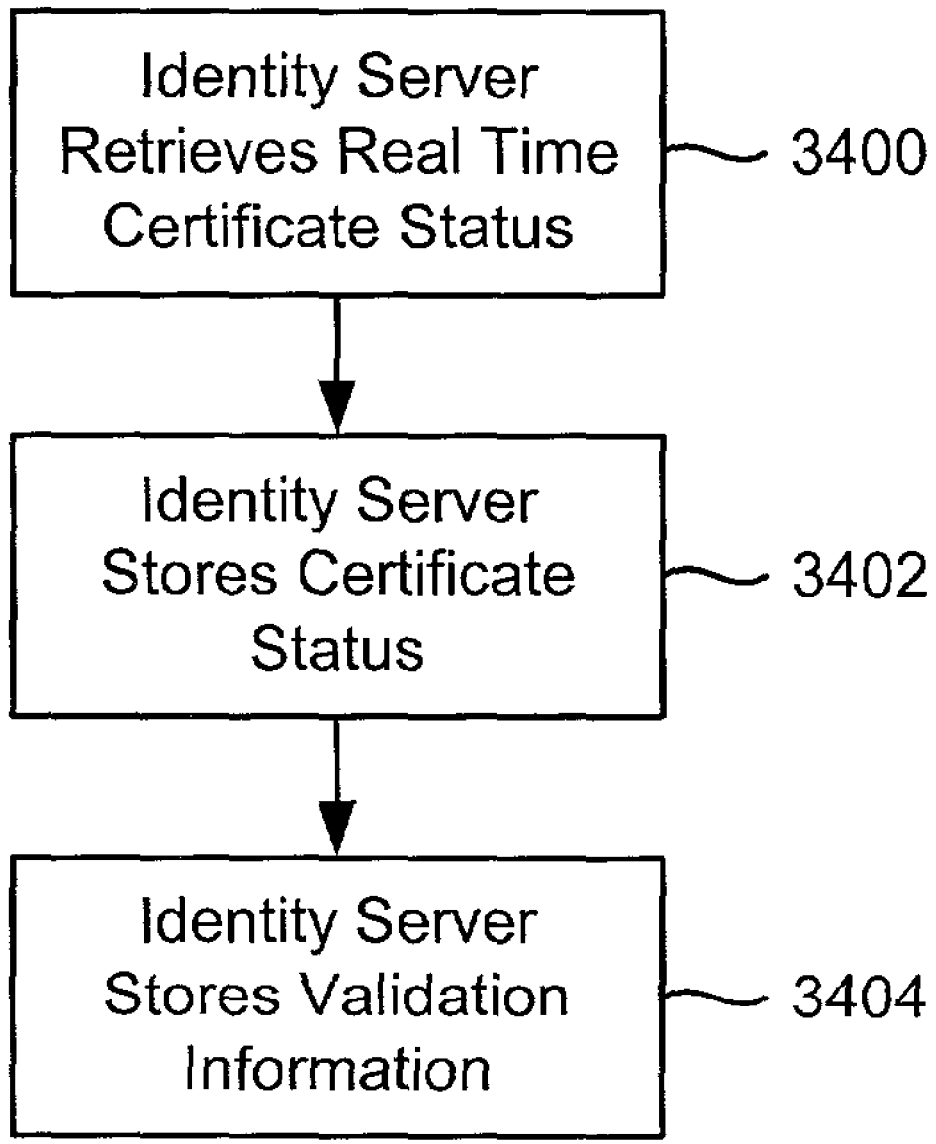
FIG. 59A is a flow chart describing one embodiment of a process for obtaining and maintaining real time certificate status.

FIG. 59A shows a sequence of steps performed by Identity Server 40 to obtain and maintain real time certificate status in one implementation of the present invention. Identity Sever 40 retrieves real time status for a certificate (step 3400). Identity Server 40 retrieves the status from Certificate Authority 2084 using a real time protocol. One example of a real time protocol is the well known OCSP protocol identified above. The retrieved status indicates whether the certificate is valid, expired, or revoked. In one implementation, Identity Server 40 retrieves certificate status directly from Certificate Authority 2084. In an alternate implementation, Identity Server 40 retrieves certificate status from Certificate Authority 2084 through Certificate Processing Server 2076.

Identity Server 40 stores the retrieved certificate status in Directory Server 36 (step 3402). Identity Server 40 also stores validation information for the certificate in Directory Server 36 (step 3404). In one implementation, the validation information includes: 1) Status Retrieval Time—indicating the time that Identity Server 40 retrieved the certificate's real time status in step 3400 and 2) Validation Interval—indicating a time period extending from the Status Retrieval Time. In one embodiment of the present invention, the Validation Interval is set to a value of zero, if the certificate's status is not valid.

In one embodiment, Identity Server 40 performs the sequence of steps shown in FIG. 59A in response to a request from a user or system administrator that identifies a certificate. In alternate embodiments, Identity Server 40 also automatically carries out the steps in FIG. 59A at predetermined time intervals.

Figure 59B:
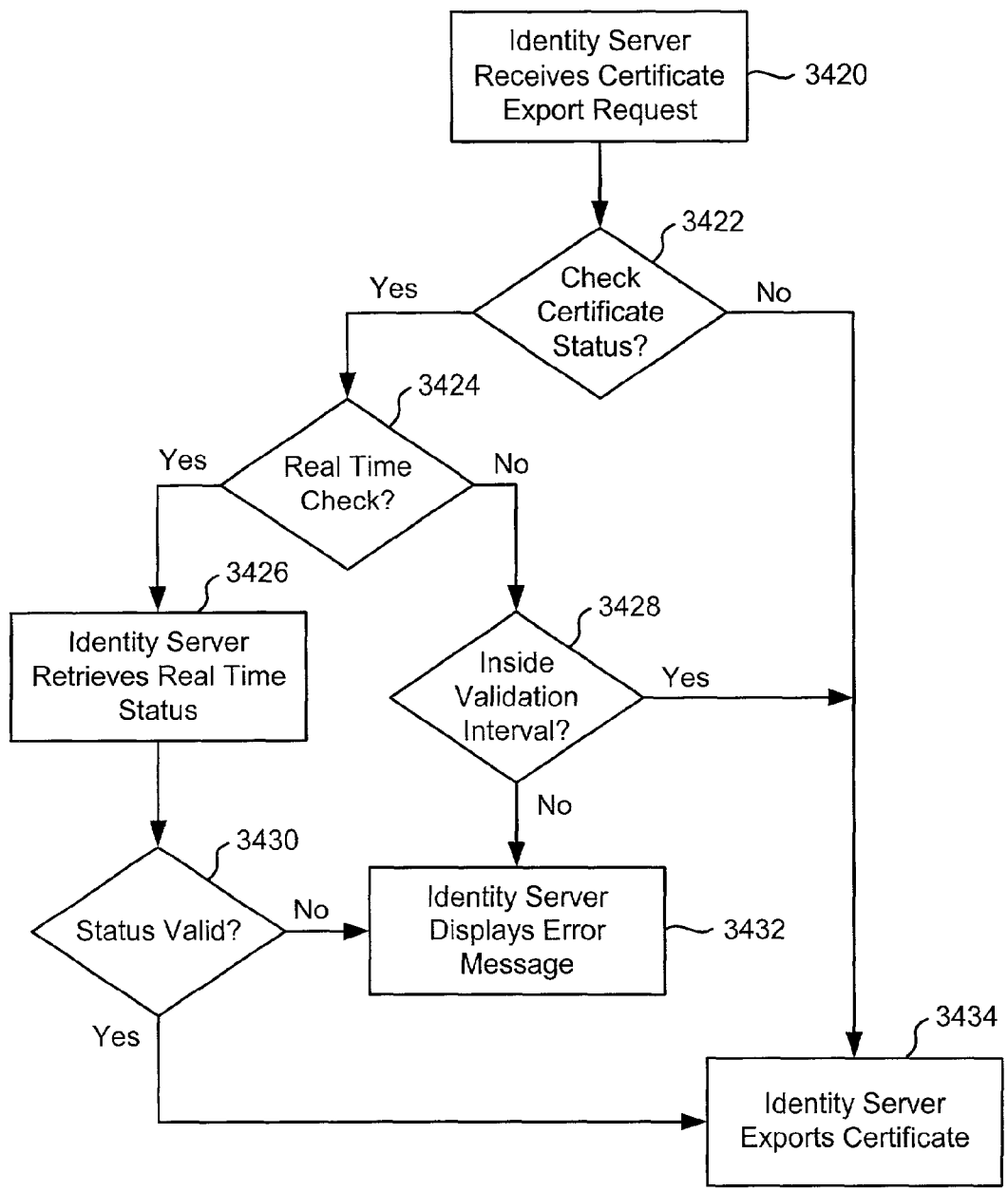
FIG. 59B is a flow chart describing one embodiment of a process for exporting a certificate.

FIG. 59B illustrates a sequence of steps carried out by Identity Server 40 to export a certificate in one version of the present invention. Identity Server 40 receives a user request via Web Server 20 to export a certificate from certificate data store location 2082 (step 3420). Identity Server 40 determines whether to check the status of the requested certificate (step 3422). In one implementation, Identity Server 40 makes this determination by querying a parameter field in the Identity System. This parameter field can be set by a system administrator during system configuration.

If a status check is not required, Identity Server 40 exports the requested certificate to the user via Web Server 20 (step 3434). Otherwise, Identity Server 40 determines whether a real time status check of the certificate is required (step 3424). Identity Server 40 also makes this determination in one embodiment by querying an Identity System parameter field. If a real time status check is required, Identity System 40 retrieves the requested certificate's real time status from Certificate Authority 2084, as described above with reference to FIG. 59A. In some embodiments, Identity Server 40 also stores the retrieved real time certificate status and related validation information as shown in FIG. 59A. Identity Server 40 determines whether the certificate's real time status is valid (step 3430). If the status is valid, Identity Server 40 exports the certificate (step 3434). Otherwise, Identity Server 40 issues an error message to the user (step 3432).

If real time status checking was not required (step 3424), Identity Server 40 determines whether the user's export request falls within the Validation Interval for the certificate (step 3428). As explained above, the Validation Interval is a window of time extending from the last time the certificate's real time status was retrieved. In one embodiment, the Validation Interval is one hour. In various embodiments, the Validation Interval has many different values. As the Validation Interval is reduced, the probability increases that the stored real time status for the certificate is still accurate. If the export request falls within the Validation Interval, Identity Server 40 exports the requested certificate (step 3434). Otherwise, Identity Server 40 issues an error message to the user (step 3432). By employing stored real time certificate status, Identity System 40 can supply real time status for large numbers of certificates. In one embodiment, the Validation Interval is zero for a certificate that is not valid-resulting in Identity Server 40 issuing an error message in response to the determination in step 3428.

Figure 59C:
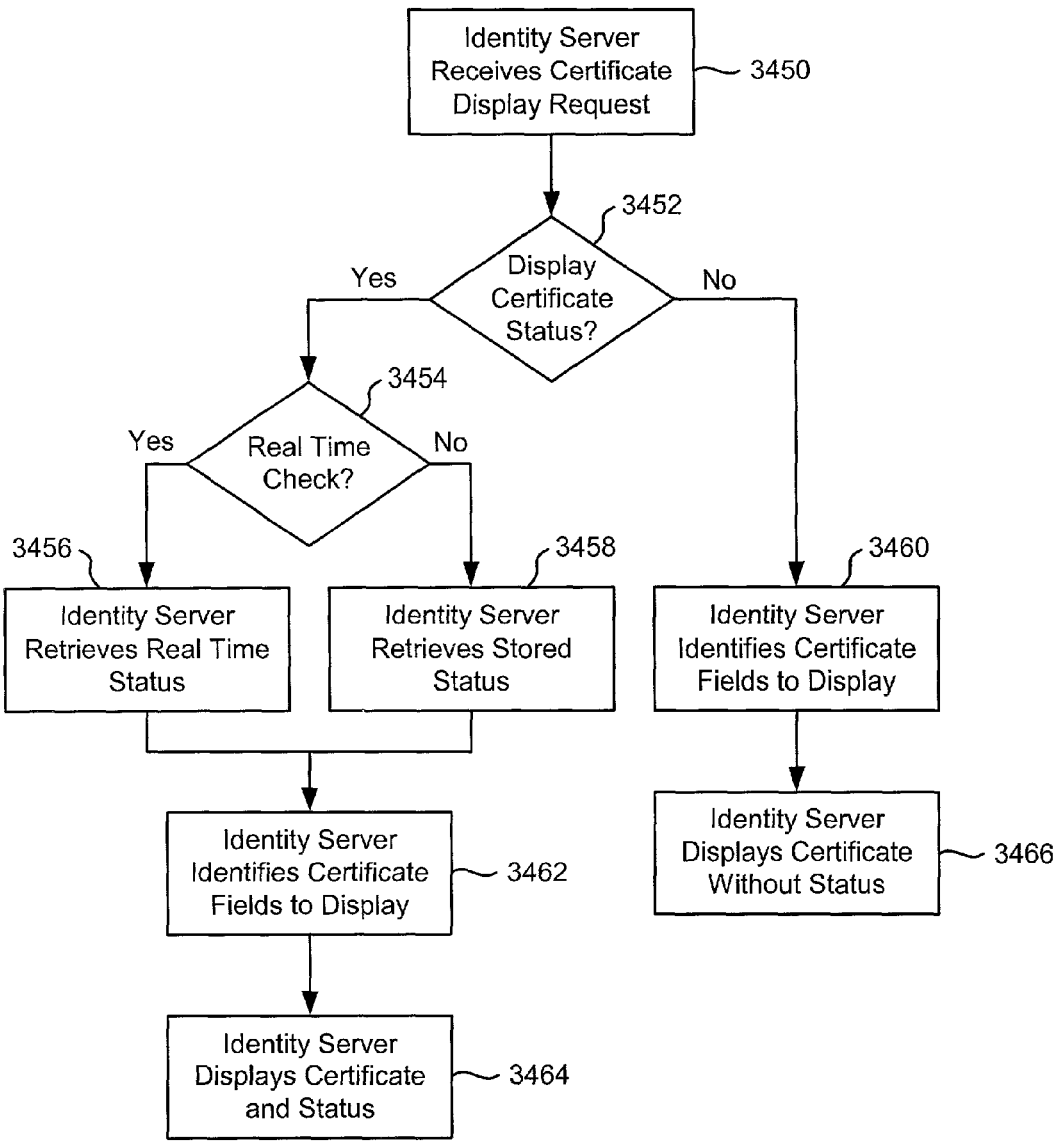
FIG. 59C is a flow chart describing one embodiment of a process for displaying certificate information.

FIG. 59C illustrates a sequence of steps executed by Identity Server 40 to display certificate information in one embodiment of the present invention. Identity Server 40 receives a user request via Web Server 20 to display a certificate in data store location 2082 (step 3450). Identity Server 40 determines whether certificate status is to be displayed along with the certificate (step 3452). In one implementation, Identity Server 40 makes this determination by querying a parameter field in the Identity System set by the Identity System administrator.

If certificate status is not required (step 3452), Identity Server 40 identifies the fields in the requested certificate that are to be displayed (step 3460). Identity Server 40 identifies these fields in one embodiment by querying a set of parameters in the Identity System that are programmed by the Identity System administrator. Identity System 40 then displays the identified fields from the certificate without any certificate status (step 3466).

If certificate status is required (step 3452), Identity Server 40 determines whether a real time certificate status check is required (step 3454). Identity Server 40 makes this determination in one implementation by querying an Identity System parameter field. If a real time status check is required, Identity Server 40 retrieves a new real time status for the certificate (step 3456), as described above with reference to FIG. 59A. In some implementations, Identity Server 40 also stores the status and validation information as shown in FIG. 59A. If a real time status check is not required (step 3454), Identity Server 40 retrieves previously obtained real time status that is stored in the Identity System for the certificate (step 3458).

Identity Server 40 identifies the fields in the requested certificate that are to be displayed after obtaining certificate status in real time or from storage (step 3462). Identity Server 40 then displays the identified fields for the certificate and the certificate's status (step 3464).

The operations described above in FIGS. 59A-59C can also be employed to provide users with dynamic certificate related information other than certificate status. Examples of other dynamic information include certificate policies and certificate costs.

The discussions above regarding workflows, groups, communication between Identity Servers, etc., primarily pertain to managing and using the Identity System. As stated above, the Identity System manages identity profiles. These identity profiles are used, among other things, to authenticate users and to authorize users to access resources. The Access System has primary responsibility for providing authentication and authorization services. In one embodiment, authentication and authorization services are performed based on using identity profiles with authentication and authorization rules. These authentication and authorization rules are associated with policy domains and policies, as described above.

Figure 60:
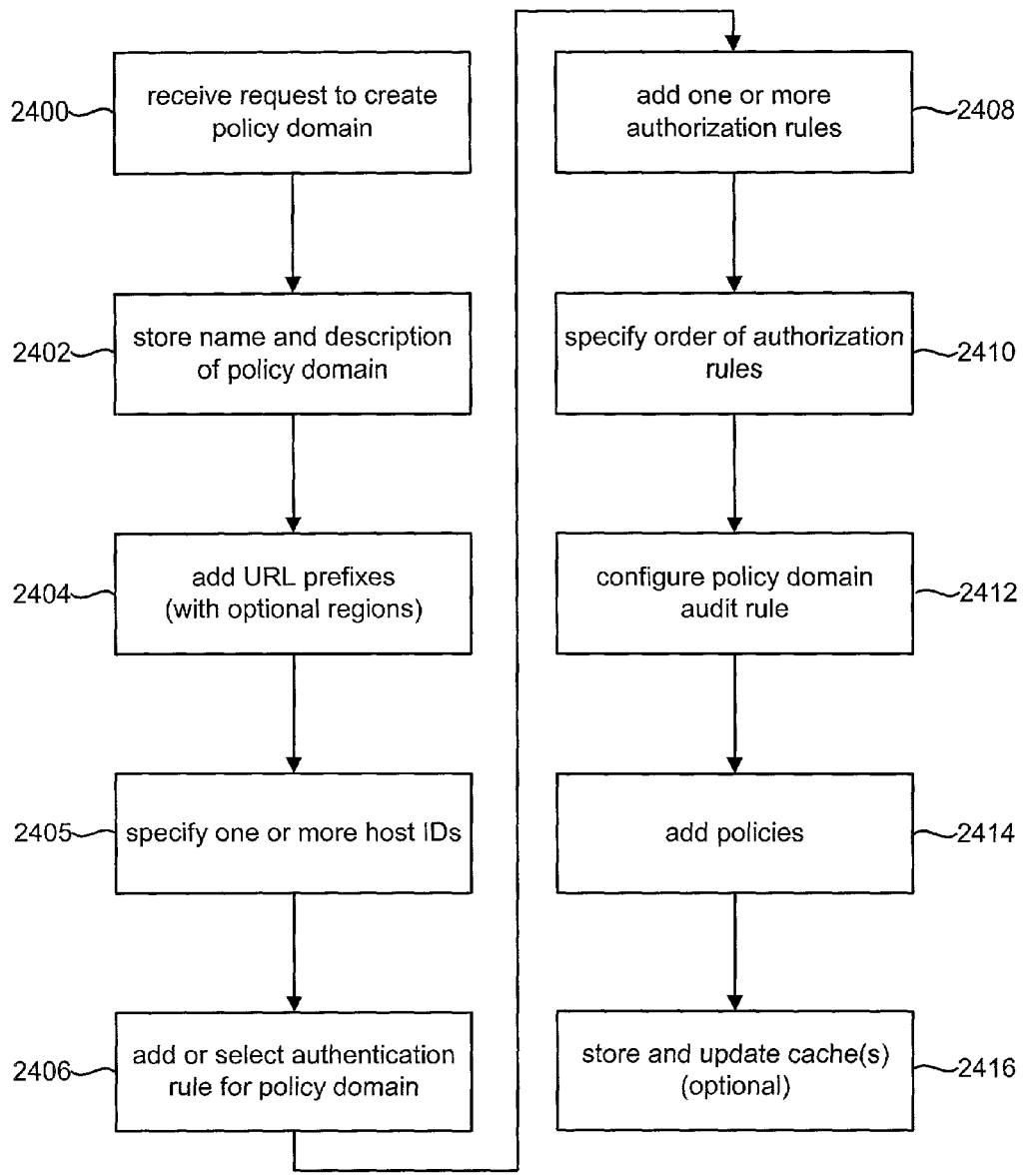
FIG. 60 is a flow chart describing a process for creating a policy domain.

FIG. 60 is a flow chart, which describes the process of creating a policy domain. In step 2400, the Access System receives a request to create a policy domain. In step 2402, the name of the policy domain and the description of the policy name are stored. In step 2404, one or more URL prefixes are added to the policy domain. In step 2405, one or more host ID's are added to the policy domain (optional). Next, one or more access rules are added to the policy domain (steps 2406 and 2408). An access rule is a rule about accessing a resource. Examples of access rules include authorization rules, authentication rules, auditing rules, and other rules, which are used during the process of attempting to access a resource.

In step 2406, a first level (default) authentication rule is added to the policy domain. In general, authentication is the process of verifying the identity of the user. Authentication rules specify the challenge method by which end users requesting access to a resource in the policy domain must prove their identity (authentication). As previously discussed, first level (default) authentication rules apply to all resources in a policy domain, while second level authentication rules are associated with policies that apply to subsets of resources or specific resources in the policy domain. In one embodiment, there is only one default authentication rule for a policy domain. If an administrator desires an authentication rule to apply to only a specific resource in the policy domain, a separate policy for that specific resource having a second level (specific) authentication rule should be defined.

After setting up the authentication rule in step 2406, one or more first level or default authorization rules are added to the policy domain in step 2408. In general, an authorization rule determines who can access a resource. The default authorization rule allows or denies users access to resources within its applicable policy domain. If multiple authorization rules are created, then they are evaluated in an order specified in step 2410. In step 2412, a first level (default) audit rule is configured for the policy domain. In step 2414, zero or more policies are added to the policy domain. In step 2416, the data for the policy domain is stored in Directory Server 36 and appropriate caches (optional) are updated. In one embodiment, an authorization rule or an authentication rule can be set up to take no action. That is, always grant authentication without any challenge or verification; or always grant authorization without any verification.

FIG. 61 is a flow chart describing the process of adding one or more authorization rules to a policy domain. In step 2432, timing conditions are set up for the authorization rule. Timing conditions restrict the time when the authorization rule is in effect. For example, users can be allowed access to URLs in the policy domain only during business hours, Monday through Friday. In one embodiment, if timing conditions are not set, the authorization rule is always in effect. The timing conditions for establishing the time a rule is valid include: (1) selecting a start date and an end date, (2) selecting a start time and an end time, (3) selecting the months of the year, (4) selecting the days of the month, and (5) selecting days of the week.

In steps 2434 and 2436, authorization actions are set up. Authorization actions personalize the end user's interaction with the Web Server. In step 2434, header variables are provided for authorization success events and authorization failure events. This feature allows for the passing of header variables about the end user (or other information) to other web-enabled resources. Web-enabled applications can personalize the end user's interaction with the Web Server using these header variables. As a simple example, the actions could supply each application with the user's name. An application could then greet the user with the message "hello <user's name>" whenever the user logs on. Header variables are variables that are part of an HTTP request. If an authorization rule is set up with header variables as part of an authorization success action, a successful authorization causes the HTTP request to the resource to include the header variables. Similarly, if there are header variables for an authorization failure, an authorization failure event includes adding header variables to the HTTP request that redirects a browser to an authorization failure web page. The resources identified by the HTTP requests that include the header variables can use the header variables any way desired. In one embodiment of the method of FIG. 61, one or more groups can be specified for authorization to the resource(s).

FIG. 62 is a flow chart that describes the process of adding header variables to an HTTP request. Header variables can be added during an authorization success event, authorization failure event, authentication success event or authentication failure event. In step 2450, the variable name is entered. In step 2452, a text string is entered. In step 2454, one or more LDAP attributes are entered. In step 2456, it is determined whether any more header variables will be added. If not, the method of FIG. 62 is done (step 2458). If so, the method of FIG. 62 loops back to step 2450.

The variable name entered in step 2450 is a value that appears in the HTTP header to name the variable. The downstream resource using the header variable searches for the variable name. The string entered is data that can be used by the downstream resource. The LDAP attribute(s) can be one or more attributes from the requesting user's identity profile. Thus, the following can occur in the simple authorization success example described above: (1) the variable name field can include "authorization success," (2) the return field can include "yes," and (3) the attribute field can include the name attribute for the user in the user's identity profile. Any of the attributes from the user's identity profile can be selected as a header variable.

Looking back at FIG. 61, in step 2436, a redirect URL can be added for an authorization success event and a redirect URL can be entered for an authorization failure event. Step 2438 includes specifying the users allowed to access the resource associated with the authorization rule. By default, users cannot access a resource until they are granted access rights. In one embodiment, there are at least four means for specifying who can access a resource. The first means is to explicitly name a set of users who can access the resource. A second means includes identifying user roles. The third means is to enter an LDAP rule that can be used to identify a set of users based on a combination of one or more attributes. A fourth means is to enter an IP address, which allows users of computers having the specified IP address to access the resource.

Step 2440 is used to specify the users not allowed to access the resource associated with this rule. Identification of users, roles, LDAP rules, and IP addresses are entered in step 2440 in the same manner as entered in step 2438. It is possible that a particular user can be subject to both an allow access rule and a deny access rule. Step 2442 is used to set a priority between such rules. Optional step 2444 is used to define any POST data to be used for authorization if this feature is implemented. An HTTP POST request can include POST data in the body of the HTTP request. POST data can also be submitted in query string form. One embodiment of the present invention allows POST data to be used for authorization purposes.

In optional step 2444, an administrator defines which POST data is to be used for authorization purposes. If POST data is to be used for authorization to satisfy an authorization rule, the POST request must include all the appropriate POST data and values for that POST data as defined in step 2444.

However, it will be understood that POST data need not be used for authorization in all embodiments of the present invention. Step 2446 is used to set a priority of evaluation for the authorization rule relative to other authorization rules in a given policy. In one embodiment, if multiple authorization rules apply to a resource, this priority determines the order of evaluation.

Figure 63:
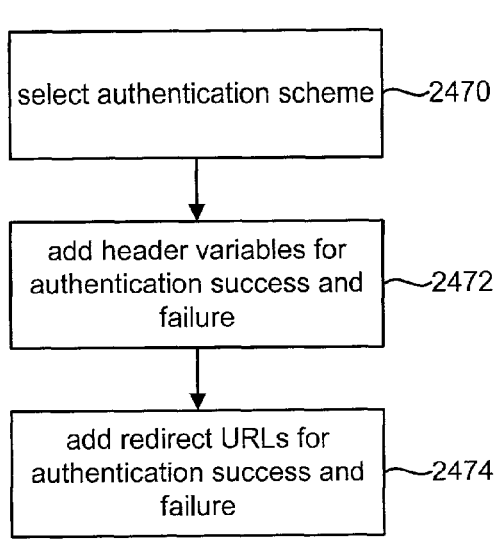
FIG. 63 is a flow chart describing a process for adding an authentication rule.

FIG. 63 is a flow chart describing the process for adding an authentication rule. In step 2470, a challenge scheme (also called an authentication scheme) is selected. An authentication scheme is a method for requesting log-on information (e.g. name and password) from end users trying to access a web resource. Within an authentication scheme is a challenge method (e.g. Basic, certificate or form). There can be more than one authentication scheme with the same challenge method (e.g. Basic over LDAP, Basic over NT Domain, ... ). Various other authentication schemes can also be used. In step 2472, header variables are added for authentication success and authentication failure events. In step 2474, redirect URLs are added for authentication success events and authentication failure events.

Figure 64:
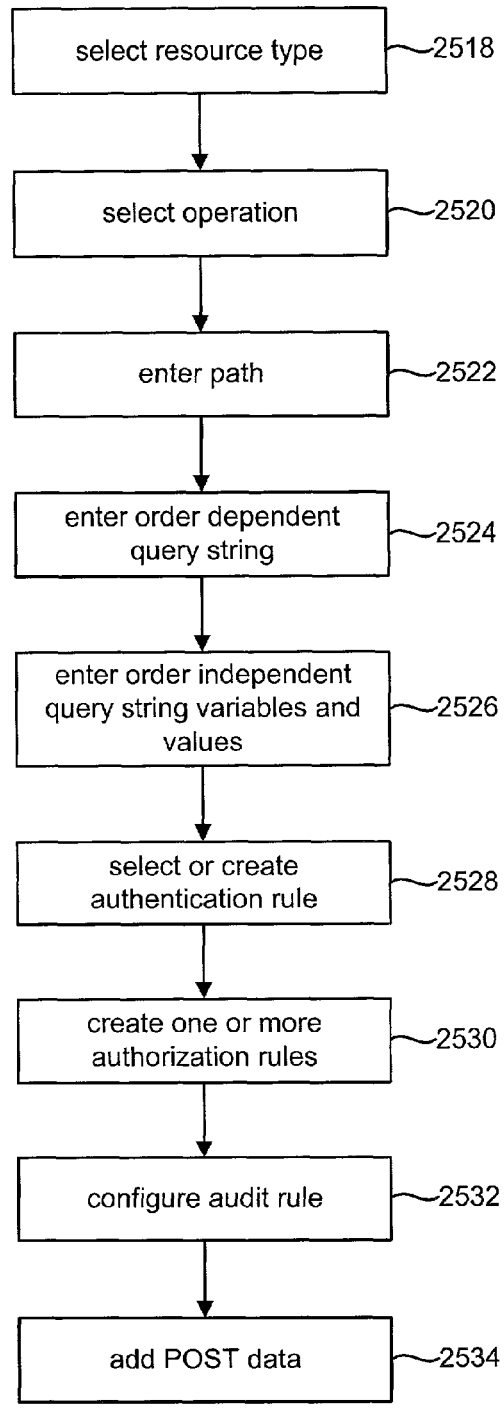
FIG. 64 is a flow chart describing a process for creating a policy.

FIG. 64 is a flow chart describing the process of adding a policy. In step 2518, a resource type is specified. The resource type allows different resources to be handled by different policies, depending on the nature of the resource itself. For example, in one embodiment, the resource type will distinguish between resources accessed using HTTP and resources accessed using FTP. In one embodiment, Enterprise Java Beans (EJBs) are a possible resource type. In another embodiment, user-defined custom resource types are supported. In step 2520, an operation type is specified. This allows different resources to be handled by different policies, depending on the operations used to request the resource. In one embodiment, the operations will be HTTP requests. Supported HTTP request methods include GET, POST, PUT, HEAD, DELETE, TRACE, OPTIONS, CONNECT, and OTHER. In another embodiment, if EJBs are identified as the resource type, an EXECUTE operation can be specified in step 2520. In another embodiment, user-defined custom operations are supported. Other and future operations can also be supported.

In step 2522, a pattern for the URL path (or other type of path) to which the policy applies is specified. This is the part of URL that does not include the scheme ("http") and host/domain ("www.oblix.com"), and appears before a '?' character in the URL. In step 2524, a query string is specified. This is a set of variables and values that must be included in the specified order in an incoming URL for the policy to match and be activated. For example, in the URL "HTTP://www.zoo.com/animals.cgi?uid=maneaters&tigers=2" the values after the question mark (e.g. "uid=maneaters&tigers=2") comprise a query string. Only a URL exhibiting the query string can match to this policy. For example, a URL with the "tigers" variable appearing before the "uid" variable will not match the above-identified policy.

In step 2526, query string variables are added. Query string variables include a name of a variable and the variable's corresponding value. Query string variables are used when it is desirable for multiple variables to be found in the query string, but the order is unimportant. Thus, for a policy with query string variables "uid=maneaters" and "tigers=2," a URL with a query string having the appropriate uid and appropriate tigers variable, in any order, will match the policy. In order for a resource URL to apply to a policy, the path of the requested resource URL must match the path of the policy as well as any query string or query variables. As discussed above, POST data can be submitted in query string form (for example, in a form submission), and evaluated using the query string variables entered in step 2526.

The query string or query variables specified in the steps of FIG. 64 do not need to uniquely identify a resource. Rather, they are used to identify a policy, which may apply to one or more resources.

Typically, the query data is added to a URL to access certain data from a resource. However, the query data can be used in the URL to identify the resource. Each application or resource is free to use the query data in any way that is in agreement with standards and norms known in the art.

In step 2528 of FIG. 64, the authentication rule is created in accordance with the method of FIG. 63. In step 2530, one or more authorization rules are created for the policy in accordance with the method of FIG. 61. In step 2532, an audit rule for the policy is configured. In step 2534, POST data (optional) is added to the policy. This POST data is used to map resources with policies.

The present invention supports the use of multiple authentication schemes. An authentication scheme comprises an authentication level, a challenge method, an SSL assertion parameter, a challenge redirect parameter, and authentication plug-ins. The authentication level represents an arbitrary designation of the level of confidence that an administrator has in a particular authentication scheme relative to other authentication schemes.

In one embodiment of the present invention, an authentication scheme can specify one of four challenge methods: none, basic, form, and X.509. If an authentication scheme's challenge method is set to "none," no authentication is required to access a requested resource, thus allowing support for unauthenticated users. This challenge method can be used over both unsecured as well as SSL connections. The "basic" challenge method can also be used over both unsecured and SSL connections. The "X.509" challenge method can be used over an SSL connection between a user's browser and Web Server host. A "form" challenge method employs a custom, site-specific HTML form presented to the user, who enters information and submits the form. Subsequent processing is determined by the administrator at the time the authentication scheme is created. Form challenge methods can be used over both unsecured and SSL connections.

The SSL parameter of an authentication scheme identifies whether SSL is to be asserted on the connection to the user's browser by the Web Server. The challenge parameter identifies where to redirect a request for authentication for the particular authentication scheme. Authentication plug-ins are necessary for processing the user's supplied information. Authentication plug-ins can interface with Access Server 34 through an authentication API.

An authentication scheme that an attacker can easily and profitability eavesdrop upon is typically considered "weak." In one embodiment, the basic authentication challenge method places the user's credential (supplied information), a simple password, "in the clear" over an unsecured network connection. However, the authentication scheme can be made stronger by passing the user's credential over an encrypted connection, such as SSL. In one embodiment, given two authentication schemes (one with and one without SSL), an access administrator will assign the authentication scheme without SSL to a lower authentication level than the authentication using SSL.

When a user first requests a protected resource, the user is challenged according to either: (1) the authentication scheme defined by the first level authentication rule in the applicable policy domain, or (2) the second level authentication rule in the applicable policy associated with the requested resource.

If the user satisfies the authentication rule, an encrypted authentication cookie is passed to the user's browser indicating a successful authentication. Once authenticated, the user may request a second resource protected by a different policy domain and/or policy with a different authentication rule. The user is allowed access to the second resource without re-authenticating under the following condition: the authentication level of the authentication scheme used to successfully authenticate for the first resource is equal to or greater than the authentication level of the authentication scheme of the second resource. Otherwise, the user is challenged and asked to re-authenticate for the second resource in accordance with the second resource's higher level authentication scheme. Satisfaction of a higher or lower authentication level is determined by evaluating the authentication cookie sent by the user's browser when requesting the second resource. In one embodiment of the present invention, administrators can define an unlimited number of authentication levels.

Once authenticated, a user can explicitly log out, causing authentication cookies cached (or otherwise stored) by the user's browser to be destroyed or become invalid. Authentication cookies can also be set by an administrator to be destroyed after a maximum idle time has elapsed between requests to resources protected in accordance with the present invention.

Figure 65:
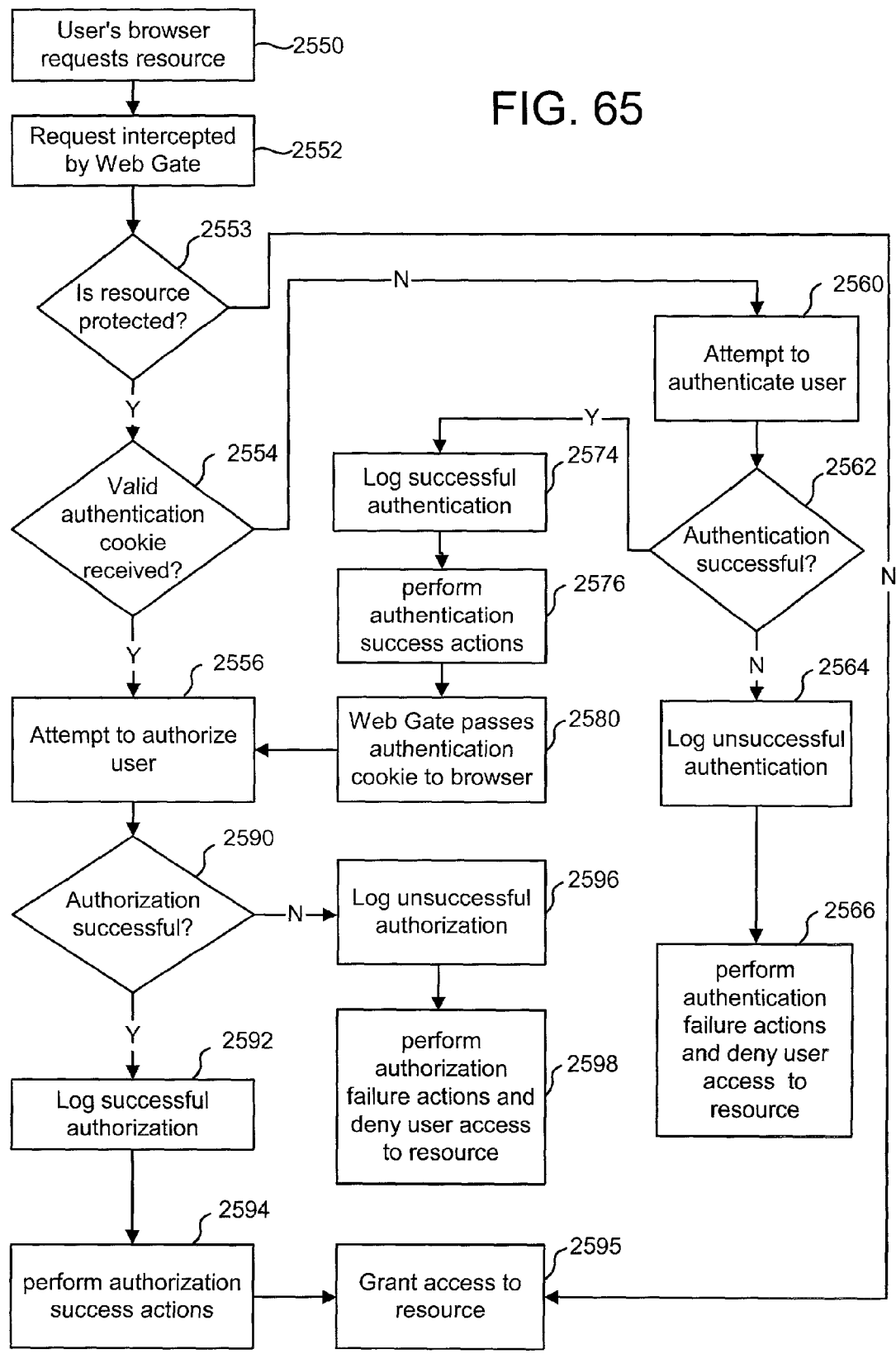
FIG. 65 is a flow chart describing an exemplar process performed by the Access System of one embodiment of the present invention.

FIG. 65 provides a flow chart for one embodiment of a method for authenticating, authorizing, and logging. In step 2550, a user's browser 12 requests a web-enabled resource 22 or 24. The request is intercepted by Web Gate 28 in step 2552. The method then determines whether the requested resource is protected by an authentication and/or authorization rule in step 2553. If the resource is not protected, then access is granted to the requested resource in step 2595. If the requested resource is protected, however, the method proceeds to step 2554. If the user has previously authenticated for a protected resource in the same domain, a valid authentication cookie is passed by browser 12 with the request in step 2550. The authentication cookie is intercepted by Web Gate in step 2552. If a valid cookie is received (step 2554), the method attempts to authorize the user in step 2556. If no valid authentication cookie is received (step 2554), the method attempts to authenticate the user for the requested resource (step 2560).

If the user successfully authenticates for the requested resource (step 2562), then the method proceeds to step 2574. Otherwise, the unsuccessful authentication is logged in step 2564. After step 2564, the system then performs authentication failure actions and Web Gate 28 denies the user access to the requested resource in step 2566. In step 2574, the successful authentication of the user for the resource is logged. The method then performs authentication success actions in step 2576. In response to the successful authentication, Web Gate 28 then passes a valid authentication cookie to browser 12 (step 2580), which stores the cookie. After passing the cookie in step 2580, the system attempts to authorize in step 2556.

In step 2556, the method determines whether the user is authorized to access the requested resource. If the user is authorized (step 2590), the method proceeds to step 2592. Otherwise, the unsuccessful authorization is logged in step 2596. After step 2596, the method performs authorization failure actions (step 2598) and Web Gate 28 denies the user access to the requested resource. If authorization is successful (step 2590), then the successful authorization of the user is logged in step 2592. Authorization success actions are performed in step 2594. The user is granted access to the requested resource in step 2595. In one embodiment of step 2595, some or all of HTTP request information is provided to the resource. In one or more scenarios, the resource being accessed is the Identity System.

Figure 66:
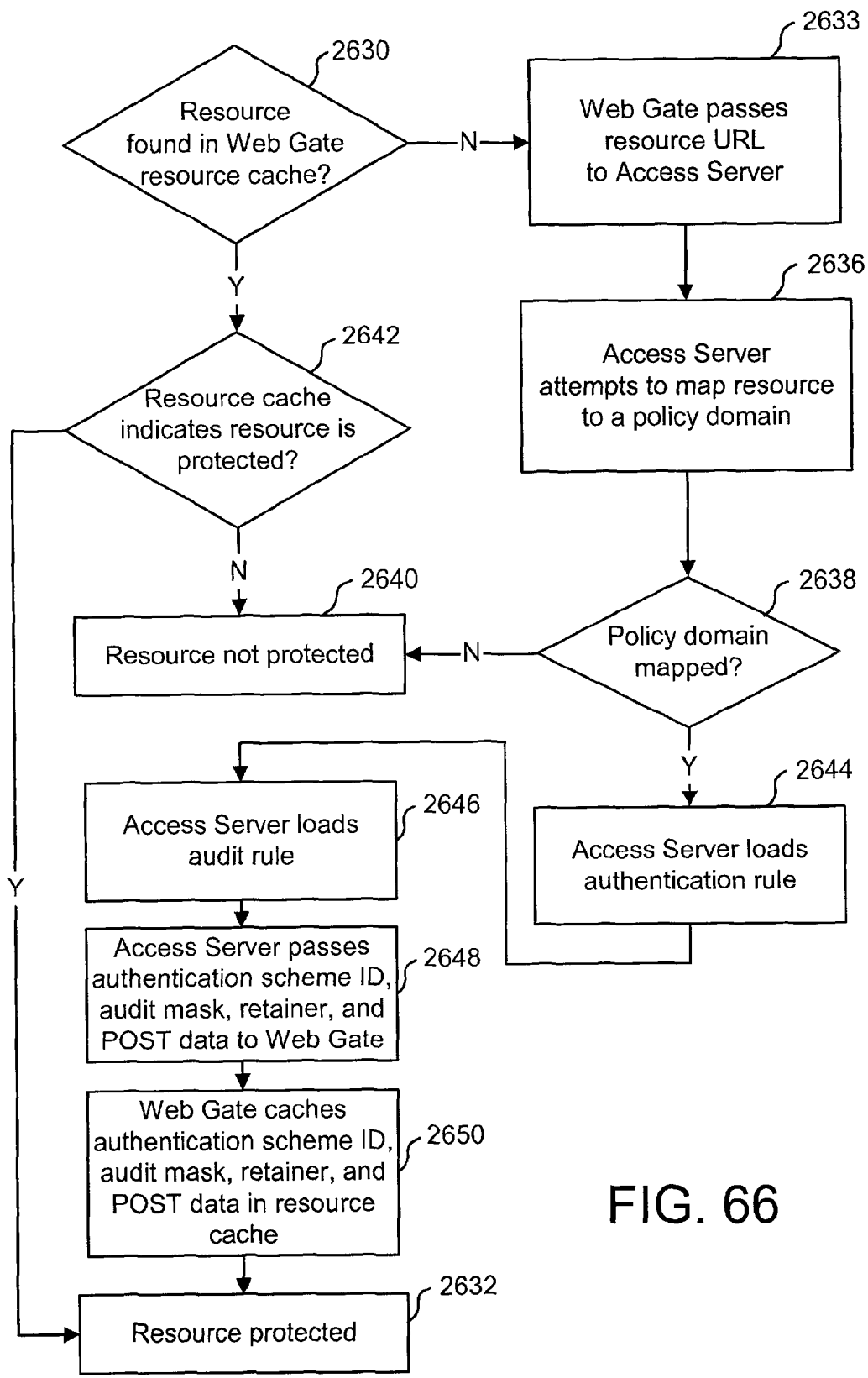
FIG. 66 is a flow chart describing a process for determining whether a particular resource is protected.

FIG. 66 provides a flow chart of a method for determining whether a requested resource is protected. In step 2630, Web Gate 28 determines whether an entry for the requested resource is found in a resource cache. If an entry is found, the cache entry is examined in step 2642 to determine whether the cache entry indicates that the resource is protected (step 2632) or unprotected (step 2640). If an entry for the requested resource is not found in the resource cache, then Web Gate 28 passes the URL of the requested resource request method to Access Server 34 in step 2633. Access Server 34 attempts to map the requested resource to a policy domain (step 2636).

If mapping step 2636 is unsuccessful (step 2638), then the requested resource is deemed to be unprotected (step 2640). However, if a successful mapping has occurred (step 2638), then Access Server 34 retrieves the authentication rule (step 2644) and audit rule (step 2646) associated with the requested resource. Access Server 34 then passes the authentication scheme ID from the authentication rule, audit mask, and any POST data received to Web Gate 28 in step 2648. Web Gate 28 caches the authentication scheme ID from the authentication rule, audit mask, and POST data in the resource cache (step 2650). Since the requested resource was successfully mapped to a policy domain in step 2636, the resource is deemed protected (step 2632).

Figure 67:
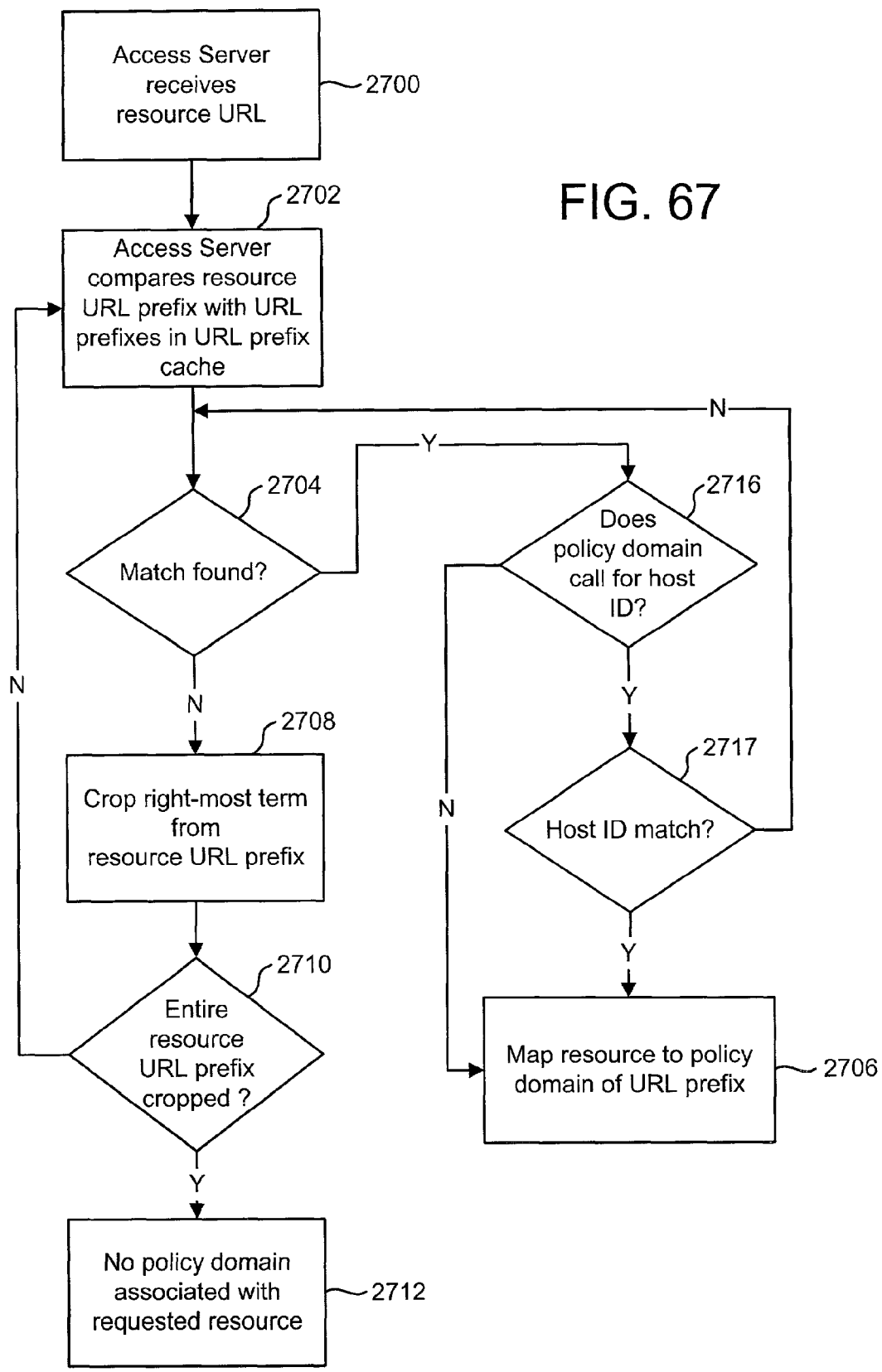
FIG. 67 is a flow chart describing a process for mapping a resource with a policy domain.

FIG. 67 is a flow chart describing the process for mapping a resource to a policy domain. In step 2700, Access Server 34 receives the URL of the requested resource from Web Gate 28. Access Server 34 then compares a URL prefix of the requested resource with entries in a URL prefix cache in step 2702. In one embodiment, when step 2702 is called for the first time, the URL prefix of the requested resource equals the file name. Thus, if the URL of the requested resource reads: "http://www.oblix.com/oblix/sales/index.html" then the URL prefix first compared by step 2702 will be: "/oblix/sales/index.html." If a matching URL prefix is found (step 2704), Access Server 34 proceeds to step 2716.

In step 2716, Access Server 34 determines whether the policy domain associated with the matching URL prefix calls for one or more host ID's. In one embodiment, resources are mapped to certain policy domains if the port number of a resource request and the location of the resource itself conform to one or more host ID's. Thus, multiple policy domains can be associated with identical URL prefixes, each policy domain requiring different host ID's (or none at all). If the policy domain considered in step 2716 requires a matching host ID, then Access Server 34 proceeds to step 2717. Otherwise, Access Server 34 proceeds directly to step 2706 where the requested resource is mapped to the policy domain associated with the currently considered URL prefix. In step 2717, if a matching host ID is found, Access Server 34 proceeds to step 2706. If no matching host ID is found, Access Server 34 returns to step 2704 where it determines whether additional matching URL prefixes exist.

If no matching URL prefix is found in step 2704, then Access Server 34 proceeds to step 2708. In step 2708, Access Server 34 crops the right-most term from the resource URL prefix compared in step 2702. Thus, if the resource URL prefix compared in step 2702 reads: "/oblix/sales/index.html" then the resource URL prefix will be cropped in step 2708 to read: "/oblix/sales." If the entire resource URL prefix has been cropped in step 2708 such that no additional terms remain (step 2710), then the method proceeds to step 2712 where Access Server 34 concludes that there is no policy domain associated with the requested resource. However, if one or more additional terms remain in the resource URL prefix, then the method returns to step 2702 where the cropped URL prefix is compared with URL prefixes cached in the URL prefix cache.

As will be apparent from FIG. 67, the method recursively performs steps 702, 2704, 2708, and 2710 until either a match is found (step 2704) or the entire resource URL prefix has been cropped (step 2710). In any case, the method of FIG. 67 will inevitably return either a successful mapping (step 2706) or no mapping (step 2712).

Figure 68:
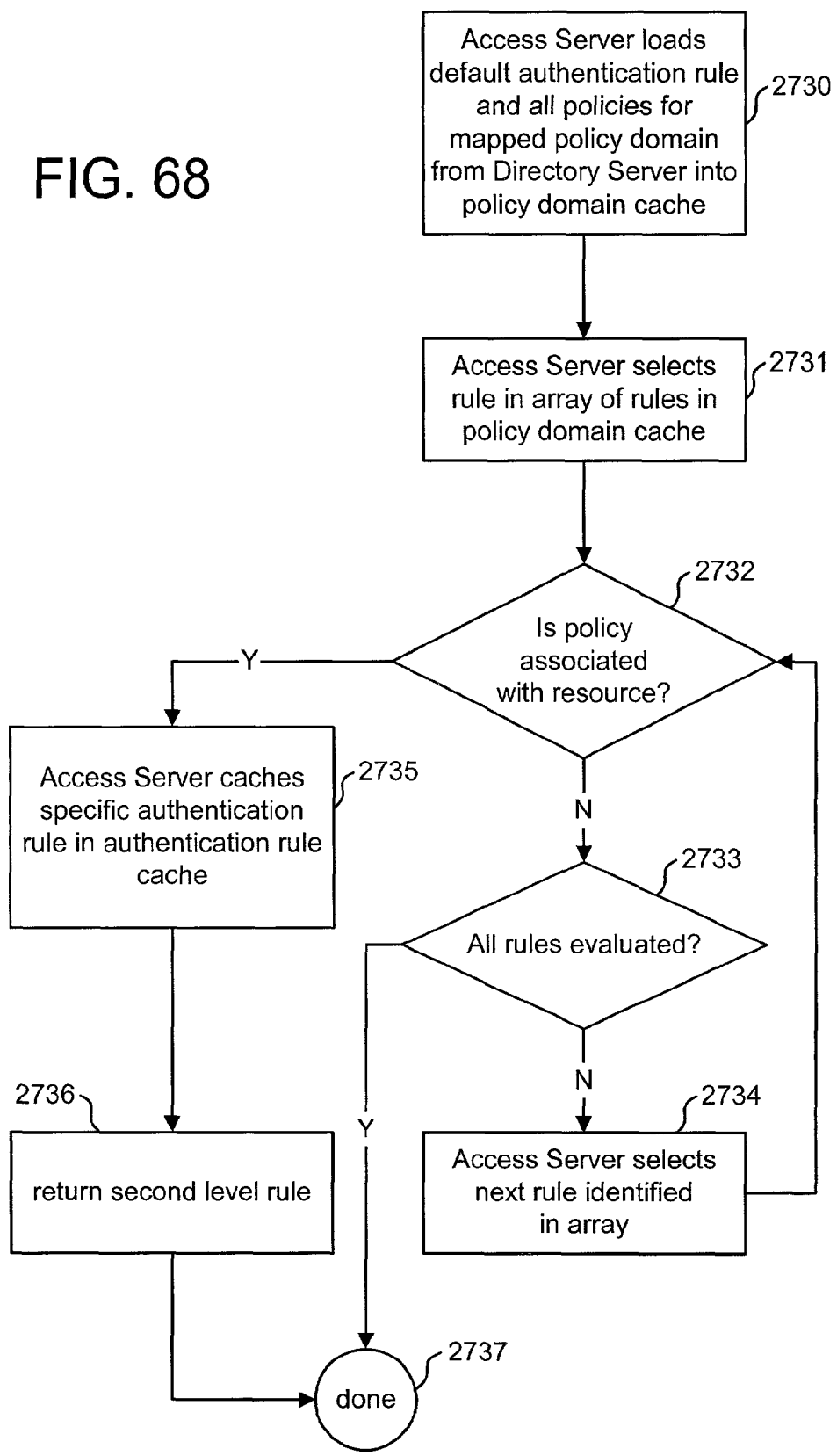
FIG. 68 is a flow chart describing a process for retrieving first and second level authentication rules.

FIG. 68 provides a flow chart describing a method for loading an authentication rule. In step 2730, Access Server 34 loads the first level (default) authentication rule for the policy domain mapped in step 2636 of FIG. 66 from Directory Server 36 into an authentication rule cache. In one embodiment, success and failure actions are part of authentication and authorization rules. In this step, Access Server 34 also builds an array of all second level rules and patterns associated with each of the policies for the policy domain. Access Server 34 then selects a second level rule in the array (step 2731). The selected second level rule is part of a policy. In step 2732, Access Server 34 performs a pattern matching method for determining whether the rule applies to the requested resource. If so, then Access Server 34 proceeds to step 2735; otherwise, Access Server 34 determines whether all rules in the array have been evaluated (step 2733). If, in step 2733, it is determined that not all of the rules in the array have been evaluated, then Access Server 34 selects the next rule in the array (step 2734) and returns to step 2732. Once all rules in the array have been considered (step 2733), the first level authentication rule previously loaded in step 2730 is returned as the authentication rule. No second level authentication rule is loaded into authentication rule cache, and the method of FIG. 68 is done (step 2737). If an associated policy was found in step 2732, then the system caches the second level authentication rule, and success and failure actions for the rule in the authentication rule cache (step 2735), returns that second level authentication rule (step 2736), and the method is done (step 2737).

Figure 69:
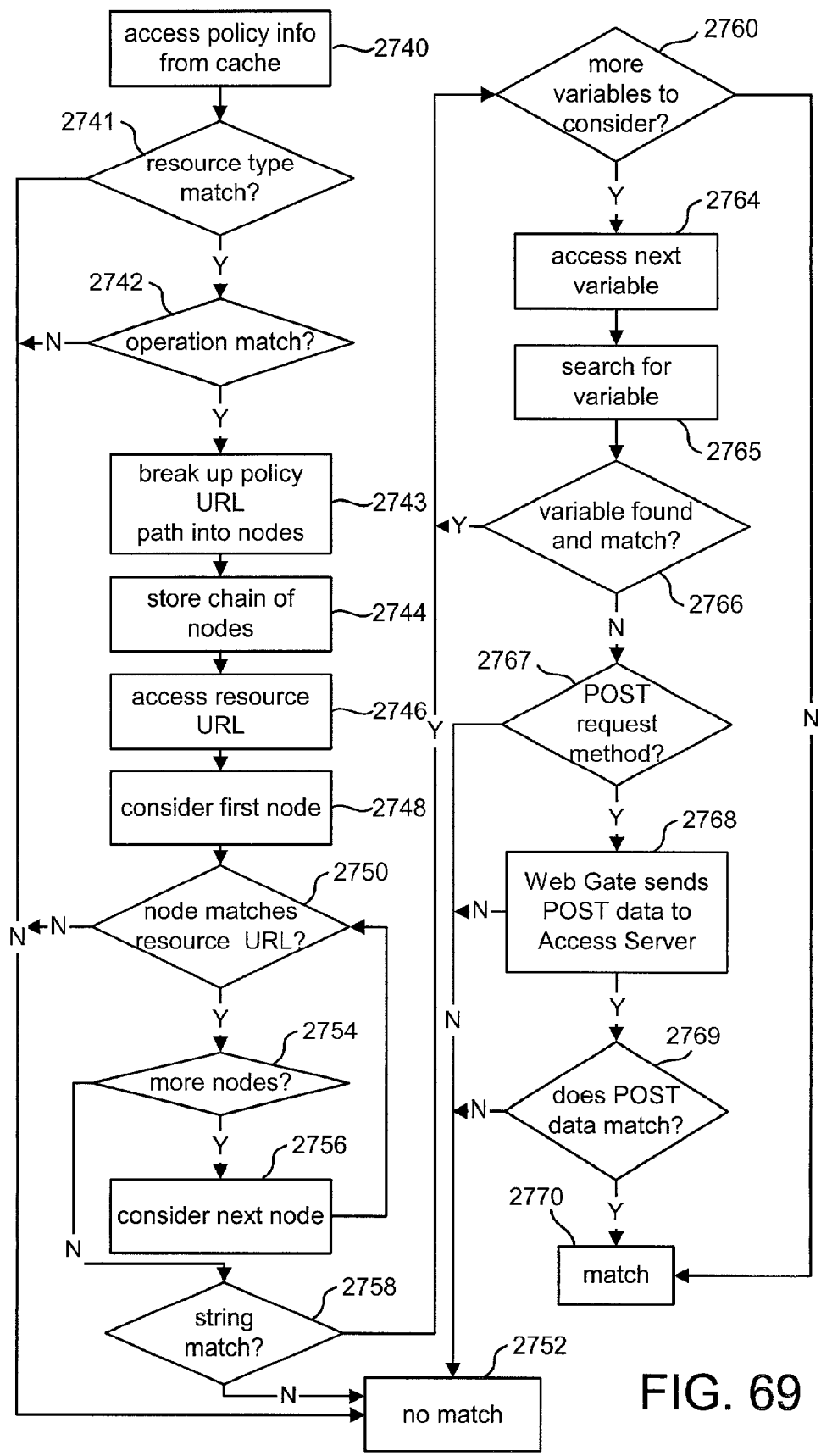
FIG. 69 is a flow chart describing a process for determining whether a resource URL matches a specific policy URL.

FIG. 69 is a flow chart describing a method for determining whether a policy is associated with a resource. A policy URL can contain the following three types of patterns:

1. Pattern on the path of the URL: This is the part of URL that does not include the scheme ("http") and host/domain ("www.oblix.com"), and appears before a '?' character in the URL. In the example URL:

http://www.oblix.com/oblix/sales/ index.html?user=J.Smith&dept=engg the absolute path is "/oblix/sales/index.html."

2. Pattern on name value pairs in the URL: This may be a set of patterns. They apply to query data (data appearing after the '?' character in the URL when operation is GET, or the POST data if operation is POST) and are configured as name (no pattern allowed) plus a pattern or value. For example:

| variable name | pattern |
| --- | --- |
| user | *Smith |
| dept | *sales* |

If multiple name value pairs are specified, they all must match to the incoming resource URL. So the URL:

http://www.oblix.com/oblix/sales/ index.html?user=J.Smith&dept=engg will not match this pattern set. This pattern does not include a notion of order to these name-value pairs. A URL:

http://www.oblix.com/oblix/sales/ index.html?dept=sales&user=J.Smith (with reverse order of "dept" and "user") will also satisfy this pattern. This is important because it is usually difficult to control the order of name value pairs in GET/POST query data.

3. Pattern on the entire query string: This is useful when an administrator desires to enforce an order on the query string. For example, a pattern "user=*Smith*sales" will match query string "user=J.Smith&dept=sales."

A policy can contain one or more of above types of patterns. If multiple patterns are specified in one policy, they ALL must match to the incoming resource URL. If not, that policy doesn't apply to the incoming resource URL.

Patterns used for one embodiment of the current invention can use the following special characters:

1. ?: Matches any one character other than '/'. For example, "a?b" matches "aab" and "azb" but not "a/b."

2. *: Matches any sequence of zero or more characters. Does not match '/'. For example, "a*b" matches "ab," "azb," and "azzzzzzb but not "a/b."

3. ["set"]: Matches one from a set of characters. "set" can be specified as a series of literal characters or as a range of characters. A range of characters is any two characters (including '-') with a '-' between them. '/' is not a valid character to include in a set. A set of characters will not match '/' even if a range which includes '/' is specified. Examples includes: "[nd]" matches only "n" or "d"; "[m-x]" matches any character between "m" and "x" inclusive; "[—b]" matches any character between "-" and "b" inclusive (except for "/"); "[abf-n]" matches "a," "b," and any character between "f" and "n" inclusive; and "[a-f-n]" matches any character between "a" and "f" inclusive, "-," or "n." The second "-" is interpreted literally because the "f" preceding it is already part of a range.

4. {"pattern1," "pattern2," . . . }: Matches one from a set of patterns. The patterns inside the braces may themselves include any other special characters except for braces (sets of patterns may not be nested). Examples includes: "a{ab,bc}b" matches "aabb" and "abcb"; "a{x*y,y?x}b" matches "axyb," "axabayb," "ayaxb," etc.

5. "/. . ./": Matches any sequence of one or more characters that starts and ends with the '/' character. Examples includes: "/ . . . /index.html" matches "/index.html," "/oblix/index.html," and "/oblix/sales/index.html," but not "index.html," "xyzindex.html," or "xyz/index.html"; and "/oblix/ . . . /*.html" matches "/oblix/index.html," "/oblix/sales/order.html," etc.

6. "\": Any character preceded by a backslash matches itself. Backslash is used to turn off special treatment of special characters. Examples include "abc\*d" only matches "abc*d"; and "abc\\d" only matches "abc\d."

To increase the speed of pattern matching, the system tries to do some work up front. When Access Server 34 loads a pattern, it creates an object. This object's constructor "compiles" the pattern. This compiling is essentially building a simple state machine from one pattern to other, i.e., it creates a chain of "glob nodes." Each glob node consists of either one pattern or a node set. For example, consider pattern: / . . . /abc*pqr{uv,xy*}.

The chain would look like:

node("/ . . . /")--->node("abc")--->node("*")--->node("pqr")--->nodeset(node("uv"), (node("xy")--->node("*")))

Once the chain is constructed, it is used to match a resource URL to the pattern. Each node or node set in this chain takes a pointer to a string, walks it and decides if it matches the pattern held by the node. In doing so, it also moves this pointer further up in the string. For example, when the system gets a URL "/1/3/abcdepqrxyz," the system takes this string and starts walking the chain. Below is an example of evaluation at each node/node set and pointer (*p) in the string. Note that the original string is not modified. To begin with lets assume that the pointer points to the beginning of the string: *p->"/1/3/abcdepqrxyz.":

Step 1: node("/ . . . /")--->MATCHES--->advance *->"abcdepqrxyz."

Step 2: node("abc")--->MATCHES--->advance *p->"depqrxyz."

Step 3: node("*")--->* matches everything except special characters (unescaped '?,' '*,' '[,' '],' '{,' '},' '/'), so at this point, the system tries matching to the next node, node ("pqr") like this:
  a) does *p->"depqrxyz" match node ("pqr")? NO, advance *p->"epqrxyz."
  b) does *p->"epqrxyz" match node ("pqr")? NO, advance *p->"pqrxyz."
  c) does *p->"pqrxyz" match node ("pqr")? YES, advance *p->"xyz." If we walked to the end of string and didn't find a "pqr" (for example in case of URL "/1/3/abcdefgh") there is no match.

Step 4: nodeset(node("uv"), (node("xy")--->node("*"))): A nodeset will match an incoming string (in the example, *p->"xyz") to one of the set members. In this case "xyz" does not match "uv," but it does match "xy*." So there is a MATCH and *p->'\0.'

Step 5: The pointer is at the end of the string. So the match is successful.

At any point, if the system finds a node that does not match its string, the system stops processing and concludes that the string does not match the pattern. For example, a URL "/1/3/dddddd" will clear step 1 above, but will fail step 2, so the matching stops after step 2.

Referring to FIG. 69, in step 2740, Access Server 34 retrieves the policy information from a policy domain cache, which cache's data from the directory server. The policy information can include one or more of the following: a URL absolute path, a query string, and zero or more query variables. In step 2741, Access Server 34 determines whether the requested resource matches the policy resource type. If the resource type does not match, Access Server 34 skips to step 2752. However, if the resource type does match, Access Server 34 proceeds to step 2742. In step 2742, Access Server 34 determines whether the operation used to request the resource matches a policy operation type. If the operation type does not match, Access Server 34 skips to step 2752. If the operation type does match, Access Server 34 proceeds to step 2743.

In step 2743, the policy URL absolute path, query variables, and query strings are broken up into various nodes, as described above. In step 2744, the various nodes are stored. Access Server 34 accesses the requested resource URL in step 2746. In step 2748, the first node of the policy URL is considered by Access Server 34. In step 2750, Access Server 34 considers whether the considered node matches the resource URL, as described above. If the first node does not match, then the entire policy will not match (step 2752). If the node does match the resource URL, or if there is no nodes for the policy, then in step 2754 it is determined whether there are any more nodes to consider. If more nodes remain to be considered, then in step 2756 the next node is considered and the method loops back to step 2750. If there are no more nodes (step 2754), the query string for the policy is compared to the query string of the resource URL in step 2758. If the query string for the policy exactly matches the query string for the resource URL, or if there is no query string for the policy, then the method continues with step 2760. If the query string for the policy does not match the query string for the resource URL, then the resource URL does not match and is not associated with the policy (step 2752).

In step 2760, it is determined whether there are any query variables to consider that have not already been considered. If there are query variables to consider, then the next query variable is accessed in step 2764. The accessed query variable is searched for in the resource URL in step 2765. If the query variable is found in the resource URL and the value for the query variable matches the stored value query variable in for the policy (step 2766), then the method continues at step 2760; otherwise, Access Server 34 proceeds to step 2767. The purpose of steps 2760, 2764, 2765, and 2766 is to determine whether each of the query variables (and associated values) defined for a policy are found, in any order, in the resource URL. If all of the query variables are in the URL with the appropriate values, than there is a match (step 2770). In one embodiment, the query string and the query variables are in the portion of the URL following the question mark.

If, in step 2766, a match is not found, then it is determined whether a match may still be possible using POST data. In one embodiment, resources are mapped to policies by matching POST data submitted with resource requests. Thus, different policies can be associated with a given resource, depending on the contents of the POST data. For example, a user may request a resource during the course of submitting an online form containing POST data. Applicable policies can be mapped on the basis of POST data added to the policy. In step 2767, Access Server 34 determines whether the policy operation type is an HTTP POST request. If not, then there is no match (step 2752). However, if the operation type is an HTTP POST request, then Access Server 34 proceeds to step 2768 where Access Server 34 requests and receives the POST data from Web Gate 28. In one embodiment, Web Gate 28 transmits a flag with all POST requests forwarded to Access Server 34. When POST data is transmitted with an HTTP POST request, the flag is set. If no POST data is transmitted, then the flag is not set. In step 2769, Access Server 34 evaluates whether the POST data received in step 2768 matches the POST data required by the policy to achieve a match. If the POST data matches, then the method proceeds to step 2770. Otherwise, the method proceeds to step 2752.

An Internet domain can reside on a single Web Server, or be distributed across multiple Web Servers. In addition, multiple Internet domains can reside on a single Web Server, or can be distributed across multiple Web Servers. In accordance with the present invention, the Access System allows a user to satisfy the authentication requirements of a plurality of domains and/or Web Servers by performing a single authentication.

In the simplest case, all of an e-business host company's Web Servers will be in the same domain (i.e. oblix.com). When a user successfully authenticates at one of the Web Servers, the Web Gate running on the authenticating Web Server causes the Web Server to return an encrypted cookie, indicating a successful authentication. Subsequent requests by the browser to the domain will pass this cookie (assuming the cookie applies to the requested URL), proving the user's identity; therefore, further authentications are unnecessary.

In a more complex case, an e-business host company's web presence incorporates associated web sites whose Web Servers have names in multiple domains. In such a multiple domain case, each of the associated portal Web Servers use a Web Gate plug-in configured to redirect user authentication exchanges to the e-business host's designated web log-in Web Server. The user is then authenticated at the e-business host's web log-in server, and an encrypted cookie is issued for the e-business host's domain to the user's browser. The user's browser is then redirected back to the original associated portal's site where the Web Gate creates a new cookie for the associated portal's domain and returns it to the user's browser.

As a result, the user is transparently authenticated in both the original associated portal's domain and the e-business host's domain. The process is transparently performed for each different associated portal that a user may visit during a session. The present invention's associated portal support easily supports single Web Servers having multiple DNS names in multiple domains, and/or multiple network addresses. In accordance with the present invention, this multiple domain authentication enables "staging" of web sites. For example, a new edition of a web site can be deployed on a separate set of servers, and then mapped to policy domains protected by the present invention by simply updating the policy domain's host ID's.

Figure 70:
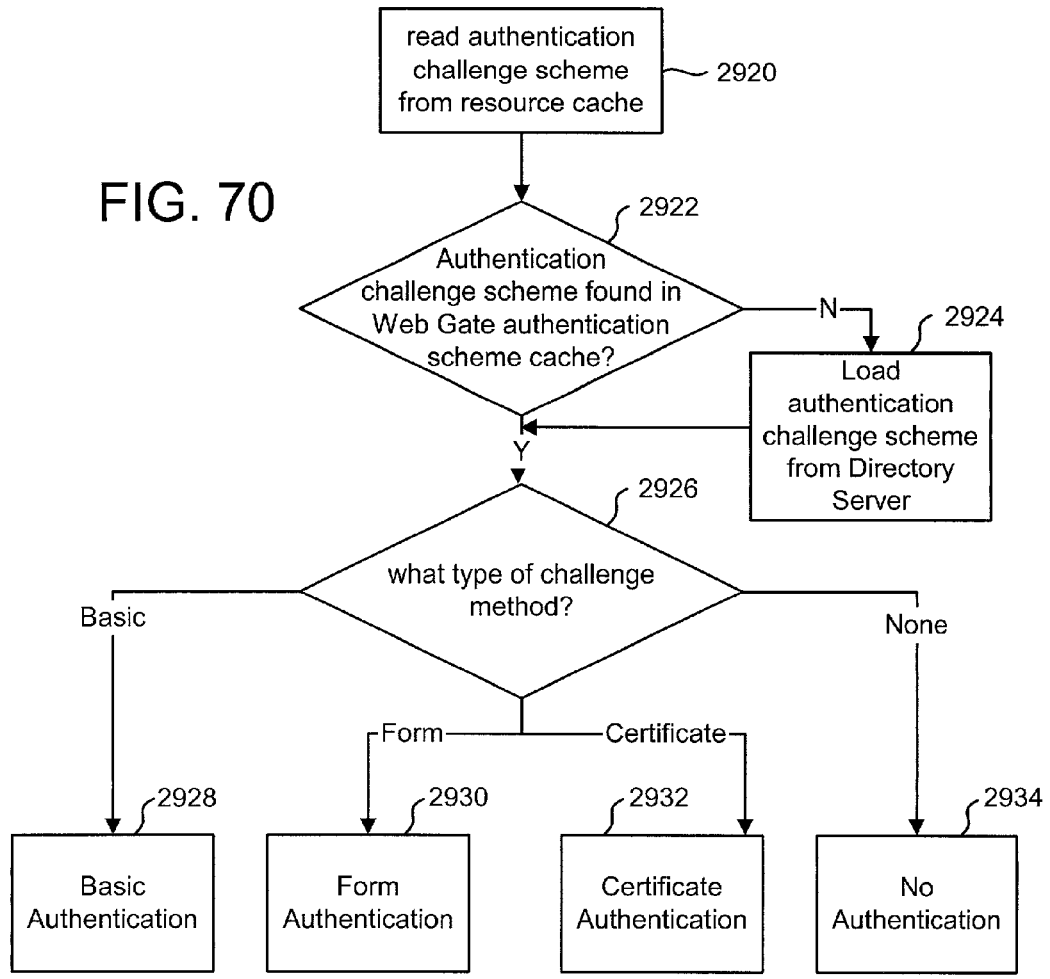
FIG. 70 is a flow chart describing authentication.

FIG. 70 provides a flow chart of one embodiment of a method for authenticating. In step 2920, the system accesses the resource cache (or the directory server) to determine what authentication challenge method is to be used for the given resource. The system then accesses the authentication scheme cache (or the directory server) in step 2922 to determine whether the authentication scheme associated with the requested resource has been previously cached. If the authentication scheme is found, then the system determines the specific type of challenge method in step 2926. If the challenge scheme was not found in step 2922, the system loads the authentication rule associated with the requested resource from Directory Server 36 in step 2924, and then proceeds to step 2926.

In step 2926, the system discerns whether the authentication challenge scheme retrieved calls for basic, form, certificate, or no authentication. If the challenge scheme indicates basic authentication, then the method proceeds to step 2928 and performs basic authentication. If the challenge scheme indicates form authentication, then the method proceeds to step 2930 and performs form authentication. If the challenge scheme indicates certificate authentication, then the method proceeds to step 2932 and performs certificate authentication. If the challenge scheme indicates that no authentication is required (step 2934), then the user is not challenged, authentication is not performed.

Figure 71:
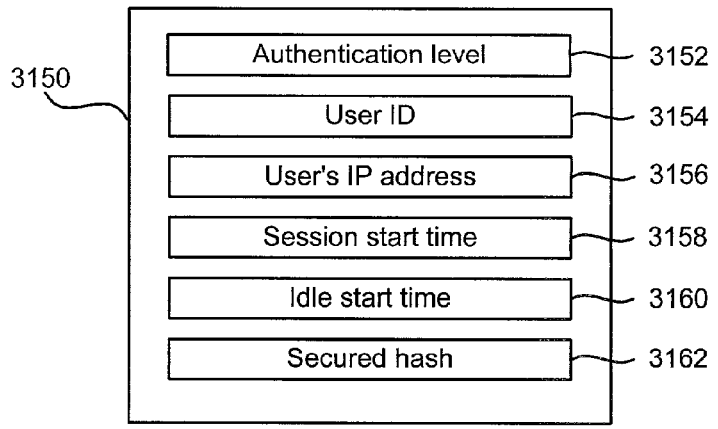
FIG. 71 is a block diagram depicting the components of one embodiment of a cookie.

FIG. 71 provides a block diagram of an authentication cookie 3150 passed by Web Gate 28 to browser 12 in step 2580 of FIG. 65. Cookie 3150 is encrypted with a symmetric cipher so that cookies from all instances of Web Gate 28 in a given deployment of the present invention may be encrypted using the same key. This key (called a shared secret) is stored on Directory Server 36 and distributed to each of the Web Gates 28 by Access Server 34. The shared secret can change as often as desired by an administrator. In one embodiment of the present invention, cookie 3150 is encrypted using RC4 encryption with a 2048 bit key. In one embodiment, previously valid keys are grandfathered such that both the current key and the immediately prior key will both work to de-crypt encrypted cookie 3150. The present invention features a one-button key re-generation function. This function is easily scriptable.

In one embodiment, the information stored by cookie 3150 includes: (1) the authentication level 3152 of the authentication scheme used to create the cookie, (2) the user ID 3154 of the authenticated user, (3) the IP address 3156 of the authenticated user, and (4) session start time 3158 identifying the time at which cookie 3150 was created. If the time elapsed since the session start time 3158 exceeds a maximum session time, the cookie will become invalid. Idle start time 3160 is also stored, which identifies the time when the previous HTTP request for a protected resource was made in which cookie 3150 was passed. If the time elapsed since the idle start time 3160 exceeds a maximum idle time, the cookie will become invalid. Both of these time limits force users to re-authenticate if they have left a session unattended for longer than the maximum session or idle times. In one embodiment, user ID 3154 stores the distinguished name for the authenticated user.

Cookie 3150 also stores a secured hash 3162 of information 3152, 3154, 3156, 3158, and 3160. In one embodiment of the present invention, secured hash 3162 is created using an MD5 hashing algorithm. Most Internet browsers cache a user's supplied authentication information during basic and certificate authentication challenge methods, and then transparently re-send the information upon receiving an authentication challenge from a Web Server. In one embodiment, an administrator can enable a form authentication challenge method requiring end users to re-authenticate upon expiration of the maximum session or maximum idle time limits.

Figure 72:
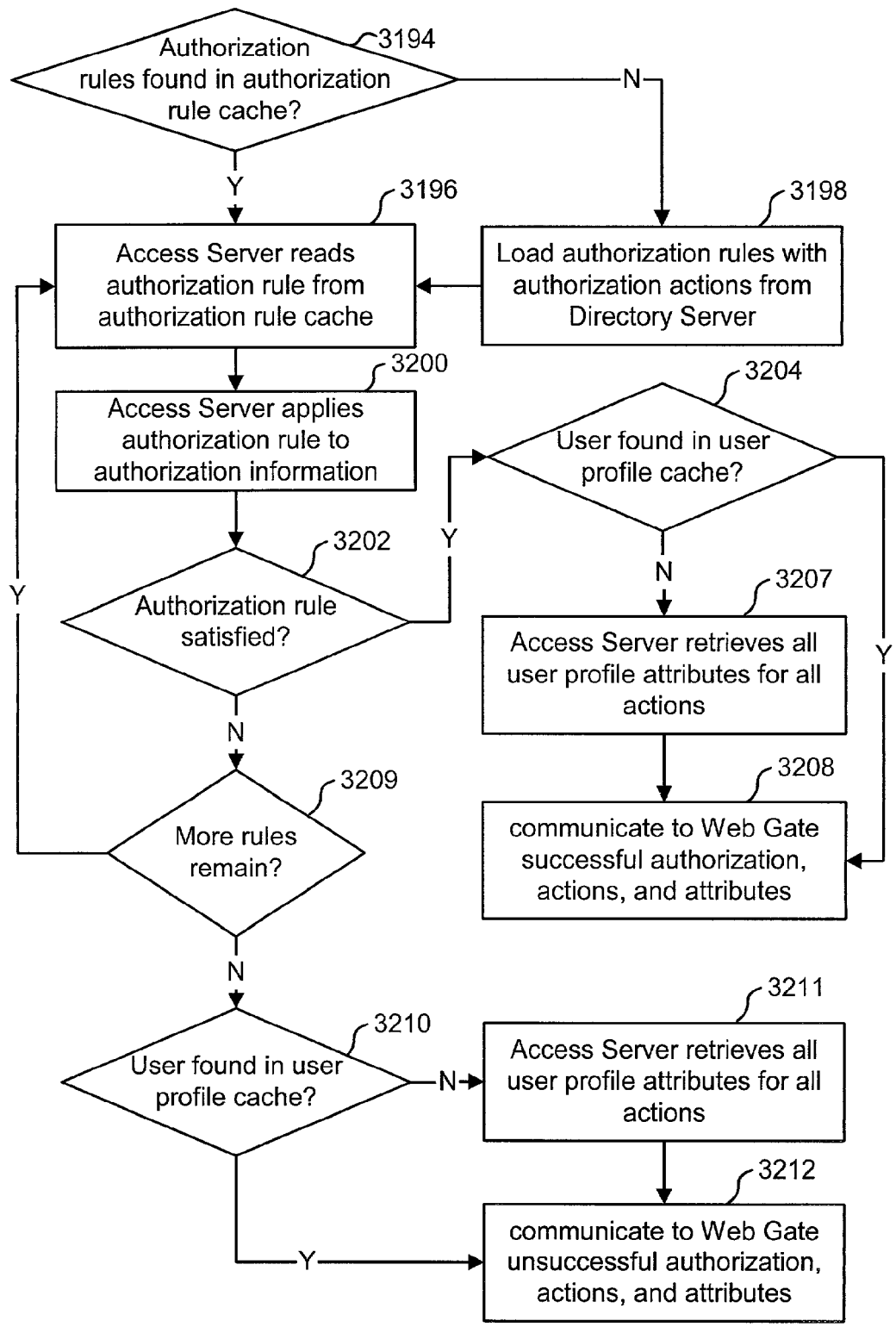
FIG. 72 is a flowchart describing a process for authorization.

FIG. 72 provides a flow chart describing a method for attempting to authorize a user. In step 3194, Access Server 34 determines whether one or more authorization rules associated with the requested resource are found in an authorization rule cache. If one or more rules are found, Access Server 34 proceeds to step 3196. Otherwise, Access Server 34 retrieves any authorization rules associated with the requested resource from Directory Server 36 in step 3198. In one embodiment, authorization success and failure actions are retrieved with the authorization rules. After retrieving the authorization rules, Access Server 34 proceeds to step 3196 and reads the first authorization rule associated with the requested resource from the authorization rule cache. Access Server 34 applies the authorization rule in step 3200.

If the authorization rule is satisfied in step 3202, Access Server 34 determines whether the identity profile attributes for the user are found in a user profile cache (step 3204). If so, Access Server 34 proceeds to step 3208. If not, Access Server 34 retrieves the attributes of the current user (step 3207), and communicates the authorization success actions and attributes to Web Gate 28 (step 3208).

If the authorization rule is not satisfied (step 3202), then Access Server 34 determines whether more authorization rules remain to be evaluated (step 3209). If more rules remain, the next rule is read (step 3196) and evaluated (step 3200). If no more rules remain, Access Server 34 determines whether the attributes for the user is found in the user profile cache (step 3210). If so, Access Server 34 proceeds to step 3212. If not, Access Server 34 retrieves the attributes of the current user (step 3211), and communicates the authorization success actions and attributes to Web Gate 28 (step 3212).

Figure 73:
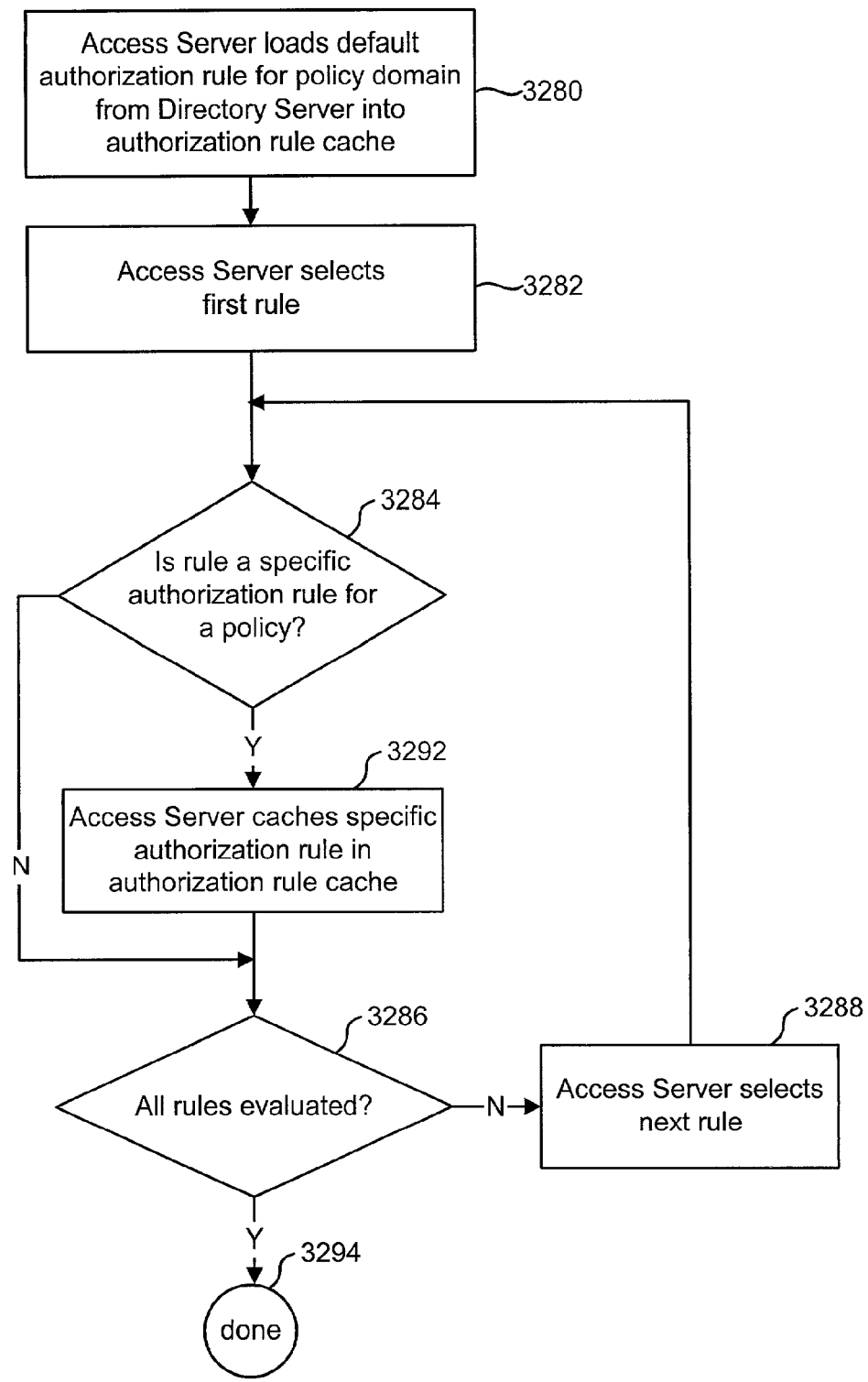
FIG. 73 is a flow chart describing a process for obtaining first and second level authorization rules from a Directory Server.

FIG. 73 provides a flow chart describing a method for loading an authorization rule from Directory Server 36. In step 3280, Access Server 34 loads the default authorization rule for the mapped policy domain from Directory Server 36 into the authorization rule cache. Access Server 34 then selects a first rule (step 3282) and determines whether the selected rule is a second level (specific) rule of a policy associated with the requested resource (step 3284). If yes, then Access Server 34 proceeds to step 3292. Otherwise, Access Server 34 determines whether all rules in the array have been evaluated (step 3286). If not, then Access Server 34 selects the next rule (step 3288) and returns to step 3284.

Once all rules in the array have been considered (step 3286), Access Server 34 proceeds to step 3294. If a second level authorization rule (a rule defined in a policy) was found for the requested resource in step 3284, then Access Server 34 caches the second level authorization rule in the authorization rule cache (step 3292). If a second level policy authorization rule was not found, then the default authorization rule previously loaded in step 3280 remains the only relevant rule in the authorization rule cache.

Figure 74:
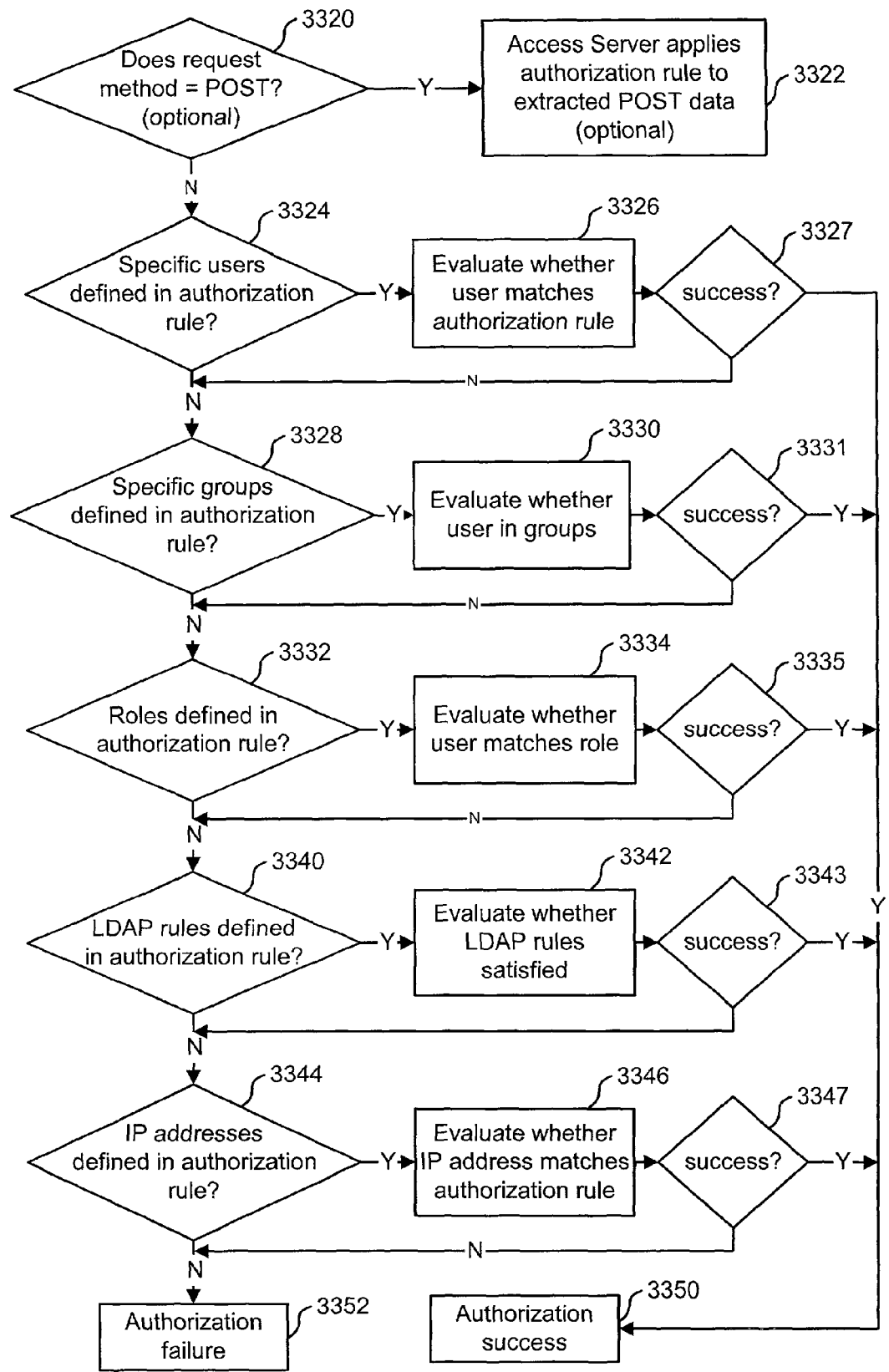
FIG. 74 is a flow chart describing a process for evaluating an authorization rule.

FIG. 74 provides a flow chart describing the method of applying an authorization rule (step 3200 of FIG. 72). In one embodiment, authorization can be performed using POST data. In another embodiment, POST data is not used for authorization. If POST data is to be used for authorization, then the method of FIG. 74 begins with optional step 3320. Otherwise, the method begins at step 3324. In optional step 3320, if the resource request employs a POST request method, then Access Server 34 proceeds to optional step 3322 where it applies the authorization rule to the POST data.

If the resource request does not employ a POST request method (or if POST data is not enabled to be used for authorization), then Access Server 34 proceeds to step 3324. If specific users are defined (by distinguished name) in the authorization rule, Access Server 34 evaluates whether the distinguished name of the authenticated user matches the distinguished name(s) called for by the authorization rule (step 3326). If specific groups are defined in the authorization rule (step 3328), Access Server 34 evaluates whether the authenticated user is a member of the groups identified in the authorization rule (step 3330). If specific roles are defined in the authorization rule (step 3332), then Access Server 34 evaluates whether the role of the authenticated user matches the role called for by the authorization rule (step 3334). If specific LDAP rules are defined in the authorization rule (step 3340), Access Server 34 evaluates whether the attributes of the authenticated user (and/or other data) satisfy the LDAP rule of the authorization rule (step 3342). In one embodiment, the result of the LDAP rule evaluation in step 3342 is cached. If specific IP addresses are defined in the authorization rule (step 3344), Access Server 34 evaluates whether the IP address of the authenticated user matches the IP address called for by the authorization rule (step 3346). If a successful match is found at any point (steps 3327, 3331, 3335, 3343, and 3347), the authorization is successful (step 3350). If no matches are found, authorization is unsuccessful (step 3352). In some embodiments, authorization is only successful if multiple matches are found. For example, a user must have the appropriate rule, be a member of the appropriate group and have an appropriate IP address.

More details of various processes for authenticating and authorizing, including using an application programinterface, can be found in U.S. patent application Ser. No. 09/814,091, "Access System Interface," filed on Mar. 21, 2001, Charles W. Knouse and Minoo Gupta ("'091 application"), which in its entirety is incorporated herein by reference. Specifically, FIGS. 14-56 of the '091 application describe the details of one set of implementations for authenticating and authorizing. FIGS. 58-62 of the '091 application describe a set of embodiments that use an application program interface for accessing the system. The present invention can make use of the authentication and/or authorization technology described in the '091 patent or various other methods of authentication and/or authorization.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. In an identity system, a method for using workflows to manage an identity profile, said method comprising:
   receiving, at said identity system, a request for an action that requires the use of a workflow and that pertains to at least one target identity profile of an entity in the identity system, wherein the target identity profile is included in a group of identity profiles;
   identifying a first workflow that performs the action and is associated with the target identity profile, wherein the first workflow is a workflow for which a user issuing the request to perform the action is authorized;
   initiating, in response to receiving the request and identifying the first workflow, the first workflow at said identity system;
   performing, as part of said first workflow, a first task at said identity system to modify an identity profile for one or more users, said identity profile comprising information for determining a set of access rights specifying whether said one or more users can access a resource on a computer;
   starting a second workflow as a subflow of said first workflow, according with custom function provided by a third party system external to the identify system, wherein the function responses to an associated event in an event catalog comprising pre and post events, and the starting of the second workflow includes providing a callback command that is used to restart said first workflow;
   performing, as part of said second workflow, a second task pertaining to said identity profile;
   wherein, said first workflow is performed by a first software application and said second workflow is performed by a second software application;
   accessing an indication that said first workflow should wait for said second workflow to complete said second task, wherein said indication is a result code indicating that said first workflow should pause, wherein the pause includes waiting to invoke said first workflow until said callback command is invoked; and
   waiting for said second workflow to complete said second task then invoke the callback command to restart said first workflow.

2. A method according to claim 1, wherein:
   said indication is a flag indicating that a particular step should wait for a subflow of a previous step.

3. A method according to claim 1, wherein said step of starting a second workflow comprises:
   determining that a particular step of said first workflow includes a supplied variable;
   searching for one or more workflows that can provide said supplied variable;
   identifying said second workflow as a result of said step of searching; and
   initiating said second workflow.

4. A method according to claim 3, further comprising:
   defining said first workflow, including indicating that said particular step of said first workflow includes said supplied variable.

5. A method according to claim 1, wherein said step of starting a second workflow comprises:
   determining that a current step of said first workflow includes a supplied variable;
   searching for one or more workflows that can provide said supplied variable;
   identifying a set of workflows as a result of said step of searching, said a set of workflows includes said second workflow;
   receiving a choice of said second workflow; and
   initiating said second workflow.

6. A method according to claim 1, further comprising:
   starting one or more additional nested workflows as subflows of said second workflow.

7. A method according to claim 6, wherein said step of starting one or more additional nested workflows comprises
   starting a third workflow as a subflow of said second workflow.

8. A method according to claim 7, wherein said step of starting one or more additional nested workflows further comprises:
   starting a fourth workflow as a subflow of said third workflow.

9. A method according to claim 7, wherein said step of starting a third workflow comprises:
   determining that a particular step of said second workflow includes a supplied variable;
   searching for one or more workflows that can provide said supplied variable;
   identifying said third workflow as a result of said step of searching; and
   initiating said third workflow.

10. A method according to claim 1, further comprising:
    reporting a result of said second workflow to said first workflow, if said first workflow is active; and
    reporting said result of said second workflow to said identity profile, if said first workflow is not active.

11. A method according to claim 1, wherein:
    said callback command includes a callback URL.

12. A method according to claim 1, wherein said step of starting a second workflow comprises:
    checking the event catalog to determine whether a particular event of said first workflow is identified in said event catalog; and
    invoking a process listed in said event catalog as being associated with said particular event of said first workflow, said process includes initiating said second workflow.

13. A method according to claim 1, further comprising:
    reporting a result of said second workflow to said first workflow, if said first workflow is active; and
    reporting said result of said second workflow to an identity profile, if said first workflow is not active.

14. A method according to claim 1, further comprising:
    using said identity profile to grant access to resources across multiple web servers from a single web-based authentication.

15. A method according to claim 1, wherein said first task to modify an identity profile comprises a task selected from the group consisting: of creating an identity profile, deleting an identity profile, and modifying one or more attributes of an identity profile.

16. A method according to claim 1, wherein said first task creates a new identity profile for a new user and adds said new identity profile to a directory, and wherein said second task comprises supplying a value for a variable in said new identity profile.

17. A method according to claim 16, further comprising:
    searching said identity system to identify a workflow that can supply said value for said variable, wherein starting a second workflow comprises starting said identified workflow.

18. A method according to claim 1, wherein said first task creates a new user and said second task adds said new user to a group.

19. A method according to claim 1, wherein receiving a request comprises an external system triggering the workflow.

20. A method according to claim 1, wherein receiving a request comprises receiving a request from a user.

21. A method according to claim 20, further comprising:
    determining whether said user is allowed to initiate said first workflow.

22. A method according to claim 21, wherein initiating a first workflow comprises:
    reporting to said user a set of one or more workflows that said first user is allowed to initiate, each of said one or more workflows being configured to perform said action, said set of one or more workflows comprising said first workflow; and
    receiving, from said user, a selection of said first workflow for performing said action.

23. The method of claim 1, wherein the group that includes the target identity profile includes one or more groups to which the target identity profile is a static member.

24. The method of claim 23, wherein the target identity profile is identified as a static member of the one or more groups based on a group identity profile for each of the one or more groups.

25. The method of claim 24, wherein the groups that include the target identity profile include one or more groups to which the target identity profile is a dynamic member.

26. The method of claim 25, wherein the target identity profile is identified as a dynamic member of the one or more groups based on application of a rule defined by the group identity profile for each of the one or more groups.

27. The method of claim 26, wherein the group that include the target identity profile includes one or more groups to which the target identity profile is a nested member.

28. The method of claim 27, wherein the target identity profile is identified as a dynamic member of the one or more groups based on the combined set of one or more groups to which the target identity profile is a static member and the one or more groups to which the target identity profile is a dynamic member.

29. In an identity system, a method for using workflows to manage an identity profile, said method comprising:
    receiving, at an identity system, a request from a first user to perform an action that modifies an identity profile for a second one or more users, said identity profile comprising information for determining a set of access rights specifying whether said one or more users can access a resource on a computer, wherein the request pertains to at least one target identity profile of an entity in the identity system, and the target identity profile is included in a group of identity profiles;
    reporting to said first user a set of one or more workflows that said first user is allowed to initiate, each of said one or more workflows being configured to perform said action;
    receiving, from said user, a selection of a first workflow for performing said action;
    performing said first workflow in a first software application, said first workflow modifying said identity profile;

causing a second process in a second software application to be performed in response to said first workflow;

starting a second workflow as a subflow of said first workflow according with custom function provided by a third party system external to the identify system, wherein the function responses to an associated event in an event catalog comprising pre and post events, and the starting of the second workflow includes providing a callback command that is used to restart said first workflow;

performing, as part of said second workflow, a second task pertaining to said identity profile;

wherein, said first workflow is performed by a first software application and said second workflow is performed by a second software application;

accessing an indication that said first workflow should wait for said second workflow to complete said second task, wherein said indication is a result code indicating that said first workflow should pause, wherein the pause includes waiting to invoke said first workflow until said callback command is invoked; and waiting for said second workflow to complete said second task then invoke the callback command to restart said first workflow.

30. A method according to claim 29, wherein:
said second process is a second workflow.

31. A method according to claim 30, wherein:
said first software application is a User Manager;
said second software application is a Group Manager;
said first workflows adds a new user to a directory; and
said second workflow adds said new user to one or more groups.

32. A method according to claim 29, wherein said step of causing comprises:
checking the event catalog to determine whether a particular event of said first workflow is identified in said event catalog; and
invoking a program listed in said event catalog as being associated with said particular event of said first workflow, said program sends a request to said second software application to invoke said second process.

33. A method according to claim 32, wherein:
said invoking a program includes passing one or more attributes of said identity profile to said program.

34. A method according to claim 32, wherein:
said invoking a program includes passing a distinguished name for said identity profile to said program.

35. A method according to claim 32, wherein:
said program creates and send an XML document to said second software application, said XML document includes said request to said second software application to invoke said second process.

36. A method according to claim 32, wherein:
said second process is a second workflow.

37. A method according to claim 32, further comprising:
receiving an output XML document from said second software application, said output XML document is received by said program and includes an output message from said second software application.

38. A method according to claim 32, wherein:
said program reads a configuration file and determines to invoke said second process based on said configuration file, said second process is a second workflow.

39. One or more non-transitory readable storage devices having processor readable code embodied on said processor readable storage devices, said processor readable code for programming one or more processors, said processor readable code comprising:

code for receiving a request for an action that requires the use of a workflow and that pertains to at least one target identity profile of an entity in the identity system, wherein the target identity profile is included in a group of identity profiles;

code for identifying a first workflow that performs the action and is associated with the target identity profile, wherein the first workflow is a workflow for which a user issuing the request to perform the action is authorized;

code for initiating, in response to receiving the request and identifying the first workflow, the first workflow at said identity system;

code for performing, as part of said first workflow, a first task to modify an identity profile for one or more users, said identity profile comprising information for determining a set of access rights specifying whether said one or more users can access a resource on a computer;

code for starting a second workflow as a subflow of said first workflow according with custom function provided by a third party system external to the identify system, wherein the function responses to an associated event in an event catalog comprising pre and post events, and the starting of the second workflow includes providing a callback command that is used to restart said first workflow;

code for performing, as part of said second workflow, a second task pertaining to said identity profile;

wherein, said first workflow is performed by a first software application and said second workflow is performed by a second software application;

code for accessing an indication that said first workflow should wait for said second workflow to complete said second task, wherein said indication is a result code indicating that said first workflow should pause, wherein the pause includes waiting to invoke said first workflow until said callback command is invoked; and code for waiting for said second workflow to complete said second task then invoke the callback command to restart said first workflow.

40. One or more non-transitory readable storage devices according to claim 39, wherein code for starting a second workflow comprises:
code for checking the event catalog to determine whether a particular event of said first workflow is identified in said event catalog; and
code for invoking a process listed in said event catalog as being associated with said particular event of said first workflow, said process includes initiating said second workflow.

41. One or more non-transitory readable storage devices according to claim 39, wherein said code for starting a second workflow comprises:
code for determining that a particular step of said first workflow includes a supplied variable;
code for searching for one or more workflows that can provide said supplied variable;
code for identifying said second workflow as a result of said step of searching; and
code for initiating said second workflow.

42. One or more non-transitory readable storage devices according to claim 39, wherein said processor readable code further comprises:
code for starting one or more additional nested workflows as subflows of said second workflow.

43. One or more non-transitory readable storage devices according to claim 42, wherein said code for starting a second workflow comprises:

code for determining that a particular step of said first workflow includes a supplied variable;

code for searching for one or more workflows that can provide said supplied variable;

code for identifying said second workflow as a result of said step of searching; and code for initiating said second workflow.

44. One or more non-transitory readable storage devices according to claim 42, wherein said processor readable code further comprises:

code for reporting a result of said second workflow to said first workflow, if said first workflow is active; and code for reporting said result of said second workflow to said identity profile, if said first workflow is not active.

45. One or more non-transitory readable storage devices having processor readable code embodied on said processor readable storage devices, said processor readable code for programming one or more processors, said processor readable code comprising:

code for receiving, at an identity system, a request from a first user to perform an action that modifies an identity profile for a second one or more users, said identity profile comprising information for determining a set of access rights specifying whether said one or more users can access a resource on a computer, wherein the request pertains to at least one target identity profile of an entity in the identity system, and the target identity profile is included in a group of identity profiles;

code for reporting to said first user a set of one or more workflows that said first user is allowed to initiate, each of said one or more workflows being configured to perform said action;

code for receiving, from said user, a selection of a first workflow for performing said action;

code for performing said first workflow in a first software application, said first workflow modifying said identity profile;

code for causing a second process in a second software application to be performed in response to said first workflow;

code for starting a second workflow as a subflow of said first workflow according with custom function provided by a third party system external to the identify system, wherein the function responses to an associated event in an event catalog comprising pre and post events, and the starting of the second workflow includes providing a callback command that is used to restart said first workflow;

code for performing, as part of said second workflow, a second task pertaining to said identity profile;

wherein, said first workflow is performed by a first software application and said second workflow is performed by a second software application;

code for accessing an indication that said first workflow should wait for said second workflow to complete said second task, wherein said indication is a result code indicating that said first workflow should pause, wherein the pause include waiting to invoke said first workflow until said callback command is invoked; and code for waiting for said second workflow to complete said second task then invoke the callback command to restart said first workflow.

46. One or more non-transitory readable storage devices according to claim 45, wherein said code for causing a second software application to be performed comprises:

code for checking the event catalog to determine whether a particular event of said first workflow is identified in said event catalog; and code for invoking a program listed in said event catalog as being associated with said particular event of said first workflow, said program sends a request to said second software application to invoke said second process.

47. One or more non-transitory readable storage devices according to claim 46, wherein:

said code for invoking a program includes code for passing one or more attributes of said identity profile to said program.

48. An apparatus that can use workflows, comprising:

a communication interface;

one or more processors in communication with said communication interface;

one or more processor readable storage devices having processor readable code embodied on said processor readable storage devices, said processor readable code for programming said one or more processors, said processor readable code comprising:

code for receiving a request for an action that requires the use of a workflow and that pertains to at least one target identity profile of an entity in the identity system, wherein the target identity profile is included in a group of identity profiles;

code for identifying a first workflow that performs the action and is associated with the target identity profile, wherein the first workflow is a workflow for which a user issuing the request to perform the action is authorized;

code for initiating, in response to receiving the request and identifying the first workflow, the first workflow at said identity system;

code for performing, as part of said first workflow, a first task to modify an identity profile for one or more users, said identity profile comprising information for determining a set of access rights specifying whether said one or more users can access a resource on a computer;

code for starting a second workflow as a subflow of said first workflow according with custom function provided by a third party system external to the identify system, wherein the function responses to an associated event in an event catalog comprising pre and post events, and the starting of the second workflow includes providing a callback command that is used to restart said first workflow;

code for performing, as part of said second workflow, a second task pertaining to said identity profile;

wherein, said first workflow is performed by a first software application and said second workflow is performed by a second software application;

code for accessing an indication that said first workflow should wait for said second workflow to complete said second task, wherein said indication is a result code indicating that said first workflow should pause, wherein the pause includes waiting to invoke said first workflow until said callback command is invoked; and code for waiting for said second workflow to complete said second task then invoke the callback command to restart said first workflow.

49. An apparatus according to claim 48, wherein said code for starting a second workflow comprises:

code for checking the event catalog to determine whether a particular event of said first workflow is identified in said event catalog; and code for invoking a process listed in said event catalog as being associated with said particular event of said first workflow, said process includes initiating said second workflow.

50. An apparatus according to claim 48, wherein said code for starting a second workflow comprises:

code for determining that a particular step of said first workflow includes a supplied variable;

code for searching for one or more workflows that can provide said supplied variable;

code for identifying said second workflow as a result of said step of searching; and code for initiating said second workflow.

51. An apparatus according to claim 48, wherein said processor readable code further comprises:

code for starting one or more additional nested workflows as subflows of said second workflow.

52. An apparatus that can use workflows, comprising:

a communication interface;

one or more processors in communication with said communication interface;

one or more processor readable storage devices having processor readable code embodied on said processor readable storage devices, said processor readable code for programming said one or more processors, said processor readable code comprising:

code for receiving, at an identity system, a request from a first user to perform an action that modifies an identity profile for a second one or more users, said identity profile comprising information for determining a set of access rights specifying whether said one or more users can access a resource on a computer, wherein the request pertains to at least one target identity profile of an entity in the identity system, and the target identity profile is included in a group of identity profiles;

code for reporting to said first user a set of one or more workflows that said first user is allowed to initiate, each of said one or more workflows being configured to perform said action;

code for receiving, from said user, a selection of a first workflow for performing said action;

code for performing said first workflow in a first software application, said first workflow modifying said identity profile;

code for causing a second process in a second software application to be performed in response to said first workflow;

code for starting a second workflow as a subflow of said first workflow according with custom function provided by a third party system external to the identify system, wherein the function responses to an associated event in an event catalog comprising pre and post events, and the starting of the second workflow includes providing a callback command that is used to restart said first workflow;

code for performing, as part of said second workflow, a second task pertaining to said identity profile;

wherein, said first workflow is performed by a first software application and said second workflow is performed by a second software application;

code for accessing an indication that said first workflow should wait for said second workflow to complete said second task, wherein said indication is a result code indicating that said first workflow should pause, wherein the pause includes waiting to invoke said first workflow until said callback command is invoked; and code for waiting for said second workflow to complete said second task then invoke the callback command to restart said first workflow.

53. An apparatus according to claim 52, wherein said code for causing a second software application to be performed comprises:

code for checking the event catalog to determine whether a particular event of said first workflow is identified in said event catalog; and code for invoking a program listed in said event catalog as being associated with said particular event of said first workflow, said program sends a request to said second software application to invoke said second process.

54. An apparatus according to claim 53, wherein:

said code for invoking a program includes code for passing one or more attributes of said identity profile to said program.

55. A method for using workflows to manage an identity profile, said method comprising:

receiving, at a user management application in an identity system, a request from a first user to perform a first action, the first action comprising creating a new identity profile for a second user, the identity profile comprising information for determining a set of access rights specifying whether said one or more users can access a resource on a computer to which access is controlled by said identity system, wherein the request pertains to at least one target identity profile of an entity in the identity system, and the target identity profile is included in a group of identity profiles;

reporting to said first user a set of one or more workflows that said first user is allowed to initiate, each of said one or more workflows being configured to perform said action;

receiving, from the user, a selection of a first workflow for performing the action;

initiating, in the user management application, the first workflow;

using the first workflow to create an identity profile for the second user, the identity profile comprising a plurality of attributes, the plurality of attributes comprising a first attribute corresponding to a variable that is to be supplied;

determining that a second workflow exists to supply the variable;

initiating the second workflow, from the first workflow, to supply the variable;

supplying the variable by writing a result of the second workflow to the identity profile according with custom function provided by a third party system external to the identify system, wherein the function responses to an associated event in an event catalog comprising pre and post events, and starting of the second workflow includes providing a callback command that is used to restart said first workflow;

initiating, from the first workflow, a third workflow in a group management application;

using the third workflow, in the group management application, to subscribe the identity profile to a specified group;

using said identity profile to grant access to resources across multiple web servers from a single web-based authentication;

wherein, said first workflow is performed by a first software application, said second workflow is performed by a second software application, and said third workflow is performed by a third software application;

accessing an indication that said first workflow should wait for said second workflow to complete said second task, wherein said indication is a result code indicating that said first workflow should pause, wherein the pause includes waiting to invoke said first workflow until said callback command is invoked; and waiting for said second workflow to complete said second task then invoke the callback command to restart said first workflow.

* * * * *

UNITED STATES PATENT AND TRADEMARK OFFICE
CERTIFICATE OF CORRECTION

| | | |
|---|---|---|
| PATENT NO. | : 7,937,655 B2 | |
| APPLICATION NO. | : 09/999074 | |
| DATED | : May 3, 2011 | |
| INVENTOR(S) | : Teng et al. | |

It is certified that error appears in the above-identified patent and that said Letters Patent is hereby corrected as shown below:

On page 2, in column 1, under "U.S. Patent Documents", line 38, delete "Marchk" and insert -- Marchak --, therefor.

On page 3, in column 1, under "Other Publications", line 11, delete "Verson" and insert -- Version --, therefor.

On page 3, in column 2, under "Other Publications", line 8, delete "2002," and insert -- 2006, --, therefor.

On page 5, in column 2, under "Other Publications", line 56, delete "Databased" and insert -- Database --, therefor.

On page 5, in column 2, under "Other Publications", line 57, delete "Agence"," and insert -- Agents", --, therefor.

On page 5, in column 2, under "Other Publications", line 57, delete "Arakwa" and insert -- Arakawa --, therefor.

On page 5, in column 2, under "Other Publications", line 61, delete "Comunications" and insert -- Communications --, therefor.

On sheet 5 of 52, in figure 5, Ref. Numeral 230, line 1, delete "enity" and insert -- entity --, therefor.

On sheet 22 of 52, in figure 32, Ref. Numeral 1402, line 1, delete "auxillary" and insert -- auxiliary --, therefor.

On sheet 22 of 52, in figure 32, Ref. Numeral 1406, line 1, delete "auxillary" and insert -- auxiliary --, therefor.

Signed and Sealed this
Eleventh Day of October, 2011

David J. Kappos
*Director of the United States Patent and Trademark Office*

On sheet 22 of 52, in figure 32, Ref. Numeral 1408, line 1, delete "auxillary" and insert -- auxiliary --, therefor.

On sheet 22 of 52, in figure 34, Ref. Numeral 1462, line 1, delete "auxillary" and insert -- auxiliary --, therefor.

On sheet 22 of 52, in figure 34, Ref. Numeral 1464, line 2, delete "auxillary" and insert -- auxiliary --, therefor.

On sheet 27 of 52, in figure 45, Ref. Numeral 1830, line 2, delete "Requet" and insert -- Request --, therefor.

On sheet 27 of 52, in figure 45, Ref. Numeral 1838, line 2, delete "Retreive" and insert -- Retrieve --, therefor.

In column 2, line 17, delete "(sublows")." and insert -- (subflows"). --, therefor.

In column 14, line 32, delete "conmon" and insert -- common --, therefor.

In column 24, line 43, delete "True_implicit" and insert -- True—implicit --, therefor.

In column 24, line 45, delete "False_implicit" and insert -- False—implicit --, therefor.

In column 31, line 12, delete "<oblix.request" and insert -- <oblix:request --, therefor.

In column 31, line 15, delete "<oblix.param" and insert -- <oblix: param --, therefor.

In column 31, line 23, delete "</oblix.request" and insert -- </oblix:request --, therefor.

In column 39, line 22, delete "doted" and insert -- dotted --, therefor.

In column 42, line 22, delete "<oblix: authenication" and insert -- <oblix: authentication --, therefor.

In column 47, line 66, delete "attmame" and insert -- attrname --, therefor.

In column 67, line 6, delete "702," and insert -- 2702, --, therefor.

In column 75, line 8, in Claim 5, delete "said a set" and insert -- a said set --, therefor.